(12) United States Patent
Sasaki et al.

(10) Patent No.: US 9,632,687 B2
(45) Date of Patent: Apr. 25, 2017

(54) CONTROL METHOD FOR INFORMATION APPARATUS AND COMPUTER-READABLE RECORDING MEDIUM THAT CONTROL HUMIDIFIERS CONNECTED TO NETWORK

(71) Applicant: PANASONIC INTELLECTUAL PROPERTY CORPORATION OF AMERICA, Torrance, CA (US)

(72) Inventors: Takamitsu Sasaki, Osaka (JP); Minehisa Nagata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 190 days.

(21) Appl. No.: 14/482,391

(22) Filed: Sep. 10, 2014

(65) Prior Publication Data

US 2015/0067562 A1    Mar. 5, 2015

Related U.S. Application Data

(63) Continuation of application No. PCT/JP2013/003099, filed on May 15, 2013.
(Continued)

(51) Int. Cl.
*G06F 3/0486* (2013.01)
*G06F 17/30* (2006.01)
(Continued)

(52) U.S. Cl.
CPC ........... *G06F 3/0486* (2013.01); *G05B 15/02* (2013.01); *G06F 3/0488* (2013.01);
(Continued)

(58) Field of Classification Search
CPC ........ H04M 11/00; F21V 33/00; G06Q 10/00; G06Q 10/10
See application file for complete search history.

(56) References Cited

U.S. PATENT DOCUMENTS

| | | | | |
|---|---|---|---|---|
| 5,598,524 A | * | 1/1997 | Johnston, Jr. | G06F 3/0486 715/769 |
| 5,815,147 A | * | 9/1998 | Bogen | A63F 13/005 715/835 |

(Continued)

FOREIGN PATENT DOCUMENTS

| | | |
|---|---|---|
| JP | 2000-081227 | 3/2000 |
| JP | 2000-138979 | 5/2000 |

(Continued)

OTHER PUBLICATIONS

"Aprilaire humidifiers user manual", published in 2010.*
Search report from PCT/JP2013/003099, mail date is Aug. 13, 2013.

*Primary Examiner* — Li Sun
*Assistant Examiner* — Jasmine Wan
(74) *Attorney, Agent, or Firm* — Greenblum & Bernstein, P.L.C.

(57) ABSTRACT

A control method according to the present disclosure causes a computer of an information apparatus to: display on a display a display screen representing a floor plan of a building; display on the display screen device icons respectively representing one or more target devices, the device icons being movable when dragged and including a humidifier icon that represents a humidifier; and when it is sensed that the humidifier icon is selected, and is moved on the floor plan, display an effect range in which an effect of the humidifier extends, in a region corresponding to a room in the floor plan where a drop of the humidifier icon is sensed.

12 Claims, 103 Drawing Sheets

Related U.S. Application Data

(60) Provisional application No. 61/766,877, filed on Feb. 20, 2013.

(51) Int. Cl.

| | | |
|---|---|---|
| *G06F 13/00* | (2006.01) | |
| *G05B 15/02* | (2006.01) | |
| *G06F 3/0481* | (2013.01) | |
| *G06F 3/0484* | (2013.01) | |
| *G06F 3/0488* | (2013.01) | |
| *H04L 29/08* | (2006.01) | |
| *G08C 17/00* | (2006.01) | |
| *G08C 17/02* | (2006.01) | |

(52) U.S. Cl.
CPC ...... *G06F 3/04817* (2013.01); *G06F 3/04842* (2013.01); *G06F 3/04847* (2013.01); *G06F 13/00* (2013.01); *G08C 17/00* (2013.01); *G08C 17/02* (2013.01); *H04L 67/025* (2013.01); *H04L 67/36* (2013.01); *G05B 2219/23258* (2013.01); *G05B 2219/2642* (2013.01); *G08C 2201/30* (2013.01); *G08C 2201/42* (2013.01)

(56) References Cited

U.S. PATENT DOCUMENTS

| | | | |
|---|---|---|---|
| 7,730,223 B1 | 6/2010 | Bavor et al. | |
| 8,579,452 B2 | 11/2013 | Diederiks et al. | |
| 9,072,848 B2* | 7/2015 | Bertinetti | A61M 16/0051 |
| 9,226,370 B2* | 12/2015 | Berkvens | H05B 37/0272 |
| 2002/0149561 A1* | 10/2002 | Fukumoto | G01C 21/3664 |
| | | | 345/156 |
| 2003/0038730 A1 | 2/2003 | Imafuku et al. | |
| 2004/0034484 A1* | 2/2004 | Solomita, Jr. | H02J 3/14 |
| | | | 702/62 |
| 2005/0131991 A1 | 6/2005 | Ogawa et al. | |
| 2007/0080940 A1 | 4/2007 | Aoki et al. | |
| 2008/0270215 A1* | 10/2008 | Erickson | G06Q 10/06 |
| | | | 705/7.13 |
| 2008/0316730 A1* | 12/2008 | Diederiks | G06F 3/0481 |
| | | | 362/85 |
| 2009/0002370 A1* | 1/2009 | Helfman | G06T 5/009 |
| | | | 345/440 |
| 2009/0109051 A1* | 4/2009 | Bodden | G08B 15/002 |
| | | | 340/691.2 |
| 2009/0136231 A1* | 5/2009 | Lai | G08C 17/02 |
| | | | 398/112 |
| 2009/0179338 A1* | 7/2009 | Cottier | G01W 1/06 |
| | | | 261/129 |
| 2009/0307255 A1* | 12/2009 | Park | G06Q 10/10 |
| 2009/0317160 A1* | 12/2009 | Kougami | G03G 15/6576 |
| | | | 399/406 |
| 2011/0055212 A1* | 3/2011 | Tsai | G06F 17/30705 |
| | | | 707/737 |
| 2012/0166041 A1* | 6/2012 | Takehisa | B60H 1/00742 |
| | | | 701/36 |
| 2014/0043791 A1 | 2/2014 | Diederiks et al. | |
| 2015/0058741 A1* | 2/2015 | Sasaki | G06Q 10/00 |
| | | | 715/740 |

FOREIGN PATENT DOCUMENTS

| | | |
|---|---|---|
| JP | 2000-356372 | 12/2000 |
| JP | 2003-052093 | 2/2003 |
| JP | 2005-198252 | 7/2005 |
| JP | 2007-104567 | 4/2007 |
| JP | 2007-158574 | 6/2007 |
| JP | 5128489 | 5/2009 |
| JP | 2009-213107 | 9/2009 |
| JP | 2010-244133 | 10/2010 |
| JP | 2012-225590 | 11/2012 |

\* cited by examiner

| VERTEX ID | VERTEX COORDINATE |
|-----------|-------------------|
| A         | (X0,Y0,Z1)        |
| B         | (X20,Y0,Z1)       |
| C         | (X40,Y0,Z1)       |
| ...       |                   |
| P         | (X150,Y100,Z1)    |

| ROOM ID | ROOM TYPE | ROOM COORDINATE |
|---|---|---|
| A | LIVING ROOM | (F,G,H,I,L,O,N) |
| B | BEDROOM | (J,K,M,L,I) |
| C | BATH | (A,B,G,F) |
| D | STAIRCASE | (H,I,R,Q) |
| ... | | |

FIG.34

| DEVICE ID | DEVICE TYPE | MODEL NUMBER | ARRANGEMENT | CAPABILITY INFORMATION | CONTROL COMMAND TRANSMISSION DESTINATION |
|---|---|---|---|---|---|
| 4701 | 4702 | 4703 | 4704 | 4705 | 4706 |
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE |
| B | ILLUMINATION | HH-LC710A | (X30,Y150,Z1) | ON/OFF CONTROL AND DIMMER CONTROL | DEVICE |
| C | REFRIGERATOR | NR-F557XV | (X50,Y200,Z1) | POWER CONSUMPTION STATE MANAGEMENT | SERVER |
| ... | | | | | |

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | (X10,Y100,Z1) | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | (X30,Y150,Z1) | ON/OFF CONTROL AND DIMMER CONTROL | DEVICE | 192.168.0.6 |
| C | REFRIGERATOR | NR-F557XV | (X50,Y200,Z1) | POWER CONSUMPTION STATE MANAGEMENT | SERVER | 192.168.0.7 |
| ... | | | | | | |

3100

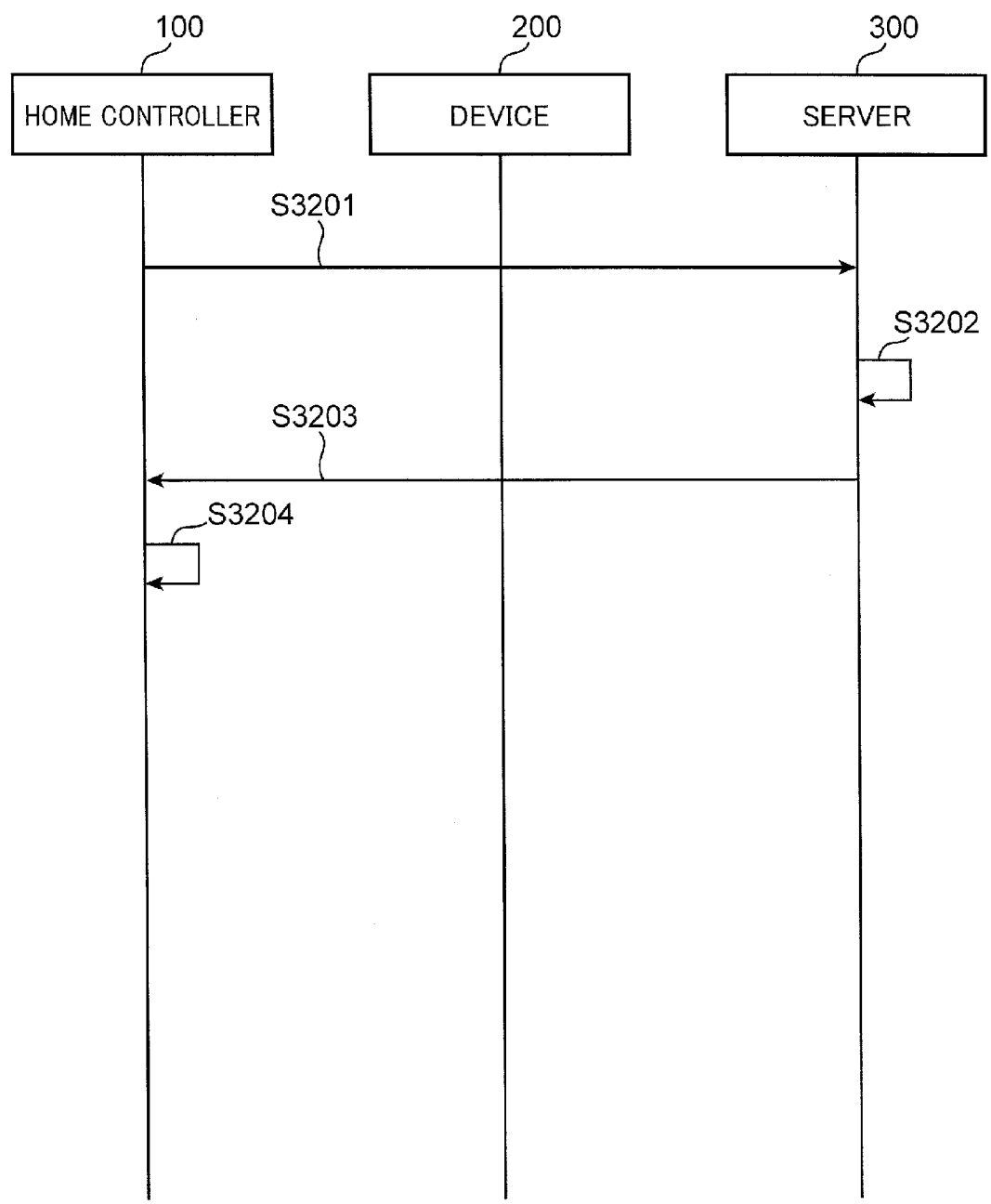

FIG. 68

| ROOM ID | ROOM TYPE | FLOOR LEVEL | DISPLAY POSITION |
|---|---|---|---|
| A | LIVING ROOM | FIRST FLOOR | FIRST CELL ON FIRST FLOOR |
| B | BEDROOM | SECOND FLOOR | FIRST CELL ON SECOND FLOOR |
| C | BATH | FIRST FLOOR | FOURTH CELL ON FIRST FLOOR |
| D | STAIRCASE | FIRST FLOOR SECOND FLOOR | SEVENTH CELL ON FIRST FLOOR SECOND CELL ON SECOND FLOOR |
| ... | | | |

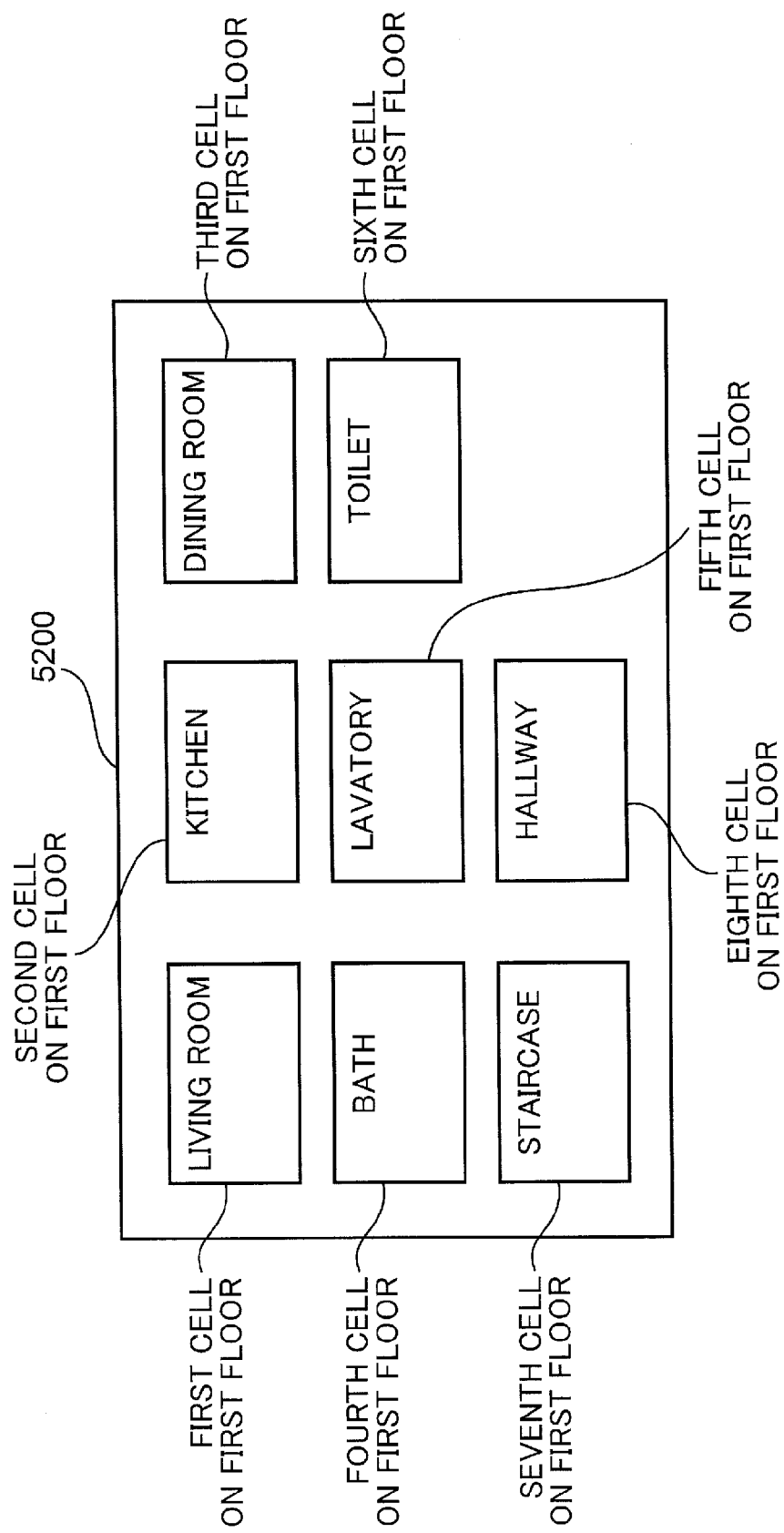

FIG.70

| DEVICE ID 4701 | DEVICE TYPE 4702 | MODEL NUMBER 4703 | ARRANGEMENT 4704 | CAPABILITY INFORMATION 4705 | CONTROL COMMAND TRANSMISSION DESTINATION 4706 |
|---|---|---|---|---|---|
| A | AIR CONDITIONER | CS-X403C | LIVING ROOM | TEMPERATURE CONTROL, AIR FLOW DIRECTION CONTROL AND AIR FLOW AMOUNT CONTROL | DEVICE |
| B | ILLUMINATION | HH-LC710A | LIVING ROOM | ON/OFF CONTROL AND DIMMER CONTROL | DEVICE |
| C | REFRIGERATOR | NR-F557XV | KITCHEN | POWER CONSUMPTION STATE MANAGEMENT | SERVER |
| ... | | | | | |

| DEVICE ID 3101 | DEVICE TYPE 3102 | MODEL NUMBER 3103 | ARRANGEMENT 3104 | CAPABILITY INFORMATION 3105 | CONTROL COMMAND TRANSMISSION DESTINATION 3106 | IP ADDRESS 3107 |
|---|---|---|---|---|---|---|
| A | AIR CONDITIONER | CS-X403C | LIVING ROOM | TEMPERATURE CONTROL, AIR FLOW DIRECTION CONTROL, AND AIR FLOW AMOUNT CONTROL | DEVICE | 192.168.0.5 |
| B | ILLUMINATION | HH-LC710A | LIVING ROOM | ON/OFF CONTROL AND DIMMER CONTROL | DEVICE | 192.168.0.6 |
| C | REFRIGERATOR | NR-F557XV | KITCHEN | POWER CONSUMPTION STATE MANAGEMENT | SERVER | 192.168.0.7 |
| ... | | | | | | |

3100

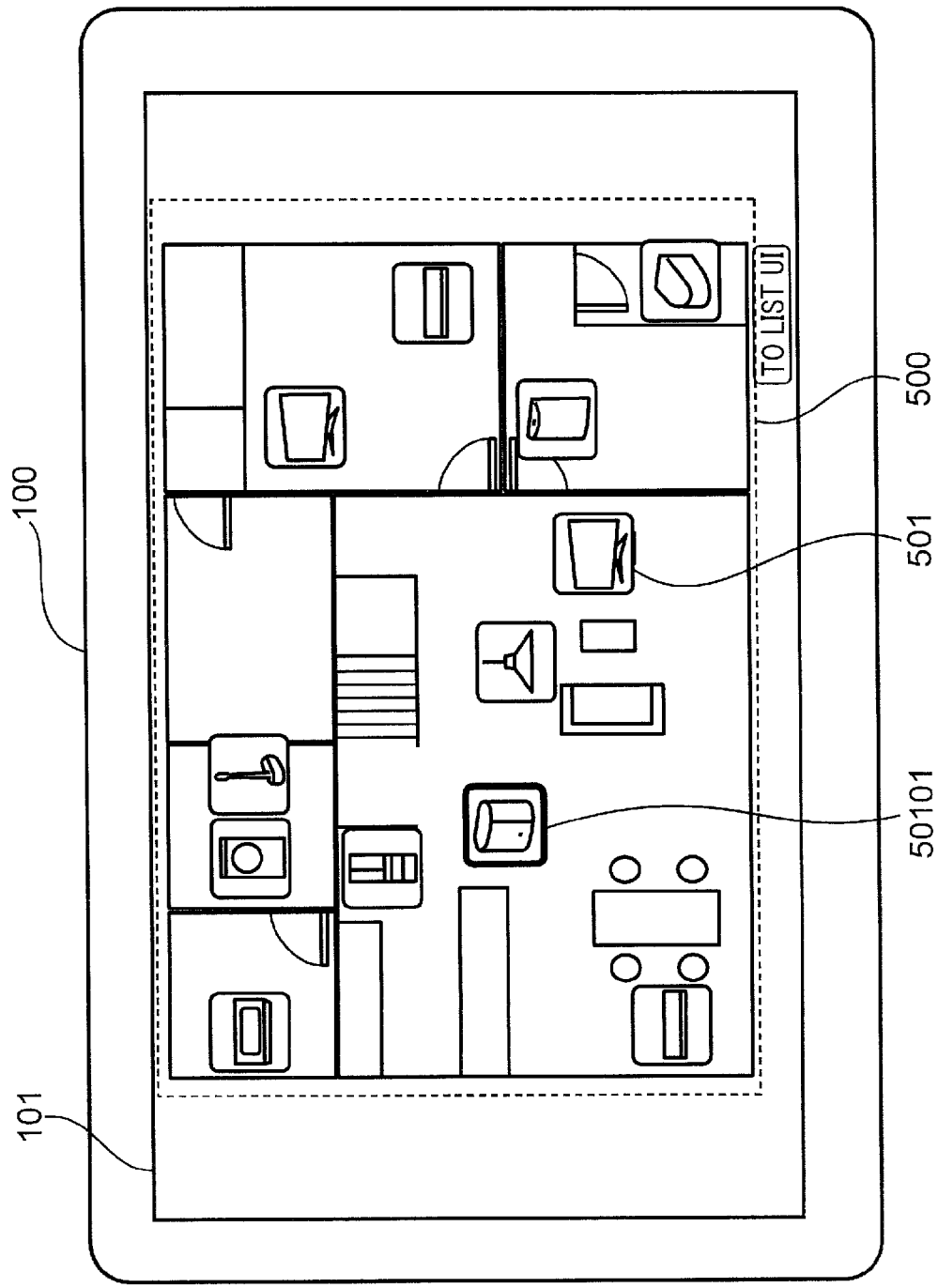

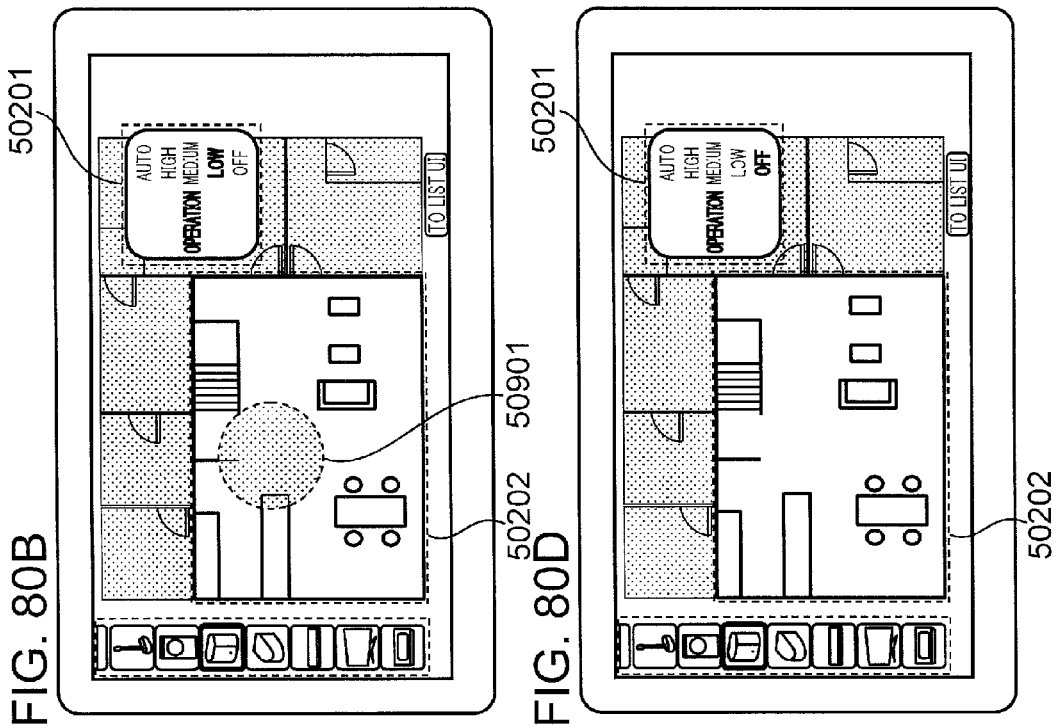
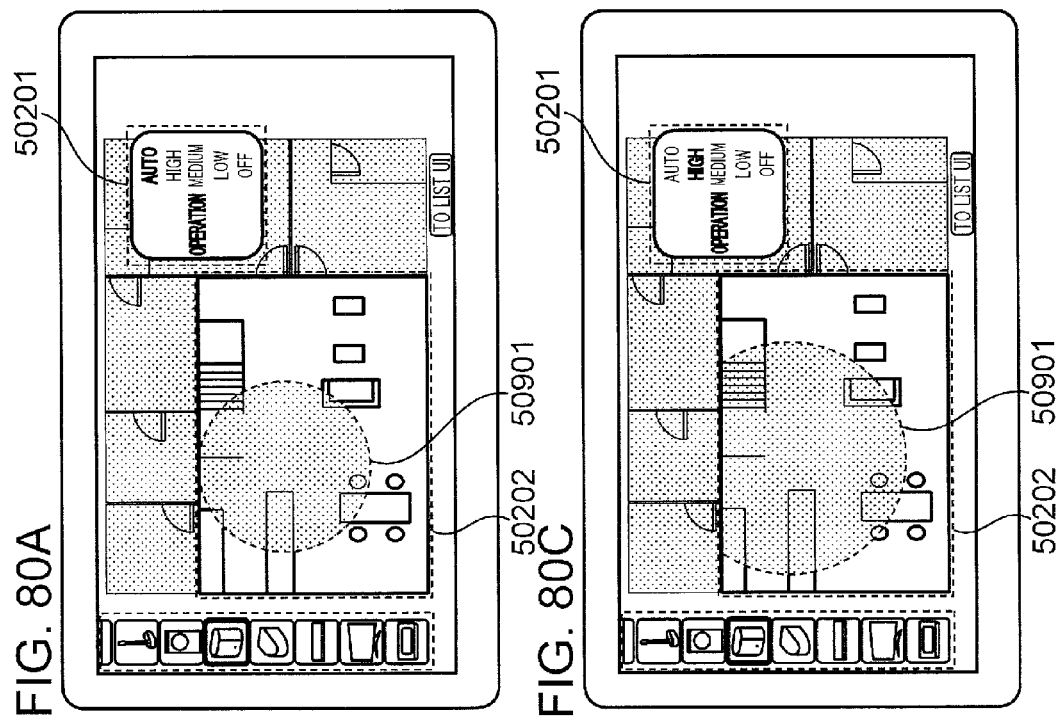

FIG. 88

| DEVICE ID 51701 | DEVICE TYPE 51702 | MODEL NUMBER 51703 | ARRANGEMENT 51704 | CAPABILITY INFORMATION 51705 | CONTROL COMMAND TRANSMISSION DESTINATION 51706 | ACCOMMODATED AREA: SQUARE METERS 51707 |
|---|---|---|---|---|---|---|
| A | AIR CONDITIONER | CS-X403C | (X10,Y80,Z1) | TEMPERATURE CONTROL AIR FLOW DIRECTION CONTROL AIR FLOW AMOUNT CONTROL | DEVICE | 22.7 (4.0kW) |
| B | ILLUMINATION | HH-LC710A | (X60,Y60,Z1) | ON/OFF CONTROL DIMMER CONTROL | DEVICE | 16.2 (5000lm・73W) |
| C | REFRIGERATOR | NR-F557XV | (X30,Y30,Z1) | POWER CONSUMPTION STATE MANAGEMENT | SERVER | — |
| D | HUMIDIFIER | FE-KLG01 | (X45,Y10,Z1) | AIR FLOW AMOUNT CONTROL | DEVICE | 16.2 |
| ... | | | | | | |

51700

CONTROL METHOD FOR INFORMATION APPARATUS AND COMPUTER-READABLE RECORDING MEDIUM THAT CONTROL HUMIDIFIERS CONNECTED TO NETWORK

RELATED APPLICATIONS

This application is a continuation application of International Application No. PCT/JP2013/003099, filed May 15, 2013, which claims the benefit of U.S. Provisional application No. 61/766,877, filed Feb. 20, 2013, the disclosures of which are incorporated by reference herein in their entireties.

TECHNICAL FIELD

The present disclosure relates to a control method for an information apparatus and a program.

BACKGROUND ART

Technologies for remotely monitoring or remotely controlling one or more target devices using one remote controller are proposed.

Patent Document 1 discloses a technology for remotely operating one or more target devices from a monitor of a television set. Specifically, icons for the one or more target devices are displayed on the right side of a monitor screen. When a desired one of the icons is selected (i), a floor plan is displayed on the left side of the monitor screen (ii). When a pointer is moved to the location of installation of a target device desired to be operated in the floor plan (iii), an operation screen for the target device selected by moving the pointer is displayed on the monitor screen (iv) (paragraphs [0138] to [0140] and FIGS. 25A and 25B).

Patent Document 2 discloses a technology for controlling one or more target devices using a single remote controller. Specifically, a floor plan of each room and the condition within the room are displayed on a liquid crystal monitor of the remote controller. For example, the liquid crystal monitor displays a illumination mark displayed in the case where an illumination device of a certain room is turned on, a room temperature mark that indicates the current temperature of a certain room, a lock mark in the shape of a hatched window displayed in the case where a window of a certain room is locked, a device/facility mark that indicates the status or the like of a control target object, a mark that indicates the amount of hot water in the case where the control target is a bath, and so forth (paragraphs [0037] to [0041] and FIG. 6).

Patent Document 3 relates to a technology for remotely controlling and remotely monitoring open/close operation and the state of an electric building material (such as a hallway door or a skylight). Specifically, a monitor screen of a personal computer displays floor plans for first and second floors of a property, a picture of the electric building material (such as a hallway door or a skylight) and a state display icon that indicates the open/close state of the electric building material are displayed at the corresponding position on the floor plans. When the state display icon is selected, an operation screen for the selected electric building material is displayed in another window. The operation screen includes an open operation button, a close operation button, an operation monitor screen, and a button for hiding the operation screen (paragraph [0025] and FIGS. 4, 5, and 6).

Patent Document 4 discloses a user interface including a floor plan and an icon. Examples of the icon include an icon representing a receptacle, an icon representing a digital image frame, and an icon representing an illumination device (FIGS. 7 and 8B).

Patent Document 5 discloses a user interface of an illumination system. When an icon associated with a certain light source is dragged into a target region on a screen and moved toward the center of the target region, the intensity of light from the corresponding light source is increased.

However, Patent Documents 1 to 5 described above need a further improvement.

Patent Document 1: Japanese Patent Application Laid-open No. 2007-104567
Patent Document 2: Japanese Patent Application Laid-open No. 2000-138979
Patent Document 3: Japanese Patent Application Laid-open No. 2009-213107
Patent Document 4: U.S. Pat. No. 7,730,223
Patent Document 5: Japanese Patent No. 5128489

SUMMARY OF THE INVENTION

In one general aspect, the techniques disclosed here feature a method for controlling an information apparatus having a display and being connected to a network, one or more target devices being controlled over the network, the method causing a computer of the information apparatus to:

display on the display a display screen representing a floor plan of a building;

display on the display screen device icons respectively representing the one or more target devices, the device icons being movable when dragged and including a humidifier icon that represents a humidifier; and when it is sensed that the humidifier icon is selected, and is moved on the floor plan, display an effect range in which an effect of the humidifier extends, in a region corresponding to a room in the floor plan where a drop of the humidifier icon is sensed.

According to the aspect described above, it is possible to embody a further improvement. These general and specific aspects may be implemented using a system, a method, and a computer program, and any combination of systems, methods, and computer programs.

BRIEF DESCRIPTION OF THE DRAWINGS

FIG. 31 is a diagram showing the configuration of vertex information according to the present disclosure.

FIG. 32 is a diagram showing the configuration of room information according to the present disclosure.

FIG. 34 is a diagram showing the configuration of a device list managed by the server according to the present disclosure.

FIG. 35 is a diagram showing the configuration of a device list managed by the home controller according to the present disclosure.

FIG. 36 is a sequence diagram showing the flow of a process for the home controller to acquire the home information from the server according to the present disclosure.

FIG. 68 is a diagram showing the configuration of room information shown in FIG. 67.

FIG. 69 is a diagram showing an example of the correspondence between the display position in the room information shown in FIG. 67 and the floor plan.

FIG. 70 is a diagram showing the configuration of a device list managed by the server for a case where the floor plan shown in FIG. 52 is adopted.

FIG. 71 is a diagram showing the configuration of a device list managed by the home controller for a case where the floor plan shown in FIG. 52 is adopted.

FIG. 72 is a diagram showing an example of a basic screen displayed on a display of a home controller.

FIG. 80A is a diagram showing an example of displaying an effect range and a control screen in a case where an operation mode of a humidifier is set to "auto".

FIG. 80B is a diagram showing an example of displaying an effect range and a control screen in a case where the operation mode of the humidifier is set to "low".

FIG. 80C is a diagram showing an example of displaying an effect range and a control screen in a case where the operation mode of the humidifier is set to "high".

FIG. 80D is a diagram showing an example of displaying an effect range and a control screen in a case where the operation mode of the humidifier is set to "off".

FIG. 88 is a diagram showing a configuration of a device list that is managed by a server and/or a home controller.

Figure 1:
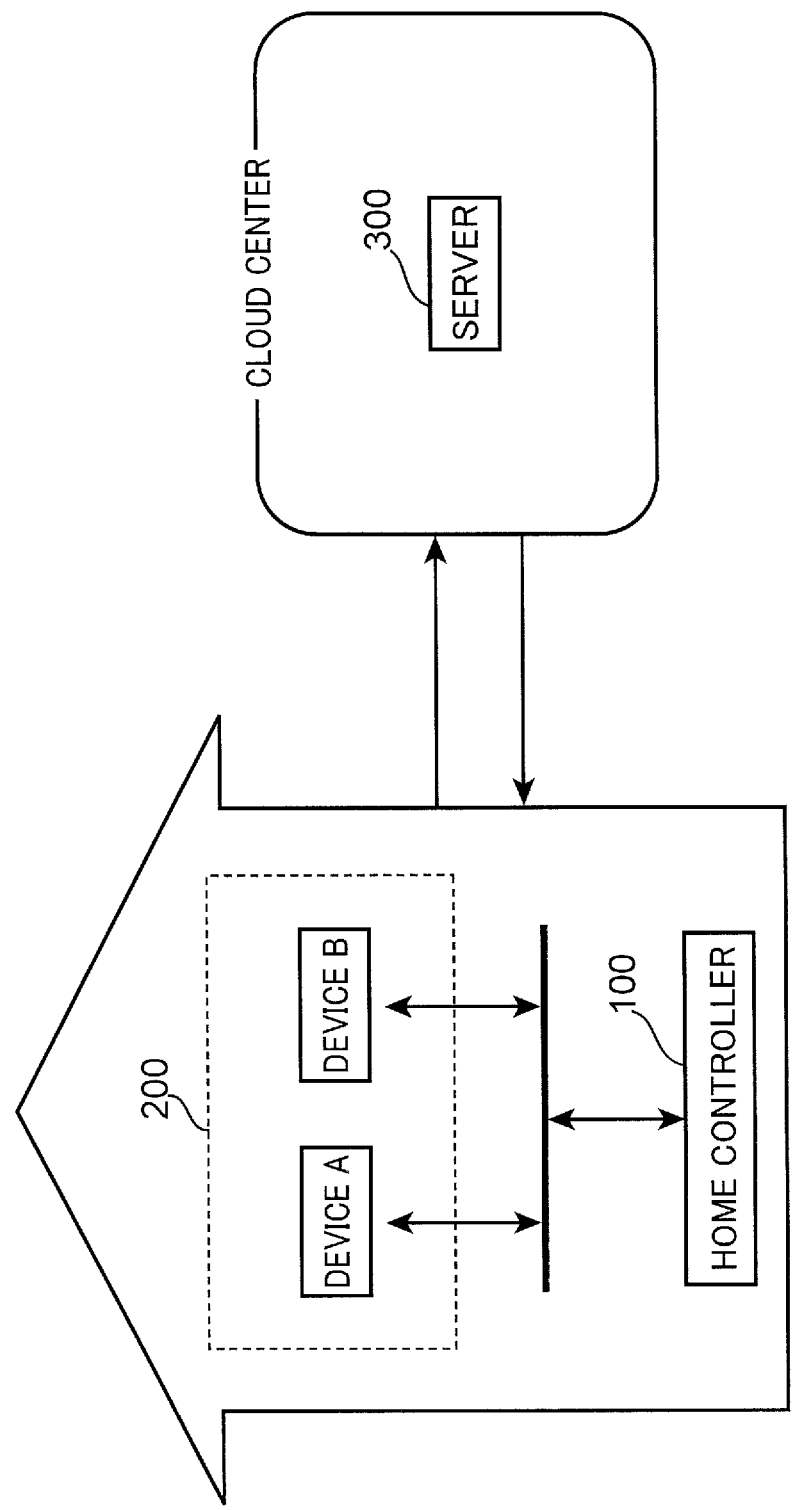
FIG. 1 is a diagram showing an overall configuration of a home control system to which a home controller according to the present disclosure is applied.

DETAILED DESCRIPTION (Story Before Inventing Aspect According to Present Disclosure)

First, the point of view of an aspect according to the present disclosure will be described.

In Patent Document 1 described above, icons for one or more target devices are displayed on the right side of a monitor screen, and a floor plan is displayed on the left side of the monitor screen. That is, the icons for the one or more target devices and the floor plan are displayed separately from each other, and the icons for the one or more target devices are not movable. Therefore, the location of installation of a target device desired to be operated in the floor plan is designated by moving a pointer. Then, an operation screen is displayed.

In Patent Document 1 described above, because of the configuration described above, the number of operation steps to be taken to display an operation screen for a desired target device is large, from (i) to (iv) described above. Therefore, when one or more target devices are remotely monitored or remotely controlled using one remote controller, the operation steps (i) to (iv) described above are required to operate each target device, which complicates operation. This requires a larger number of process steps to be taken by a portable information terminal before a desired target device among the one or more target devices is operated simply because remote controllers for the one or more target devices are integrated into one, which requires a larger number of process operations to be performed by a user.

Patent Document 2 described above describes only displaying the state of each target device, and does not describe at all remotely controlling operation of each target device. Therefore, although the one or more target devices can be remotely monitored using one remote controller, the one or more target devices cannot be controlled.

In Patent Document 3 described above, open/close operation and the state of an electric building material (such as a hallway door or a skylight) are remotely controlled and remotely monitored using a personal computer. However, the content of the remote control is merely simple control of open/close operation. Patent Document 3 described above does not disclose individual issues specific to individual target devices.

In Patent Document 4 described above, an operation screen for an illumination device, or an operation screen for a digital image frame, is merely displayed (FIG. 8B). No operation screens for other control targets are disclosed. For example, air, which is the target to be purified by an air purifier, is not visible to human eyes.

In Patent Document 5 described above, an icon is moved from the outside of a target region to the inside of the target region to merely control the quantity of light from an illumination device in a room corresponding to the target region.

Based on the considerations described above, the inventors have conceived various aspects of the present disclosure to be described below.

An aspect of the present disclosure provides a method for controlling an information apparatus having a display and being connected to a network, one or more target devices being controlled over the network, the method causing a computer of the information apparatus to:

display on the display a display screen representing a floor plan of a building;

display on the display screen device icons respectively representing the one or more target devices, the device icons being movable when dragged and including a humidifier icon that represents a humidifier; and when it is sensed that the humidifier icon is selected, and is moved on the floor plan, display an effect range in which an effect of the humidifier extends, in a region corresponding to a room in the floor plan where a drop of the humidifier icon is sensed.

For example, an air flow amount of the humidifier can be set to a plurality of stages including "high", "medium", and "low". In addition, a floor area to which the humidifier can be applied depends on a performance of the humidifier, and a size of a room that can be accommodated by the humidifier depends on the performance thereof. Therefore, for example, when a humidifier is operated in a room that is larger than a room that can be accommodated by the humidifier based on performance, the humidifier is unable to humidify the entire room in which the humidifier is operated.

In addition, air that is an object of humidification by the humidifier is invisible to the human eye.

In consideration thereof, by displaying an effect range of the humidifier in a region corresponding to a room in which drop of a humidifier icon representing the humidifier is sensed in the floor plan, a guide with respect to what kind of range can be humidified based on the performance of the humidifier can be presented in advance.

Accordingly, at which position the humidifier is to be disposed in accordance with the performance of the humidifier in order to more effectively humidify air in a region corresponding to a room in which selection of a humidifier icon representing the humidifier is sensed can be presented in advance before operating the humidifier.

Furthermore, in the aspect described above, for example, when it is sensed that the humidifier icon is dragged from a first region corresponding to a first room in which the humidifier icon was placed in the floor plan and is dropped in a second region corresponding to a second room that differs from the first room, an effect range in which the effect of the humidifier extends may be displayed in the second region corresponding to the second room.

In addition, in the aspect described above, for example, when a first size of the first room differs from a second size of the second room, the effect range in the first region corresponding to the first room may differ from the effect range in the second region corresponding to the second room.

Furthermore, in the aspect described above, for example, when selection of the humidifier icon is sensed in the region corresponding to the room in which the drop of the humidifier icon is sensed, a control screen for at least operation or state confirmation of a humidifier corresponding to the selected humidifier icon may be displayed.

In addition, in the aspect described above, for example, a control command may be output to the network based on an operation on the control screen, the control command being used for at least the operation or the state continuation of the humidifier.

Furthermore, in the aspect described above, for example, the effect range may be a range that is humidified by the humidifier.

In addition, in the aspect described above, for example, the effect range may change in accordance with the operation on the control screen.

Furthermore, in the aspect described above, for example, the effect range may become wider in a case where the humidifier is set to operate in a stronger operation state than a current operation state based on the operation on the control screen and may become narrower in a case where the humidifier is set to operate in a weaker operation state than the current operation state based on the operation on the control screen.

In addition, in the aspect described above, for example, the effect range may be a circular range that is centered on the humidifier icon.

Furthermore, in the aspect described above, for example, the display may comprise a touch panel display, and the device icon may be moved when a contact of a prescribed object with the touch panel display is sensed at a position corresponding to the device icon and the device icon is dragged.

In addition, in the aspect described above, for example, the humidifier includes a setting section for setting an amount of humidified air output from the humidifier, the display may comprise a touch panel display, and when a contact of a prescribed object with the touch panel display is sensed in a region corresponding to the displayed effect range and a continuous movement of the contact is sensed on the display screen, a control command for changing the amount of the humidified air output from the humidifier may be output to the network, in accordance with the movement of the contact.

Furthermore, another aspect of the present disclosure provides a program to be executed by an information apparatus having a display and being connected to a network, one or more target devices being controlled over the network, the program causing a computer of the information apparatus to:

display on the display a display screen representing a floor plan of a building;

display on the display screen device icons respectively representing the one or more target devices, the device icons being movable when dragged and including a humidifier icon that represents a humidifier; and when it is sensed that the humidifier icon is selected, and is moved on the floor plan, display an effect range in which an effect of the humidifier extends, in a region corresponding to a room in the floor plan where a drop of the humidifier icon is sensed.

(The Present Disclosure)

The present disclosure will be described below with reference to the drawings. In the drawings, the same symbols are used for the same constituent elements.

In the present disclosure, a home controller which can singly control one or more devices will be described.

(Overall Configuration)

FIG. 1 is a diagram showing an overall configuration of a home control system to which a home controller according to the present disclosure is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The server 300 is disposed in a cloud center. The home controller 100, the device 200, and the server 300 communicate with each other via a wired or wireless network. For example, the device 200 and the home controller 100 are communicably connected to each other via a wireless or wired in-home network, and the home controller 100, the device 200, and the server 300 are communicably connected to each other via an external network such as the Internet.

The home controller 100 is not necessarily disposed in the house, and may be disposed outside the house. In this case, a user controls the one or more devices 200 from a location away from the home.

A portable information terminal such as a smartphone or a tablet terminal may be adopted as the home controller 100. It should be noted, however, that the smartphone and the tablet terminal are merely exemplary, and a portable information terminal of a button type such as a cellular phone may be adopted as the home controller 100.

Figure 2:
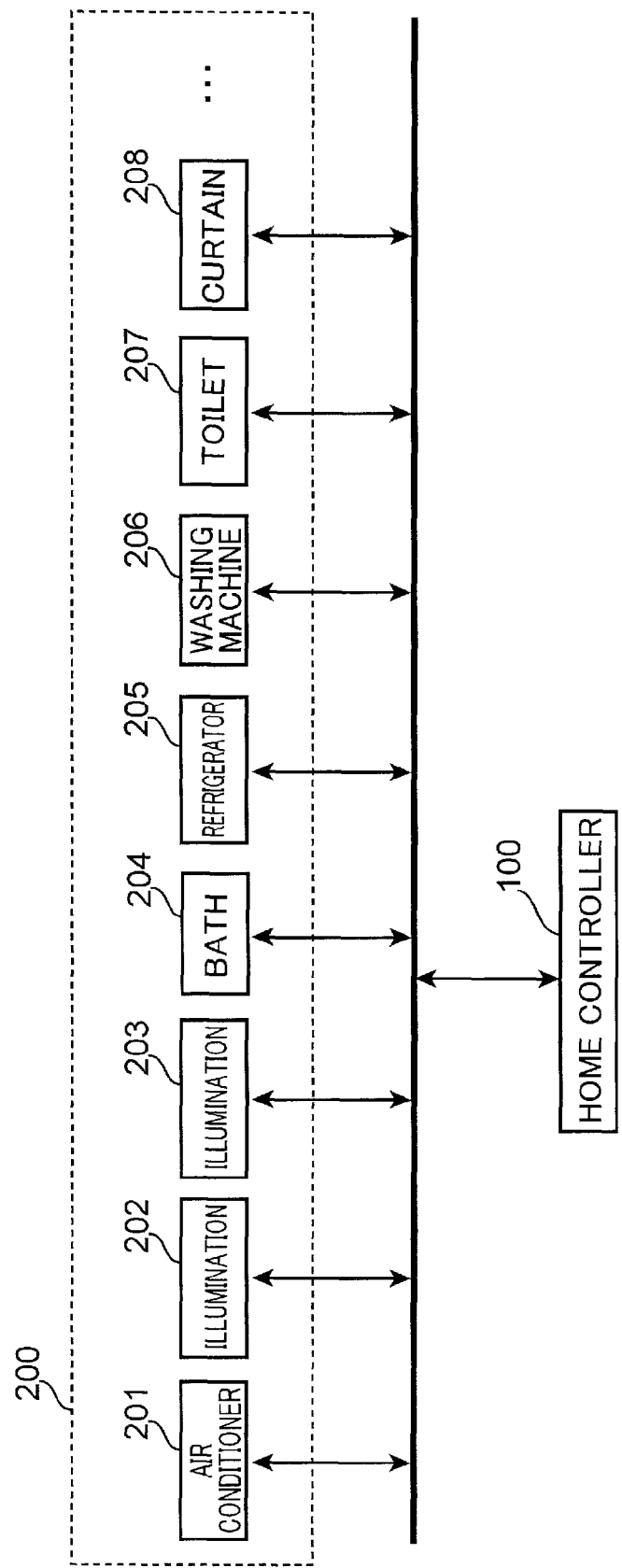
FIG. 2 is a diagram showing main devices to be controlled by the home controller according to the present disclosure.

FIG. 2 is a diagram showing the main devices 200 to be controlled by the home controller 100. The home controller 100 controls the devices 200 such as an air conditioner 201, illumination devices 202 and 203, a bath 204, a refrigerator 205, a washing machine 206, a toilet 207, and a curtain 208. The devices 200 to be controlled by the home controller 100 may include a plurality of devices 200 of the same type such as the illumination devices 202 and 203.

The devices 200 such as the air conditioner 201 shown in FIG. 2 are merely exemplary, and a television set, a Blu-ray recorder, an audio device, and so forth may be adopted as the devices 200. That is, any electrical device that functions to communicate with the home controller 100 may be adopted as the device 200. In FIG. 2, electrical devices for use in ordinary households are shown as the devices 200. However, the present disclosure is not limited thereto, and office devices for use in offices or the like may be adopted as the devices 200. Examples of the office devices include a printer, a personal computer, a scanner, and a copy machine.

Figure 3:
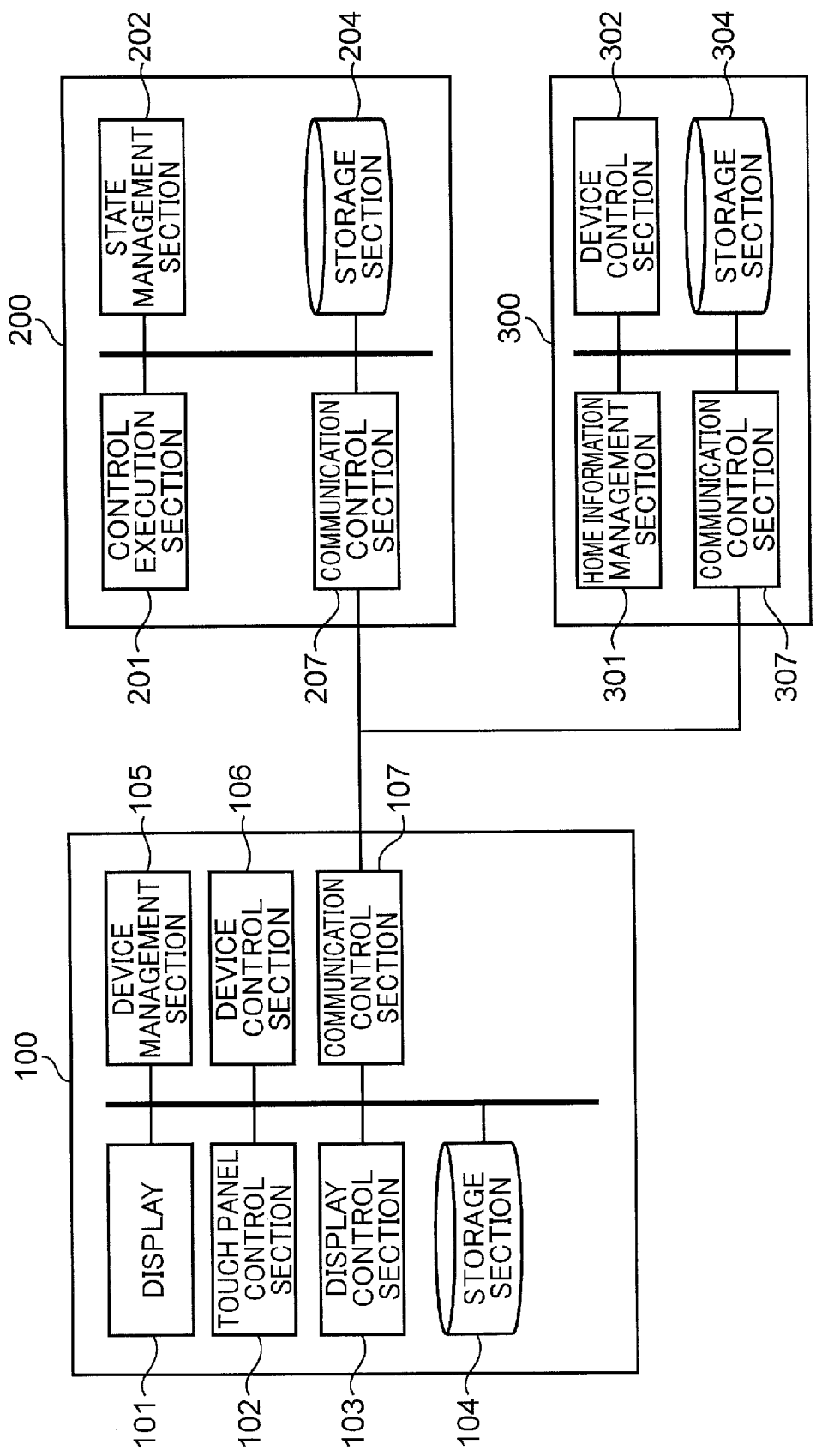
FIG. 3 is a block diagram showing the configuration of the home controller, a device, and a server according to the present disclosure.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list managed by the device management section 105.

The device management section 105 manages the control target devices 200 using the device list stored in the storage section 104. In addition, the device management section 105 detects a device 200 when the device 200 is connected to the in-home network. Further, the device management section 105 acquires home information 2700 to be discussed later from the server 300, stores the acquired home information 2700 in the storage section 104, and manages the home information 2700. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the present disclosure, a series of operations performed by the user by contacting the display 101 may be replaced with operations of moving a pointer and clicking using an external input device such as a mouse.

As shown in FIG. 3, the device 200 includes a control execution section 201, a state management section 202, a storage section 204, and a communication control section 207. The control execution section 201 receives a control command from the home controller 100 or the server 300, and controls the device 200 in accordance with the received control command. The content of control of the device 200 performed by the control execution section 201 differs in accordance with the type of the device 200. For example, if the device 200 is an illumination device, the control execution section 201 turns on and off the illumination device. In addition, the control execution section 201 transmits the result of execution of the control command and the state of the device 200 to the home controller 100 or the server 300.

The state management section 202 manages the state of the device 200. The content of management of the device 200 performed by the state management section 202 differs in accordance with the type of the device 200. For example, if the device 200 is an illumination device, the state management section 202 manages whether the illumination device is currently turned on or turned off. The storage section 204 stores information related to the state of the device 200 managed by the state management section 202. The communication control section 207 controls communication between the device 200 and the home controller 100 and communication between the device 200 and the server 300. In addition, the communication control section 207 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a home information management section 301, a device control section 302, a storage section 304, and a communication control section 307. The home information management section 301 manages the home information 2700 to be discussed later for each house or each user account. In addition, the home information management section 301 transmits the home information 2700 to the home controller 100 in response to a request from the home controller 100. Further, the home information management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the home information 2700 and the information related to the state of the device 200 managed by the home information management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
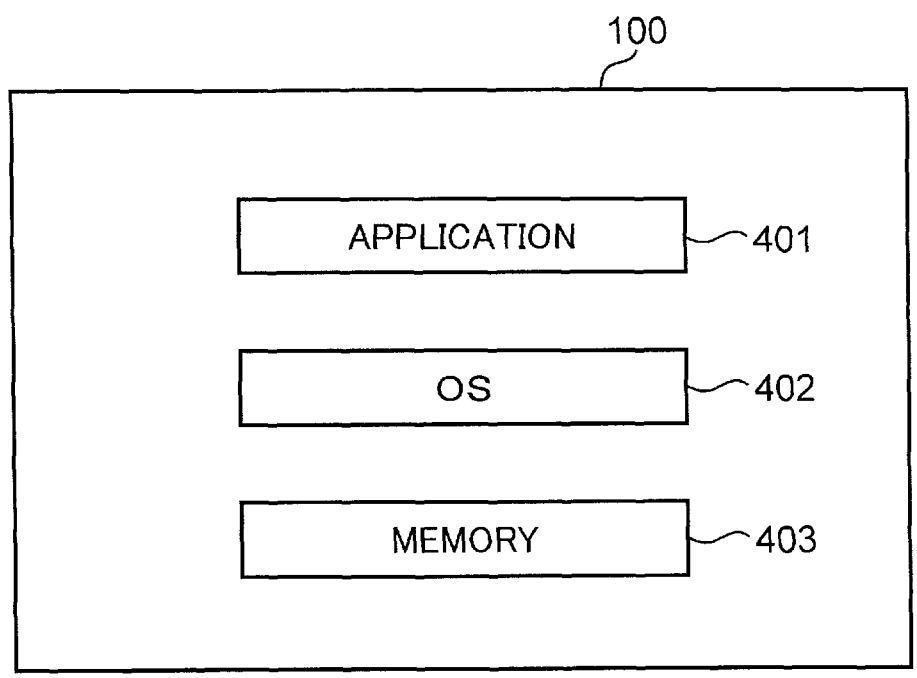
FIG. 4 is a diagram showing a configuration example of the form of implementation of the home controller according to the present disclosure.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the portable information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the portable information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the present disclosure, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any present disclosure, the home controller 100 according to the present disclosure can be embodied. In the present disclosure, the processor and the storage device forming the portable information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
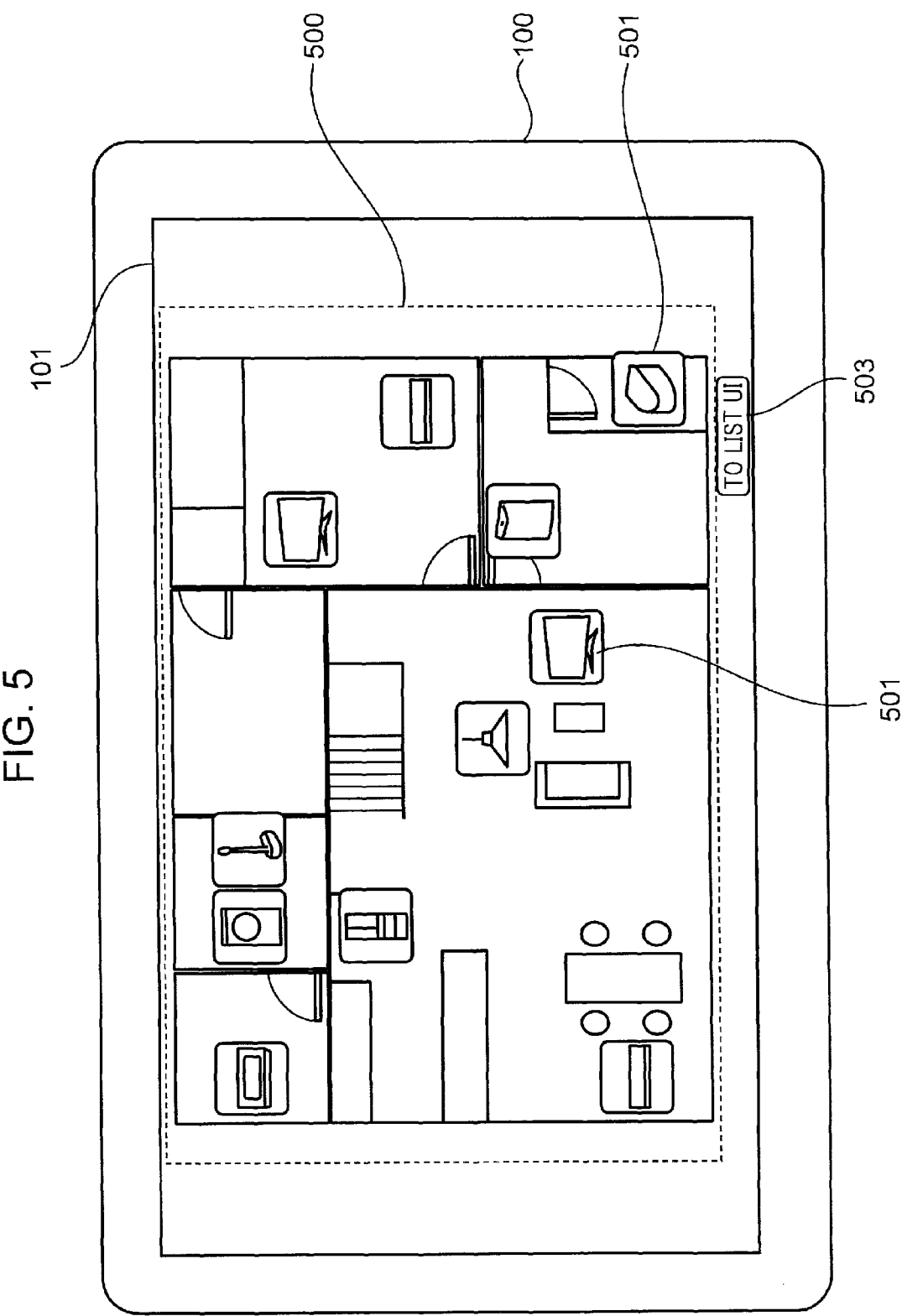
FIG. 5 is a diagram showing the configuration of a basic screen of the home controller according to the present disclosure.
Figure 6:
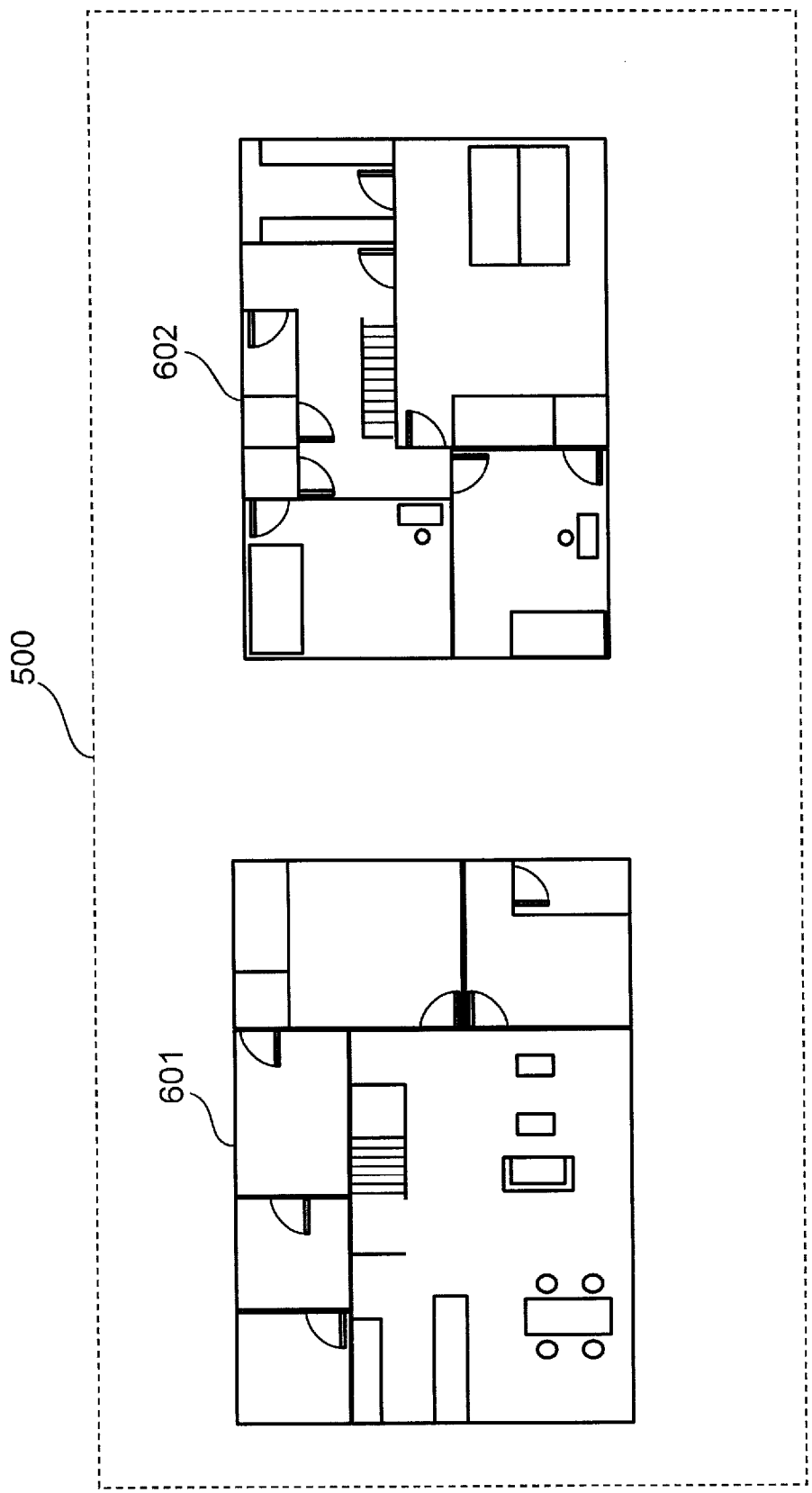
FIG. 6 is a diagram showing an example of a floor plan according to the present disclosure.

FIG. 5 is a diagram showing the configuration of a basic screen of the home controller 100. As shown in FIG. 5, the basic screen of the home controller 100 displayed on the display 101 include a floor plan 500, device icons 501, and a device list display change button 503. The floor plan 500 is a plan view that planarly represents the arrangement and the shape of one or more rooms forming each floor of a house. In the case where the house has one or more floors, the floor plan 500 is prepared for each floor. For example, in the case where the house has two floors, two floor plans 500, namely a floor plan 601 for the first floor and a floor plan 602 for the second floor, are displayed on the display 101 as shown in FIG. 6.

The device icon 501 is an icon displayed as overlapped on the floor plan 500 and representing the device 200. When the touch panel control section 102 senses a tap on the device icon 501 performed by the user, the display control section 103 causes the display 101 to display a device control screen 502 to be discussed later. This allows the user to control the device 200 by operating the device control screen 502.

The device icon 501 is prepared for each device 200. The display control section 103 disposes the device icon 501 on the floor plan 500 on the basis of the actual arrangement of the device 200 within the house. Information as to at what position on the floor plan 500 the device icon 501 is to be disposed is registered in an arrangement 3104 of a device list 3100 to be discussed later. Here, a position on the floor plan 500 corresponding to the actual arrangement position of the device 200 is registered in the arrangement 3104. Thus, the display control section 103 can dispose the device icon 501 at a position on the floor plan 500 corresponding to the actual arrangement position of the device 200 by disposing the device icon 501 at the position registered in the arrangement 3104 of the device list 3100.

In the floor plan 500 shown in FIG. 5, one floor is partitioned into a plurality of rooms by partition lines that indicate partitions between the rooms. This allows the user to recognize what device 200 is disposed in what room at a glance.

In the example of FIG. 5, in addition, schematic images of furniture pieces are displayed at positions on the floor plan 500 corresponding to the actual arrangement positions of the furniture pieces. An image that indicates the movable range of a door is displayed at a position on the floor plan 500 corresponding to the actual arrangement position of the door. An image of a staircase is displayed at a position on the floor plan 500 corresponding to the actual arrangement position of the staircase. This allows the user to recognize the positions of the furniture pieces disposed in each room and the positions of the staircase and the doors on the floor.

The button with a text "TO LIST UI" displayed at the lower right of the basic screen is the device list display change button 503, which is a button for switching the screen display from the basic screen to a device list display screen to be discussed later (see FIG. 24). When the touch panel control section 102 senses a tap on the device list display change button 503 performed by the user, the display control section 103 switches the screen display on the display 101 from the basic screen to the device list display screen. It should be noted, however, that the display control section 103 may hide the device list display change button 503 in the case where a registration is made in the home controller 100 in advance that the device list display screen is not utilized.

In the foregoing description, one device icon 501 is correlated with one device 200. However, the present disclosure is not limited thereto, and one device icon 501 may be correlated with a plurality of devices 200 so that the one device icon 501 may be used in common to the plurality of devices 200. For example, in the case where there are two illumination devices in a living room, the two illumination devices may be represented by one device icon 501.

In this case, when the device icon 501 representing the two illumination devices is tapped on by the user, the display control section 103 causes the display 101 to display a device control screen 502 that allows simultaneous control of the two illumination devices. This allows the user to control the two illumination devices at the same time. A plurality of illumination devices are often disposed in a large room such as the living room. In the case where the user turns on or off the illumination devices in the living room, the user often turns on or off all the illumination devices disposed in the living room, rather than turning on or off some of the illumination devices. In this case, if it is possible to collectively turn on or off all the illumination devices, the number of operations to be performed by the user can be reduced. Thus, one device icon 501 may be correlated with a plurality of devices 200 that are highly likely to be operated by the user at the same time to cause one device control screen 502 to be displayed.

In the case where the device icon 501 represents a plurality of devices 200, the display control section 103 may display the device icon 501 at a position on the floor plan 500 corresponding to the actual arrangement position of one of the devices 200. Alternatively, the display control section 103 may display the device icon 501 representing the plurality of devices 200 at a predetermined location of a room in which the plurality of devices 200 are disposed.

In order to dispose the device icon 501 on the floor plan 500 on the basis of the actual arrangement of the device 200 within the house, the user moves the device icon 501 to an appropriate position on the floor plan 500. The user can move the device icon 501 to a desired position by dragging the device icon 501 while holding down the device icon 501. These operations are executed at the timing when the device icon 501 is added such as when the home controller 100 is initially utilized and when a new device 200 is purchased.

Specifically, when the touch panel control section 102 senses a drag on the device icon 501, the device management section 105 registers the position on the floor plan 500 of the device icon 501 after the movement in the arrangement 3104 of the device list 3100 to be discussed later. This allows a position on the floor plan 500 corresponding to the actual arrangement position of the device 200 to be registered in the arrangement 3104.

The initial display position of the device icon 501 may be determined in advance by the system, and may be a predetermined position outside the display region of the floor plan 500 or a predetermined position within a predetermined room on the floor plan 500, for example. The method of disposing the device icon 501 on the floor plan 500 on the basis of the actual arrangement of the device 200 within the house is not limited thereto, and the method described below may be used.

Figure 7:
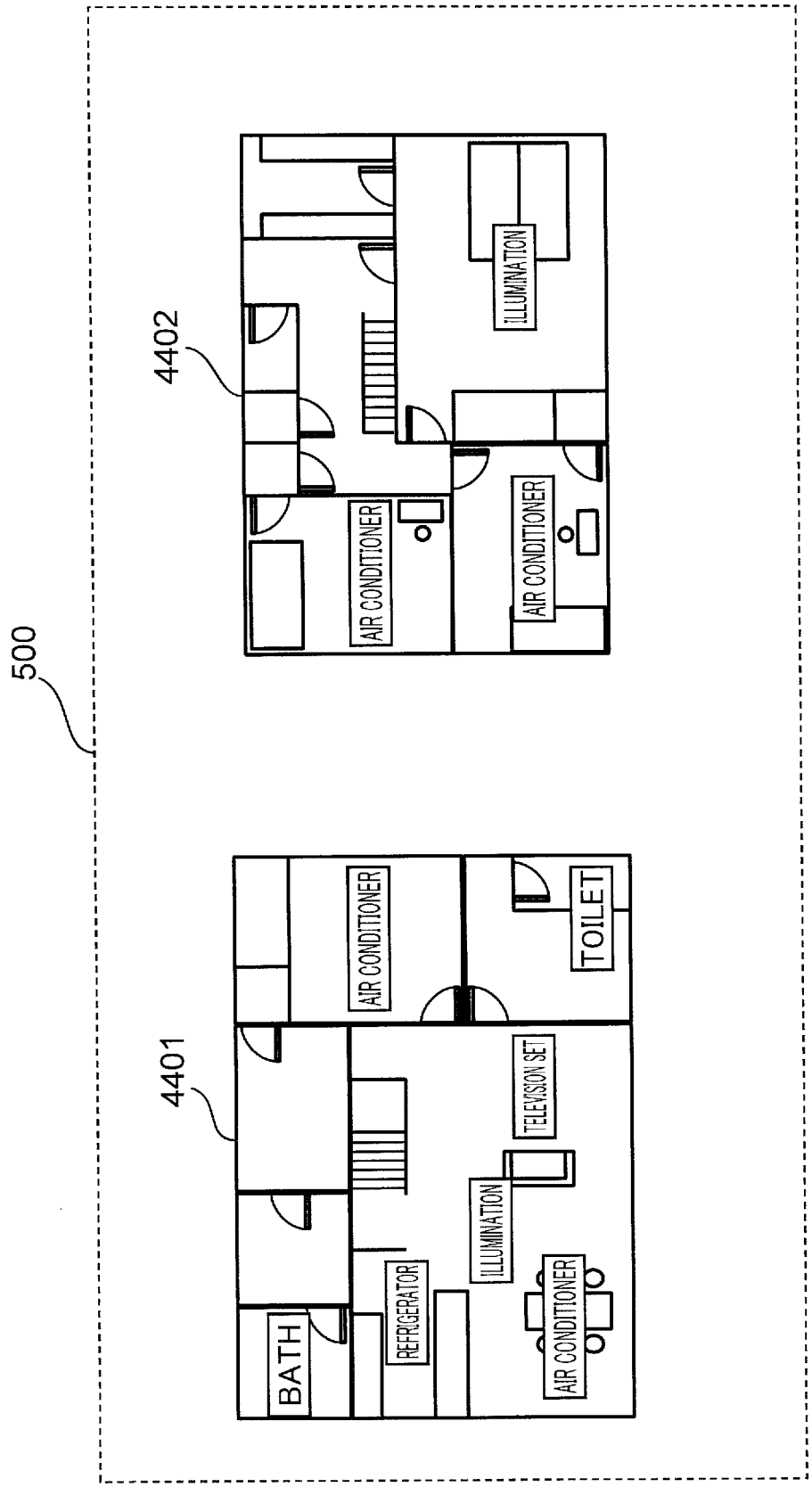
FIG. 7 is a diagram showing an example of the floor plan including arrangement information for device icons as texts according to the the present disclosure.
Figure 8:
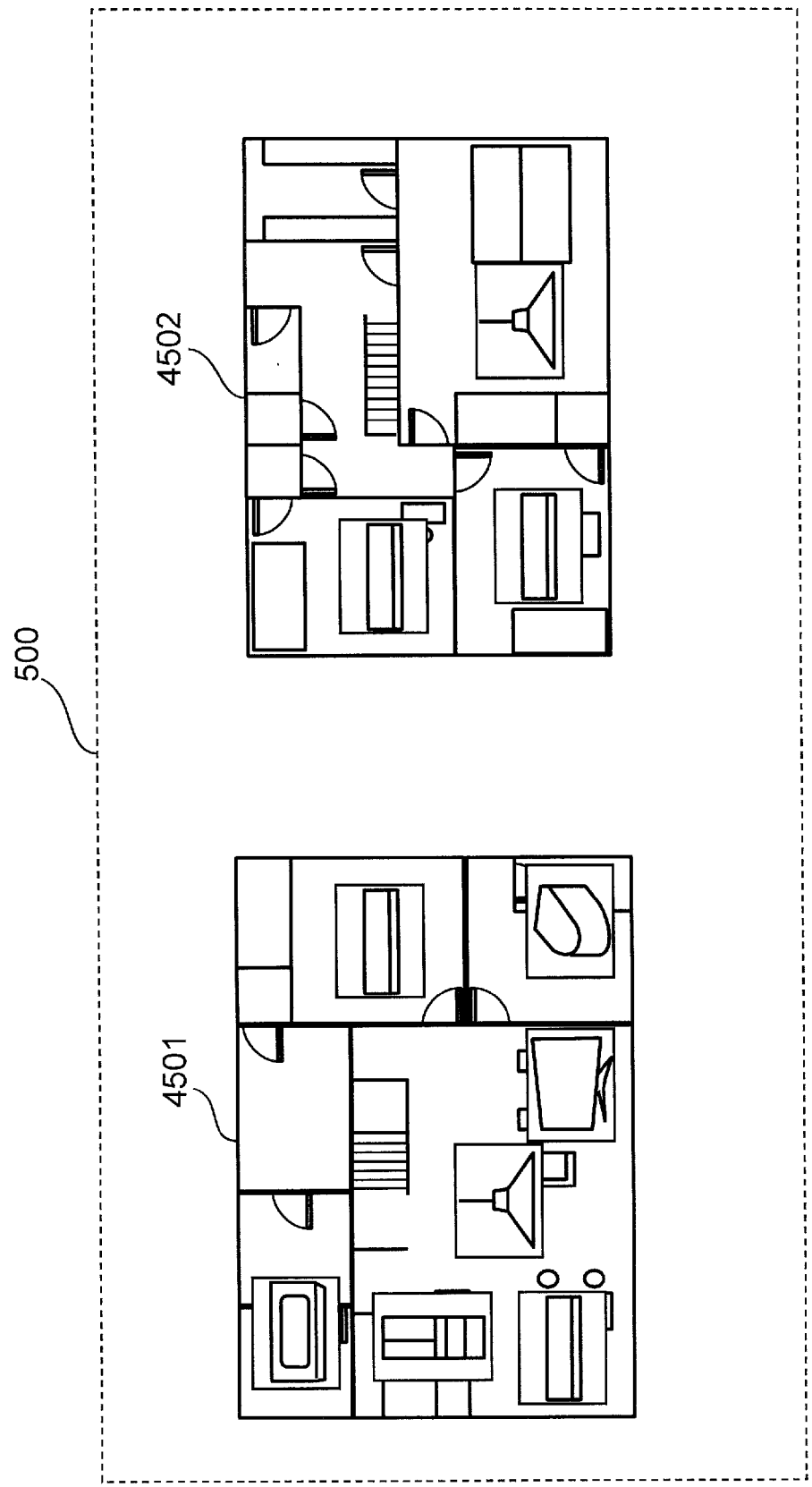
FIG. 8 is a diagram showing an example of the floor plan including arrangement information for device icons as images according to the present disclosure.
Figure 9:
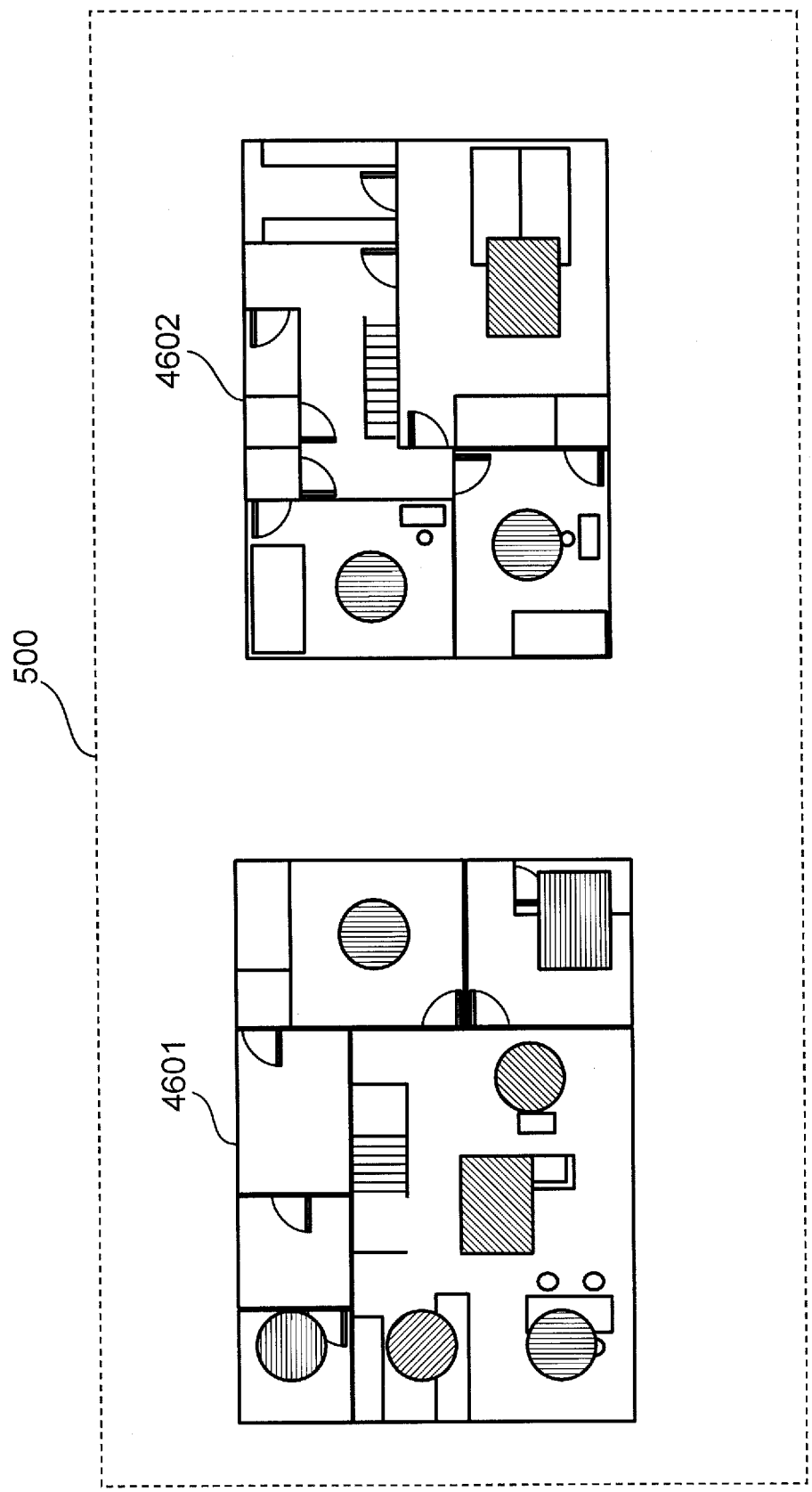
FIG. 9 is a diagram showing an example of the floor plan including arrangement information for device icons as images according to the present disclosure.

As shown in FIGS. 7, 8, and 9, some floor plans 500 include arrangement information for the device icons 501. For example, in the example of the floor plan 500 of FIG. 7, texts that indicate the type of the devices 200 represented by the device icons 501 to be disposed are provided at positions at which the device icons 501 are to be disposed. In the example of the floor plan 500 of FIG. 8, images that indicate the type of the devices 200 represented by the device icons 501 to be disposed are provided at positions at which the device icons 501 are to be disposed. In the example of the floor plan 500 of FIG. 9, simplified images such as circles and rectangles that indicate the type of the devices 200 represented by the device icons 501 to be disposed are provided at positions at which the device icons 501 are to be disposed.

Consequently, in the case where the floor plan 500 includes arrangement information for the device icons 501, the display control section 103 may generate the basic screen of FIG. 5 by automatically disposing the device icons 501 on the floor plan 500 on the basis of the arrangement information included in the floor plan 500. In this case, it is not necessary for the user to perform an operation of moving the device icons 501 to appropriate positions on the floor plan 500.

For example, in an exemplary floor plan 4401 for the first floor of FIG. 7, the display control section 103 detects a position provided with a text "TELEVISION SET", automatically disposes the device icon 501 for the television set at the detected position, and registers the detected position in the arrangement 3104 of the device list 3100.

In an exemplary floor plan 4501 for the first floor of FIG. 8, the display control section 103 detects a position provided with an image for the "television set", automatically disposes the device icon 501 for the television set at the detected position, and registers the detected position in the arrangement 3104 of the device list 3100. In an exemplary floor plan 4601 for the first floor of FIG. 9, the display control section 103 detects a position provided with an image in the shape of a "circle filled with oblique lines", automatically disposes the device icon 501 for the television set at the detected position, and registers the detected position in the arrangement 3104 of the device list 3100.

The display control section 103 may detect the display position of arrangement information by recognizing the arrangement information included in the floor plan 500 using a text recognition technology or an image recognition technology commonly utilized.

Figure 10:
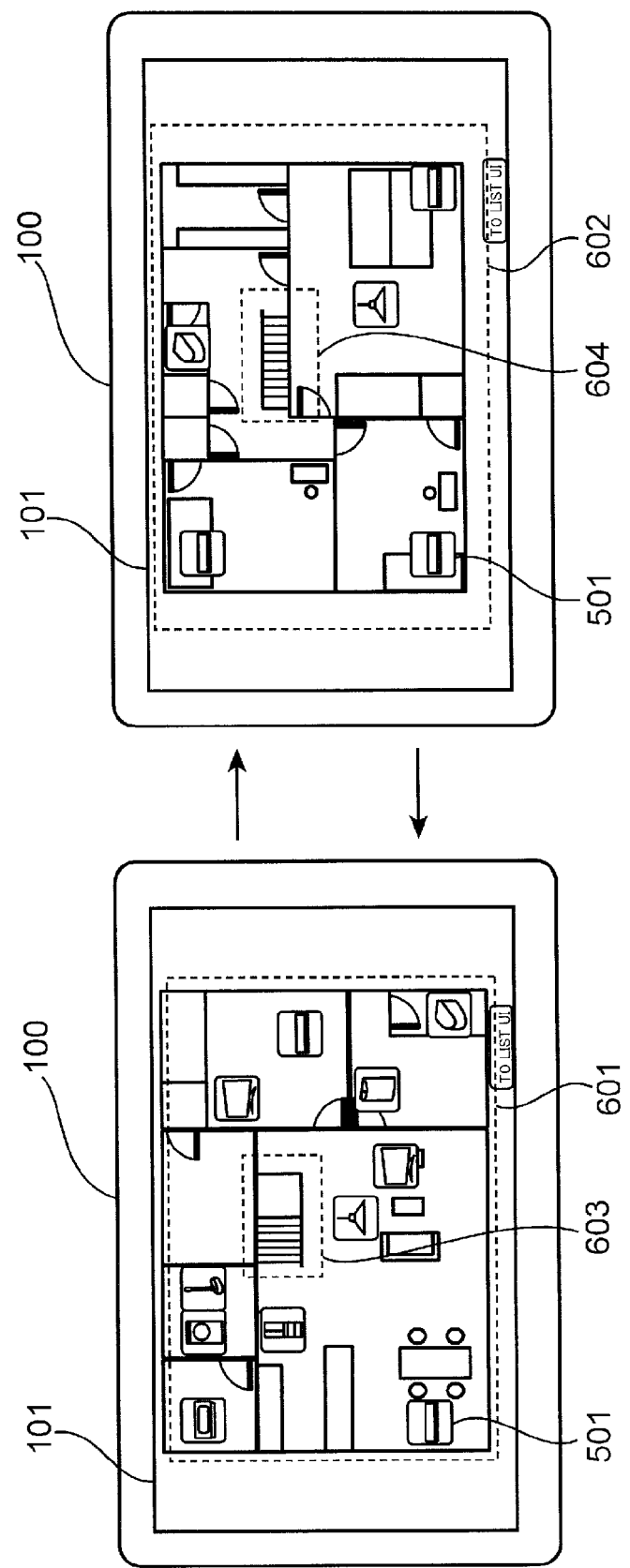
FIG. 10 is a diagram showing an example of transition between a first floor display state and a second floor display state of the basic screen of the home controller according to the present disclosure.

FIG. 10 is a diagram illustrating a method of switching the floor display on the basic screen of the home controller 100. FIG. 10 illustrates a case where the house has two floors, namely the first floor and the second floor. With a floor plan 601 for the first floor displayed on the basic screen of the home controller 100, the touch panel control section 102 senses a tap on a staircase region 603 on the first floor performed by the user. Then, the display control section 103 switches the floor display on the basic screen from the first floor to the second floor. Similarly, with a floor plan 602 for the second floor displayed on the basic screen of the home controller 100, the touch panel control section 102 senses a tap on a staircase region 604 on the second floor performed by the user. Then, the display control section 103 switches the floor display on the basic screen from the second floor to the first floor.

Here, the touch panel control section 102 may judge that the staircase region 603 is tapped on if the position tapped on by the user is positioned within a region surrounded by four vertexes of a staircase registered in a room type 2902 of room information 2900 (see FIG. 32).

Further, the floor display may be switched by not only tapping on the staircase region 603 but also a swipe operation on the display 101. With the floor plan 601 for the first floor displayed on the basic screen of the home controller 100, the touch panel control section 102 senses a swipe operation performed from the right to the left on the display 101 by the user. Then, the display control section 103 switches the floor display on the basic screen from the first floor to the second floor. Similarly, with the floor plan 602 for the second floor displayed on the basic screen of the home controller 100, the touch panel control section 102 senses a swipe operation performed from the left to the right on the display 101 by the user. Then, the display control section 103 switches the floor display on the basic screen from the second floor to the first floor. The floor display may be switched by a swipe operation in the vertical direction.

Figure 11:
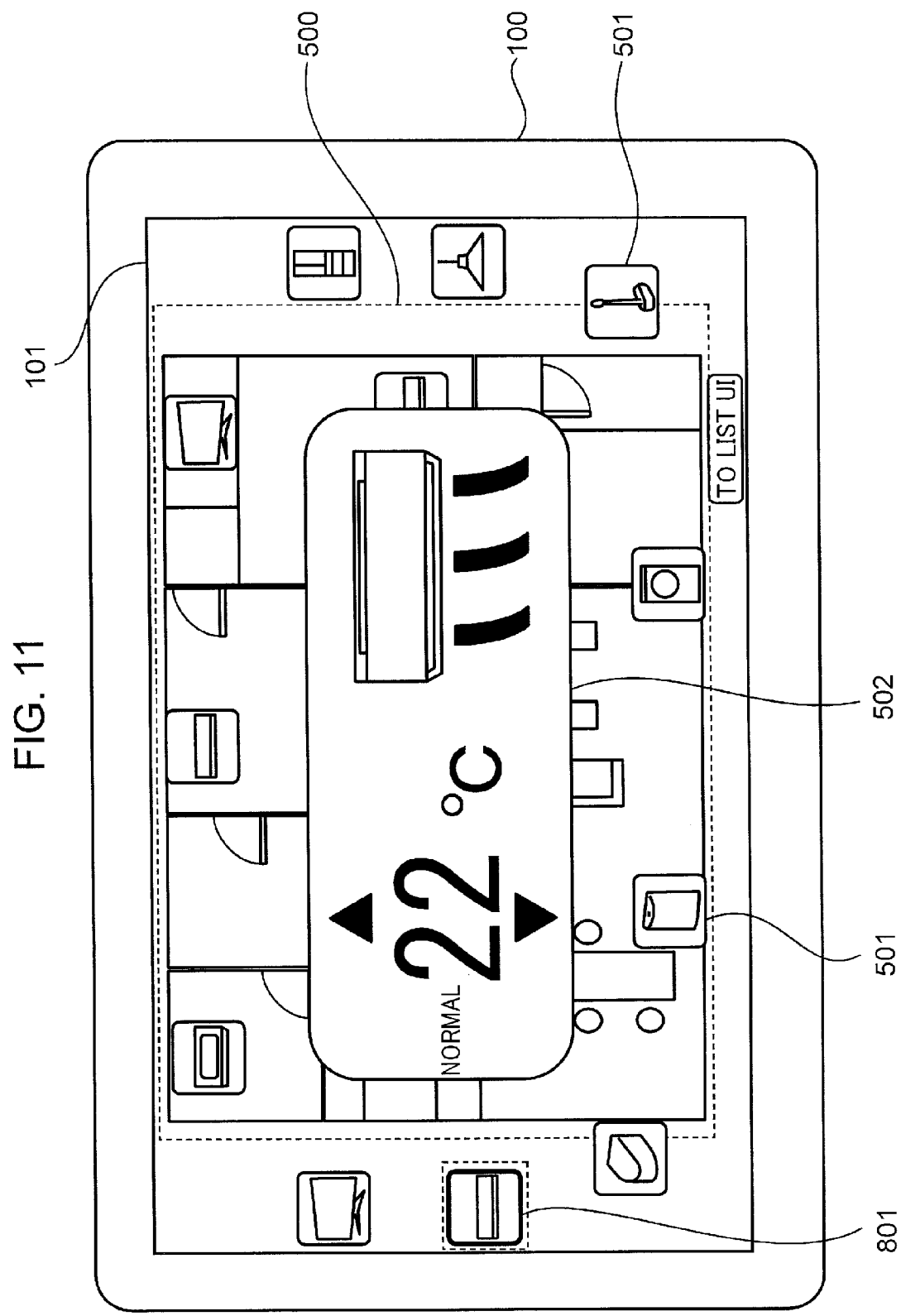
FIG. 11 is a diagram showing the configuration of the display state of a device control screen of the home controller according to the present disclosure.

FIG. 11 is a diagram showing the configuration of the display state of the device control screen 502 of the home controller 100. In the basic screen shown in FIG. 5, when the touch panel control section 102 senses that the user selects the device icon 501, the display control section 103 causes the display 101 to display the device control screen 502 corresponding to the selected device icon 501. The device control screen 502 is a control screen that is specific to each device 200 and that allows control or confirmation of the state of the device 200. For example, in FIG. 11, a device icon 801 for the air conditioner is selected by the user, and the temperature setting and the air flow direction are controlled using the device control screen 502 for the air conditioner.

An image of the air conditioner is displayed in the device control screen 502 to allow the user to immediately recognize that the device control screen 502 corresponds to the air conditioner. This prevents an erroneous operation. An image that indicates the air flow direction is displayed on the lower side of the image of the air conditioner to allow the user to select a desired air flow direction by repeatedly tapping on the image, for example. A numeral displayed within the device control screen 502 indicates the current set temperature of the air conditioner. A button in the shape of a triangle that points upward in the device control screen 502 is a temperature increase button. A button in the shape of a triangle that points downward is a temperature decrease button. Pressing the temperature increase button once increases the set temperature of the air conditioner by a predetermined temperature (for example, 0.5 degrees). Pressing the temperature decrease button once decreases the set temperature of the air conditioner by a predetermined temperature (for example, 0.5 degrees).

Examples of the method of disposing the device icons 501 in the display state of the device control screen 502 include the following methods.

A first method is to dispose the device icons 501 outside the display region of the device control screen 502 as shown in FIG. 11. When the touch panel control section 102 senses that a certain device icon 501 is tapped on by the user, the display control section 103 disposes all the device icons 501 at locations outside the display region of the device control screen 502 and inside the display region of the display 101 irrespective of whether or not the locations are inside the display region of the floor plan 500. In the example of FIG. 11, the device icons 501 are disposed in an elliptical arrangement so as to surround the device control screen 502. That is, when a certain device icon 501 is selected by the user and the device control screen 502 for the device 200 corresponding to the device icon 501 is displayed, the display control section 103 retracts all the device icons 501 out of the display region of the device control screen 502.

This prevents the device icons 501 from being hidden by the device control screen 502. Therefore, in the case where the device control screen 502 for a device 200 is currently displayed and the user attempts to cause the device control screen 502 for another device 200 to be displayed, it is not necessary for the user to temporarily erase the currently displayed device control screen 502 and search for the device icon 501 for the relevant device 200.

Here, the display control section 103 may decide the arrangement position of each device icon 501 on the outer periphery of an ellipse having a shape determined in advance in accordance with the size of the device control screen 502, and dispose the device icon 501 at the decided position, for example. Examples of the method of deciding the arrangement position include a method of arranging all the device icons 501 as display targets at equal intervals on the outer periphery of an ellipse, and a method of disposing the device icons 501 such that the angles formed by lines connecting between adjacent device icons 501 and the center of an ellipse are equal to each other. Alternatively, the display control section 103 may divide the outer periphery of an ellipse into four sections corresponding to the upper, lower, left, and right portions of the device control screen 502, and dispose the device icons 501 such that the number of device icons 501 in each section is the same and the device icons 501 in each section are arranged at equal intervals. The device icon 501 disposed at the closest position on the floor plan 500 may be disposed at the decided arrangement position.

In the foregoing description, the device icons 501 are arranged in an elliptical arrangement. However, the present disclosure is not limited thereto, and the device icons 501 may be arranged in a circular arrangement. Also in this case, the arrangement position of the device icons 501 may be decided using the same method as in the case where the device icons 501 are arranged in an elliptical arrangement. Other examples of the shape of arrangement of the device icons 501 used when the device icons 501 are retracted out of the display region of the device control screen 502 include polygonal arrangements such as triangular, rectangular, and pentagonal arrangements.

Figure 13:
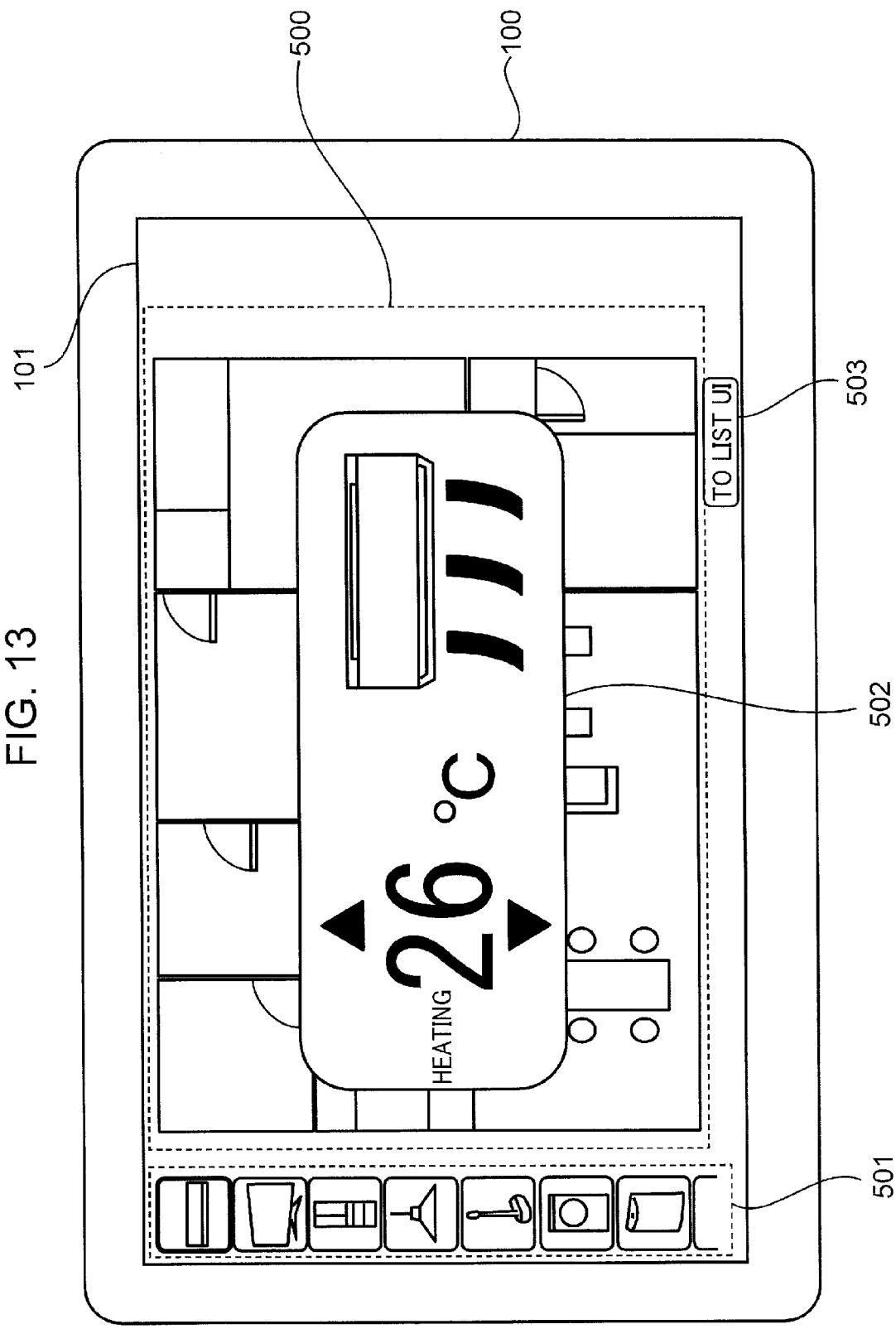
FIG. 13 is a diagram showing the configuration of the display state of a device control screen of the home controller according to the present disclosure.

A second method is to dispose the device icons 501 in one line outside the display region of the device control screen 502 and the floor plan 500 and inside the display region of the display 101 as shown in FIG. 13. When the touch panel control section 102 senses that a certain device icon 501 is tapped on by the user, the display control section 103 disposes all the device icons 501 in one vertical line on the left side of the display region of the floor plan 500. That is, the display control section 103 retracts all the device icons 501 to a vacant space outside the display region of the floor plan 500 and inside the display region of the display 101.

In FIG. 13, the device icons 501 are disposed on the left side of the floor plan 500. However, the present disclosure is not limited thereto, and the device icons 501 may be disposed in one vertical line on the right side of the floor plan 500, or may be disposed in one horizontal line on the upper or lower side of the floor plan 500.

In the case where all the device icons 501 cannot be disposed on the left side of the floor plan 500, the display control section 103 may scroll the device icons 501 upward or downward in accordance with a swipe operation performed upward or downward on the device icons 501 disposed in one vertical line on the left side to cause the device icons 501, which have been hidden, to be displayed within the display 101.

This allows the device icons 501, which have been hidden, to be displayed within the display 101 to allow the user to select the device icons 501. In the case where the device icons 501 are displayed in one horizontal line and all the device icons 501 may not displayed, the display control section 103 may scroll the device icons 501 leftward or rightward in accordance with a swipe operation performed leftward or rightward on the device icons 501 disposed in one horizontal line to cause the device icons 501, which have been hidden, to be displayed within the display 101.

In the display state of the device control screen 502, the display control section 103 may display the device icon 501 selected by the user in a display mode that is different from that for the unselected device icons 501. This allows the user to easily recognize the selected device icon 501.

For example, as shown in FIG. 11, the display control section 103 may display the selected device icon 801 in a color that is different from that of the other unselected device icons 501. Specifically, the display control section 103 may display a background portion of the selected device icon 501 in a color that is different from that of background portions of the unselected device icons 501. It should be noted, however, that such a display mode is merely exemplary, and the display control section 103 may make the selected device icon 501 brighter than the unselected device icons 501, may make the selected device icon 501 denser than the unselected device icons 501, or may cause the selected device icon 501 to flash on and off at a constant cycle.

In the display state of the device control screen 502, the device icon 501 selected by the user may be disposed as distinguished from the unselected device icons 501. This allows the user to easily recognize the selected device icon 501.

Figure 12:
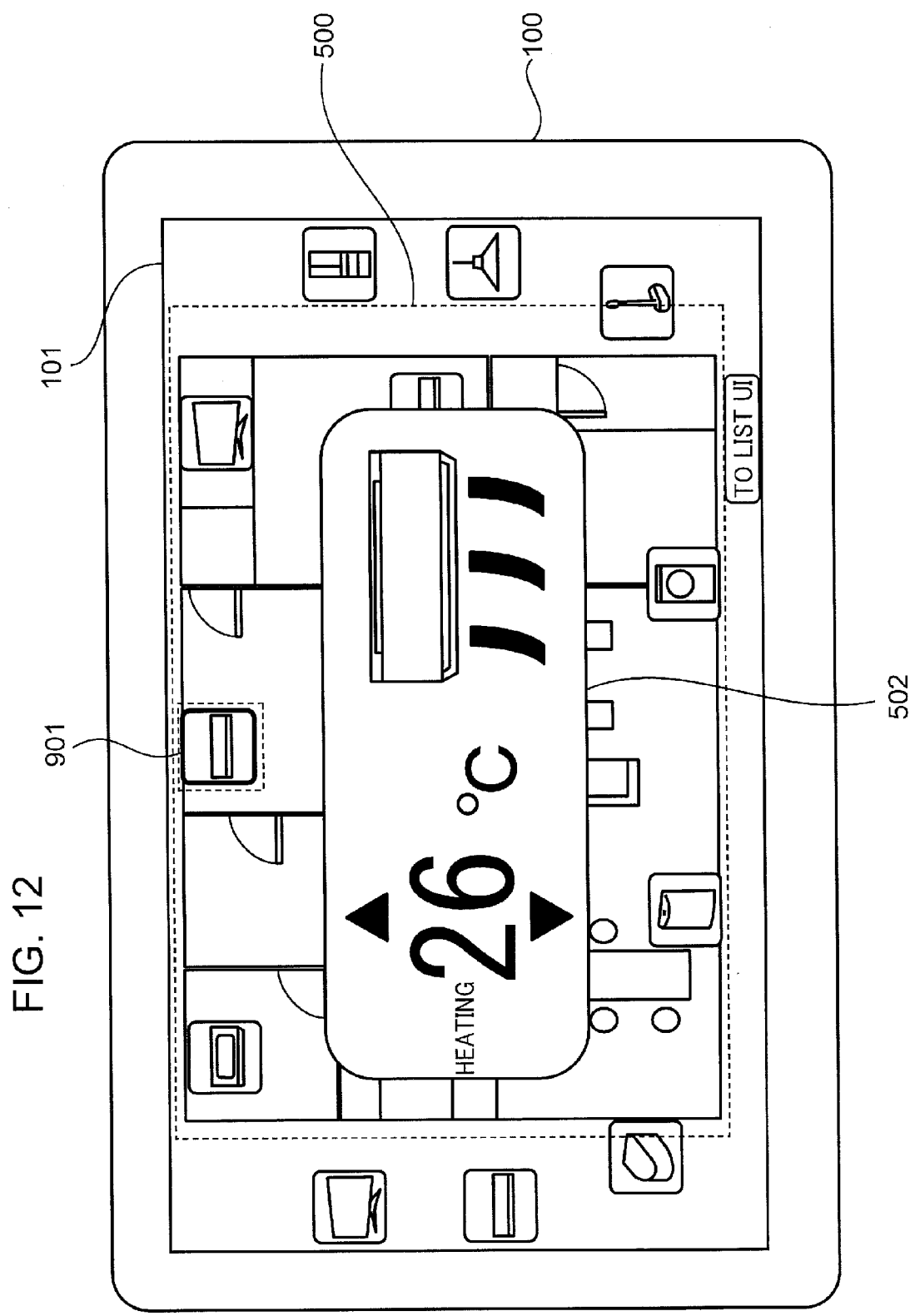
FIG. 12 is a diagram showing a device icon arrangement example of the display state of the device control screen of the home controller according to the present disclosure.

For example, as shown in FIG. 12, the display control section 103 may dispose a selected device icon 901 at the uppermost position on the outer periphery of an ellipse. Besides, for example, the display control section 103 may dispose the selected device icon 501 at a particular position (for example, the lowermost position, the rightmost position, or the leftmost position) on the outer periphery of an ellipse. In any event, the display control section 103 may dispose the device icon 501 selected by the user at a particular location that is easily recognizable by the user.

Figure 14:
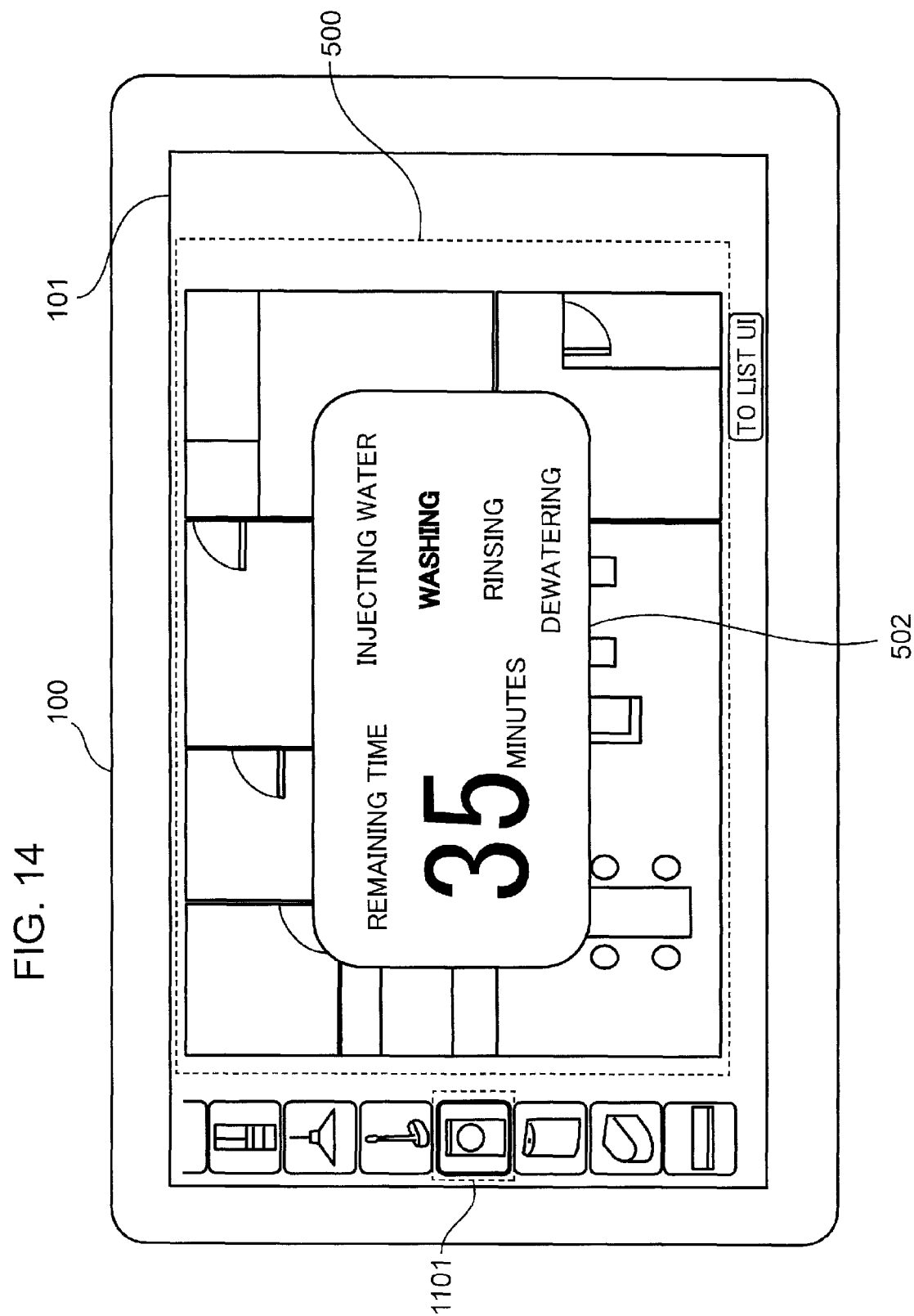
FIG. 14 is a diagram showing a device icon arrangement example of the display state of the device control screen of the home controller according to the present disclosure.

Besides, for example, as shown in FIG. 14, the display control section 103 may scroll an array of the device icons 501 such that a selected device icon 1101 is disposed within the display region of the display 101. In the example of FIG. 14, the device icons 501 are scrolled such that the selected device icon 1101 is disposed at the center of a line of icons displayed in one vertical line on the left side of the floor plan 500. This allows the user to easily recognize the selected device icon 501. Although the device icon 1101 is disposed at the center of the line of icons in FIG. 14, the device icon 1101 may be disposed at any other conspicuous position. For example, the device icon 1101 may be disposed at the top or bottom position of the line of icons.

The order of arrangement of the device icons 501 taken when the device icons 501 are retracted out of the display region of the floor plan 500 may be determined such that devices 200 that are closer in position of arrangement on the floor plan 500 to the device icon 501 selected by the user are disposed to be closer in order of arrangement to the selected device icon 501. Alternatively, the order of arrangement of the device icons 501 may be determined such that the device icons 501 for devices 200 that are more likely to be used together with the device 200 selected by the user are disposed to be closer in order of arrangement to the device icon 501 for the device 200 selected by the user. For example, the television set and the Blu-ray recorder are highly likely to be used together by the user. Therefore, when the device icon 501 for the television set is selected by the user, the device icon 501 for the Blu-ray recorder may be displayed next to the device icon 501 for the television set. In order to embody such a configuration, a table that indicates combinations of devices 200 that are highly likely to be used together may be stored in advance in the storage section 104, and the arrangement of the device icons 501 may be decided in accordance with the table.

In any of the methods of disposing the device icons 501 taken when the device control screen 502 is displayed described above, in addition, the display control section 103 may dispose the device icons 501 as grouped under particular conditions.

Figure 15:
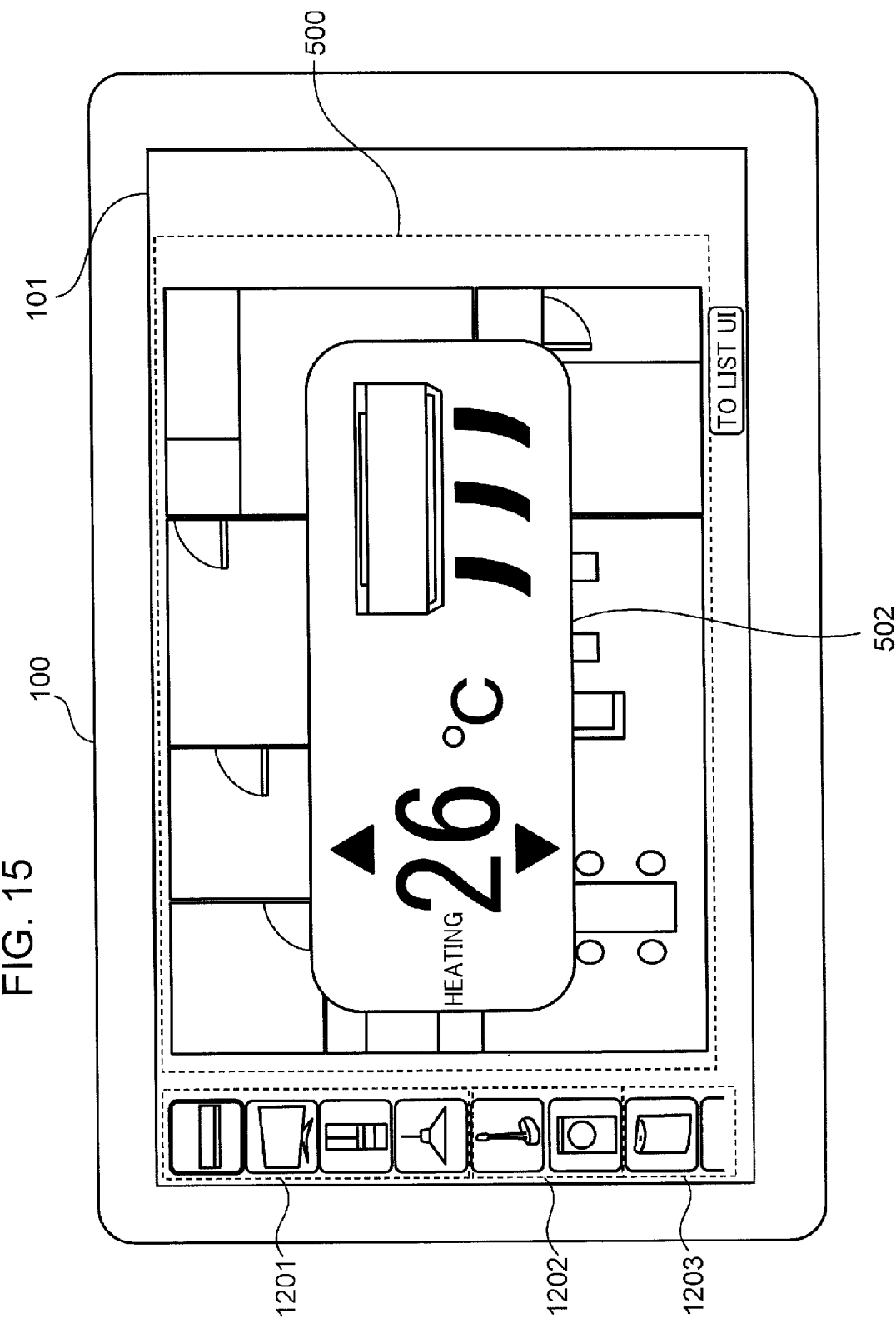
FIG. 15 is a diagram showing a device icon arrangement example of the display state of the device control screen of the home controller according to the present disclosure.

For example, in FIG. 15, the device icons 501 are grouped in accordance with the location at which the devices 200 are disposed. The devices 200 disposed in the living room are grouped as device icons 1201. The devices 200 disposed in a lavatory are grouped as device icons 1202. The devices 200 disposed in a bedroom are grouped as device icons 1203. Then, the display order is set to each group, and the grouped device icons 501 are disposed in one vertical line on the left side of the floor plan 500 in accordance with the display order. The display order of the groups may be determined such that groups that are positioned closer to the room in which the device 200 selected by the user is disposed are closer in display order to the group for the room in which the device 200 selected by the user is disposed.

Besides, the display control section 103 may dispose the device icons 501 as grouped in accordance with the type of the devices 200. For example, in FIG. 16, two device icons 501 for the television set are disposed on the left side of the floor plan 500 as grouped as device icons 2301, and two device icons 501 for the air conditioner are disposed on the left side of the floor plan 500 as grouped as device icons 2302 for the air conditioner. Consequently, the display control section 103 may group the device icons 501 in accordance with the device type by disposing the device icons 501 for the devices 200 of the same type to be continuous.

The display control section 103 may discriminate the type of the devices 200 in accordance with the content registered in a device type 3102 of the device list 3100 (see FIG. 35).

Although the device icons 501 for the devices 200 of the same type are grouped into one group in the foregoing description, the present disclosure is not limited thereto. For example, the display control section 103 may classify the devices 200 into categories matching the device type, group the device icons 501 in accordance with the category, and dispose the device icons 501 on the left side of the floor plan 500 in groups.

Figure 16:
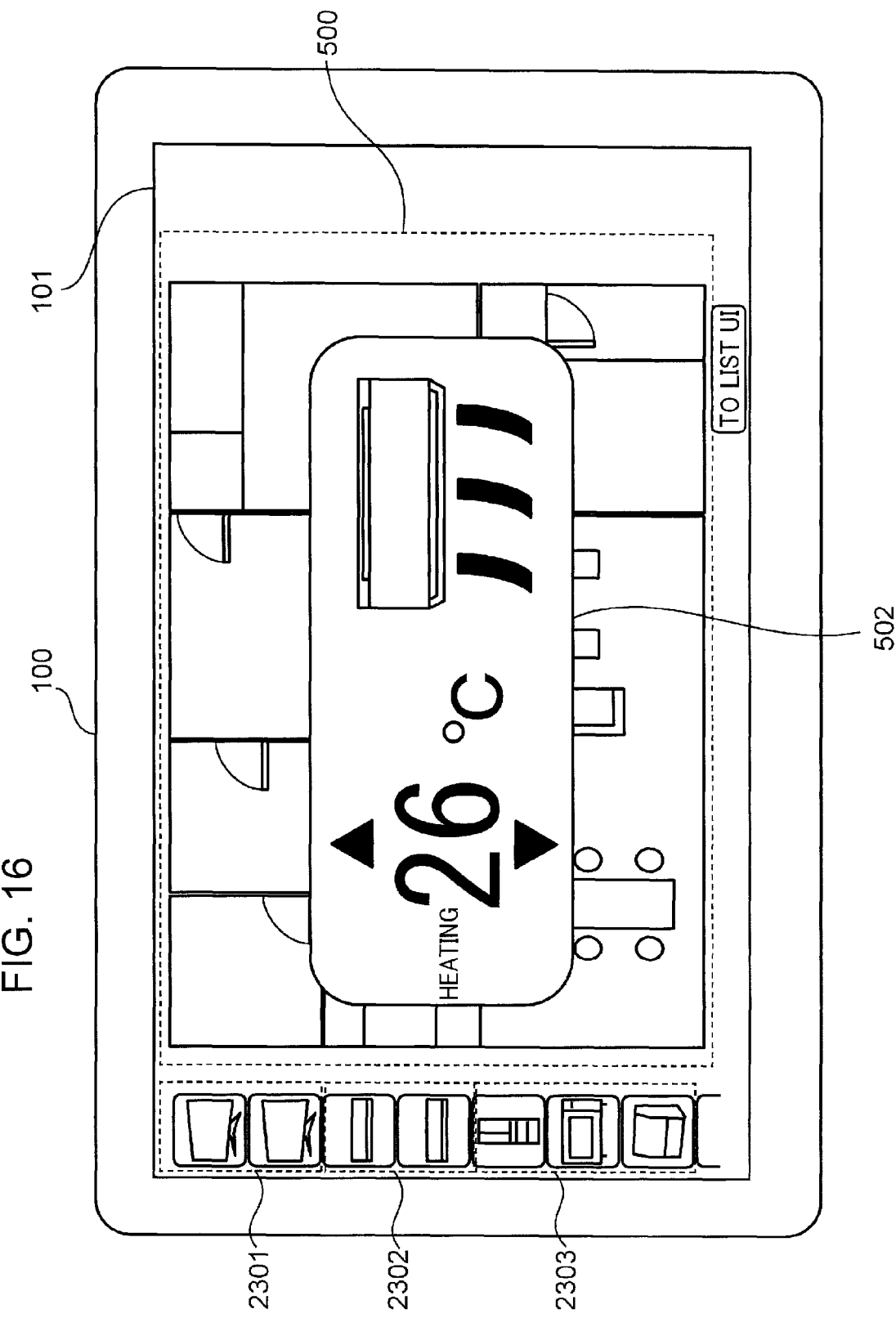
FIG. 16 is a diagram showing a device icon arrangement example of the display state of the device control screen of the home controller according to the present disclosure.

For example, as shown in the lower left of FIG. 16, three device icons 501 for the refrigerator, a microwave oven, and a dish washing/drying machine are classified into a cooking device category, and therefore the three device icons are grouped as device icons 2303 for the cooking devices and disposed on the left side of the floor plan 500.

Examples of the other categories include entertainment devices and air-conditioning devices. The entertainment device category includes devices 200 such as a television set, a recorder, a player, and a home theater system. The air-conditioning device category includes devices 200 such as an air conditioner, an air purifier, a humidifier, a dehumidifier, and a home air circulation system.

For example, if the device icons 501 for the television set, the recorder, the air conditioner, and the air purifier are disposed on the floor plan 500 and the device icon 501 for the television set is selected by the user, the device icons 501 for the television set and the recorder classified into the entertainment device category are grouped into one group and disposed on the left side of the floor plan 500, and the device icons 501 for the air conditioner and the air purifier classified into the air-conditioning device category are grouped into one group and disposed on the left side of the floor plan 500.

The display control section 103 may determine the category of the devices 200 from the content registered in the device type 3102 of the device list 3100. In this case, a classification table for determining the category of the devices 200 from the content registered in the device type 3102 may be stored in advance in the storage section 104, and the display control section 103 may reference the classification table to discriminate the category of the devices 200.

A variety of manners of classifying the devices 200 according to the device type may be adopted besides that described above. For example, as shown in FIG. 24, the devices 200 may be classified into household appliance, air-conditioning, and facility categories.

The method of grouping the device icons 501 on the basis of particular conditions and disposing the device icons 501 as described above may also be applied to the display mode in which the device icons 501 are retracted so as to surround the device control screen 502 as shown in FIG. 11.

Figure 17A:
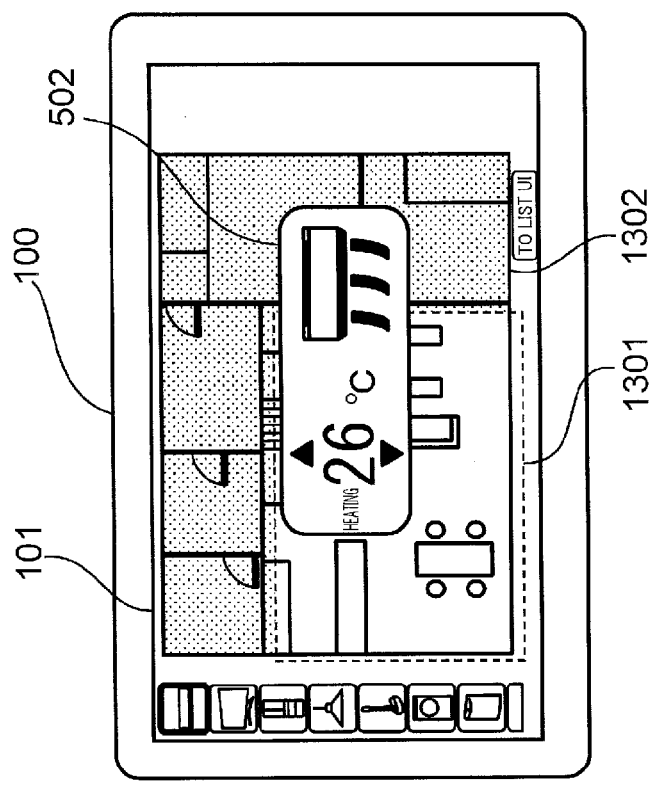
FIGS. 17A and B are diagrams showing a configuration example of the display state of the device control screen of the home controller according to the present disclosure.
Figure 17B:
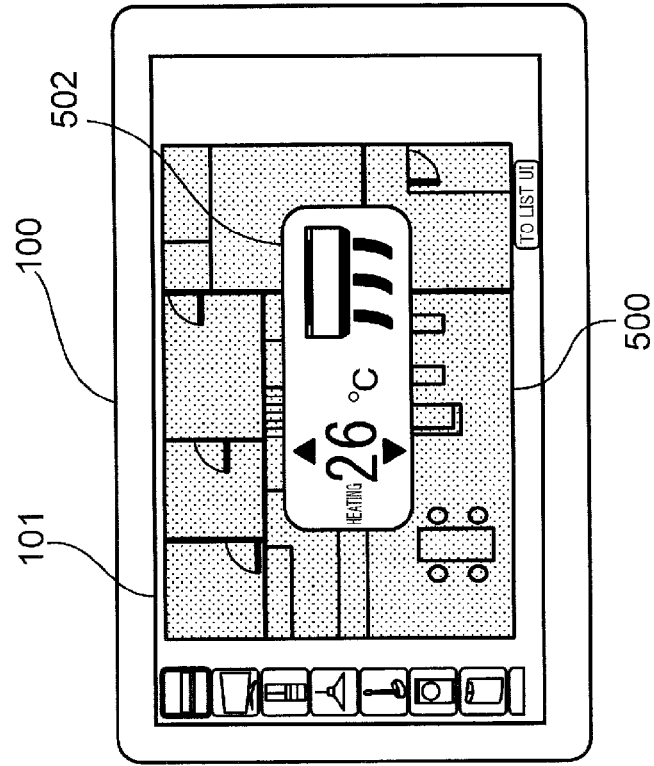

FIGS. 17A and 17B are each a diagram showing a method of displaying the floor plan 500 with the device control screen 502 displayed. As shown in FIGS. 17A and 17B, there are two types of the method of displaying the floor plan 500. In a first display method, as shown in FIG. 17A, the entire floor plan 500 is covered by a translucent gray layer (in the drawing, indicated by dots).

In this case, the background of the device control screen 502 is turned into a gray color to emphasize the device control screen 502, which allows the user to more definitely recognize the device control screen 502. In addition, the gray layer is translucent, and the floor plan 500 is not completely hidden. This allows the device control screen 502 to be operated with presence. The gray layer is image data having a color with low brightness such as gray and set to predetermined transparency.

The display control section 103 may decide the display order of the device control screen 502, the gray layer, and the floor plan 500 such that the device control screen 502 is the uppermost layer and the floor plan 500 is the lowermost layer, and synthesize these images. This prevents the device control screen 502 from being displayed as covered by the gray layer.

In a second display method, as shown in FIG. 17B, a non-control target region 1302 in the floor plan 500 is covered by a translucent gray layer (the region with dots in the drawing), and a control target region 1301 is not covered by the translucent gray layer. This allows the user to operate the device control screen 502 while being conscious of the control target region 1301, which allows operation with presence. Here, the control target region 1301 refers to a region on the floor plan 500 that corresponds to a room in which the device 200 represented by the device icon 501 selected by the user is disposed, and the non-control target region 1302 refers to a region on the floor plan 500 other than the room. For example, in the case where the control target device is the air conditioner installed in the living room, the control target region 1301 is the region on the floor plan 500 corresponding to the living room, and the non-control target region 1302 is the region on the floor plan 500 other than the living room.

For example, it is assumed that the user selects the device icon 501 for the air conditioner with a device ID 3101 of A shown in FIG. 35. In this case, the display control section 103 specifies the position (X10, Y100, Z1) of the air conditioner from the content registered in the arrangement 3104 of the air conditioner. Next, the display control section 103 references the room information 2900 to decide in which room the specified position (X10, Y100, Z1) is positioned. Here, it is assumed that the position (X10, Y100, Z1) is positioned within a region surrounded by vertexes with vertex IDs of F, G, H, I, L, O, and N. Then, the display control section 103 determines that the air conditioner is disposed in the living room with a room ID of A. Then, the display control section 103 generates a gray layer with the region of the living room defined as the control target region 1301 and with the region on the floor plan 500 other than the living room defined as the non-control target region 1302.

Next, transition between the display state of the basic screen and the display state of the device control screen 502 will be described using FIG. 18. In the basic screen shown in the left diagram of FIG. 18, the user selects the device icon 501 for the device 200 (here, the air conditioner) that is desired to be controlled, and the touch panel control section 102 senses the selection. Then, as shown in the right diagram of FIG. 18, the display control section 103 displays the device control screen 502 corresponding to the selected device icon 501 as overlapped on the floor plan 500. This results in transition from the display state of the basic screen to the display state of the device control screen 502.

Figure 18:
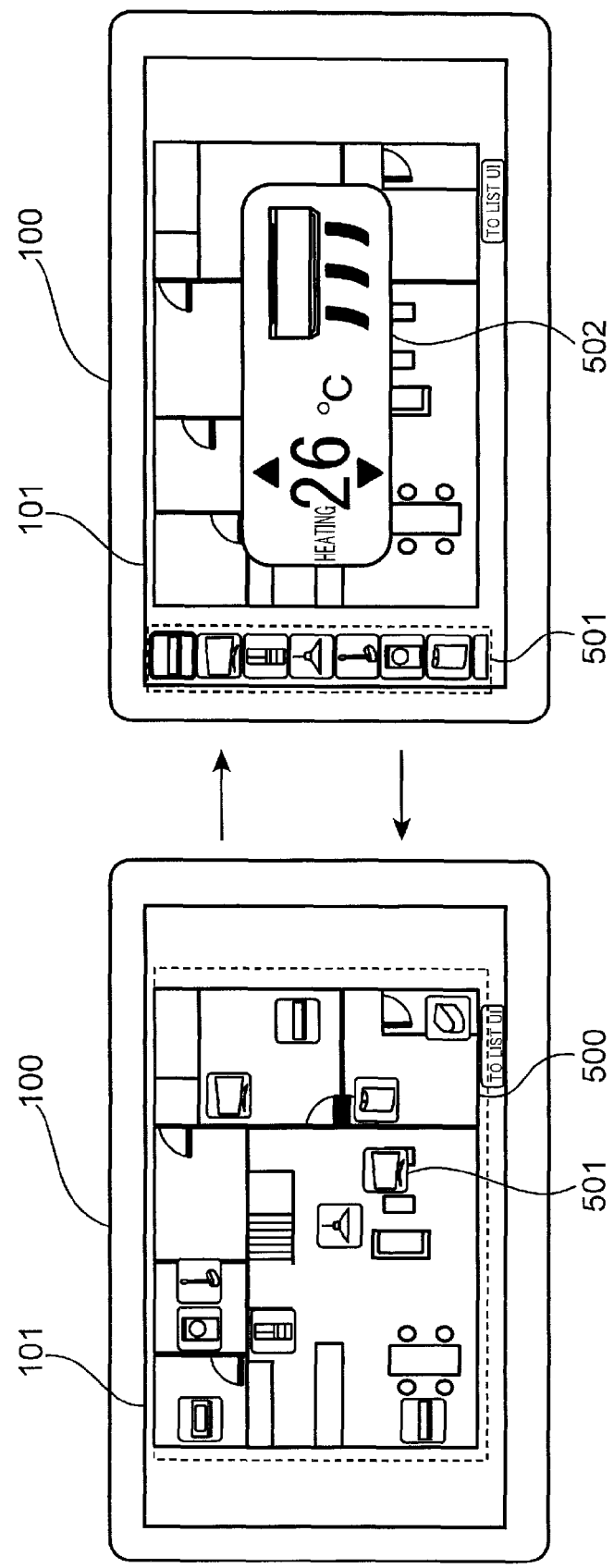
FIG. 18 is a diagram showing an example of transition between the basic screen of the home controller and the display state of the device control screen according to the present disclosure.

On the other hand, as shown in the right diagram of FIG. 18, in the display state of the device control screen 502, the user taps on the device icon 501 for the air conditioner corresponding to the device control screen 502 or a location outside the display region of the device control screen 502 (for example, the display region of the floor plan 500 outside the display region of the device control screen 502), and the touch panel control section 102 senses the tap. Then, as shown in the left diagram of FIG. 18, the display control section 103 erases the device control screen 502, and returns from the display state of the device control screen 502 to the display state of the basic screen. At this time, the display control section 103 returns the device icon 501 to the original arrangement position on the floor plan 500.

The operation described above is the same for the floor plan 500 for any floor displayed in the basic screen. For example, as shown in the left diagram of FIG. 19, in the case where the basic screen displays the floor plan 602 for the second floor, the user taps on the device icon 501 for the device 200 (here, the air conditioner) that is desired to be controlled, and the touch panel control section 102 senses the tap. Then, as shown in the right diagram of FIG. 19, the display control section 103 displays the device control screen 502 corresponding to the selected device icon 501 as overlapped on the floor plan 602 for the second floor.

Figure 19:
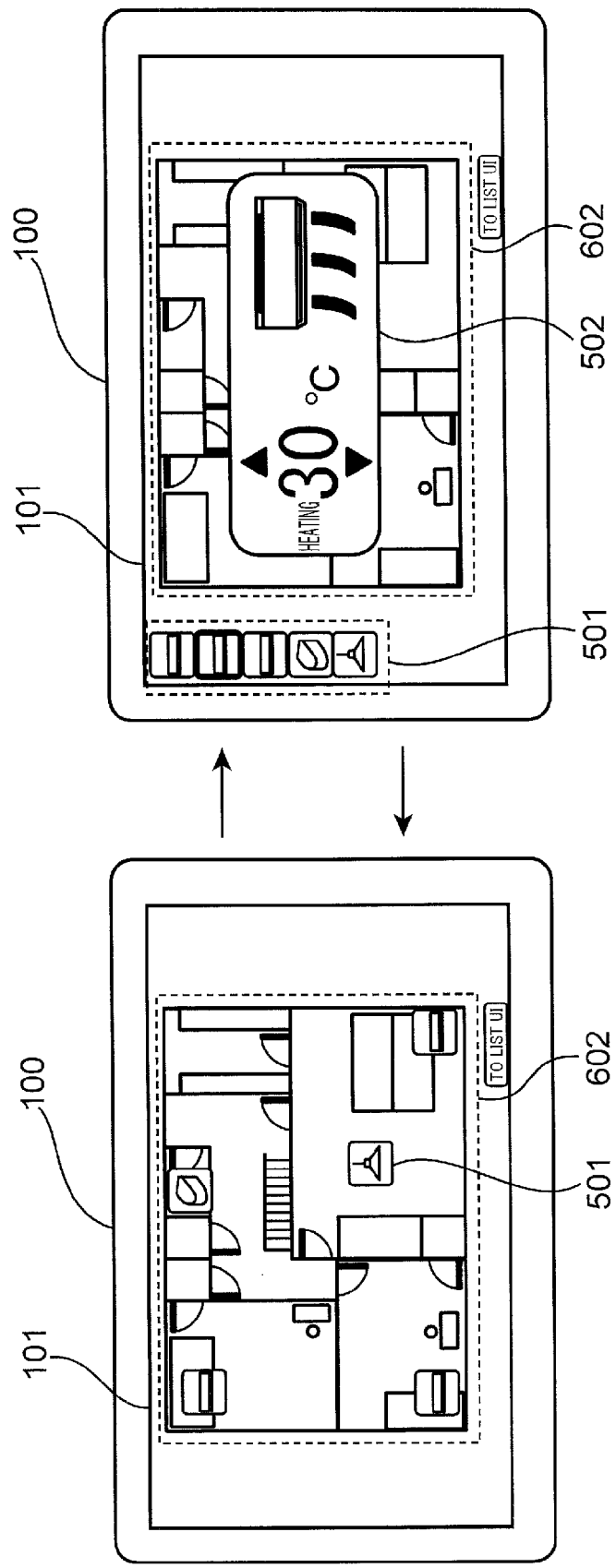
FIG. 19 is a diagram showing an example of transition between the second floor display state of the basic screen of the home controller and the display state of the device control screen for the second floor according to the present disclosure.

On the other hand, as shown in the right diagram of FIG. 19, in the display state of the device control screen 502 for the air conditioner, the user taps on the device icon 501 for the air conditioner corresponding to the device control screen 502 being displayed or a location outside the display region of the device control screen 502 (for example, the display region of the floor plan 500 outside the display region of the device control screen 502), and the touch panel control section 102 senses the tap. Then, as shown in the left diagram of FIG. 19, the display control section 103 erases the device control screen 502, and returns from the display state of the device control screen 502 to the display state of the basic screen in which the floor plan 602 for the second floor is displayed.

Figure 20:
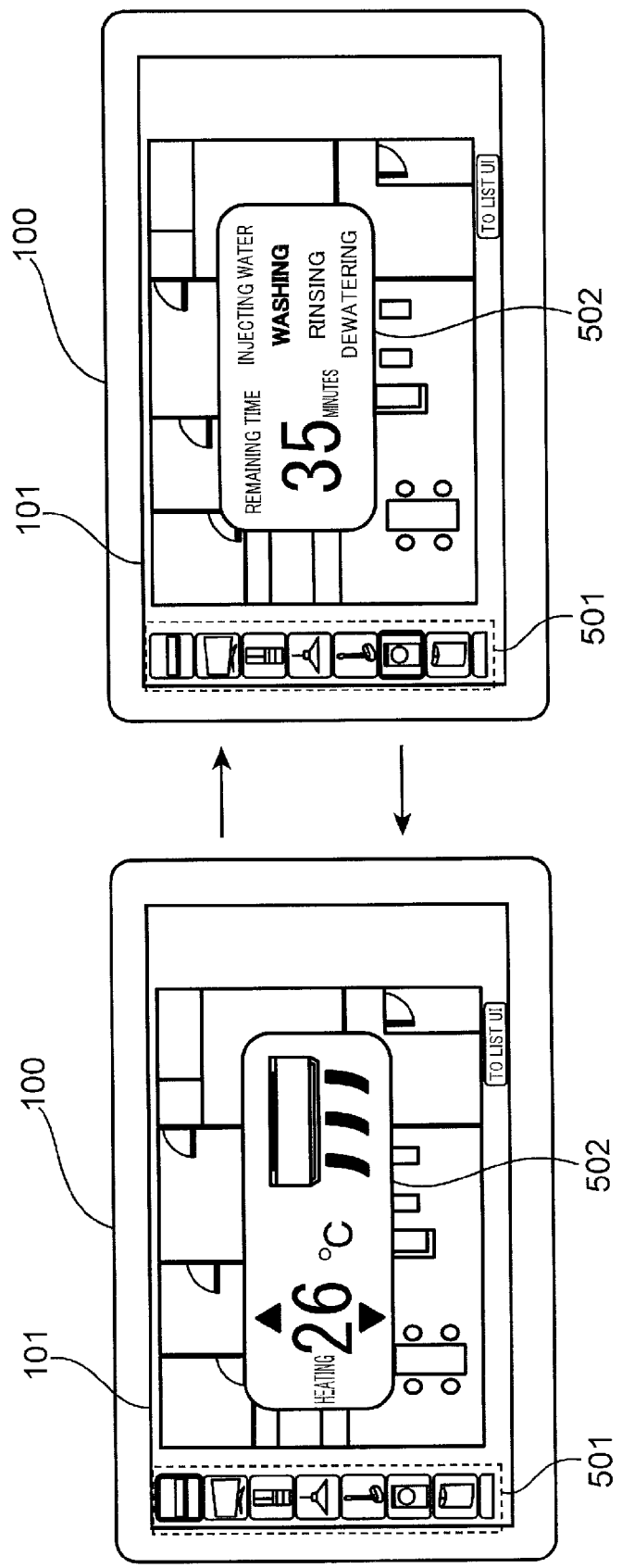
FIG. 20 is a diagram showing an example of transition from the display state of the device control screen of a certain device to the display state of the device control screen of another device according to the present disclosure.

Next, a method of switching from the display state of a certain device control screen 502 to the display state of another device control screen 502 will be described using FIG. 20. As shown in the left diagram of FIG. 20, in the display state of the device control screen 502 for the air conditioner, the user taps on the device icon 501 for the washing machine which is different from the device icon 501 for the air conditioner, and the touch panel control section 102 senses the tap. Then, as shown in the right diagram of FIG. 20, the display control section 103 erases the device control screen 502 which has been displayed, and displays the device control screen 502 corresponding to the device icon 501 for the washing machine as overlapped on the floor plan 500. Switching in the opposite direction is performed in the same manner.

Consequently, when the user successively selects different device icons 501, switching is successively performed between the device control screens 502, which allows the user to successively control different devices 200. That is, in causing another device control screen 502 to be displayed while a certain device control screen 502 is displayed, it is no longer necessary for the user to input an operation of erasing the certain device control screen 502, and switching can be performed between the device control screens 502 with one touch operation.

In the display state of the device control screen 502, in the case where the user taps on the device icon 501 corresponding to the device control screen 502 being displayed, the display control section 103 may only erase the device control screen 502, and may not return to the basic screen. Such screen transition is shown in FIG. 21.

Figure 21:
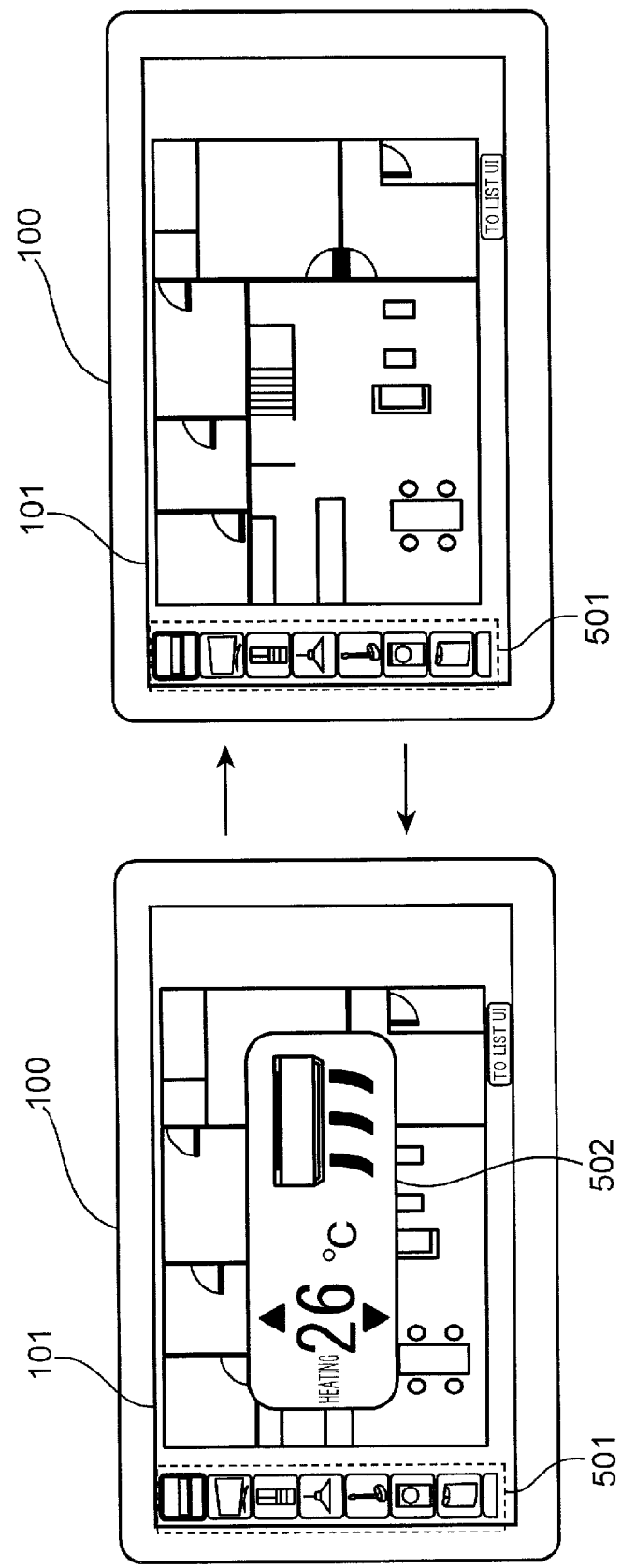
FIG. 21 is a diagram showing an example of transition between the display state and the hidden state of the device control screen of the home controller according to the present disclosure.

In the left diagram of FIG. 21, the device icon 501 for the air conditioner is selected by the user, and therefore the device control screen 502 for the air conditioner is displayed, and all the device icons 501 are displayed in one vertical line on the left side of the floor plan 500. In this state, the user taps on the device icon 501 for the air conditioner, and the touch panel control section 102 senses the tap. Then, as shown in the right diagram of FIG. 21, the display control section 103 erases only the device control screen 502 for the air conditioner with the device icons 501 kept displayed in one vertical line. In this case, the device icons 501 do not move onto the floor plan 500, and therefore a user's desire to cause only the floor plan 500 to be displayed may be met.

On the other hand, in the hidden state of the device control screen 502, the user selects a desired device icon 501, and the touch panel control section 102 senses the selection. Then, the display control section 103 displays the device control screen 502 corresponding to the selected device icon 501. For example, in the right diagram of FIG. 21, when the user selects the device icon 501 for the air conditioner from the device icons 501 disposed in one vertical line on the left side of the floor plan 500, the device control screen 502 for the air conditioner is displayed as shown in the left diagram of FIG. 21.

Figure 22:
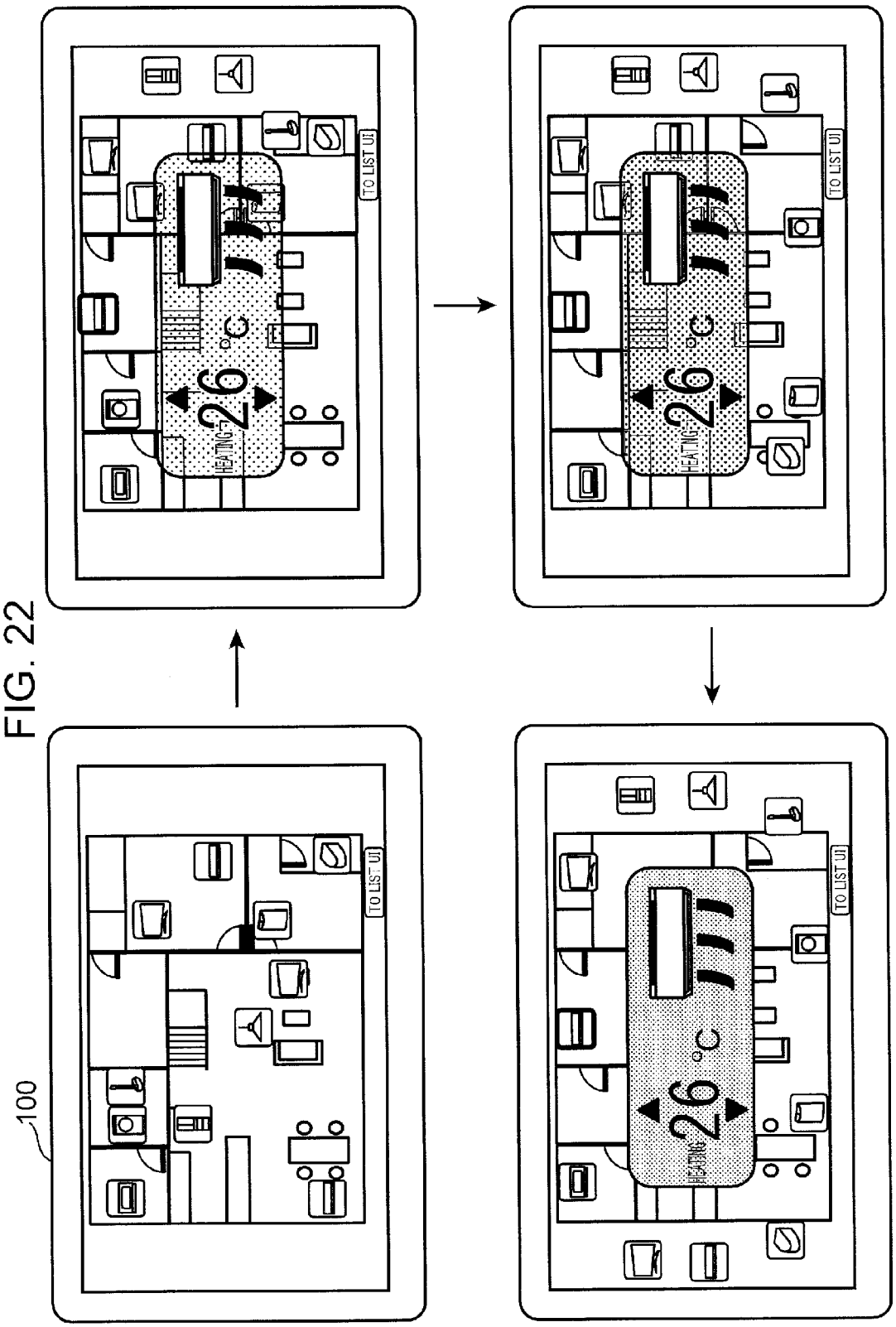
FIG. 22 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 22. As shown in the upper left diagram of FIG. 22, the user selects the device icon 501 for the air conditioner, for example, in the basic screen. Then, the display control section 103 gradually lowers the transparency of the device control screen 502 for the air conditioner in the order of the upper right diagram, the lower right diagram, and the lower left diagram of FIG. 22 to a final transparency of 0. At the same time, the display control section 103 moves all the device icons 501 onto the outer periphery of an ellipse that surrounds the device control screen 502.

Figure 23:
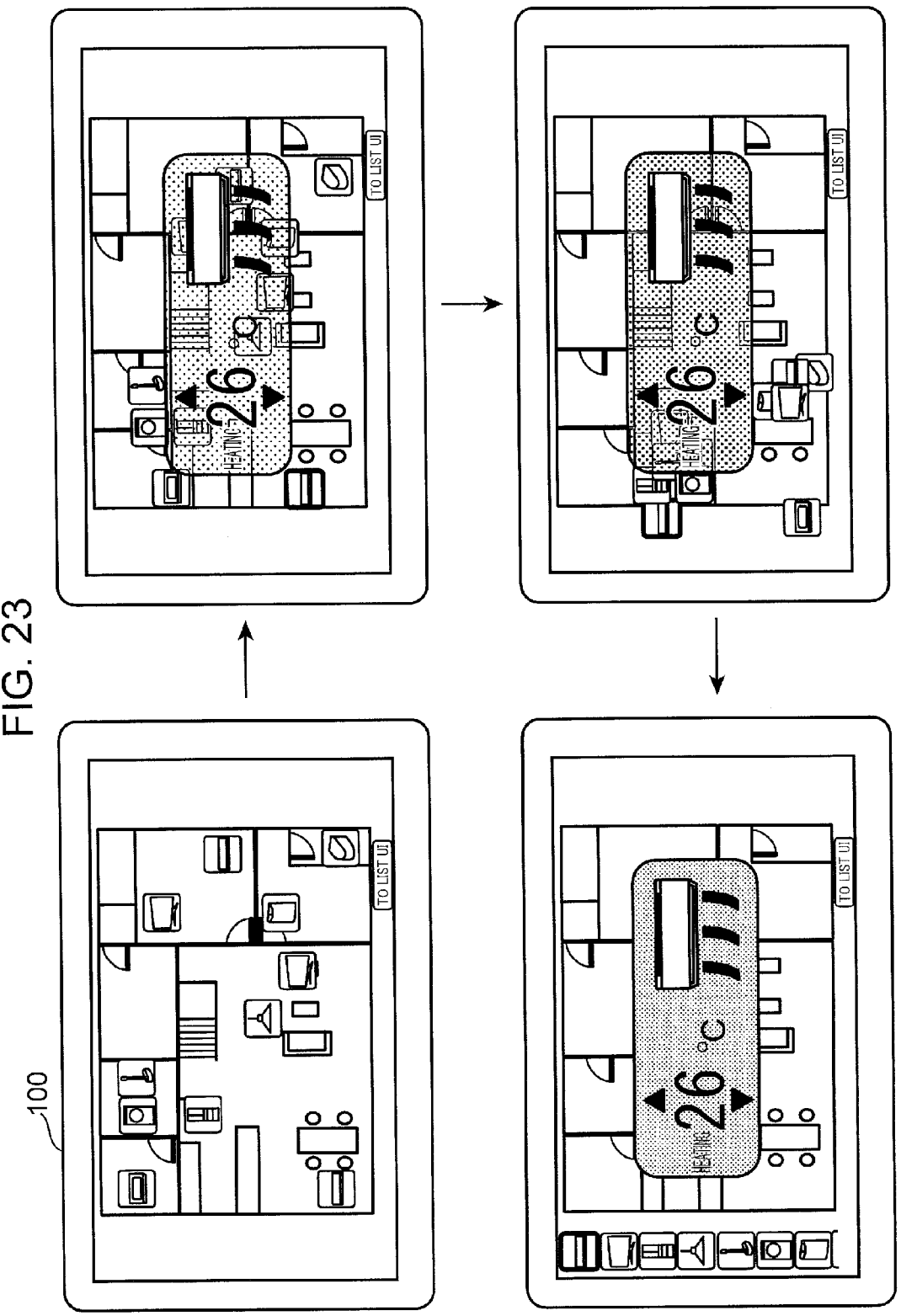
FIG. 23 is a diagram showing an example of an animation for transition from the basic screen of the home controller to the display state of the device control screen according to the present disclosure.

Next, transition from the display state of the basic screen to the display state of the device control screen 502 represented through an animation will be described using FIG. 23. As shown in the upper left diagram of FIG. 23, the user selects the device icon 501 for the device 200 which is the air conditioner, for example, in the basic screen. Then, the display control section 103 gradually decreases the transparency of the device control screen 502 for the air conditioner in the order of the upper right diagram, the lower right diagram, and the lower left diagram of FIG. 23 to a final transparency of 0. At the same time, the display control section 103 moves all the device icons to the left side of the floor plan 500.

Consequently, representing the screen transition through an animation can enhance the interest of the user in operating the device control screen 502 through screen rendering shown since the device icon 501 is selected until the device control screen 502 is displayed.

Figure 24:
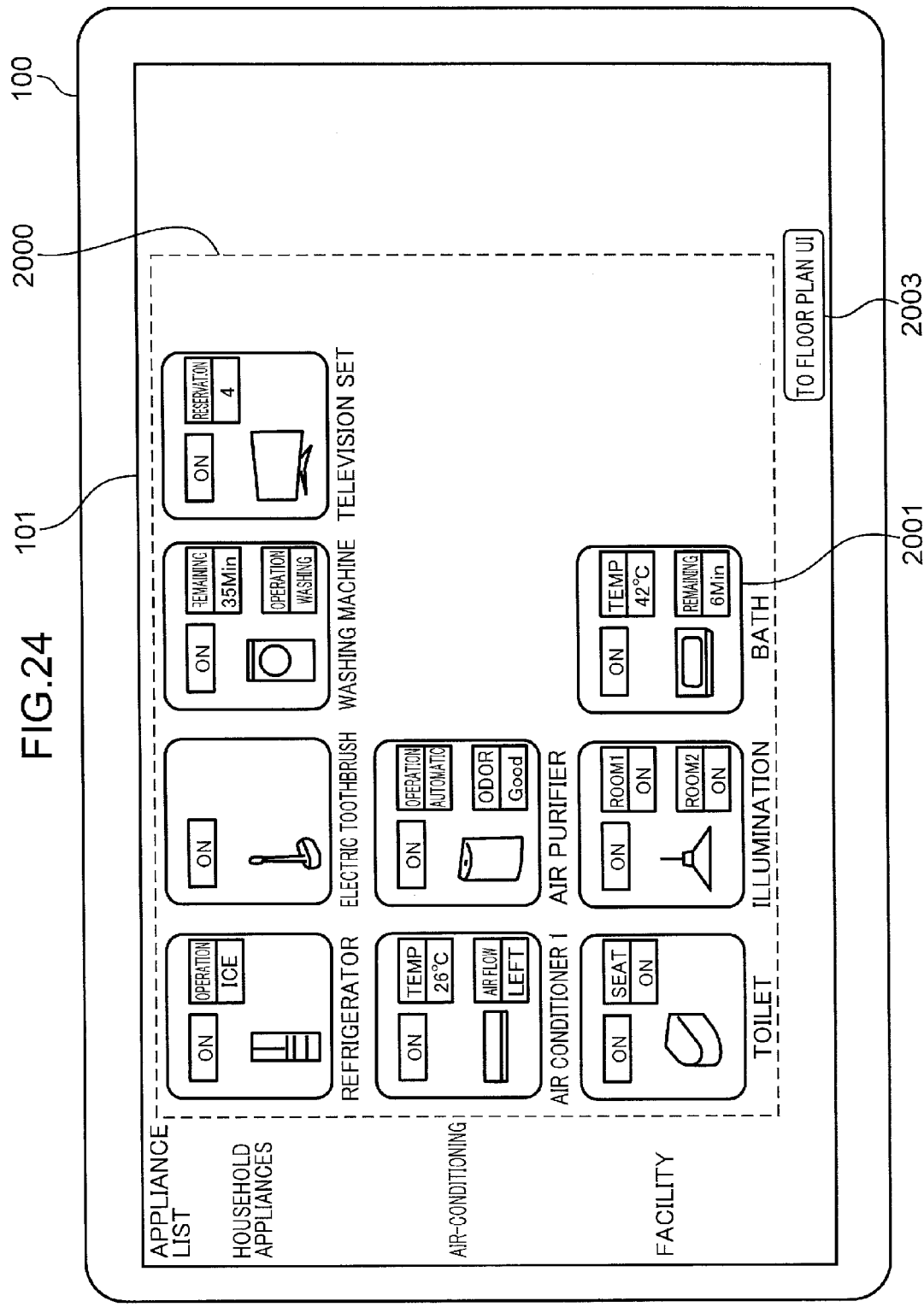
FIG. 24 is a diagram showing the configuration of a device icon list display screen of the home controller according to the present disclosure.

FIG. 24 is a diagram showing the configuration of a device list display screen. The device list display screen is displayed when the user taps on the device list display change button 503 in the basic screen shown in FIG. 5.

As shown in FIG. 24, the device list display screen includes a device list 2000, device details icons 2001, and a basic screen display button 2003.

When the user taps on the device details icon 2001 and the touch panel control section 102 senses the tap, the display control section 103 causes the device control screen 502 to be displayed as overlapped on the device list 2000. This allows the user to cause the device control screen 502 to be displayed and operate the device 200 as in the case where the device icon 501 is tapped on.

The device details icon 2001 is prepared for each device 200. The device details icon 2001 is different from the device icon 501 in representing not only an image representing the device 200 but also the on/off state and the operation state of the device 200. For example, the device details icon 2001 for the refrigerator displayed in the upper left of FIG. 24 displays not only an image of the refrigerator but also "ON", which indicates that the refrigerator is currently turned on, and "OPERATION/ICE", which indicates that the refrigerator is currently making ice.

In the device list 2000, the device details icons 2001 are displayed as classified on the basis of a classification criterion determined in advance. Examples of the classification criterion determined in advance include the type of the device 200, the room in which the device 200 is disposed, and the status of use of the device 200. In FIG. 24, the type of the device 200 is used as the classification criterion, and the device details icons 2001 are classified into three categories, namely the household appliance, air-conditioning, and facility categories.

In the example of FIG. 24, the refrigerator, an electric toothbrush, the washing machine, and the television set are classified into the household appliance category, the air conditioner and the air purifier are classified into the air-conditioning category, and the toilet, the illumination device, and the bath are classified into the facility category. In this case, a classification table that determines into which of the household appliance, air-conditioning, and facility categories each device 200 is classified on the basis of the content registered in the device type 3102 of the device list 3100 (see FIG. 35) is stored in advance in the storage section 104. Then, the display control section 103 may reference the classification table to classify each device into a category.

Returning to FIG. 24, the button with a text "TO FLOOR PLAN UI" displayed at the lower right of the device list 2000 is the basic screen display button 2003. The basic screen display button 2003 is a button for switching the screen from the device list display screen to the basic screen.

Although switching can be made between the basic screen and the device list display screen in the foregoing description, the device list display screen may be utilized as the basic screen in place of the basic screen shown in FIG. 5. In this case, the basic screen display button 2003 may be omitted.

In the foregoing description, one device details icon 2001 is correlated with one device 200. However, the present disclosure is not limited thereto, and one device details icon 2001 may be correlated with a plurality of devices 200 so that the one device details icon 2001 may be used in common to the plurality of devices 200. For example, in the case where there are two illumination devices in a living room, the two illumination devices may be represented by one device details icon 2001.

In this case, when the device details icon 2001 representing the two illumination devices is tapped on by the user, the display control section 103 causes the display 101 to display a device control screen 502 that allows simultaneous control of the two illumination devices. In this case, the same effect as that obtained in the case where one device icon 501 is used in common to a plurality of devices 200 is obtained. In the case where one device details icon 2001 is used in common to a plurality of illumination devices, the device details icon 2001 may display the on/off state and the operation state of each of two illumination devices.

In the basic screen, the device details icon 2001 may be used in place of the device icon 501. In the device list display screen, the device icon 501 may be used in place of the device details icon 2001. In addition, the device control screen 502 displayed in the case where the device details icon 2001 is selected and the device control screen 502 displayed in the case where the device icon 501 is selected may be the same as or different from each other. For example, the device details icon 2001 contains more information than that of the device icon 501, and therefore the device control screen 502 displayed in the case where the device details icon 2001 is selected may include more buttons and states than those of the device control screen 502 displayed in the case where the device icon 501 is selected.

Figure 25:
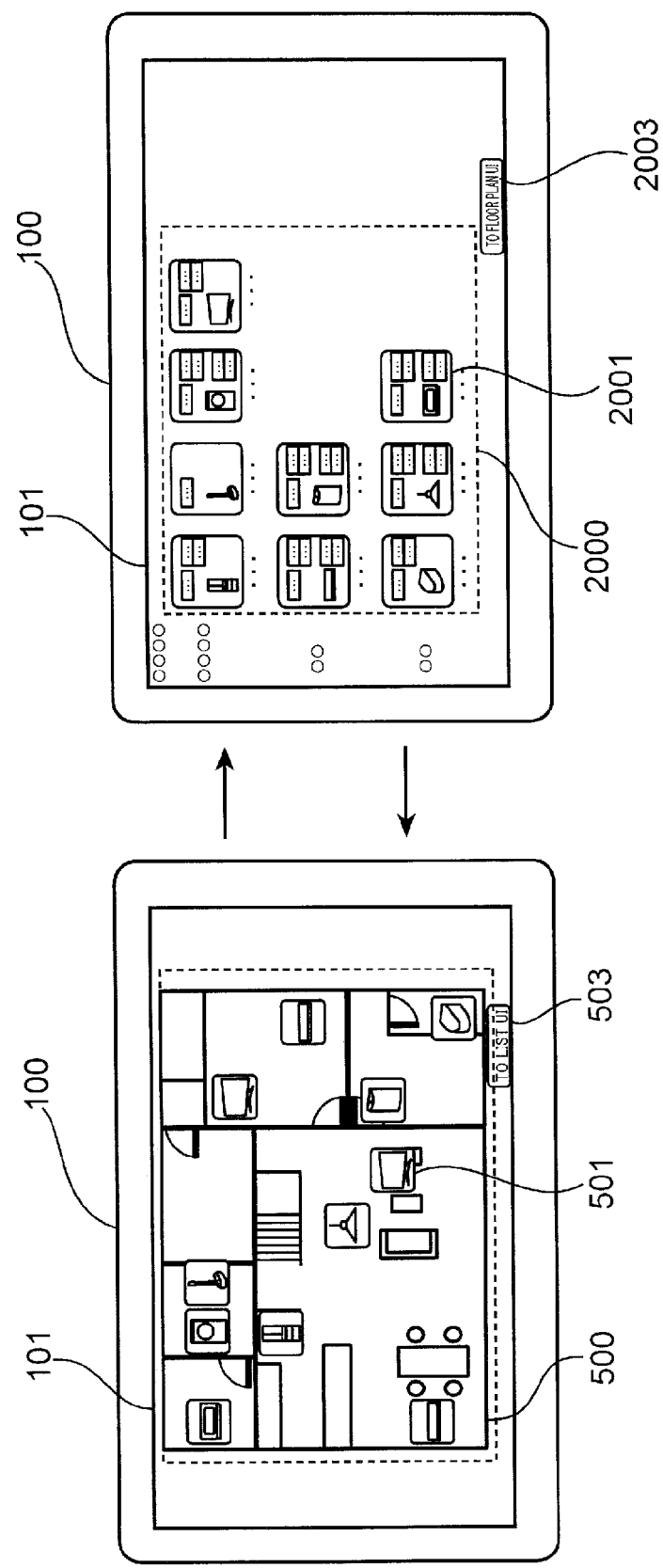
FIG. 25 is a diagram showing an example of transition between the basic screen of the home controller and the device icon list display screen according to the present disclosure.

FIG. 25 is a diagram showing screen transition between the basic screen and the device list display screen. In the basic screen shown in the left diagram of FIG. 25, when the device list display change button 503 is selected by the user, display on the display 101 is switched to the device list display screen shown in the right diagram of FIG. 25. On the other hand, in the device list display screen shown in the right diagram of FIG. 25, when the basic screen display button 2003 is selected by the user, display on the display 101 is switched to the basic screen shown in the left diagram of FIG. 25.

Specifically, when the touch panel control section 102 senses a tap on the basic screen display button 2003, the display control section 103 switches the display screen on the display 101 to the basic screen from the device list display screen. On the other hand, in the display state of the basic screen, when the touch panel control section 102 senses a tap on the device list display change button 503, the display control section 103 switches the display screen on the display 101 from the basic screen to the device list display screen.

For example, in the case where the device list display screen is selected for display, and in the case where the user attempts to operate the television set located in front of the user, the device list display screen includes only one device details icon 2001 for the television set if there is only one television set in the house. This allows the user to directly select the device details icon 2001 for the television set without an erroneous operation, and to cause the device control screen 502 corresponding to the television set to be displayed.

On the other hand, in the case where the device list display screen is selected, the device list display screen focuses on the individual devices 200, and thus the relationship between the device 200 and the location at which the device 200 is disposed is unclear, although it is possible to operate or confirm the state of the individual devices 200. Therefore, for a plurality of devices 200 installed within the same building, such as the air conditioners or the illumination devices, for example, it is unclear the air conditioner or the illumination device in which room is the control target, which may incur an erroneous operation.

Thus, in the present disclosure, the basic screen is provided in addition to the device list display screen to allow selection from the basic screen and the device list display screen.

Consequently, in the case where the basic screen is selected, the relationship between the device 200 and the location at which the device 200 is disposed is made definite. Therefore, also for a plurality of devices 200 of the same type installed in the same building, such as the air conditioners or illumination devices, for example, a discrimination as to the air conditioner or the illumination device in which room is the control target is facilitated. This prevents the air conditioner or the illumination device installed in a room that is different from the desired room from being erroneously operated.

Figure 26:
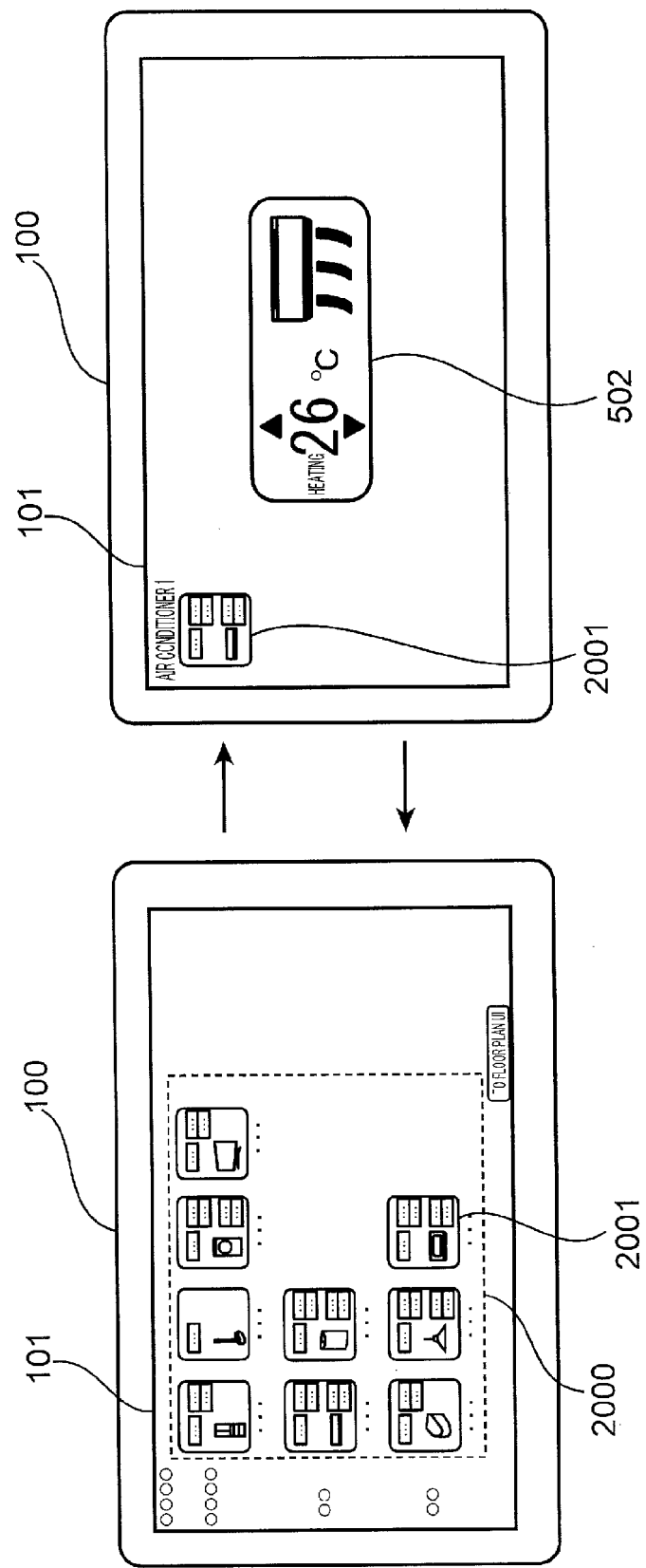
FIG. 26 is a diagram showing an example of transition between the device icon list display screen of the home controller and the display state of the device control screen according to the present disclosure.

FIG. 26 is a diagram showing screen transition between the display state of the device list display screen and the display state of the device control screen 502. In the device list display screen shown in the left diagram of FIG. 26, the user selects the device details icon 2001 for the device 200 (here, the air conditioner) that is desired to be controlled, and the touch panel control section 102 senses the selection. Then, as shown in the right diagram of FIG. 26, the display control section 103 displays the device control screen 502 for the air conditioner corresponding to the selected device details icon 2001 as overlapped on the device list display screen. This results in transition from the display state of the device list display screen to the display state of the device control screen 502.

In the example in the right drawing of FIG. 26, the display control section 103 hides the device details icons 2001 for devices other than the air conditioner selected by the user, and only the device details icon 2001 for the air conditioner is displayed at a position that is different from that in the device control screen 502. This allows the user to definitely recognize the device details icon 2001 that the user himself/herself selected.

On the other hand, as shown in the right diagram of FIG. 26, in the display state of the device control screen 502, the user selects the device details icon 2001 for the air conditioner, and the touch panel control section 102 senses the selection. Then, as shown in the left diagram of FIG. 26, the display control section 103 erases the device control screen 502, and returns from the display state of the device control screen 502 to the display state of the device list display screen.

Although only one device details icon 2001 is displayed in the display state of the device control screen 502 shown in the right diagram of FIG. 26, other device details icons 2001 that are not selected by the user may be displayed in the same manner as in FIG. 13. In this case, the plurality of device details icons 2001 may be displayed in one line at an end of the screen as shown in FIG. 13, or may be displayed so as to surround the device control screen 502 as shown in FIG. 12.

According to the configuration, the user can successively select the device details icons 2001 in the display state of the device control screen 502 to successively display other device control screens 502. Consequently, in causing another device control screen 502 to be displayed while a certain device control screen 502 is displayed, it is no longer necessary for the user to input an operation of erasing the certain device control screen 502, and switching can be performed between the device control screens 502 with one touch operation.

Figure 27:
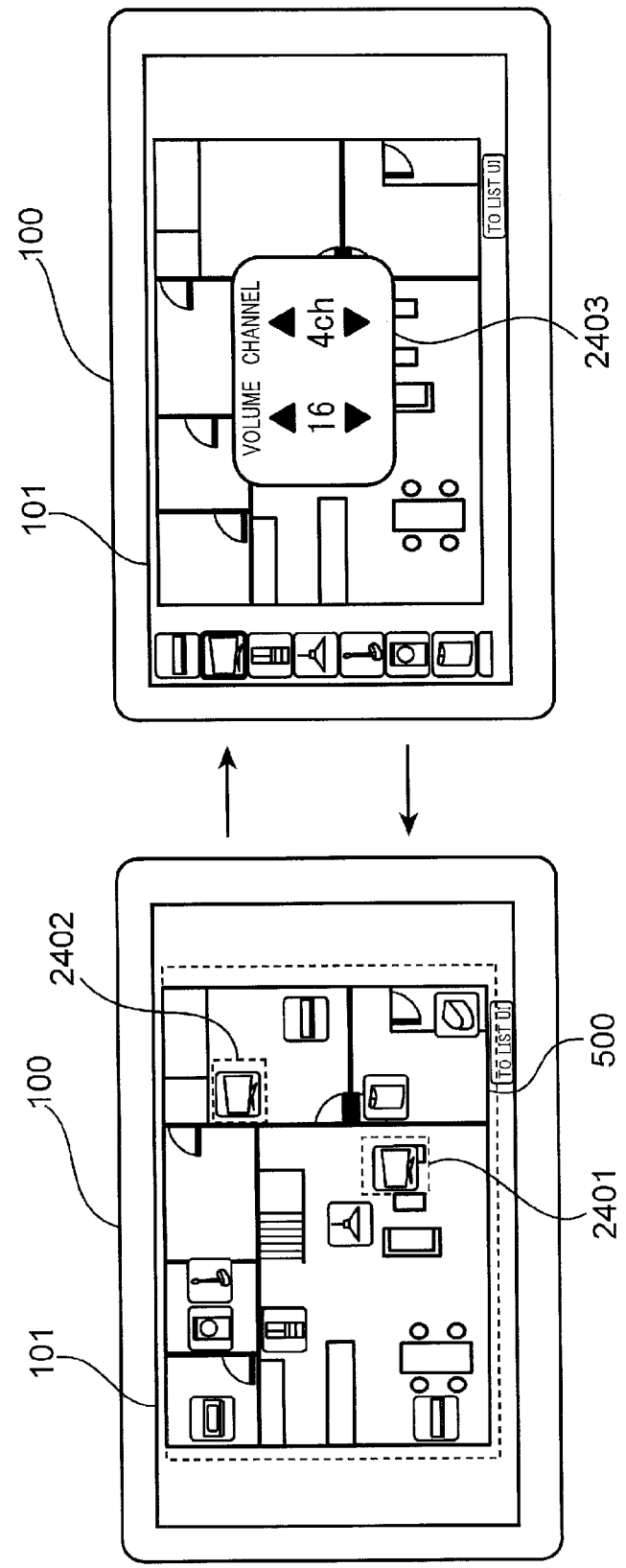
FIG. 27 is a diagram showing an example of transition between the basic screen of the home controller and the display state of the device control screen according to the present disclosure.

FIG. 27 is a diagram showing screen transition between the display state of the basic screen and the display state of the device control screen 502 performed in the case where the basic screen includes a plurality of device icons 501 representing the devices 200 of the same type. As shown in the left diagram of FIG. 27, the basic screen includes two device icons 501 for the television set. Here, the device icon 501 for a television set A is represented as a device icon 2401, and the device icon 501 for a television set B is represented as a device icon 2402. At this time, the user can intuitively select a television set that is desired to be controlled from the floor plan 500, and operate the television set.

For example, in the right diagram of FIG. 27, the device icon 2401 for the television set A is selected, and a device control screen 2403 for the television set A is displayed. Consequently, even if there are a plurality of device icons 501 for the devices 200 of the same type, each device icon 501 is disposed at a position on the floor plan 500 corresponding to the actual installation position. This allows the user to intuitively select the device icon 501 for a device 200 that is desired to be controlled in accordance with the display position on the floor plan 500, which prevents the device control screen 502 for another device 200 from being erroneously displayed.

Figure 28:
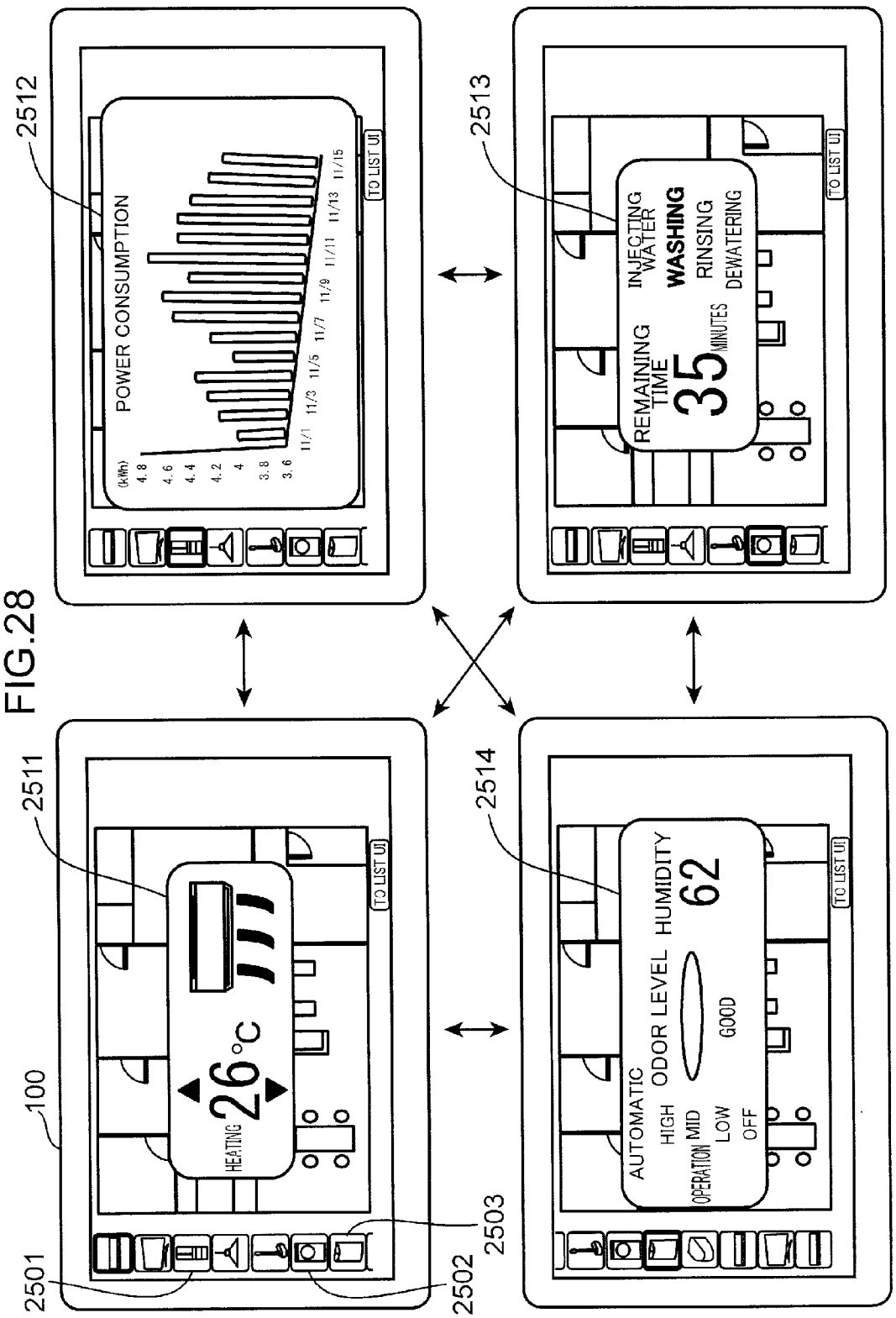
FIG. 28 is a diagram showing how the home controller successively transitions among the display states of the device control screens for different devices according to the present disclosure.

FIG. 28 is a diagram showing screen transition performed in the case where different device icons 501 are successively selected in the display state of the device control screen 502 to successively switch between the device control screens 502. In the upper left diagram, a device control screen 2511 for the air conditioner is displayed. When the device icon 2501 for the refrigerator is selected in this state, a device control screen 2512 for the refrigerator is displayed on the display 101 as shown in the upper right diagram. When the device icon 2502 for the washing machine is selected in the upper left diagram, a device control screen 2513 for the washing machine is displayed as shown in the lower right diagram. When the device icon 2503 for the air purifier is selected in the upper left diagram, a device control screen 2514 for the air purifier is displayed as shown in the lower left diagram. Such screen transition is performed in the same manner in the upper right diagram, the lower right diagram, and the lower left diagram.

Consequently, when the user selects the device icon 501 in the display state of the device control screen 502, the device control screen 502 corresponding to the device icon 501 can be directly displayed. Therefore, in the case where another device control screen 502 is to be displayed while a certain device control screen 502 is displayed, the other device control screen 502 can be displayed with one touch operation without inputting an operation of erasing the device control screen 502 being displayed. This allows the user to smoothly switch between the device control screens 502.

Figure 29:
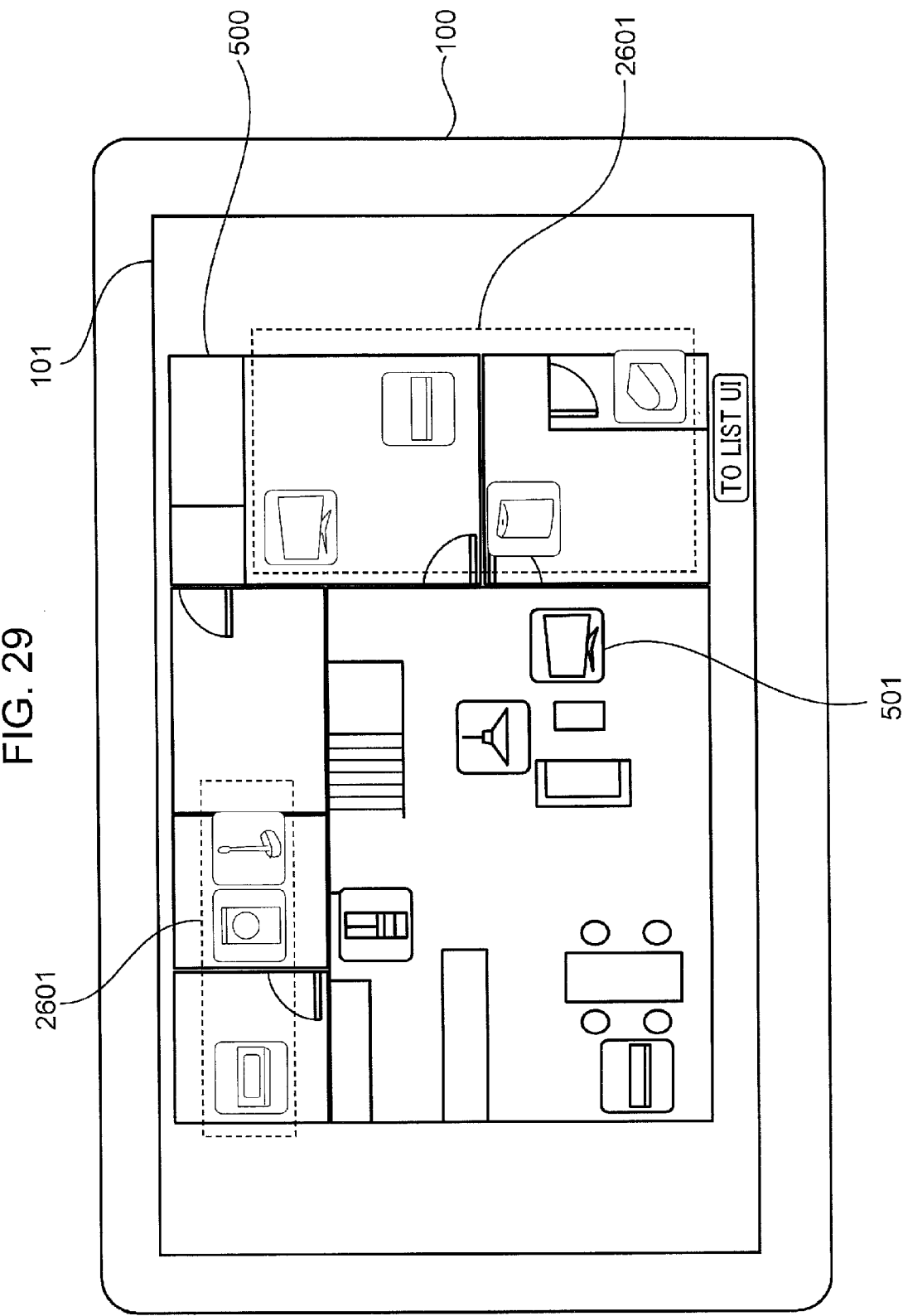
FIG. 29 is a diagram showing an example of display on the basic screen of devices that cannot be detected on a network according to the present disclosure.

FIG. 29 is a diagram showing an example of display on the basic screen of the device icons 501 for incommunicable devices 200 that cannot be detected on the network. The device management section 105 detects a device 200 that cannot be detected on the network and a device 200 that does not respond to a control command even though registered in the device list 3100 as incommunicable devices 200. Then, the display control section 103 displays the device icons 501 for the incommunicable devices 200 in a display mode that is different from that for the device icons 501 for communicable devices 200.

For example, in FIG. 29, the device icons 501 for the incommunicable devices 200 are represented as device icons 2601. The device icons 2601 are displayed translucently. This allows the user to immediately recognize that the devices 200 indicated by the device icons 2601 are currently out of order or cannot be controlled because of occurrence of a communication failure.

Although the device icons 2601 are displayed translucently in FIG. 29, the present disclosure is not limited thereto. For example, the device icons 2601 may be displayed in a fainter color or more darkly than the other device icons 501, or provided with an annotation mark.

Figure 30:
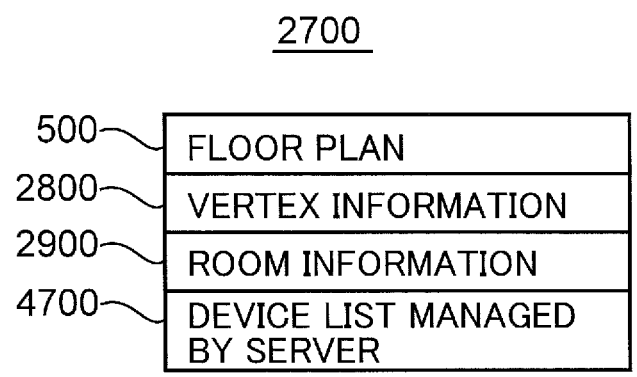
FIG. 30 is a diagram showing the configuration of home information according to the present disclosure.

FIG. 30 is a diagram showing the configuration of home information 2700. The home information 2700 is managed by the server 300 for each house, and the home controller 100 controls display on the basic screen, the device control screen 502, and so forth on the basis of the home information 2700. As shown in FIG. 30, the home information 2700 includes the floor plan 500, vertex information 2800, the room information 2900, and a device list 4700 managed by the server.

As shown in FIG. 6, the floor plan 500 is a plan view that is prepared for each floor of a house and that planarly represents the arrangement and the shape of one or more rooms forming the floor. In the present disclosure, the floor plan 500 includes a plan view formed from image data represented in a bitmap format, for example.

The vertex information 2800 is information for adapting the floor plan 500 to a two-dimensional coordinate-axis space to allow the home controller 100 to interpret the floor plan 500. The room information 2900 is information for deciding the regions of rooms from the vertex information 2800. The vertex information 2800, the room information 2900, and the device list 4700 managed by the server will be described in detail below.

FIG. 31 is a diagram showing the configuration of the vertex information 2800. As shown in FIG. 31, the vertex information 2800 includes a vertex ID 2801 and a vertex coordinate 2802. The vertex ID 2801 is an identifier that identifies a vertex on the floor plan 500. The vertex coordinate 2802 is a coordinate represented in the format of (X coordinate, Y coordinate, floor number), and indicates the position of a vertex of a partition line or the like represented on the floor plan 500. For example, the vertex with a vertex ID of B has a vertex coordinate (X20, Y0, Z1), which represents the position on the first floor (the ground floor) with an X coordinate of 20 and a Y coordinate of 0.

Figure 33:
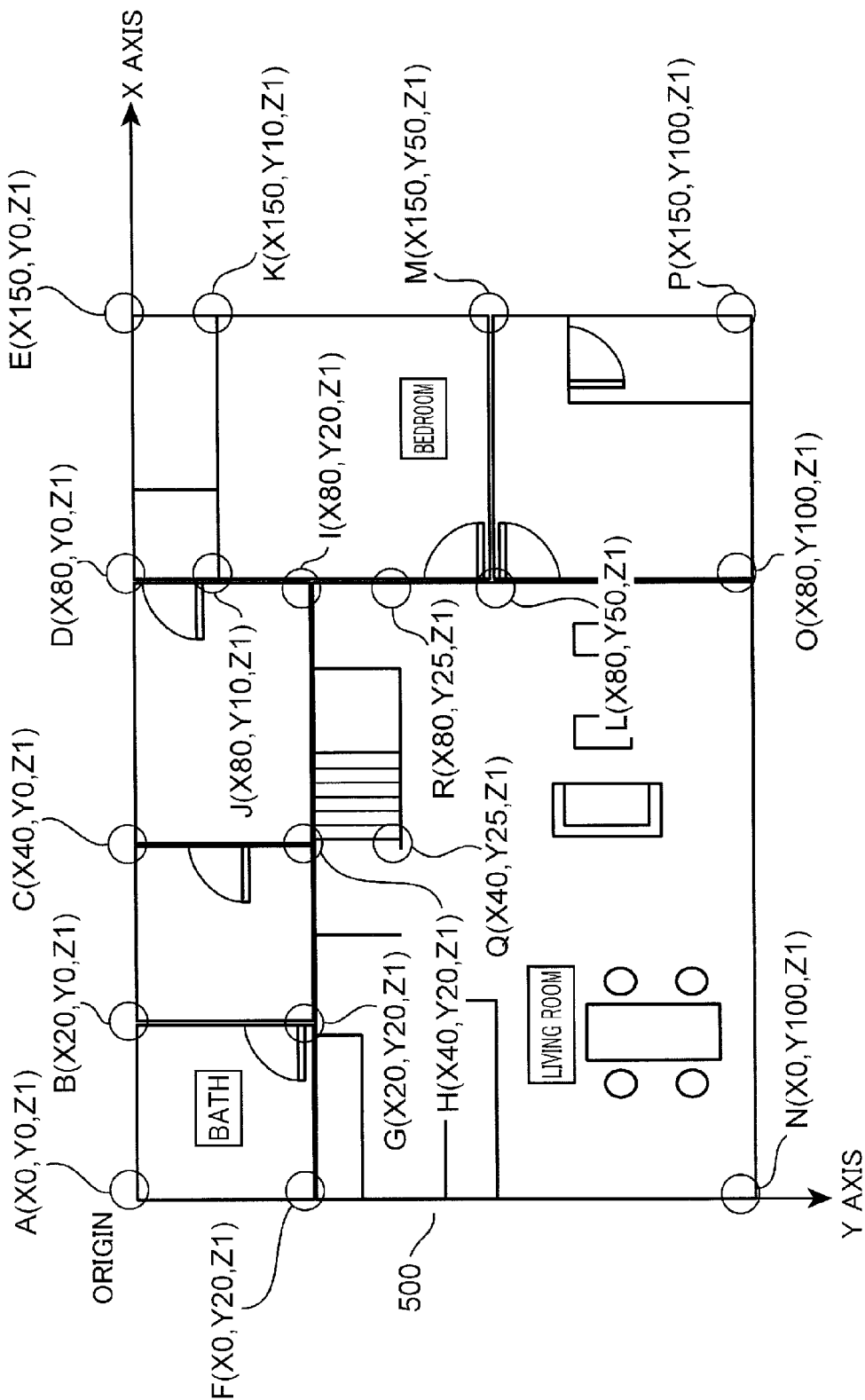
FIG. 33 is a diagram showing an example of the correspondence between the vertex information and the floor plan for the first floor according to the present disclosure.

FIG. 33 is a diagram showing the correlation between each vertex registered in the vertex information 2800 and the floor plan 500. It should be noted, however, that in FIG. 33, the upper left vertex of the floor plan 500 is the origin (with an X coordinate of 0 and a Y coordinate of 0). For example, the vertex with a vertex ID of A has a vertex coordinate (X0, Y0, Z1), and therefore is positioned at the origin. Meanwhile, the vertex with a vertex ID of B has a vertex coordinate (X20, Y0, Z1), and therefore is positioned at the upper right vertex of the bath.

FIG. 32 is a diagram showing the configuration of the room information 2900. As shown in FIG. 32, the room information 2900 includes a room ID 2901, the room type 2902, and a room coordinate 2903. The room ID 2901 is an identifier that identifies a room on the floor plan 500. The room type 2902 indicates the type of the room. The room coordinate 2903 is expressed by a set of the vertex IDs 2801, and decides the region of the room on the floor plan 500. For example, the room with a room ID of C is the bath, and indicates a region formed by connecting the vertexes with vertex IDs of A, B, G, and F sequentially in this order on the floor plan 500. The room information 2900 includes not only information on the rooms but also information on the staircase. The region with a room ID of D formed by connecting the vertexes with vertex IDs of H, I, R, and Q sequentially in this order represents the staircase.

Consequently, with the vertex information 2800 and the room information 2900 provided, the home controller 100 can specify the regions of the rooms represented on the floor plan 500 by plotting the vertexes indicated by the vertex information 2800 on the image data for the floor plan 500 and connecting the vertexes indicated by the room coordinate 2903, and recognize the type of the rooms from the room type 2902.

The vertex information 2800 may be generated by a system administrator by causing the floor plan 500 to be displayed on a display of a personal computer, detecting vertexes from the displayed floor plan, and inputting the vertex ID and the vertex coordinate of the detected vertexes to the personal computer. The vertex information 2900 may also be generated by the system administrator by detecting rooms from the floor plan displayed on a display, and inputting the room ID, the room type, and the room coordinate of the detected rooms to a personal computer. Alternatively, the vertex information 2800 and the room information 2900 may be generated by taking in CAD data which are the original data for the floor plan 500.

FIG. 34 is a diagram showing the configuration of the device list 4700 managed by the server 300. As shown in FIG. 34, the device list 4700 includes a device ID 4701, a device type 4702, a model number 4703, an arrangement 4704, a capability information 4705, and a control command transmission destination 4706.

The device ID 4701 is the identifier of the device 200. The device type 4702 indicates the type of the device 200. The model number 4703 indicates the model number of the device 200. The arrangement 4704 is a coordinate represented in the format of (X coordinate, Y coordinate, floor number) as with the vertex coordinate 2802, and indicates the arrangement of the device icon 501 corresponding to the device 200 on the floor plan 500.

The display control section 103 can dispose the device icon 501 on the floor plan 500 on the basis of the arrangement 4704, and display the basic screen and so forth. The capability information 4705 indicates the content for control of the device 200 and the state that can be acquired from the device 200. For example, the air conditioner with a device ID of A can be controlled for the temperature, the air flow direction, and the air flow amount. The control command transmission destination 4706 indicates the transmission destination of a control command for controlling the device 200. For example, the control command transmission destination 4706 for the air conditioner with a device ID of A is the device, and therefore a control command is directly transmitted from the home controller 100 to the device 200.

Meanwhile, the control command transmission destination 4706 for the refrigerator with a device ID of C is the server, and therefore a control command is transmitted from the home controller 100 to the device 200 via the server 300. The control command is a command for operating the device 200 or confirming the state of the device 200.

The current state of the device 200 may be registered in the device list 4700. This allows the server 300 to notify the home controller 100 of the state of the relevant device 200 in the case where a request for confirmation of the state of the device 200 is made from the home controller 100.

As discussed above, in order to dispose the device icon 501 on the floor plan 500 on the basis of the actual arrangement of the device 200 within the house, the user moves the device icon 501 to an appropriate position on the floor plan 500. Thus, for the device icon 501 of which the arrangement on the floor plan 500 is not specified by the user, a value that indicates an unset arrangement such as (0, 0, 0) is set as the value of the arrangement 4704. The display control section 103 displays the device icon 501 with the arrangement 4704 unset at a position on the display 101 determined in advance.

The device list 4700 managed by the server may be omitted from the home information 2700. In this case, the home controller 100 may directly acquire from the device 200 information corresponding to the device type 4702, the model number 4703, and the capability information 4705 provided in the device list 4700 managed by the server.

FIG. 35 is a diagram showing the configuration of the device list 3100 managed by the home controller 100. The home controller 100 disposes the device icons 501 on the floor plan 500 in the basic screen and controls the devices 200 on the basis of information in the device list 3100.

The device list 3100 includes the device ID 3101, the device type 3102, a model number 3103, the arrangement 3104, capability information 3105, a control command transmission destination 3106, and an IP address 3107. The device ID 3101 to the control command transmission destination 3106 are the same in content as those with the same name in FIG. 34.

In the device list 3100, the content of the device type 3102, the model number 3103, the arrangement 3104, the capability information 3105, the control command transmission destination 3106 can be acquired by the device management section 105 by transmitting the device list 4700 from the server 300. The IP address 3107 is acquired from the device 200 by the device management section 105. It should be noted, however, that the device management section 105 may give priority to the content of the device type 3102, the model number 3103, the capability information 3105, and the control command transmission destination 3106 that can be directly acquired from the device 200 in the case where such content is available.

The control command transmission destination 3106 may be determined in advance by the home controller system, may be automatically decided on the basis of the state of the network to which the home controller 100 is connected, or may be set by the user, rather than being acquired from the server 300 or the device 200.

Next, the flow of control performed on the device 200 by the home controller 100 will be described using the drawings.

FIG. 36 is a sequence diagram showing the flow of a process for the home controller 100 to acquire the home information 2700 from the server 300. The home controller 100 acquires the home information 2700 from the server 300 at desired timing such as when the home controller 100 is initially utilized or started, and generates the basic screen shown in FIG. 5 on the basis of the acquired home information 2700.

First, the device management section 105 of the home controller 100 transmits a home information request to the server 300 (S3201). Here, the home information request includes at least a home controller ID that indicates a user or a home that utilizes the home controller 100. The home information management section 301 of the server 300 which receives the home information request searches the storage section 304 for the home information 2700 corresponding to the home controller ID (S3202), and transmits the home information 2700 to the home controller 100 (S3203). The device management section 105 of the home controller 100 stores the home information 2700 received from the server 300 in the storage section 104, and the display control section 103 generates a basic screen on the basis of the home information 2700, and displays the basic screen on the display 101 (S3204).

Next, the flow of a process for the home controller 100 to detect the device 200 on the network after the home controller 100 is connected to the network will be described using FIG. 37.

Figure 37:
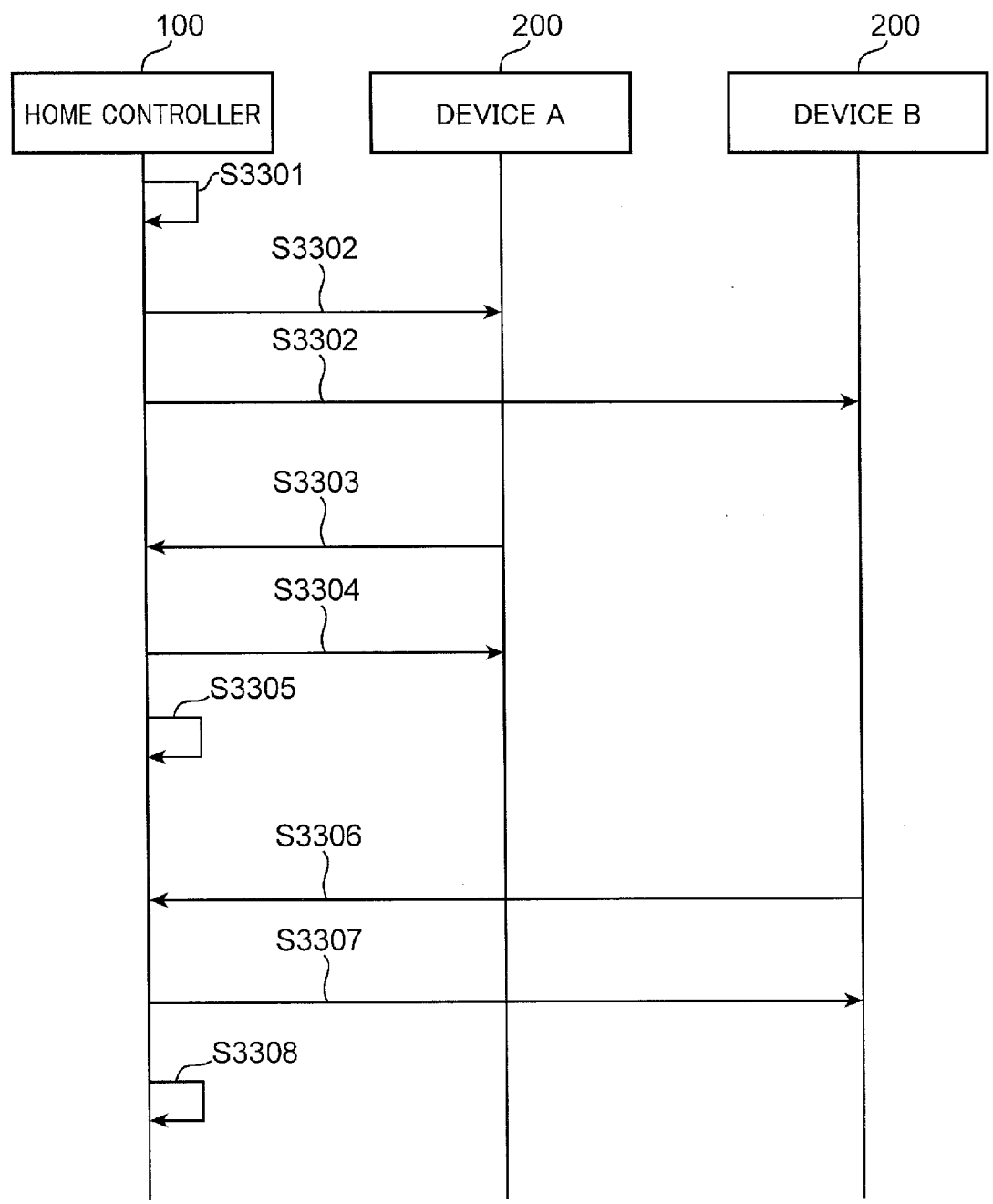
FIG. 37 is a sequence diagram showing the flow of a process for the home controller to detect a device on a network when the home controller is connected to the network according to the present disclosure.

In FIG. 37, a device A 200 with a device ID of A and a device B 200 of a device ID of B shown in FIG. 34 are connected to the network.

When the home controller 100 is connected to the network when the home controller 100 is initially utilized or turned on (S3301), the device management section 105 of the home controller 100 broadcasts a device search request to all the devices 200 on the network (S3302). The device A 200 which receives the device search request returns a device search response to the home controller 100 (S3303). The home controller 100 which receives the device search response acquires device information from the device A 200 (S3304), and updates the display screen (S3305).

Similarly, the device B 200 which receives the device search request returns a device search response to the home controller 100 (S3306). The home controller 100 which receives the device search response acquires device information from the device B 200 (S3307), and updates the display screen (S3308). Here, the device information is information that represents the device type, the model number, the capability information, and so forth of the device 200. The device management section 105 of the home controller 100 generates the device list 3100 (see FIG. 35) on the basis of the device information.

Figure 38:
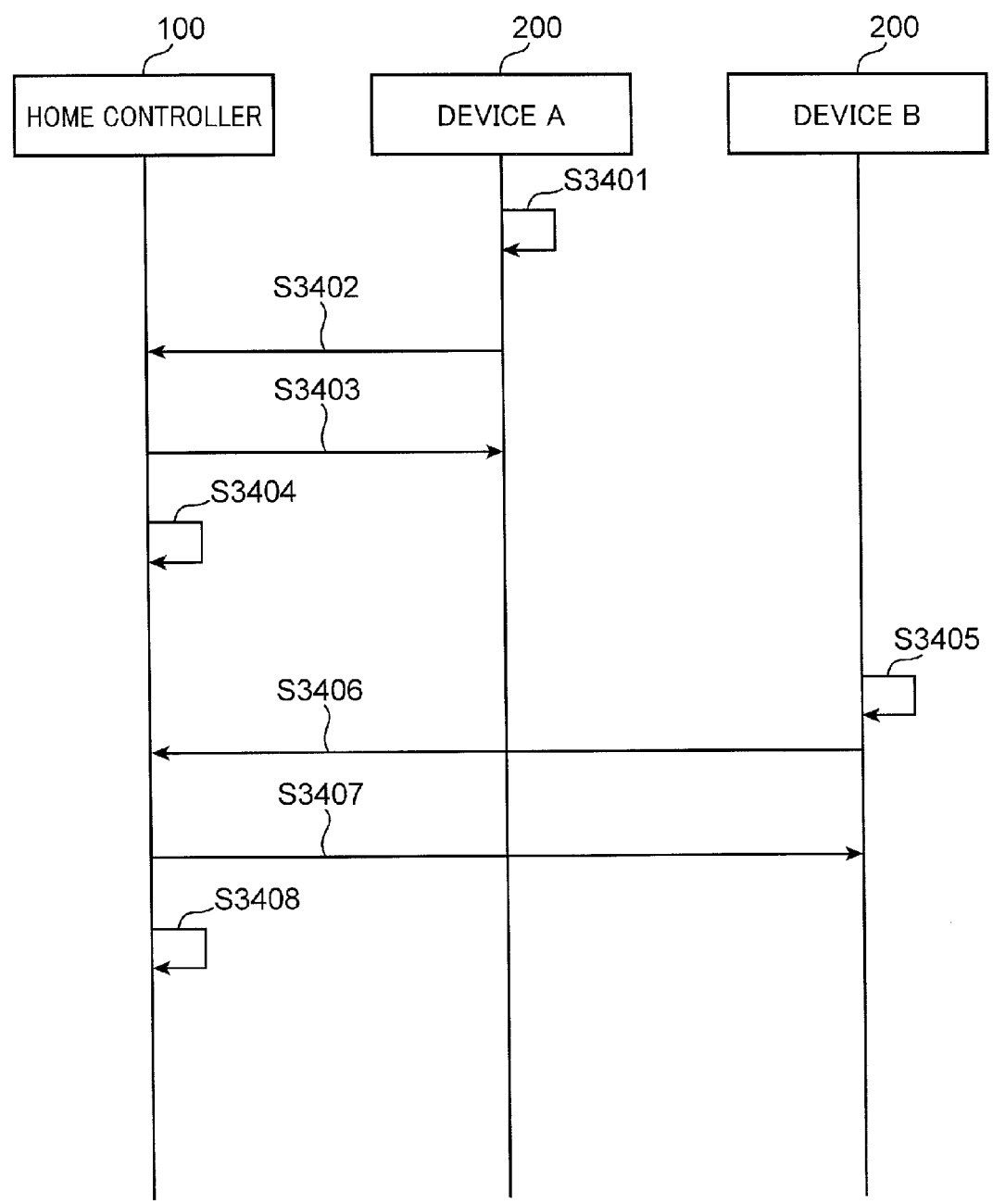
FIG. 38 is a sequence diagram showing the flow of a process for the home controller to detect a device on a network when the device is connected to the network according to the present disclosure.

Next, the flow of a process for the home controller 100 to detect the device 200 on the network when the device 200 is connected to the network will be described using FIG. 38. When the device A 200 is connected to the network when the device A 200 is initially utilized or turned on (S3401), a network connection notification is broadcast to all the home controllers 100 on the network (S3402). In the home controller 100 which receives the network connection notification, the device management section 105 acquires device information from the device A 200 (S3403), and the display control section 103 updates the display screen (S3404). When the device B 200 is connected to the network, the same process as for the device A 200 is performed (S3405 to S3408).

Here, the update of the display screen of the home controller 100 in FIGS. 37 and 38 (S3305, S3308, S3404, and S3408) will be described. The home controller 100 hides the device icon 501 corresponding to the device 200 until the device search response or the network connection notification is received from the device 200, that is, until the device 200 is detected on the network. Then, the home controller 100 which receives the device search response displays the device icon 501 for the corresponding device 200 on the screen. Alternatively, the home controller 100 displays the device icon 501 for the undetected device 200 in a faint color (for example, translucently) compared to the device icon 501 for the detected device 200. Then, the home controller 100 which receives the device search response changes the color of the device icon 501 for the undetected device 200 to the same color as the color of the device icon 501 for the detected device 200.

Figure 39A:
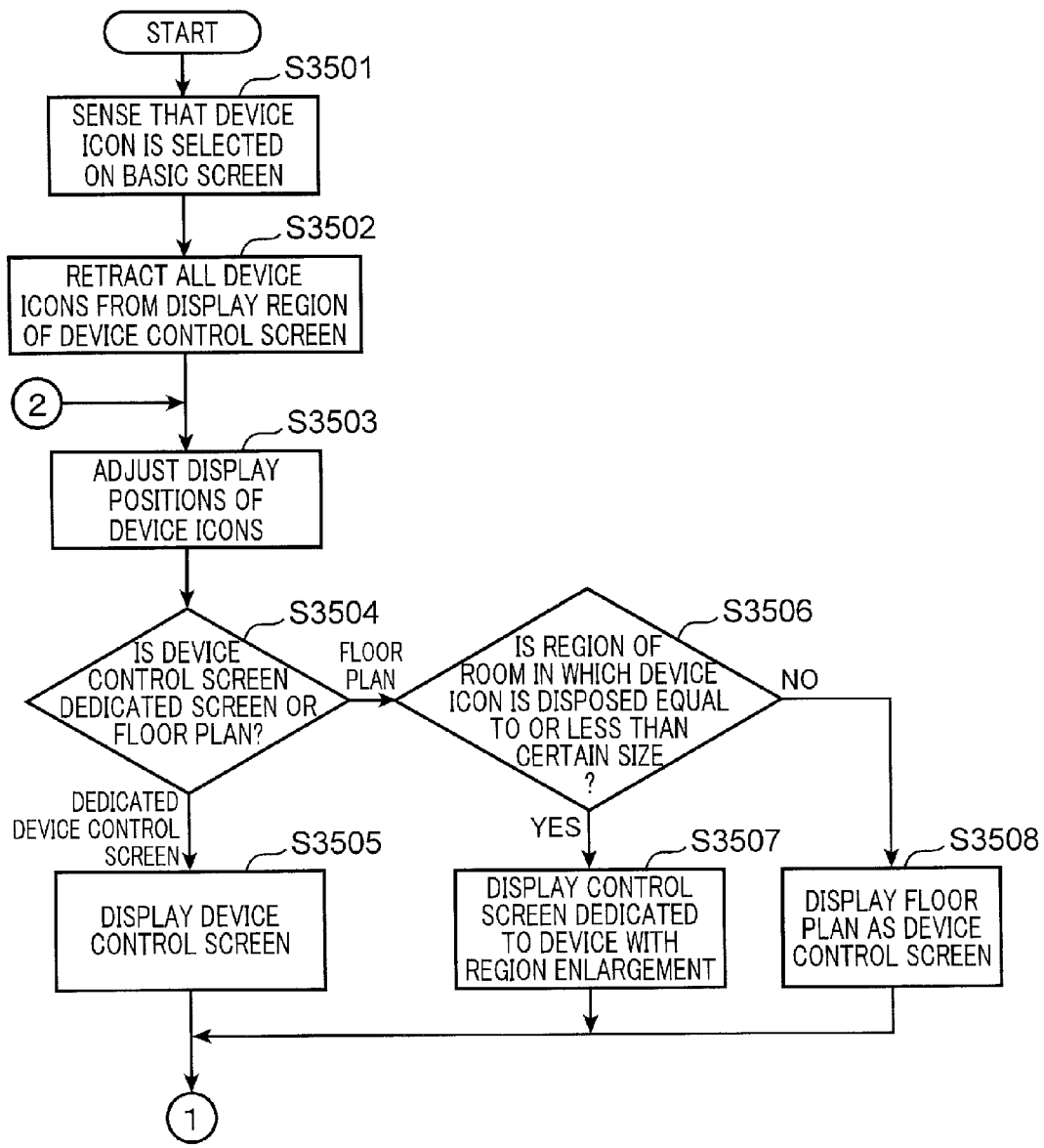
FIG. 39A is a flowchart showing the flow of a process for the home controller to control a device according to the present disclosure.
Figure 39B:
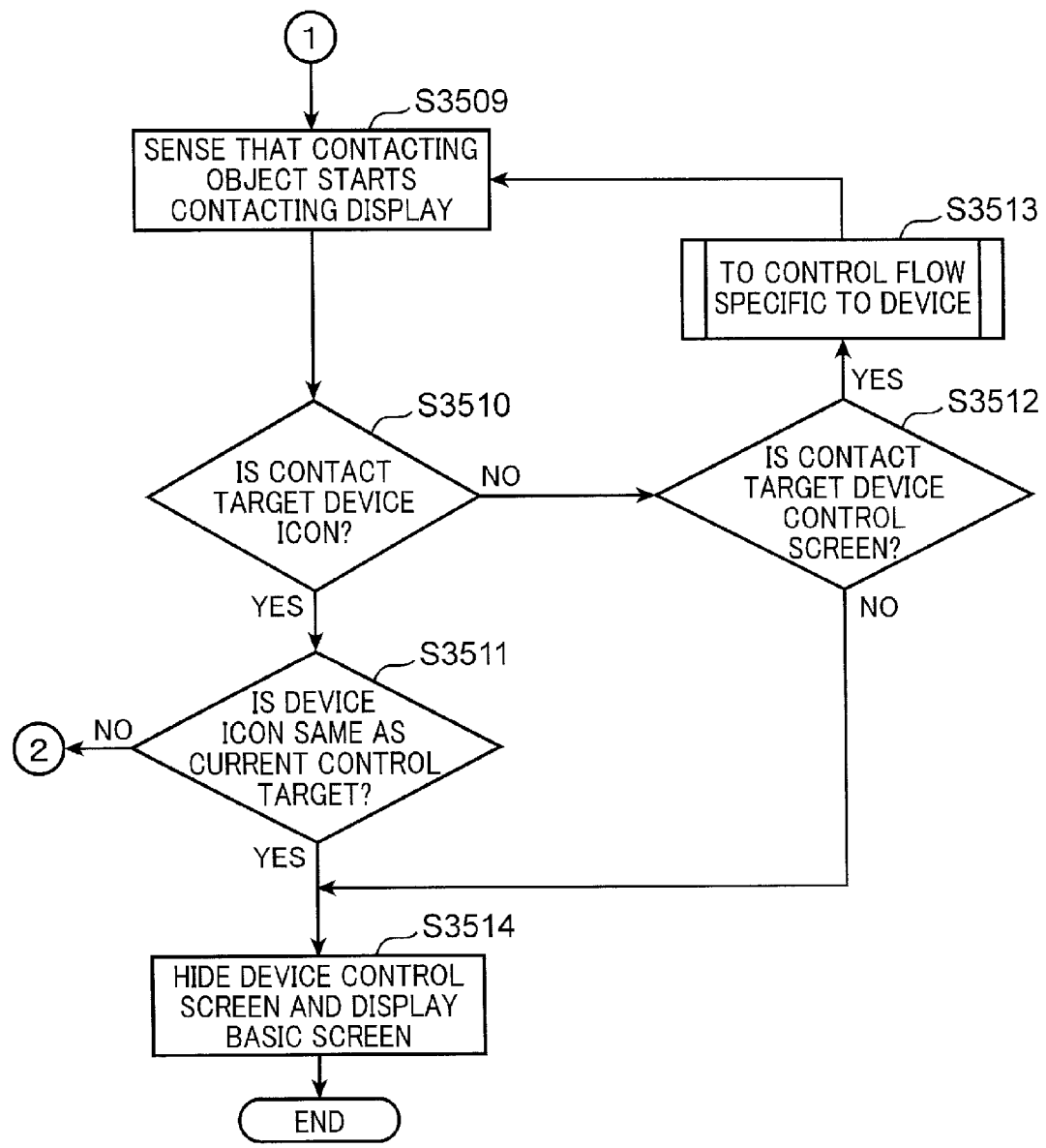
FIG. 39B is a flowchart showing the flow of a process for the home controller to control a device according to the present disclosure.

FIGS. 39A and 39B are each a flowchart showing the flow of a process for the home controller 100 to control the device 200 according to the present disclosure.

First, the touch panel control section 102 senses that the device icon 501 representing a certain device 200 is selected by the user on the basic screen (S3501). Next, the display control section 103 retracts all the device icons 501 out of the display region of the device control screen 502 (S3502). In this case, the device icons 501 are retracted as shown in FIGS. 11 and 13.

Next, the display control section 103 adjusts the display positions of the retracted device icons 501 (S3503). For example, the selected device icons 501 are adjusted so as to be displayed at particular positions as shown in FIGS. 12 and 14.

Next, the display control section 103 judges whether the device control screen 502 corresponding to the device icon 501 selected by the user is a dedicated screen or a floor plan (S3504).

Here, the device control screen 502 which is a dedicated screen refers to the device control screen 502 prepared separately from the floor plan and displayed as overlapped on the floor plan as shown in FIG. 13. On the other hand, the device control screen 502 which is a floor plan refers to the device control screen 502 which is the floor plan itself.

For example, if the illumination device can be turned on and off or adjusted for the brightness by the user by directly tapping on the region of a room on the floor plan in which the illumination device is disposed, the illumination device can be operated with presence. In the case where the user attempts to operate a plurality of illumination devices installed in the living room at the same time, meanwhile, the entire screen is covered by the device control screens 502 dedicated to the illumination devices if the device control screens 502 dedicated to the individual illumination devices are displayed on the floor plan at the same time, which lowers the viewability.

Thus, in the following description, it is assumed that the device control screen 502 for the illumination device is a floor plan. Specifically, when the user selects the device icon 501 for the illumination device installed in a certain room in the basic screen, all the device icons 501 are retracted out of the display region of the floor plan, and the floor plan becomes ready to receive an operation for the illumination device in the room. Then, when the user taps on the region of the room on the floor plan in which the selected illumination device is installed, one or more illumination devices within the room can be operated at the same time.

For example, when the user taps on the region of a room with the illumination devices in the room turned off, one or more illumination devices in the room are turned on at the same time. Next, when the user taps on the region, the one or more illumination devices are turned off at the same time.

In the case where the device control screen 502 is a floor plan in S3504, and if the region of the room in which the device icon 501 is disposed is equal to or less than a certain size (YES in S3506), the display control section 103 causes the device control screen 502 dedicated to the device in which the region of the room is displayed as enlarged to be displayed as overlapped on the floor plan (S3507). Here, for example, a floor plan formed by clipping the floor plan of the relevant room from the floor plan for the entire floor and enlarging the clipped floor plan is displayed as overlapped on the floor plan for the entire floor.

If the region of the room in which the device icon 501 is disposed is not equal to or less than the certain size (NO in S3506), on the other hand, the display control section 103 displays the floor plan as the device control screen 502 (S3508).

Information as to whether a dedicated screen or a floor plan is adopted as the device control screen 502 for each device 200 is stored in advance in the storage section 104. Thus, the display control section 103 may reference the information to determine whether the device control screen 502 is a dedicated screen or a floor plan.

In addition, the display control section 103 may calculate the size of the relevant room by specifying the vertexes of the relevant room from the room information 2900, specifying the coordinates of the specified vertexes from the vertex information 2800, and calculating the area of a region surrounded by the specified coordinates of the vertexes. Then, the result of determination in S3506 may be NO if the size of the room is not equal to or less than the certain size determined in advance, and the result of determination in S3506 may be YES if the size of the room is equal to or less than the certain size.

In the case where the device control screen 502 is a dedicated screen in S3504, on the other hand, the display control section 103 displays the dedicated screen as overlapped on the floor plan (S3505).

In S3509, the touch panel control section 102 senses that a contacting object (here, a finger of the user) starts contacting the display 101.

Next, the touch panel control section 102 determines whether or not the contact target is the device icon 501 (S3510).

If it is determined that the device icon 501 is contacted (YES in S3510), the touch panel control section 102 determines whether or not the contacting object contacts the same device icon 501 as the device icon 501 selected in S3501 (S3511). In the case where it is determined that the contacting object contacts the same device icon 501 as the device icon 501 selected in S3501 (YES in S3511), the display control section 103 hides the device control screen 502 being displayed to display the basic screen (S3514).

In the case where the touch panel control section 102 determines that the device icon 501 is not contacted (NO in S3510), the touch panel control section 102 further determines whether or not the contact target is the device control screen 502 (S3512). In the case where it is determined that the contact target is not the device control screen 502 (NO in S3512), the display control section 103 hides the device control screen 502 being displayed, and the basic screen is displayed (S3514).

If the touch panel control section 102 determines that the contacting object contacts a button or the like within the device control screen 502 (YES in S3512), on the other hand, the process is advanced to S3513, where a control flow that is specific to the device is executed (S3513).

Figure 40:
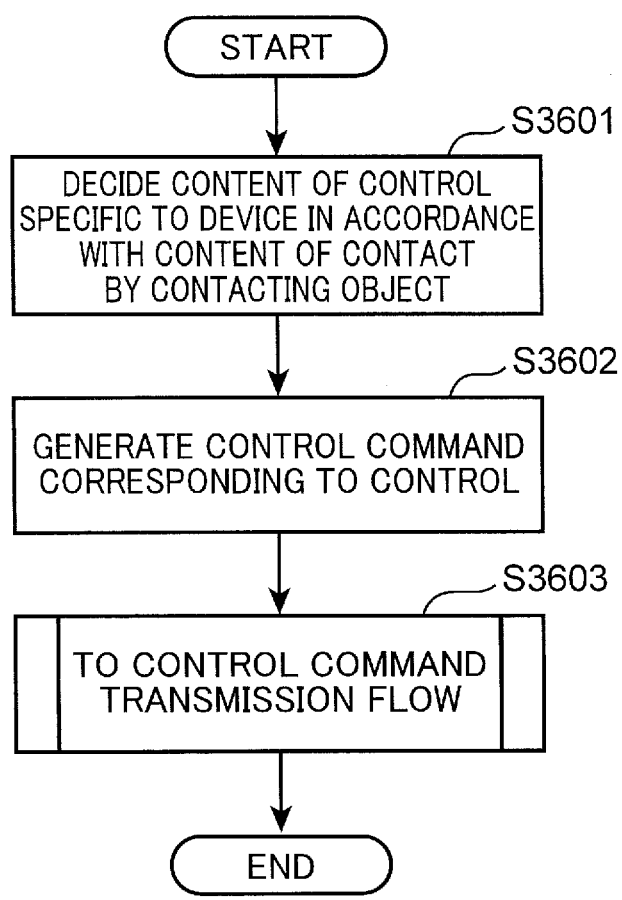
FIG. 40 is a flowchart showing the flow of a process for the home controller to generate a control command for a device in accordance with the content of a contact by a contacting object according to the present disclosure.

Next, the control flow that is specific to the device executed in S3513 will be described in detail using FIG. 40. First, the device control section 106 decides the content of control that is specific to the device in accordance with the content of a contact by the contacting object (S3601). Next, the device control section 106 generates a control command according to the content of control (S3602). It is assumed that the user taps on the button for raising the temperature with the device control screen 502 for the air conditioner displayed as shown in FIG. 11 and the touch panel control section 102 senses the tap. Then, the device control section 106 generates a control command for raising the temperature of the air conditioner. Next, the device control section 106 advances the process to S3603, where a control command transmission flow is executed.

Next, the control command transmission flow executed in S3603 will be described in detail using FIG. 41. First, the device control section 106 determines whether or not the home controller 100 is connected to the home network (S3701). If the home controller 100 is connected to the home controller (YES in S3701), the device control section 106 checks the transmission destination of a control command in accordance with the content of the control command transmission destination 3106 of the device list 3100 (S3702). Here, the home network is a network provided within the home of the user. Thus, the result of determination in S3701 is NO if the user operates the home controller 100 from a location away from the home, and the result of determination in S3701 is YES if the user operates the home controller 100 from a location within the home.

If the transmission destination of a control command is "DEVICE" in S3702, the device control section 106 transmits a control command to the relevant device 200 (S3703). If the transmission destination of a control command is "SERVER" in S3702, on the other hand, the device control section 106 transmits a control command to the server 300 (S3704).

For example, in the device list 3100, the control command transmission destination 3106 of the air conditioner is "DEVICE", and therefore the device control section 106 transmits a control command to the air conditioner. On the other hand, in the device list 3100, the control command transmission destination 3106 of the refrigerator is "SERVER", and therefore the device control section 106 transmits a control command to the server 300.

Meanwhile, in the case where it is judged in S3701 that the home controller 100 is not connected to the home network (NO in S3701), the process in S3704 is performed.

In S3705, the device control section 106 receives the control result from the device 200. Next, in the case where transmission of a control command to all the devices 200 that are operated at the same time is completed (YES in S3706), the device control section 106 advances the process to S3707. In the case where transmission of a control command to all the devices 200 that are operated at the same time is not completed (NO in S3706), on the other hand, the device control section 106 returns the process to S3702, and repeats the processes in and after S3702.

For example, in the case where two illumination devices are installed in the same room and the two illumination devices are set in advance to be operated at the same time, the device control section 106 transmits a control command to each of the two illumination devices. The result of determination in S3706 is NO for devices 200 that are not operated at the same time as other devices 200.

Next, the display control section 103 updates the screen displayed on the display 101 (S3707). For example, if the set temperature of the air conditioner is changed, the device control screen 502 is updated such that the temperature display is flashed on and off, for example, until the set temperature of the air conditioner is changed by a control command and the temperature display stops flashing when the set temperature of the air conditioner is changed by a control command. In the example of the illumination device, the screen is updated such that the region on the floor plan of a room in which the illumination device is installed becomes brighter than other regions in the case where the illumination device is turned on.

Figure 42:
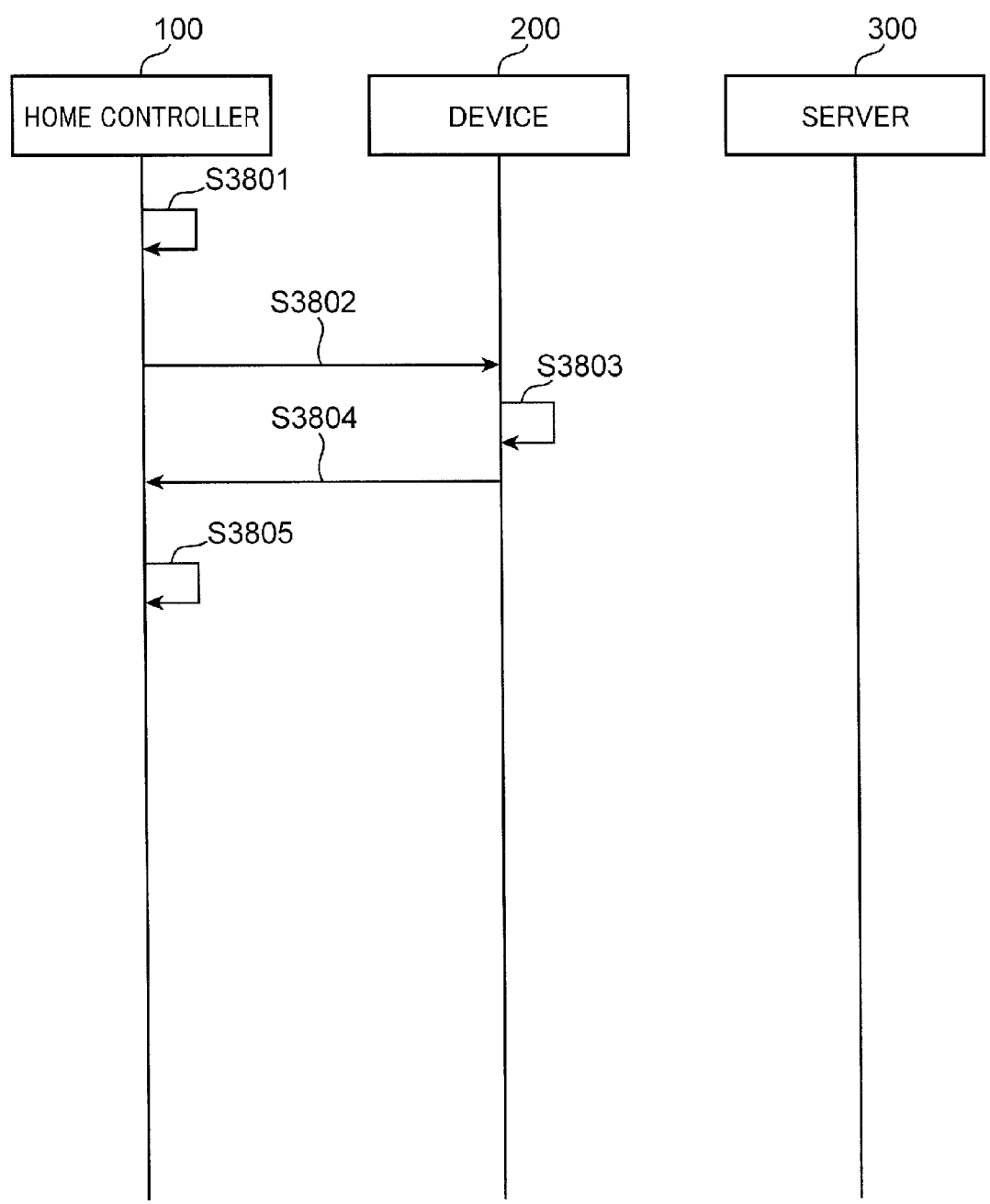
FIG. 42 is a sequence diagram showing the flow of a process for the home controller to directly control a device according to the present disclosure.

Next, the flow of a process for the home controller 100 to directly control the device 200 will be described using FIG. 42. First, the touch panel control section 102 of the home controller 100 senses a user operation on the device control screen 502 (S3801). Next, the device control section 106 of the home controller 100 generates a control command according to the user operation, and transmits the control command to the device 200 (S3802).

The device 200 which receives the control command executes the control command (S3803), and transmits the control result to the home controller 100 (S3804). The display control section 103 of the home controller 100 which receives the control result updates the display screen in accordance with the control result (S3805).

Figure 43:
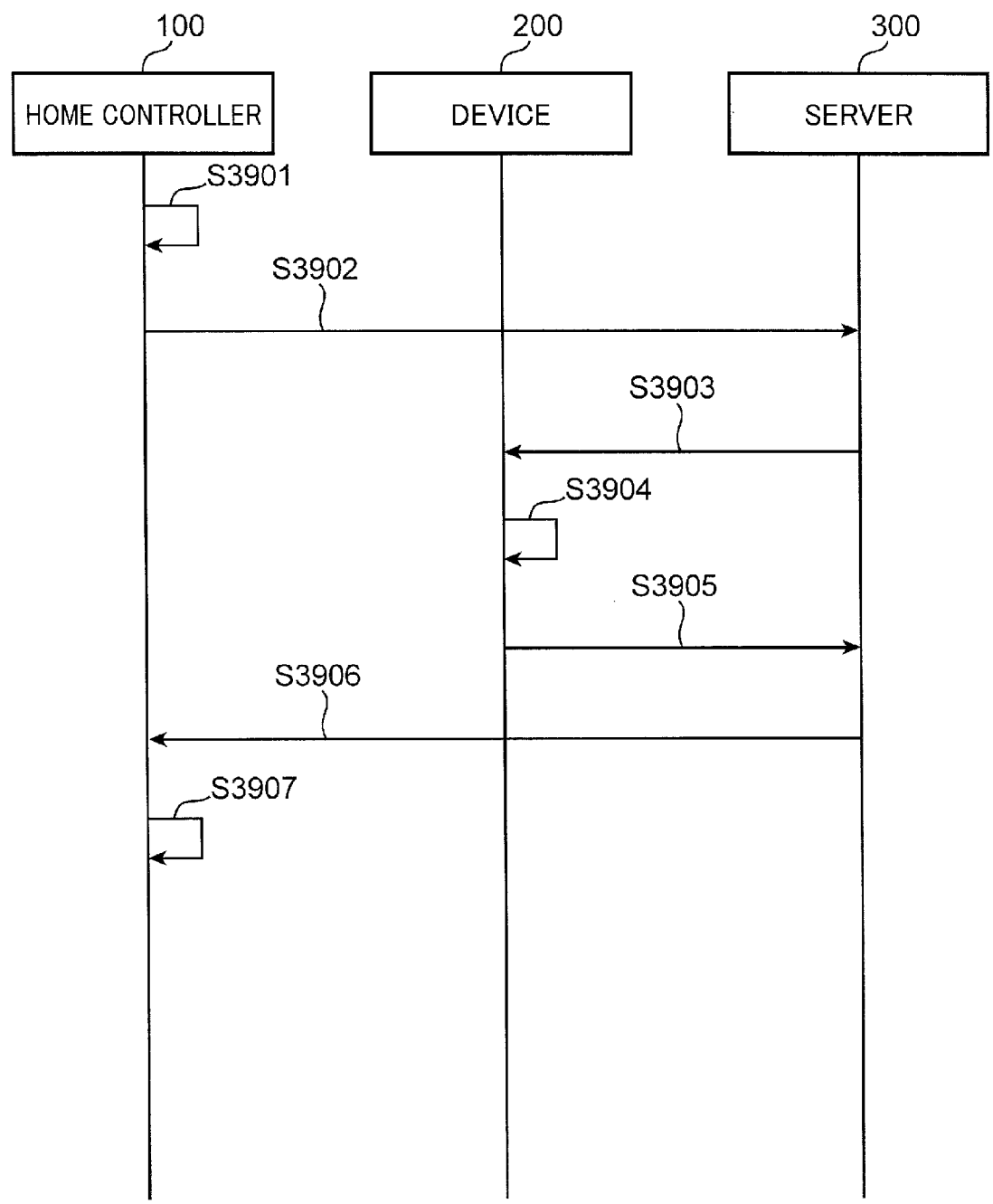
FIG. 43 is a sequence diagram showing the flow of a process for the home controller to control a device by way of the server according to the present disclosure.

Next, the flow of a process for the home controller 100 to control the device 200 by way of the server 300 will be described using FIG. 43. First, the touch panel control section 102 of the home controller 100 senses a user operation on the device control screen 502 (S3901). Next, the device control section 106 of the home controller 100 generates a control command according to the user operation, and transmits the control command to the server 300 (S3902).

The server 300 which receives the control command transmits the relevant control command to the device 200 (S3903). The device 200 which receives the control command executes the control command (S3904), and transmits the control result to the server 300 (S3905). The server 300 which receives the control result transmits the control result to the home controller 100 (S3906). The display control section 103 of the home controller 100 which receives the control result updates the display screen in accordance with the control result (S3907).

Figure 44:
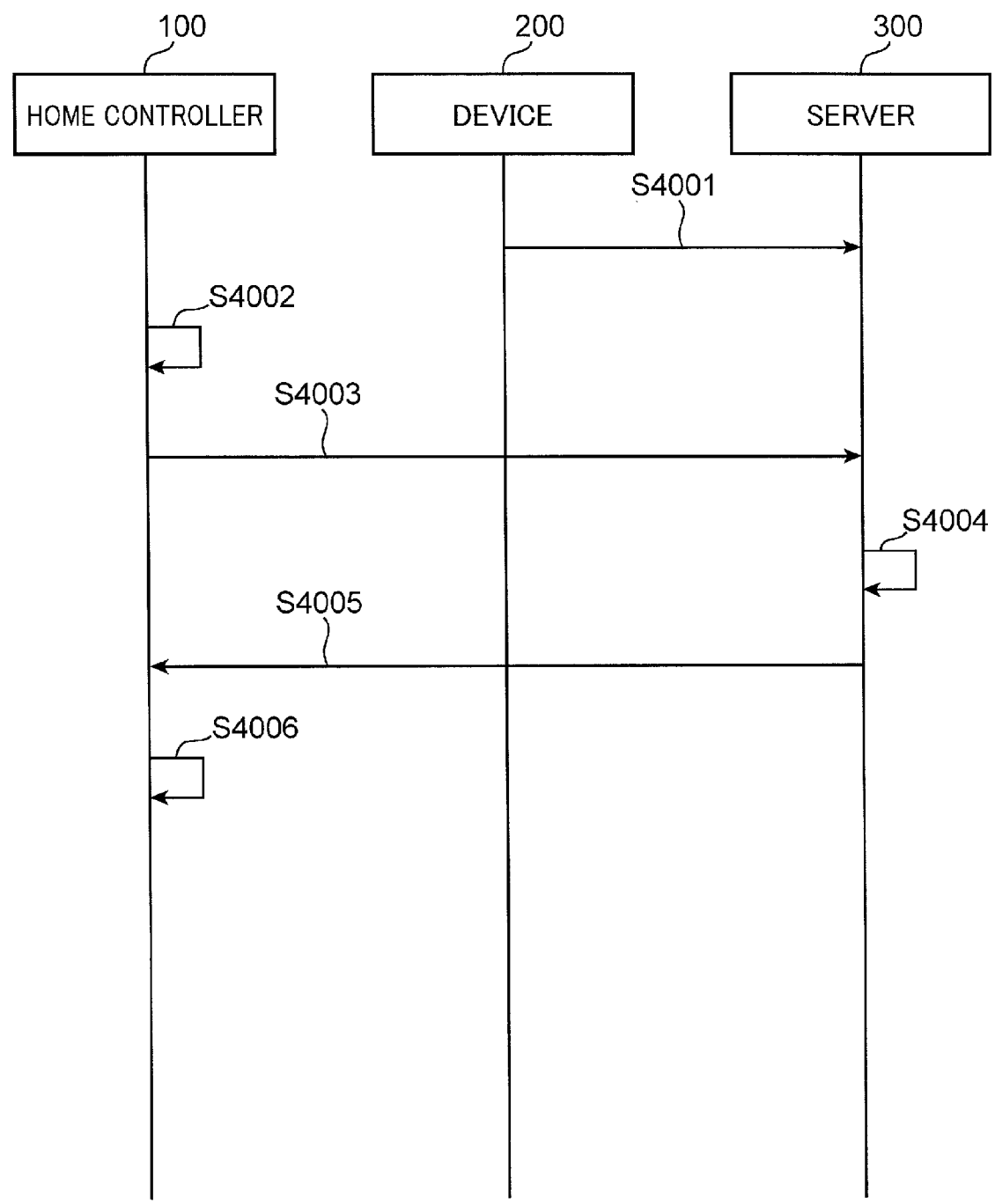
FIG. 44 is a sequence diagram showing the flow of a process for the home controller to acquire the state of a device from the server according to the present disclosure.

Next, the flow of a process for the home controller 100 to confirm the device state of the device 200 by way of the server 300 will be described using FIG. 44. First, the device 200 transmits the current device state to the server 300 (S4001). Here, the device 200 transmits the device state to the server 300 when the device 200 is turned on, when the device 200 is turned off, when the device state is changed, or regularly to cause the server 300 to store the device state. The process in S4001 may be executed asynchronously with the processes in S4002 to S4006.

Next, the touch panel control section 102 of the home controller 100 senses a user operation on the device control screen 502 (S4002). Next, the device control section 106 of the home controller 100 generates a control command according to the user operation, and transmits the control command to the server 300 (S4003). Here, a control command for confirming the device state of the device 200 is generated.

The server 300 which receives the control command searches for the current device state of the relevant device 200 (S4004), and transmits the device state of the relevant device 200 to the home controller 100 as the control result (S4005). The display control section 103 of the home controller 100 which receives the control result updates the display screen in accordance with the control result (S4006). For example, if the device control screen 502 for the device 200 is displayed on the display 101, the content of the device control screen 502 for the device 200 is updated in accordance with the control result.

Figure 45:
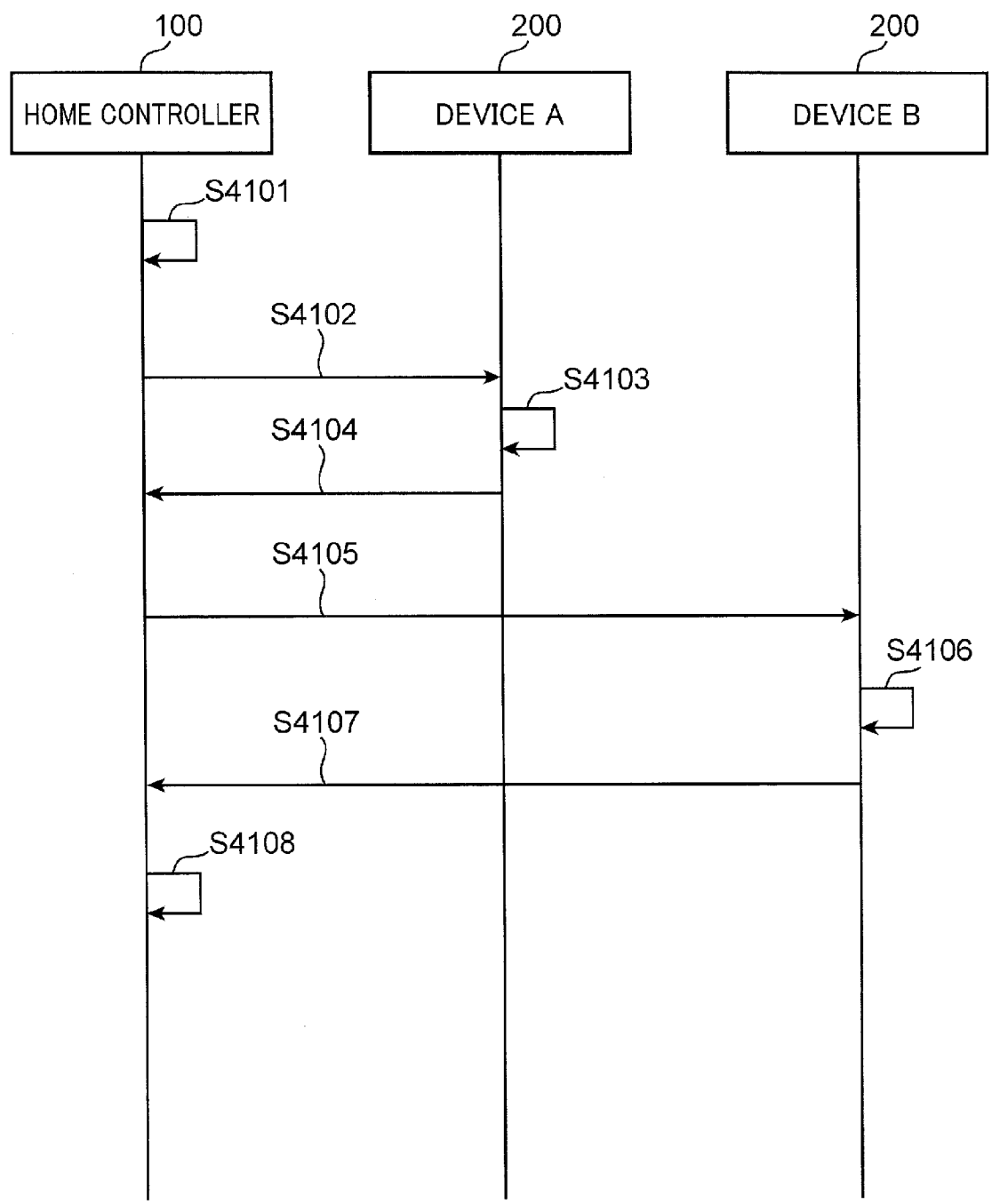
FIG. 45 is a sequence diagram showing the flow of a process for the home controller to directly control devices in the case where the home controller controls a plurality of devices with one operation according to the present disclosure.

Next, the flow of a process for the home controller 100 to directly control the devices 200 in the case where the home controller 100 controls a plurality of devices 200 with one operation will be described using FIG. 45. Here, a case where the home controller 100 controls the device A 200 and the device B 200 is described as an example.

First, the touch panel control section 102 of the home controller 100 senses a user operation on the device control screen 502 (S4101). Next, the device control section 106 of the home controller 100 generates a control command according to the user operation, and transmits the control command to the device A 200 (S4102).

The device A 200 which receives the control command executes the control command (S4103), and transmits the control result to the home controller 100 (S4104).

Next, the device control section 106 of the home controller 100 transmits to the device B 200 a control command that is the same as the control command transmitted to the device A 200 (S4105). The device B 200 which receives the control command executes the control command (S4106), and transmits the control result to the home controller 100 (S4107).

The display control section 103 of the home controller 100 which receives the control result updates the display screen in accordance with the control result (S4108). In this case, for example, if the device control screens 502 for the devices A 200 and B 200 are displayed on the display 101, the content of the device control screens 502 for the devices A 200 and B 200 is updated in accordance with the control result.

Figure 46:
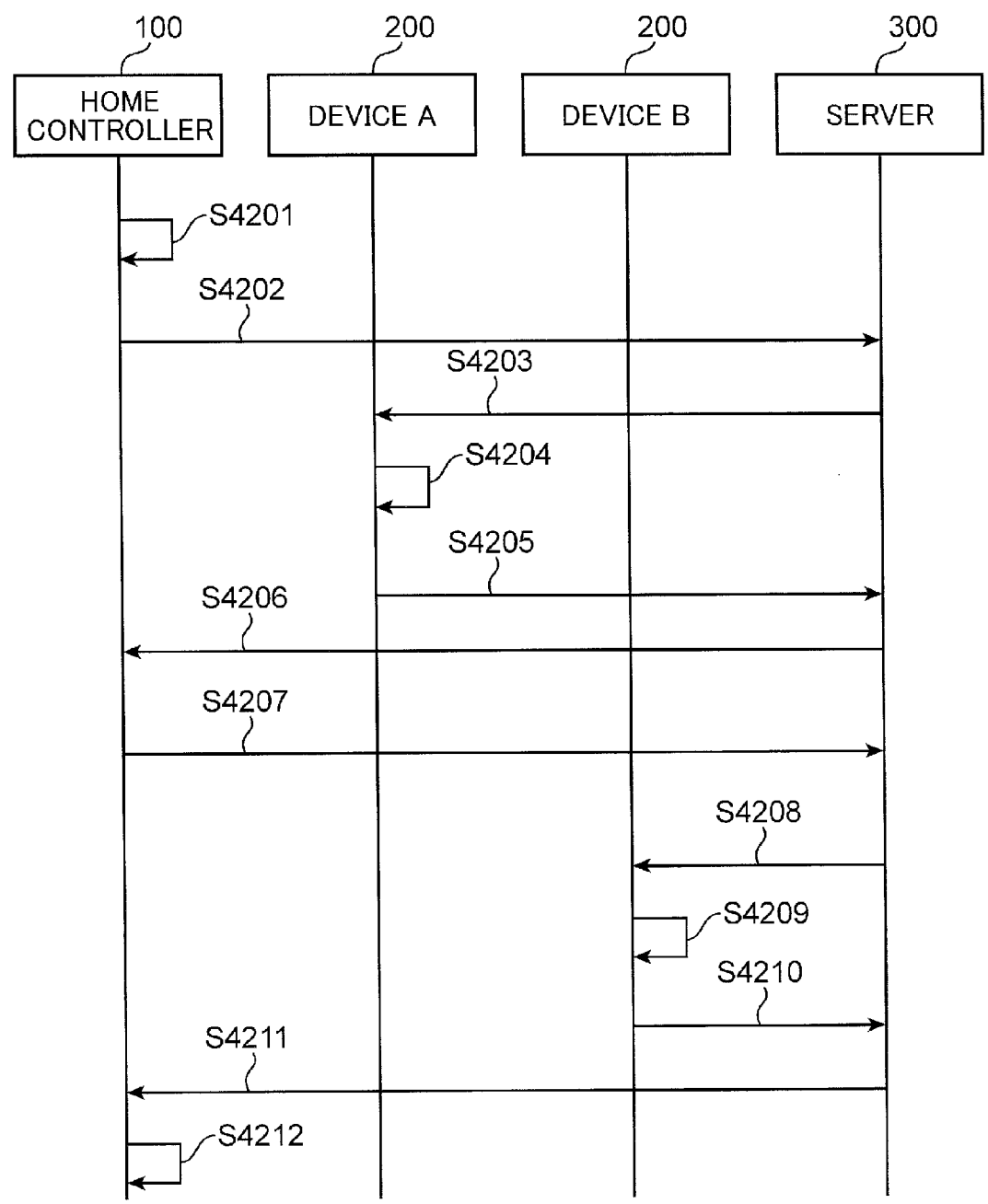
FIG. 46 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 46. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4201).

Next, the device control section 106 of the home controller 100 generates a control command for the device A 200 according to the user operation, and transmits the control command to the server 300 (S4202).

The server 300 which receives the control command for the device A 200 transmits the control command to the device A 200 (S4203). The device A 200 which receives the control command executes the control command (S4204), and transmits the control result to the server 300 (S4205). The server 300 which receives the control result transmits the control result to the home controller 100 (S4206).

Similarly, the device control section 106 of the home controller 100 generates a control command for the device B 200 according to the user operation, and transmits the control command to the server 300 (S4207).

The server 300 which receives the control command transmits the control command to the device B 200 (S4208). The device B 200 which receives the control command executes the control command (S4209), and transmits the control result to the server 300 (S4210). The server 300 which receives the control result transmits the control result to the home controller 100 (S4211).

Then, the display control section 103 of the home controller 100 updates the display screen in accordance with the control result (S4212).

Figure 47:
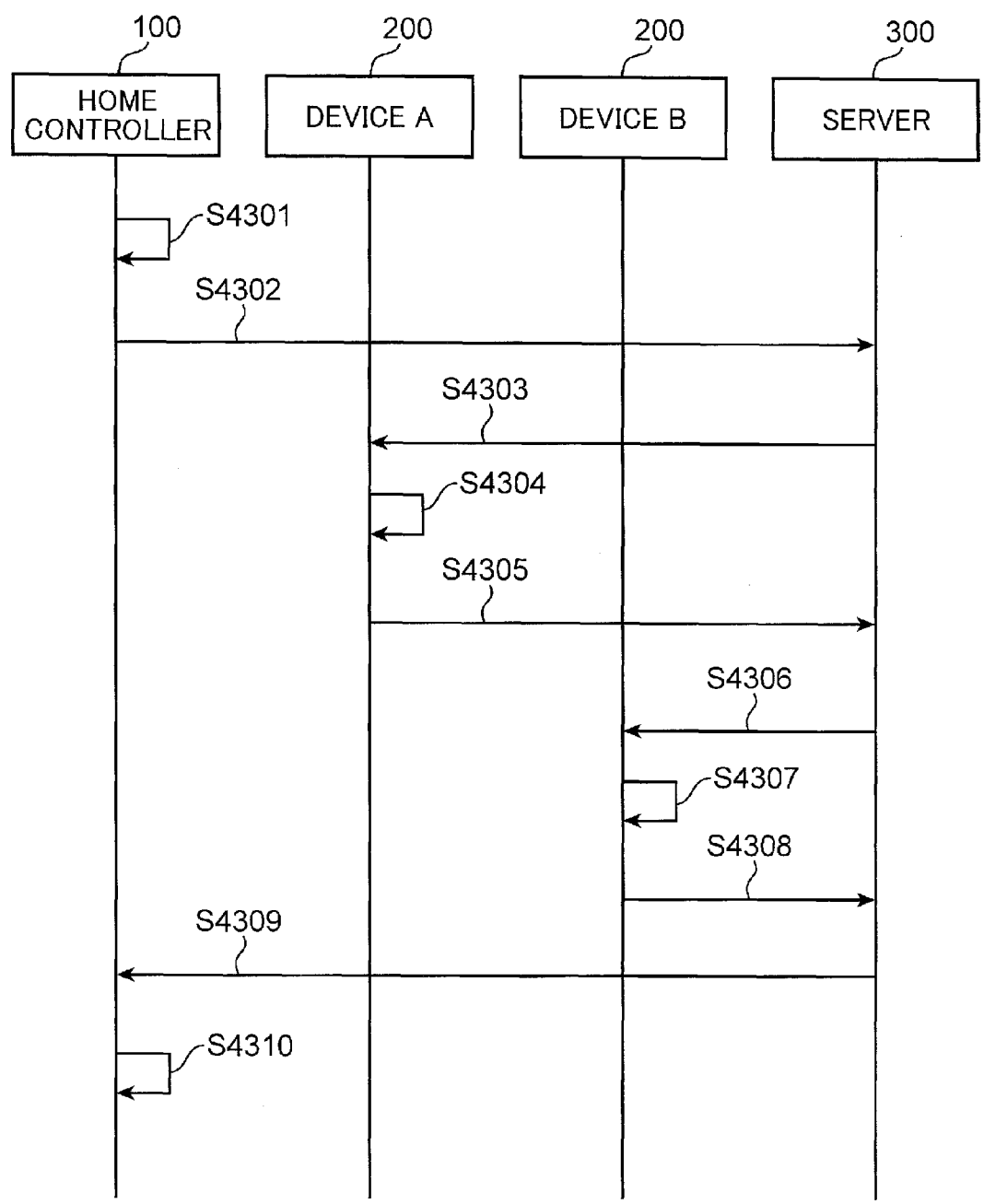
FIG. 47 is a sequence diagram showing the flow of a process for the home controller to control devices by way of the server in the case where the home controller controls a plurality of devices with one operation according to the present disclosure.

Next, the flow of a process for the home controller 100 to control the devices 200 by way of the server 300 in the case where the home controller 100 controls a plurality of devices 200 with one operation will be described using FIG. 47. Here, a case where the home controller 100 controls the device A 200 and the device B 200 is described as an example. In addition, it is assumed that the devices A 200 and B 200 are represented by one device icon 501, and controlled using one device control screen 502.

First, the touch panel control section 102 of the home controller 100 senses a user operation on the device control screen 502 (S4301).

Next, the device control section 106 of the home controller 100 generates a control command for the device A 200 and the device B 200 in accordance with the user operation, and transmits the control command to the server 300 (S4302).

The server 300 which receives the control command transmits the control command to the device A 200 (S4303). The device A 200 which receives the control command executes the control command (S4304), and transmits the control result to the server 300 (S4305).

Similarly, the server 300 transmits the control command to the device B 200 (S4306). The device B 200 which receives the control command executes the control command (S4307), and transmits the control result to the server 300 (S4308). The server 300 which receives the control result for the device A 200 and the device B 200 transmits the control result to the home controller 100 (S4309).

Then, the display control section 103 of the home controller 100 updates the display screen in accordance with the control result (S4310).

Figure 48:
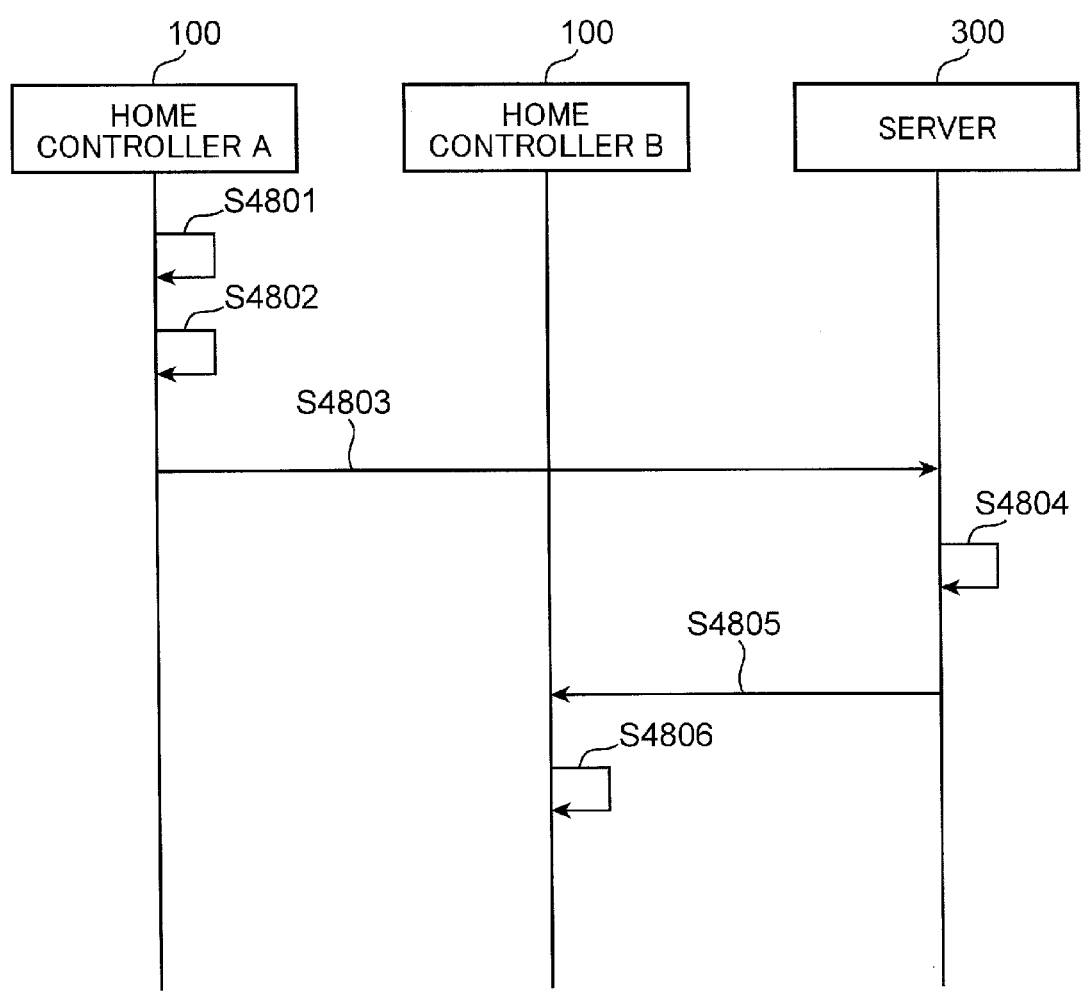
FIG. 48 is a sequence diagram showing the flow of a process for a case where a device icon is moved in the home controller according to the present disclosure.

Next, the flow of a process for a case where the device icon 501 is moved in the home controller 100 will be described using FIG. 48. Here, it is assumed that the user owns two home controllers A 100 and B 100.

When the touch panel control section 102 of the home controller A 100 senses movement of the device icon 501 (S4801), the display control section 103 updates the display screen (S4802). Here, the display control section 103 displays the device icon 501 moved in accordance with the amount of a drag performed on the device icon 501 by the user.

The device management section 105 of the home controller A 100 transmits to the server 300 a device list update notification including the coordinate on the floor plan 500 after the drag (S4803). Here, the device management section 105 of the home controller A 100 updates the content of the arrangement 3104 of the relevant device 200 in the device list 3100 managed by the device management section 105 itself with the coordinate after the drag.

The server 300 which receives the device list update notification updates the device list 4700 (S4804). In this case, the home information management section 301 of the server 300 updates the content of the arrangement 4704 of the relevant device 200 in the device list 4700 with the coordinate included in the device list update notification.

Subsequently, the server 300 transmits the device list update notification to the home controller B 100 (S4805). The home controller B 100 which receives the device list update notification updates the display screen (S4806). Here, the device management section 105 of the home controller B 100 updates the content of the arrangement 3104 of the relevant device 200 in the device list 3100 managed by the device management section 105 itself with the coordinate included in the device list update notification.

The device icon 501 is disposed at an appropriate position on the floor plan 500 through the process described above. Because the home controller B 100 is notified of the update of the arrangement position of the device icon 501 performed by the home controller A 100 by way of the server 300, the arrangement position of the device icon 501 after the update is shared among the home controllers A 100 and B 100 and the server 300. Therefore, it is possible to avoid trouble in which the arrangement position of the device icon 501 is different between the home controller A 100 and the home controller B 100.

Figure 49:
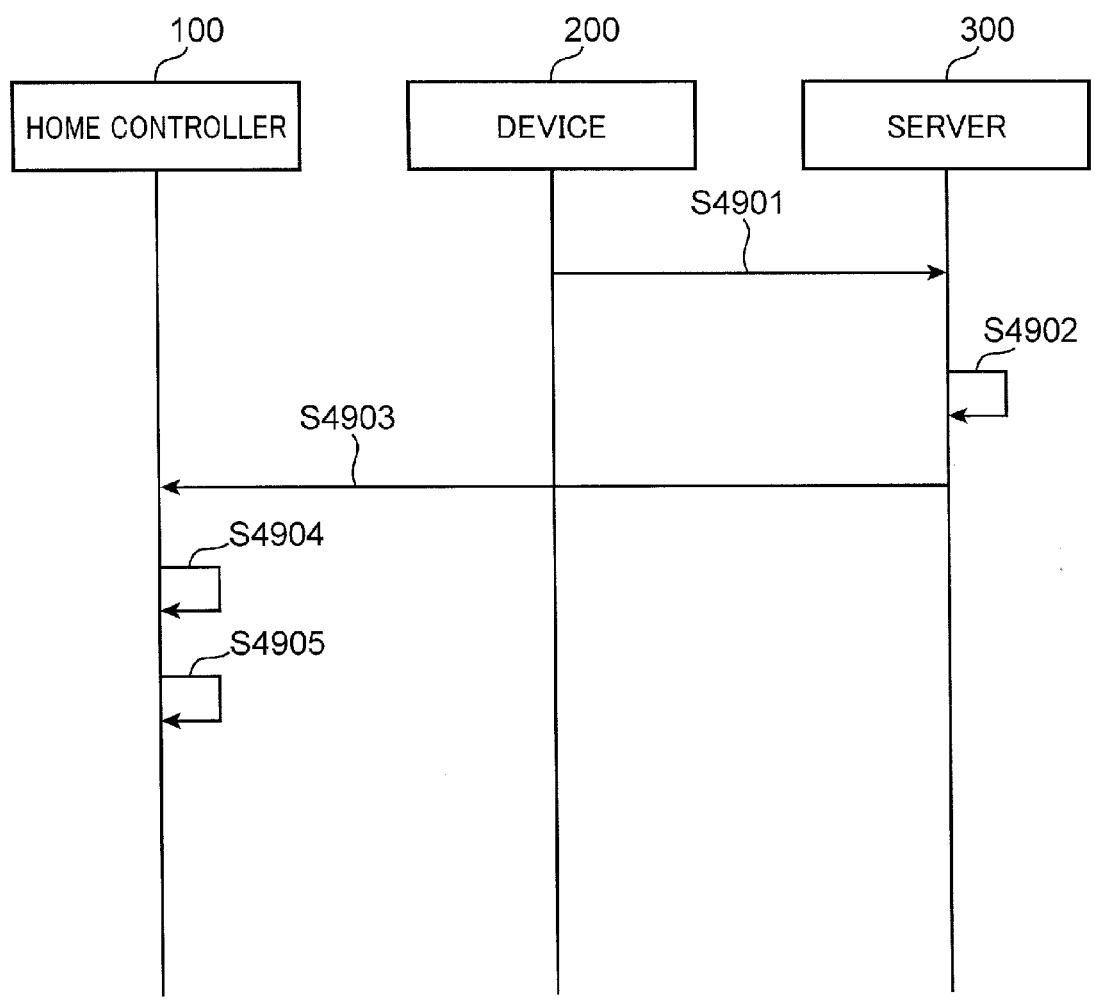
FIG. 49 is a sequence diagram showing the flow of a process for updating the device lists of the home controller and the server according to the present disclosure.

Next, an example of a process for updating the device lists of the home controller 100 and the server 300 will be described using FIG. 49. The device 200 transmits the device state indicating the current state of the device 200 itself to the server 300 (S4901). Here, the device 200 may regularly transmit the device state, or may transmit the device state when the state is varied. The server 300 updates the device list 4700 in accordance with the content of the received device state (S4902). Here, in the case where the device list 4700 does not contain information on the device 200, the server 300 adds information on the device 200 as a new device. Then, the server 300 transmits a device list update notification to the home controller 100 (S4903). The device management section 105 of the home controller 100 updates the device list 3100 in accordance with the content of the received device list update notification (S4904). Here, in the case where the device list 3100 does not contain information on the device 200, the device management section 105 adds information on the device 200 as a new device. Then, the display control section 103 of the home controller 100 updates the display screen (S4905).

Consequently, the server 300 is notified of variation in state of the device 200, which allows the server 300 to monitor variation in state of the device 200. The server 300 to which the device state is transmitted from the device 200 notifies the home controller 100 of variation in state of the device 200, which allows the home controller 100 to recognize the current state of the device 200. In the case where a new device 200 is connected to the home network, the server 300 and the home controller 100 can add the new device. Hence, it is possible to prevent occurrence of deviation between the actual state of the device 200 and the state of the device 200 recognized by the home controller 100.

Figure 50:
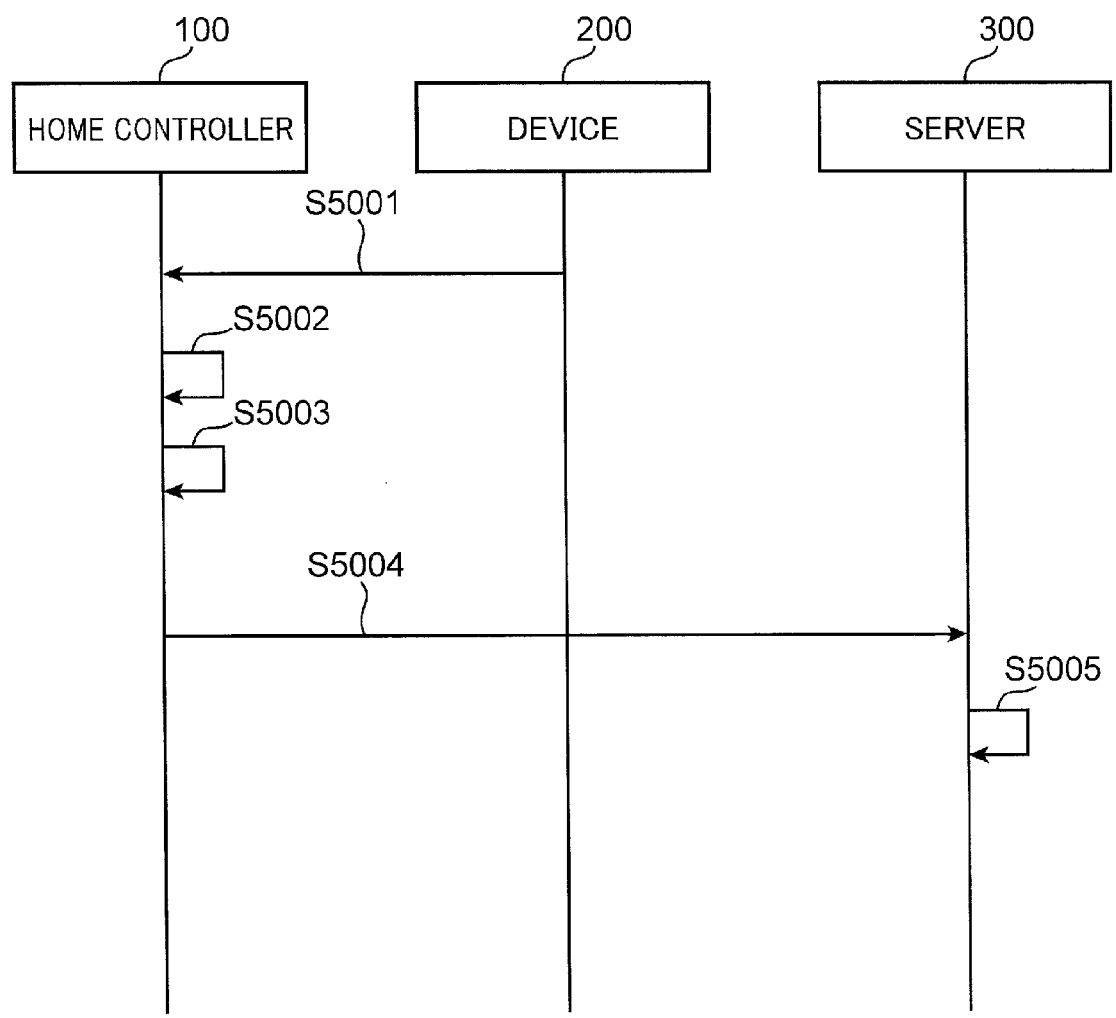
FIG. 50 is a sequence diagram showing the flow of a process for updating the device lists of the home controller and the server according to the present disclosure.

Next, another example of the process for updating the device lists of the home controller 100 and the server 300 will be described using FIG. 50. The device 200 transmits the device state to the home controller 100 (S5001). Here, the device 200 may regularly transmit the device state, or may transmit the device state when the state is varied.

The device management section 105 of the home controller 100 updates the device list 3100 in accordance with the content of the received device state (S5002). Here, in the case where the device list 3100 does not contain information on the device 200, the device management section 105 adds information on the device 200 as a new device. Then, the display control section 103 updates the display screen (S5003). Then, the device management section 105 of the home controller 100 transmits a device list update notification to the server 300 (S5004). The server 300 updates the device list 4700 in accordance with the received device list update notification (S5005). Here, in the case where the device list 4700 does not contain information on the device 200, the server 300 adds information on the device 200 as a new device.

Figure 51:
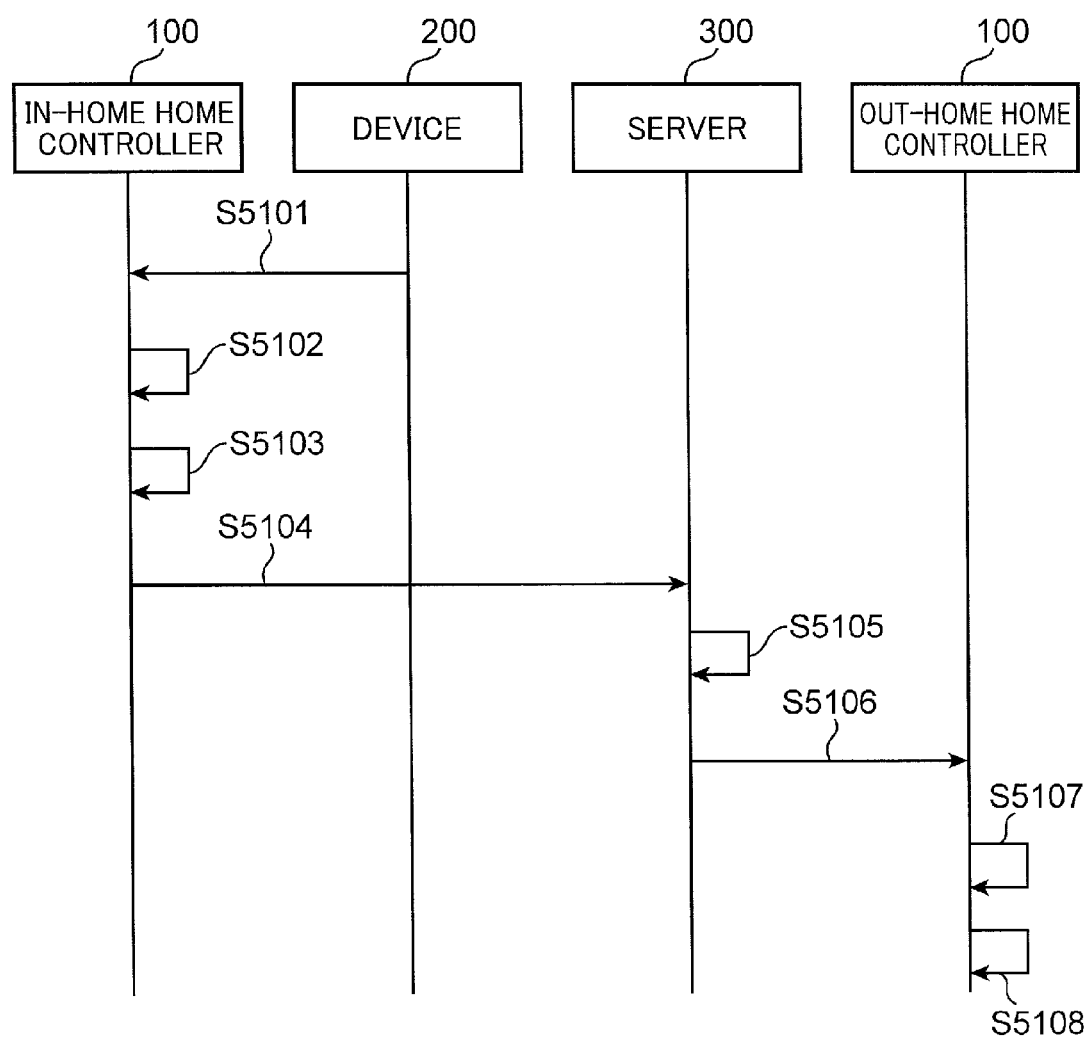
FIG. 51 is a sequence diagram showing the flow of a process for updating the device lists of the home controller and the server according to the present disclosure.

Next, still another example of a process in which the home controller 100 and the server 300 update the device list will be described using FIG. 51. In FIG. 51, a case where the user owns two home controllers 100, namely an in-home home controller 100 and an out-home home controller 100, is described as an example. Here, the out-home home controller 100 is a home controller 100 taken away from the home by the user, and the in-home home controller 100 is a home controller 100 kept at the home by the user.

The device 200 transmits the device state to the in-home home controller 100 (S5101). The in-home home controller 100 updates the device list 3100 in accordance with the content of the received device state (S5102). Here, in the case where the device list 3100 does not contain information on the device 200, the device management section 105 adds information on the device 200 as a new device. Then, the display screen is updated (S5103). Then, the in-home home controller 100 transmits a device list update notification to the server 300 (S5104).

The server 300 updates the device list 4700 in accordance with the content of the received device list update notification (S5105). Here, in the case where the device list 4700 does not contain information on the device 200, the server 300 adds information on the device 200 as a new device. Then, the server 300 transmits a device list update notification to the out-home home controller 100 (S5106). The out-home home controller 100 updates the device list 3100 in accordance with the content of the received device list update notification (S5107). Here, in the case where the device list 3100 does not contain information on the device 200, the device management section 105 of the out-home home controller 100 adds information on the device 200 as a new device. Then, the display screen is updated (S5108).

According to the example, even in the case where one home controller 100 is located away from the home and the other home controller 100 is located in the home, it is possible to prevent occurrence of deviation between the states of the device 200 recognized by the two home controllers 100.

The sequences and the process flows described above are merely exemplary, and the order of the steps may be changed and some of the steps may be omitted as long as the intended process may be embodied. For example, a control command may be transmitted to the device A 200 and the device B 200 asynchronously.

In the foregoing description, a plan view that planarly represents the position and the shape of rooms forming each floor is adopted as the floor plan 500. However, the present disclosure is not limited thereto, and a diagram that schematically shows how many rooms of what type are located on each floor may be adopted as the floor plan.

Figure 52:
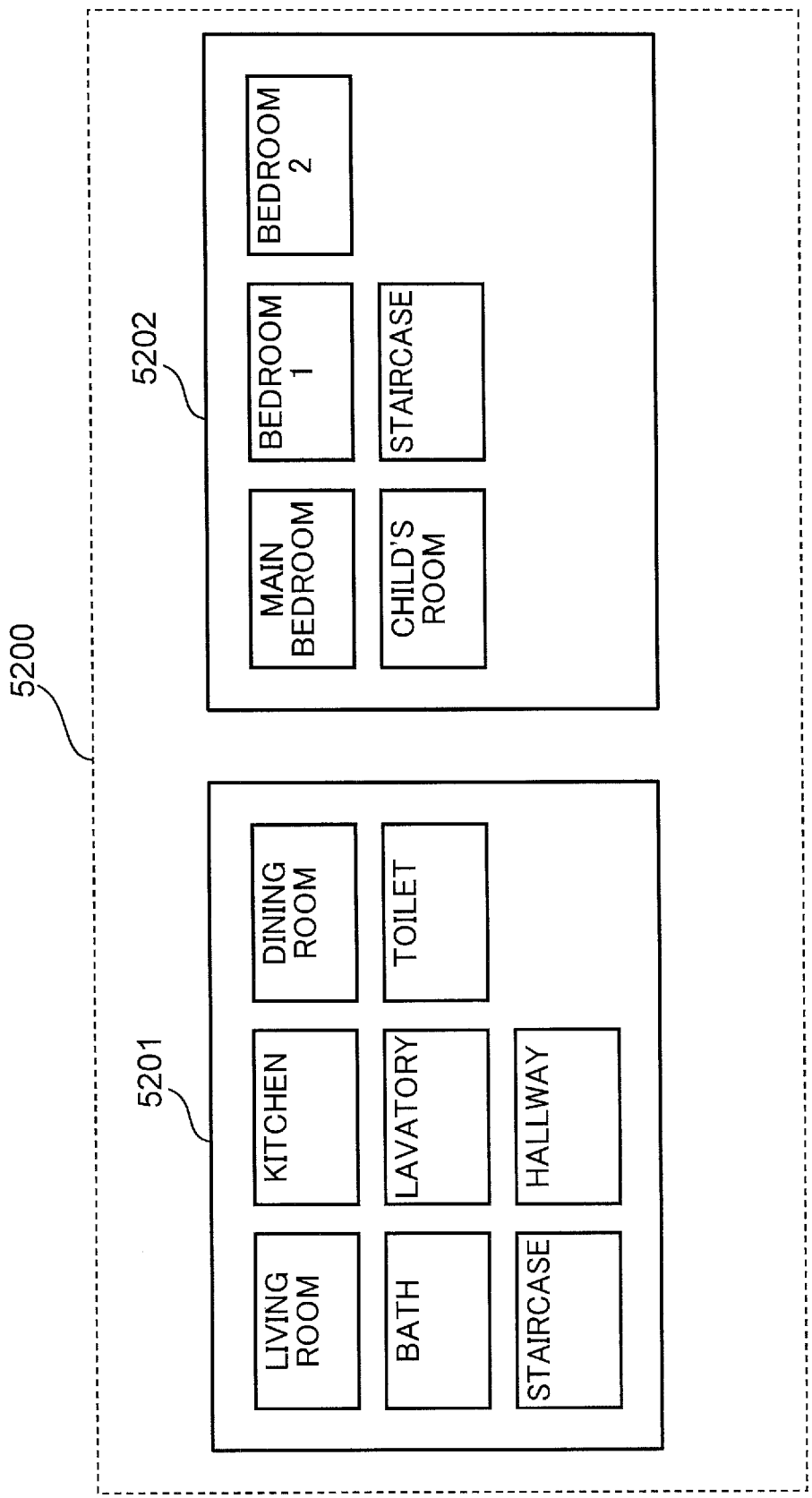
FIG. 52 is a diagram showing a floor plan in another pattern according to the present disclosure.

Floor plans in other patterns will be specifically described below. FIG. 52 is a diagram showing a floor plan 5200 in another pattern. In the floor plan 5200, rooms forming one floor are each represented by one rectangular block, and the rooms on the one floor are disposed in a matrix. The blocks have the same size, and are each provided with the name of the room.

In the floor plan 5200, the name and the number of the rooms forming each floor are indicated, but the relative size and the position in the floor of the rooms are not represented. In the present disclosure, such a diagram is treated as the floor plan 5200. That is, in the present disclosure, any diagram that represents at least what rooms are provided on each floor are treated as the floor plan.

For example, it is seen that a floor plan 5201 for the first floor includes rooms such as a living room, a kitchen, a dining room, a bath, a lavatory, a toilet, a staircase, and a hallway. Meanwhile, it is seen that a floor plan 5202 for the second floor includes rooms such as a main bedroom, a bedroom 1, a bedroom 2, a child's room, and a staircase.

The user can drag and move a desired room on the floor plan 5200 to change the position of the room on the floor plan 5200. In the case where a large number of devices 200 are disposed within a room and all the device icons 501 cannot be displayed within the room on the floor plan 5200 using a default room size, the display control section 103 may increase the size of the room such that all the device icons 501 can be accommodated within the room.

Figure 53:
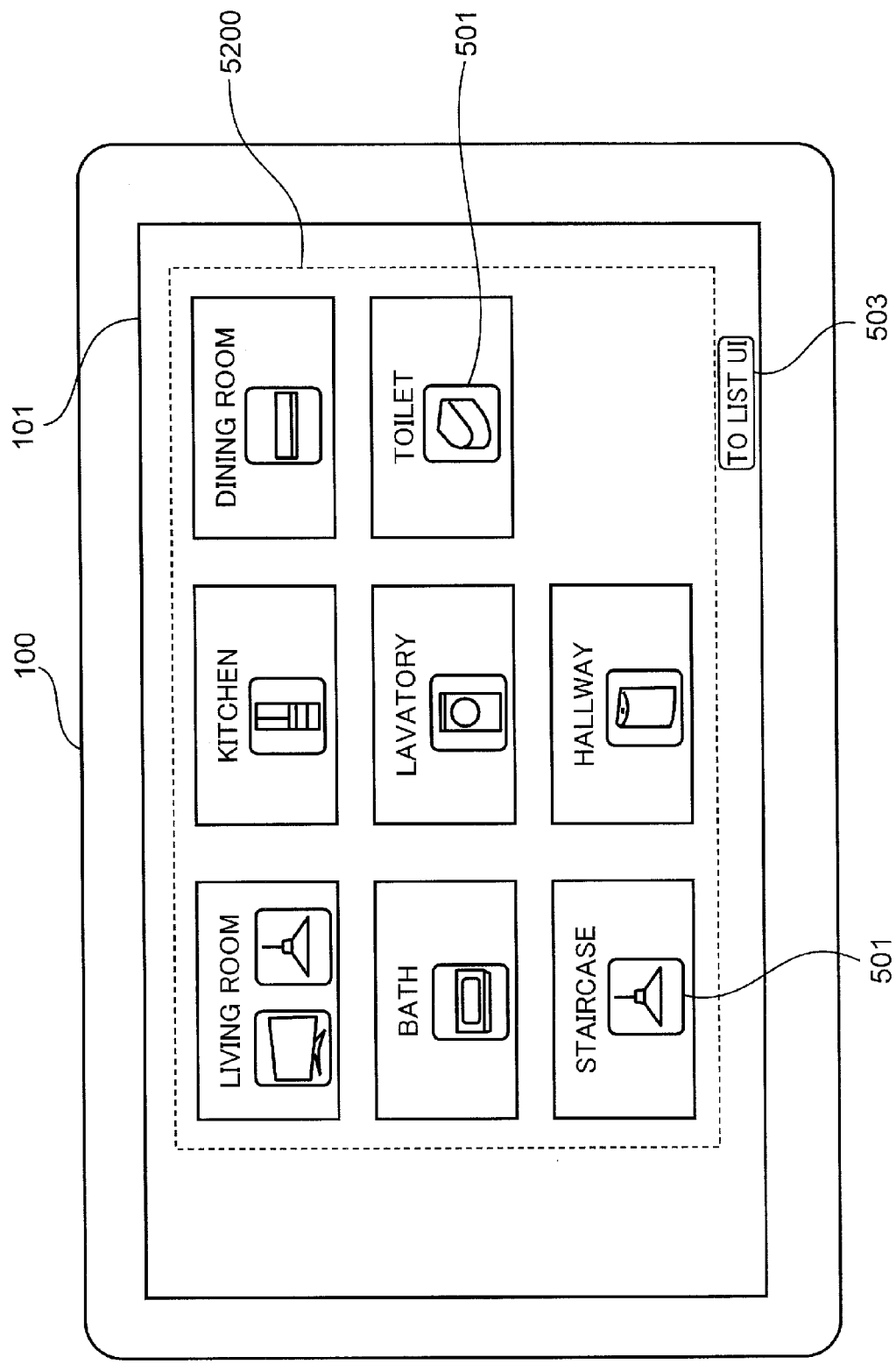
FIG. 53 is a diagram showing the configuration of a basic screen that adopts the floor plan shown in FIG. 52.

FIG. 53 is a diagram showing the configuration of a basic screen that adopts the floor plan 5200. The floor plan 5200 is displayed on the basic screen. In addition, the device icons 501 for the devices 200 actually disposed are displayed within each room.

For example, the device icons 501 for the television set and the illumination device are displayed in the living room, and therefore it is seen that the television set and the illumination device are installed in the living room.

The device list display change button 503 is a button for switching the screen display from the basic screen to the device list display screen discussed earlier (see FIG. 24).

Figure 54:
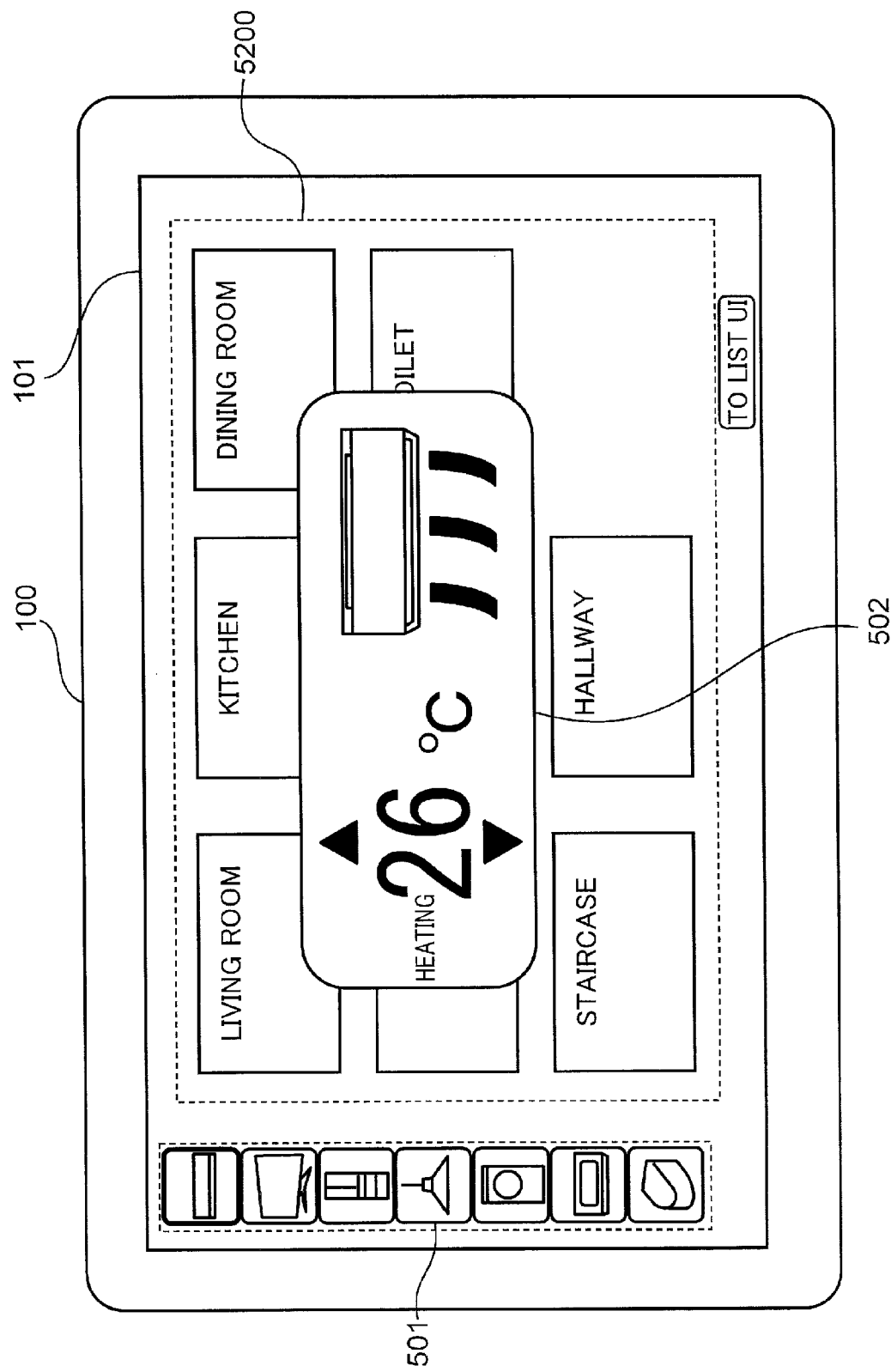
FIG. 54 is a diagram showing the display state of a device control screen for a case where the floor plan shown in FIG. 52 is adopted.

FIG. 54 is a diagram showing the display state of the device control screen 502 for a case where the floor plan 5200 shown in FIG. 52 is adopted. In the basic screen shown in FIG. 53, when the touch panel control section 102 senses that the user selects the device icon 501, the display control section 103 causes the display 101 to display the device control screen 502 corresponding to the selected device icon 501. In FIG. 54, the device icon 501 for the air conditioner is selected, and therefore the device control screen 502 for the air conditioner is displayed as overlapped on the floor plan 5200.

In displaying the device control screen 502, the display control section 103 disposes the device icons 501 displayed on the floor plan 5200 outside the display region of the device control screen 502. In the example of FIG. 54, all the device icons 501 are disposed in one vertical line on the left side of the floor plan 5200.

In disposing the device icons 501 in one vertical line on the left side of the floor plan 5200, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 54, the device icons 501 are disposed on the left side of the floor plan 5200. However, the device icons 501 may be disposed in one vertical line on the right side of the floor plan 5200, or may be disposed in one horizontal line on the upper or lower side of the floor plan 5200.

In the case where all the device icons 501 cannot be displayed on the left side of the floor plan 5200, the display control section 103 may scroll the device icons 501 upward or downward in accordance with a swipe operation performed upward or downward on the device icons 501 disposed in one line on the left side to cause the device icons 501, which have been hidden, to be displayed within the display 101.

In disposing the device icons 501 in one vertical line on the left side of the floor plan 5200, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the top, middle, or bottom position) in the line of icons.

In displaying the device control screen 502, the display control section 103 may dispose all the device icons 501 on the outer periphery of an ellipse as shown in FIG. 12.

Next, transition between the display state of the basic screen and the display state of the device control screen 502 will be described using FIG. 55.

Figure 55:
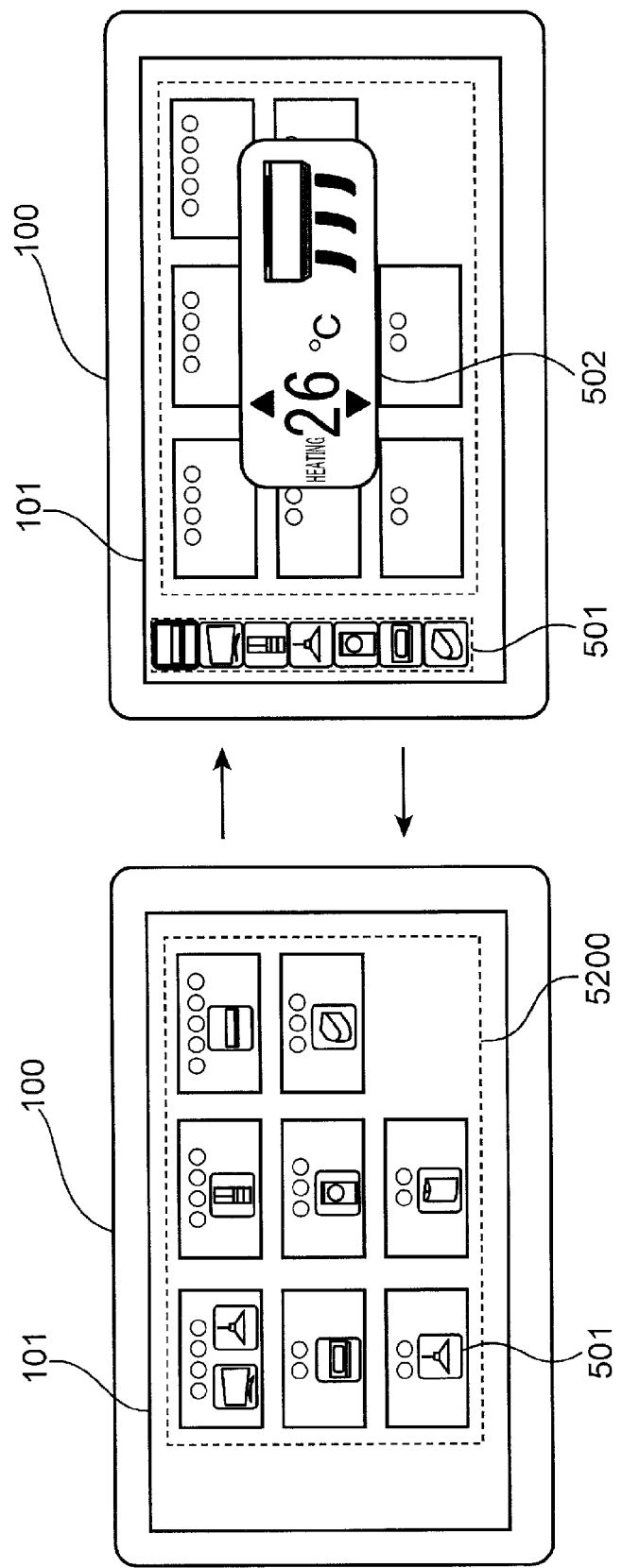
FIG. 55 is a diagram illustrating transition between the display state of the basic screen and the display state of the device control screen.

In the basic screen shown in the left diagram of FIG. 55, the user selects the device icon 501 for the device 200 (here, the air conditioner) that is desired to be controlled, and the touch panel control section 102 senses the selection. Then, as shown in the right diagram of FIG. 55, the display control section 103 displays the device control screen 502 corresponding to the selected device icon 501 as overlapped on the floor plan 5200. This results in transition from the display state of the basic screen to the display state of the device control screen 502.

On the other hand, as shown in the right diagram of FIG. 55, in the display state of the device control screen 502, the user selects the device icon 501 for the air conditioner corresponding to the device control screen 502 or a location outside the display region of the device control screen 502 (for example, the display region of the floor plan 5200 outside the display region of the device control screen 502), and the touch panel control section 102 senses the selection. Then, as shown in the left diagram of FIG. 55, the display control section 103 erases the device control screen 502, and returns from the display state of the device control screen 502 to the display state of the basic screen.

Figure 56:
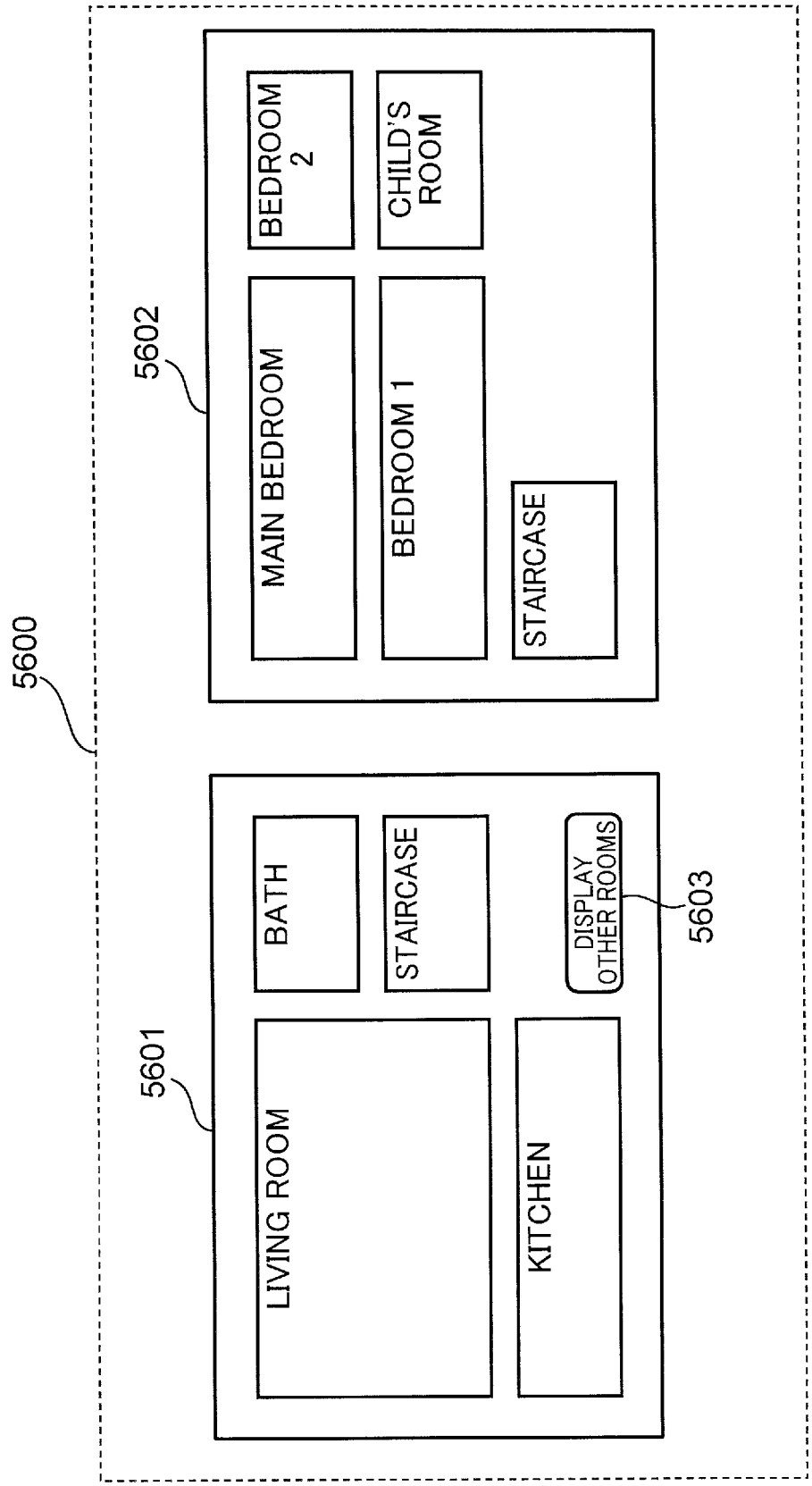
FIG. 56 is a diagram showing the configuration of a floor plan in which the size of each room is varied in accordance with the actual room size in the floor plan shown in FIG. 52.

FIG. 56 is a diagram showing the configuration of a floor plan 5600 for a case where the size of each block is varied in accordance with the actual room size in the floor plan 5200 shown in FIG. 52.

In the left diagram of FIG. 56, a floor plan 5601 for the first floor is shown. In the right diagram of FIG. 56, a floor plan 5602 for the second floor is shown.

In the floor plan 5601 for the first floor, the living room is the largest in terms of the room size, and is followed by the kitchen, the bath, and the staircase. Therefore, the sizes of the rooms are displayed in this order. Also in the floor plan 5602 for the second floor, the rooms are represented in accordance with the actual room size. In this case, information that indicates the actual room size may be registered in advance in room information 6800 to be discussed later, and the display control section 103 may decide the size of each room in accordance with the information.

Figure 57:
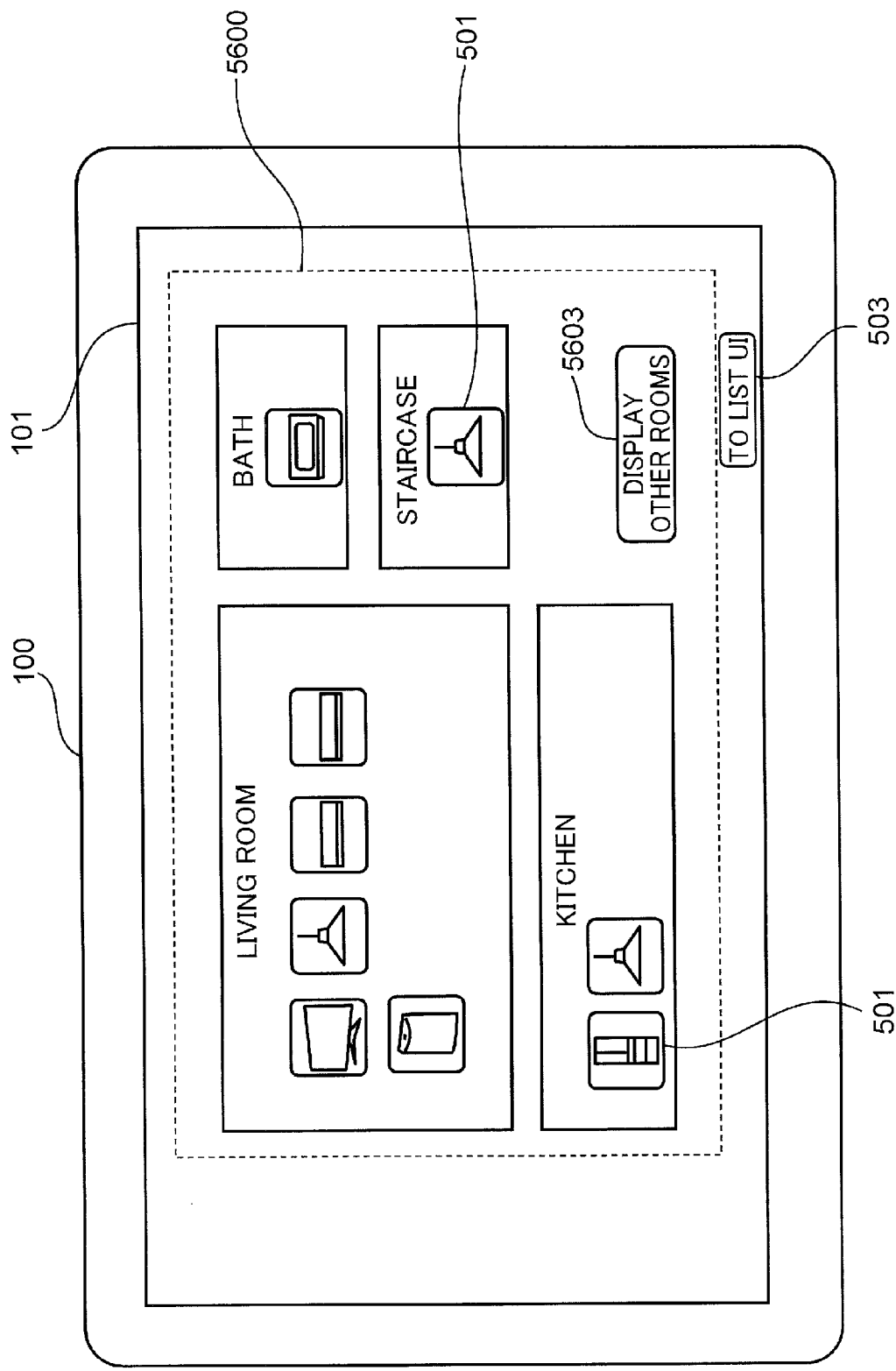
FIG. 57 is a diagram showing the configuration of a basic screen that adopts the floor plan shown in FIG. 56.

FIG. 57 is a diagram showing the configuration of a basic screen that adopts the floor plan 5600 shown in FIG. 56. In the floor plan 5600, each room is displayed with a size matching the actual size. In addition, the device icons 501 for the devices 200 actually disposed are displayed in each room.

In the case where the mode in which each room is represented with a size matching the actual room size on the floor plan 5600 is adopted, displaying all the rooms within the display 101 may result in small display of the rooms to make a user operation difficult. Thus, a room display button 5603 with a text "DISPLAY OTHER ROOMS" is provided in FIG. 57.

When the user selects the room display button and the touch panel control section 102 senses the selection, the display control section 103 switches the screen display to the floor plan 5600 which displays the remaining rooms.

In the example of FIG. 57, the floor plan 5600 is partitioned into the floor plan 5601 for the first floor and the floor plan 5602 for the second floor. Therefore, when the room display button 5603 is selected, the display control section 103 switches display on the display 101 to the floor plan 5602 for the second floor. In this case, the room display button 5603 is also provided on the floor plan 5602 for the second floor. Therefore, when the room display button 5603 is selected, the display control section 103 switches display on the display 101 to the floor plan 5601 for the first floor.

Although the floor plan is provided for each floor in the example of FIG. 57, the present disclosure is not limited thereto. For example, in the case where the floor plan 5601 for the first floor cannot be displayed on the display 101 at the same time, the display control section 103 may divide the floor plan 5601 for the first floor, and display a divided portion of the floor plan 5601 on the display 101. In this case, when the room display button 5603 is selected, a hidden portion of the floor plan 5601 for the first floor may be displayed.

In the case where the floor plan 5601 for the first floor and the floor plan 5602 for the second floor can be displayed on the display 101 at the same time, the display control section 103 may display the floor plan 5601 for the first floor and the floor plan 5602 for the second floor on the display 101 at the same time. In this case, the room display button 5603 is omitted from the floor plan 5600.

In the case where the staircase is tapped on on the floor plan 5600, the display control section 103 may switch between the floor plan 5601 for the first floor and the floor plan 5602 for the second floor.

Figure 58:
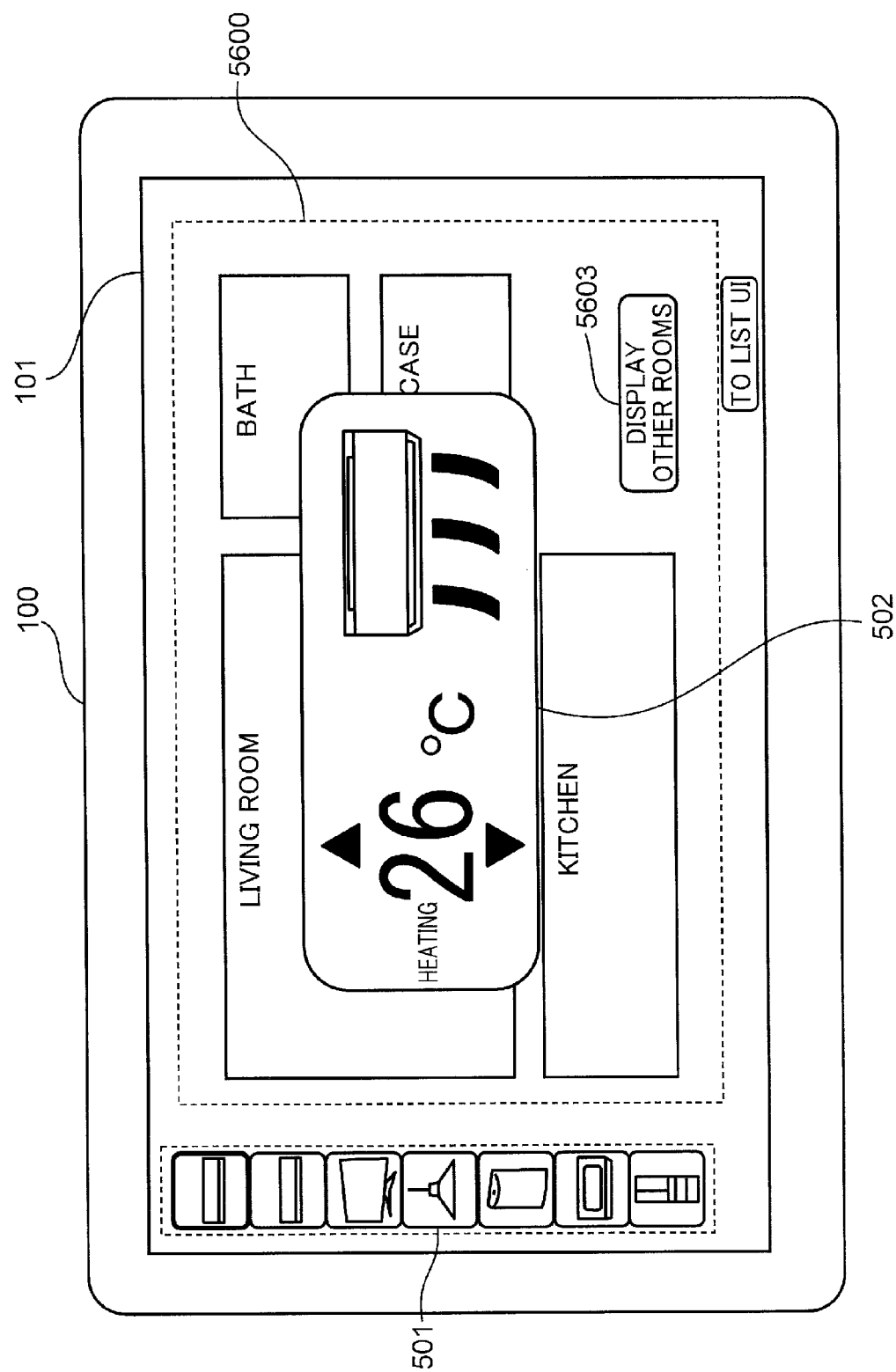
FIG. 58 is a diagram showing the display state of a device control screen for a case where the floor plan shown in FIG. 56 is adopted as the floor plan.

FIG. 58 is a diagram showing the display state of the device control screen 502 for a case where the floor plan 5600 shown in FIG. 56 is adopted as the floor plan. In FIG. 58, as in FIG. 54, the device control screen 502 for the air conditioner is displayed. FIG. 58 is otherwise the same as FIG. 54, and therefore is not described.

Figure 59:
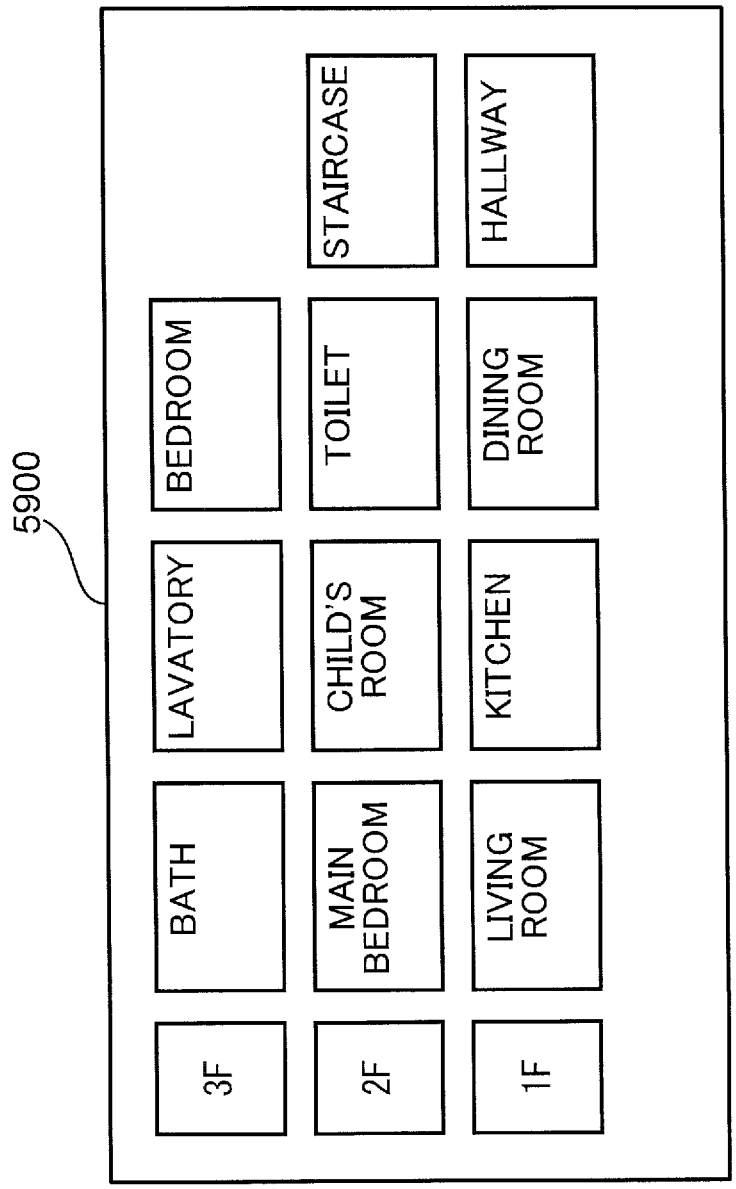
FIG. 59 is a diagram showing a floor plan in still another pattern according to the present disclosure.

FIG. 59 is a diagram showing a floor plan 5900 in still another pattern according to the present disclosure. The floor plan 5900 of FIG. 59 is the same as the floor plan 5200 in that rooms are represented by blocks of the same size, but is different from the floor plan 5200 in arrangement of the rooms. Specifically, in the floor plan 5900, the floor numbers are displayed in the vertical direction, and the rooms forming the same floor are arranged in one horizontal line. In the example of FIG. 59, the house has three floors, namely the first floor to the third floor, and therefore the rooms forming the third floor are disposed in the first line, the rooms forming the second floor are disposed in the second line, and the rooms forming the first floor are disposed in the third line. The floor number such as 1F, 2F, and 3F is indicated at the left end of each line. It is seen at a glance from the floor plan 5900 on which floor each room is disposed.

Also in the floor plan 5900, the size of each room may be varied in accordance with the actual room size. In the floor plan 5900, in addition, in the case where all the rooms cannot be displayed within the display region of the display 101, the floor plan 5900 may be scrolled in the horizontal direction so that a desired room can be displayed on the display 101.

For example, in the case where there are further rooms on the second floor, when the touch panel control section 102 senses that the user performs a swipe operation from the left to the right, the display control section 103 may scroll the rooms forming the second floor, or the rooms forming the first floor to the third floor, from the left to the right in accordance with the amount of the swipe operation.

Figure 60:
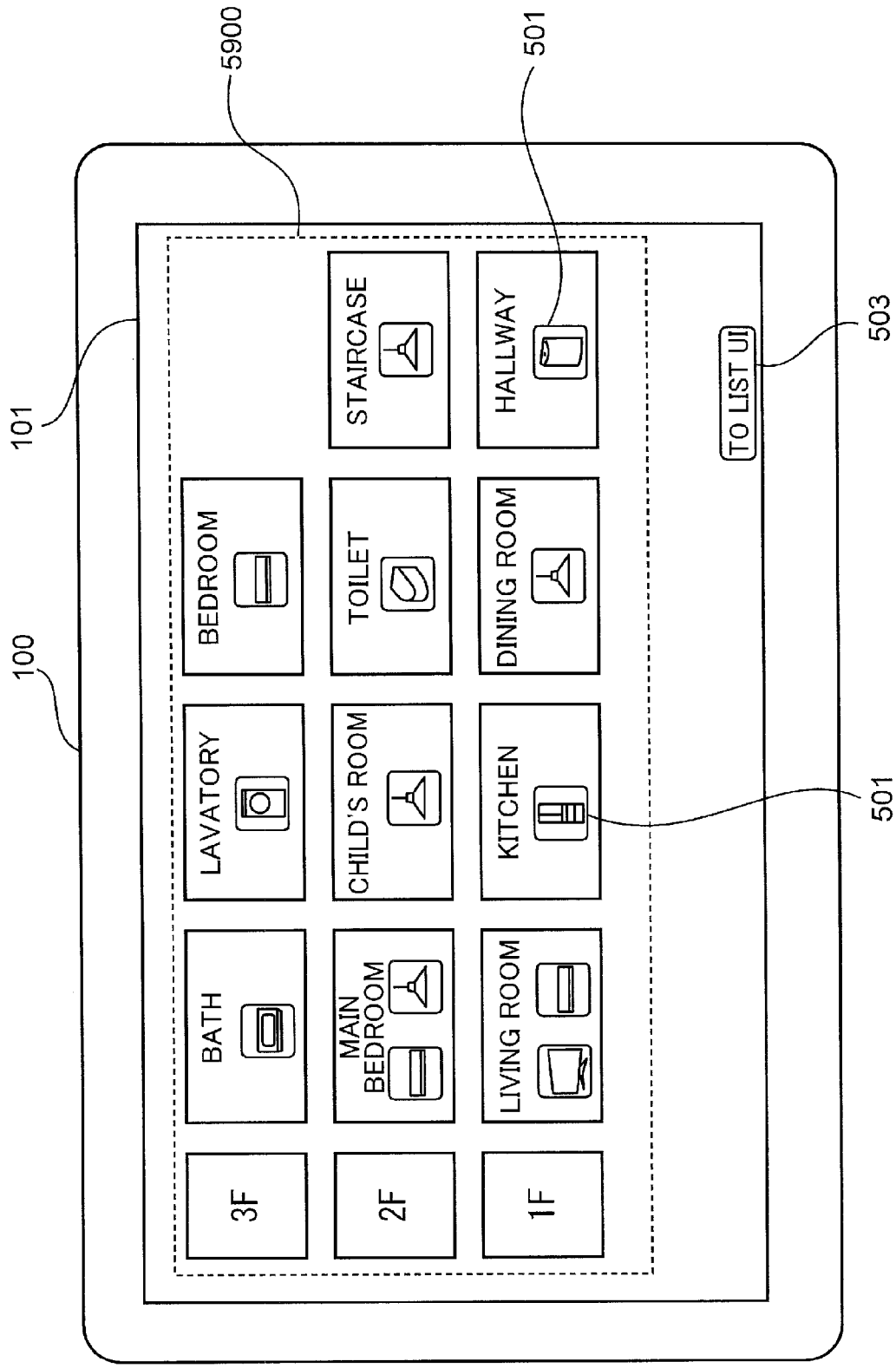
FIG. 60 is a diagram showing the configuration of a basic screen that adopts the floor plan shown in FIG. 59.

FIG. 60 is a diagram showing the configuration of a basic screen that adopts the floor plan 5900 shown in FIG. 59. The floor plan 5900 is displayed on the basic screen. In addition, the device icons 501 for the devices 200 actually disposed are displayed within each room. The device list display change button 503 is a button for switching the screen display from the basic screen to the device list display screen discussed earlier (see FIG. 24).

Figure 61:
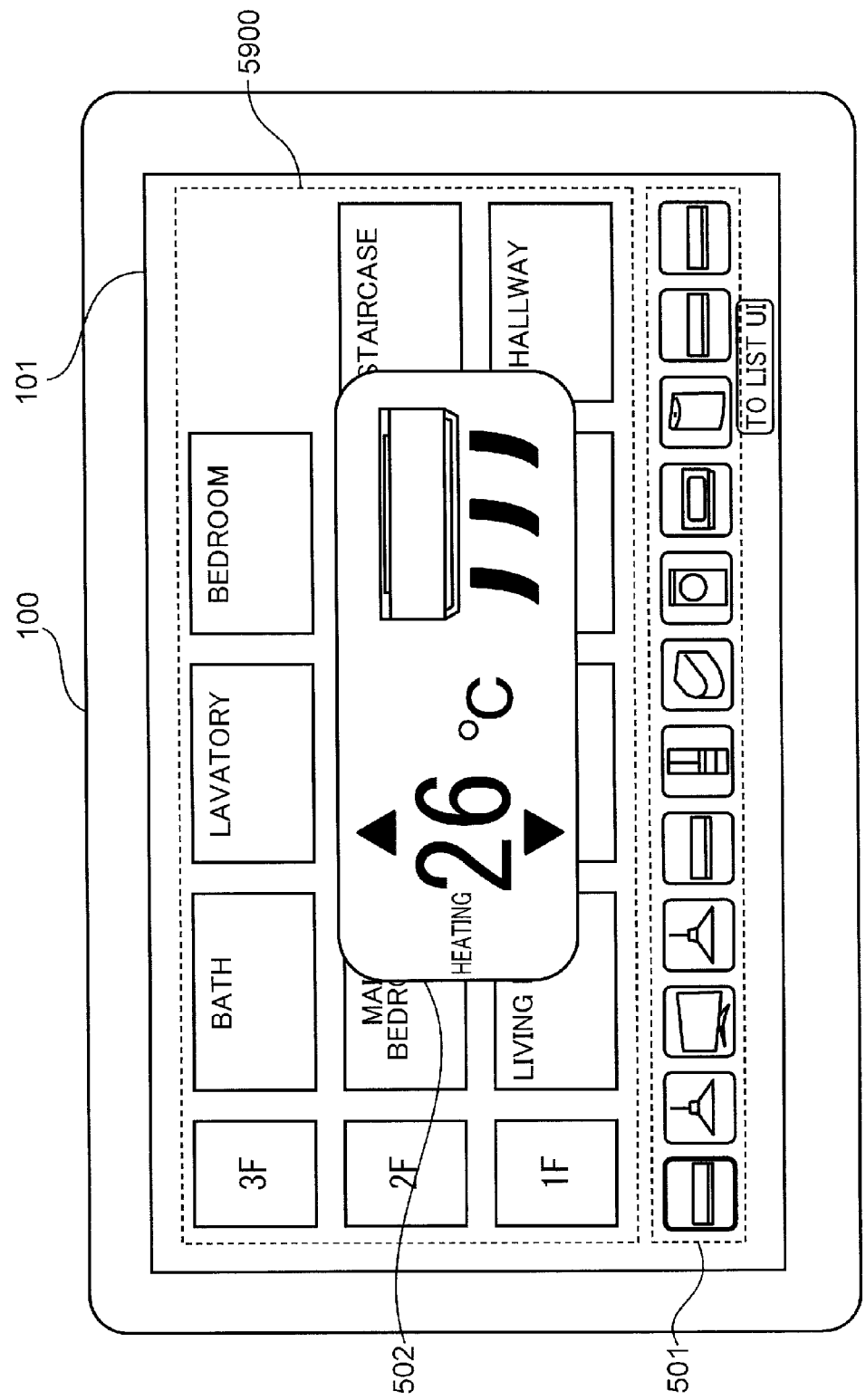
FIG. 61 is a diagram showing the display state of a device control screen for a case where the floor plan shown in FIG. 59 is adopted.

FIG. 61 is a diagram showing the display state of the device control screen 502 for a case where the floor plan 5900 shown in FIG. 59 is adopted. In the basic screen shown in FIG. 60, when the touch panel control section 102 senses that the user selects the device icon 501, the display control section 103 causes the display 101 to display the device control screen 502 corresponding to the selected device icon 501. In FIG. 61, the device icon 501 for the air conditioner is selected, and therefore the device control screen 502 for the air conditioner is displayed as overlapped on the floor plan 5900. In displaying the device control screen 502, the display control section 103 disposes the device icons 501 displayed on the floor plan 5900 outside the display region of the device control screen 502. In the example of FIG. 61, all the device icons 501 are disposed in one horizontal line on the lower side of the floor plan 5900.

In disposing the device icons 501 in one vertical line on the lower side of the floor plan 5900, the display control section 103 may group the device icons 501 under particular conditions. For example, the device icons 501 may be grouped in accordance with the room, may be grouped in accordance with the type of the device 200, or may be grouped in accordance with the category based on the type of the device 200.

In the example of FIG. 61, the device icons 501 are disposed on the lower side of the floor plan 5900. However, the device icons 501 may be disposed in one horizontal line on the upper side of the floor plan 5900, or may be disposed in one vertical line on the left or right side of the floor plan 5900.

In the case where all the device icons 501 cannot be disposed on the lower side of the floor plan 500, the display control section 103 may scroll the device icons 501 leftward or rightward in accordance with a swipe operation performed leftward or rightward on the device icons 501 disposed in one horizontal line on the lower side to cause the device icons 501, which have been hidden, to be displayed within the display 101.

In disposing the device icons 501 in one horizontal line on the lower side of the floor plan 5900, the display control section 103 may display the device icon 501 selected by the user in a display mode that is different from that for the unselected device icons 501. For example, the selected device icon 501 may be displayed in a color that is different from that of the unselected device icons 501, may be displayed more brightly than the unselected device icons 501, may be displayed more densely than the unselected device icons 501, or may be flashed on and off at a constant cycle.

The display control section 103 may scroll an array of the device icons 501 such that the device icon 501 selected by the user is positioned at a conspicuous position (for example, the leftmost, middle, or rightmost position) in the line of icons.

In displaying the device control screen 502, the display control section 103 may dispose all the device icons 501 on the outer periphery of an ellipse as shown in FIG. 12.

In the floor plan 5900, the rooms on all the floors are displayed on the display 101 at the same time, which may result in small display of the rooms to make a user operation difficult. Thus, the display control section 103 may display the floor plan 5900 as enlarged in accordance with the user operation. Specifically, when the user performs an operation of pinching out on a certain room in the floor plan 5900 and the touch panel control section 102 senses the operation, the display control section 103 may display the room on the display 101 as enlarged at an enlargement scale matching the amount of the pinch out.

Figure 62:
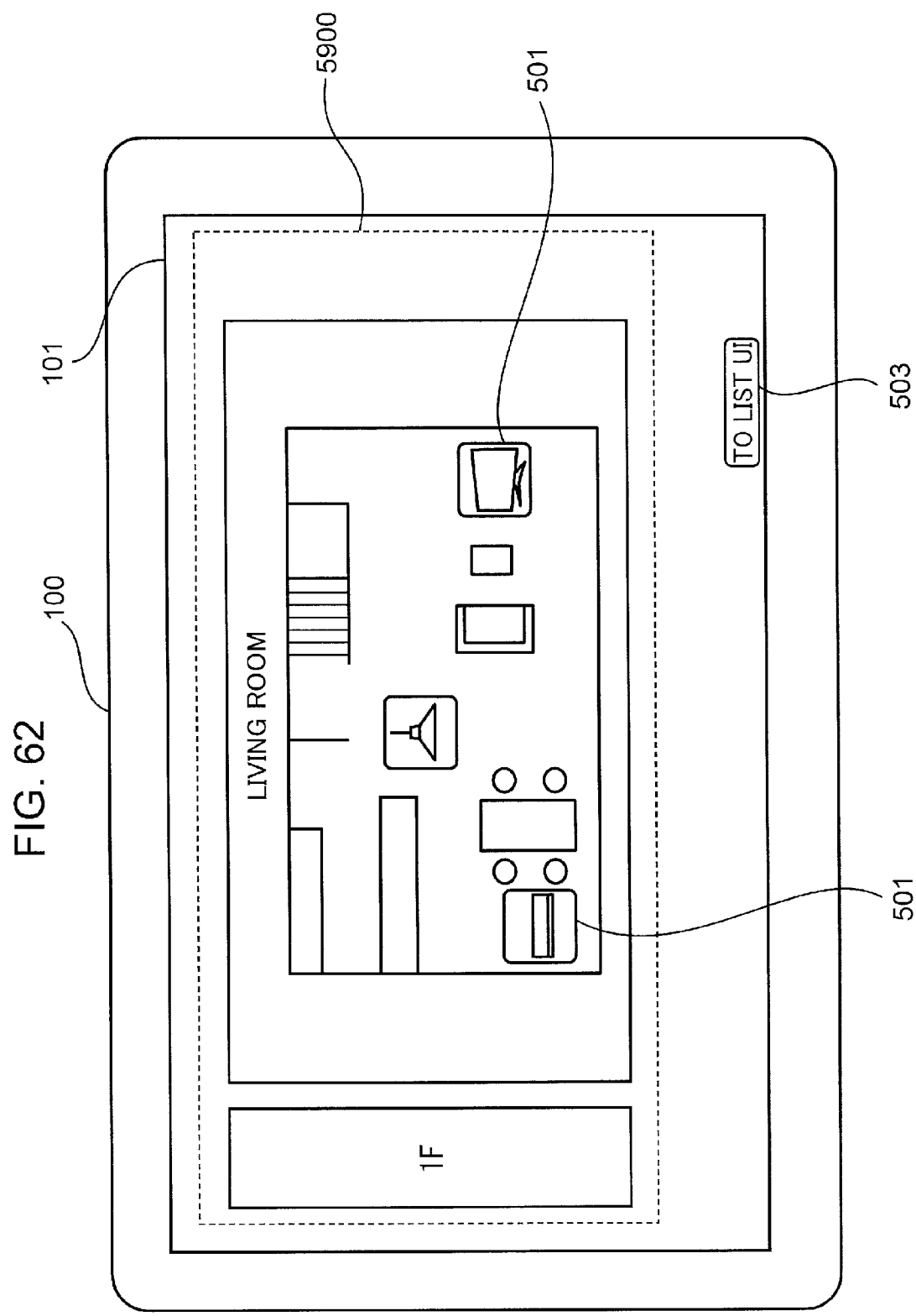
FIG. 62 is a diagram showing a floor plan displayed on a display in the case where a user performs a pinch-out operation on a room in the floor plan shown in FIG. 59.

FIG. 62 is a diagram showing a floor plan that displays a certain room in the floor plan 5900 as enlarged. As shown in FIG. 62, the display control section 103 may display a plan view that planarly represents the shape of the relevant room as overlapped on the floor plan 5900. Alternatively, the display control section 103 may switch to displaying the plan view. This allows the user to grasp the configuration of the rooms in the house and the devices 200 disposed in each room on the floor plan 5900 shown in FIG. 60, and to grasp the actual arrangement position of the devices 200 in the enlarged room on the floor plan 5900 shown in FIG. 62.

In the floor plan 5900 not displayed as enlarged shown in FIG. 60, it is not necessary for the display control section 103 to display the device icons 501 for all the devices 200 disposed within the rooms, and the display control section 103 may display only some of the device icons 501.

In this case, the display control section 103 may display one or a plurality of (for example, two) device icons 501 frequently used by the user on the floor plan 5900. Alternatively, the display control section 103 may not display the device icons 501 on the floor plan 5900 not displayed as enlarged. This prevents the viewability of the floor plan 5900 from being lowered because of an increased number of the device icons 501 displayed on the floor plan 5900 not displayed as enlarged.

Figure 63:
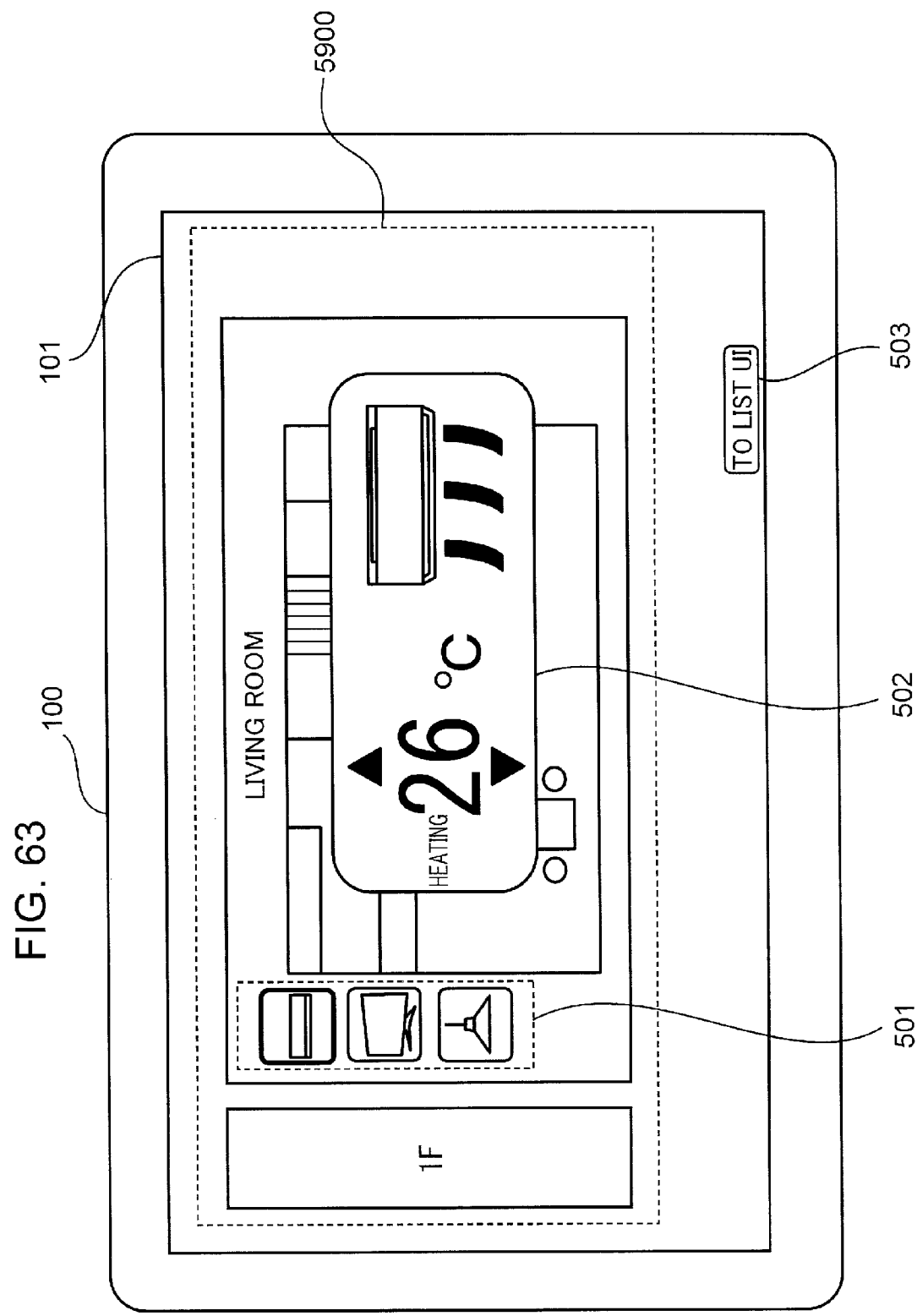
FIG. 63 is a diagram showing the display state of a device control screen in the floor plan displayed as enlarged shown in FIG. 62.

FIG. 63 is a diagram showing the display state of the device control screen 502 in the floor plan 5900 displayed as enlarged shown in FIG. 62. In FIG. 63, as in FIG. 54, the device control screen 502 for the air conditioner is displayed. In FIG. 63, only the device icons 501 disposed in the room (living room) displayed as enlarged are displayed on the left side of the plan view and in the block of the living room. In the example of FIG. 62, the device icons 501 for the air conditioner, the illumination device, and the television set are displayed in the living room within the plan view, and the device icon 501 for the air conditioner is selected by the user. Therefore, the device icons 501 are displayed in one vertical line on the left side of the plan view.

In the case where a certain room is displayed as enlarged, it is highly likely that the user operates the device 200 disposed within the room. In the case where a certain room is displayed as enlarged, in addition, the device icons 501 for devices in the other rooms are not displayed on the display 101. Therefore, if the device icons 501 for devices disposed in the other rooms are displayed on the left side of the plan view when the user selects a certain device icon 501, the user may be given a sense of wrongness.

Figure 64:
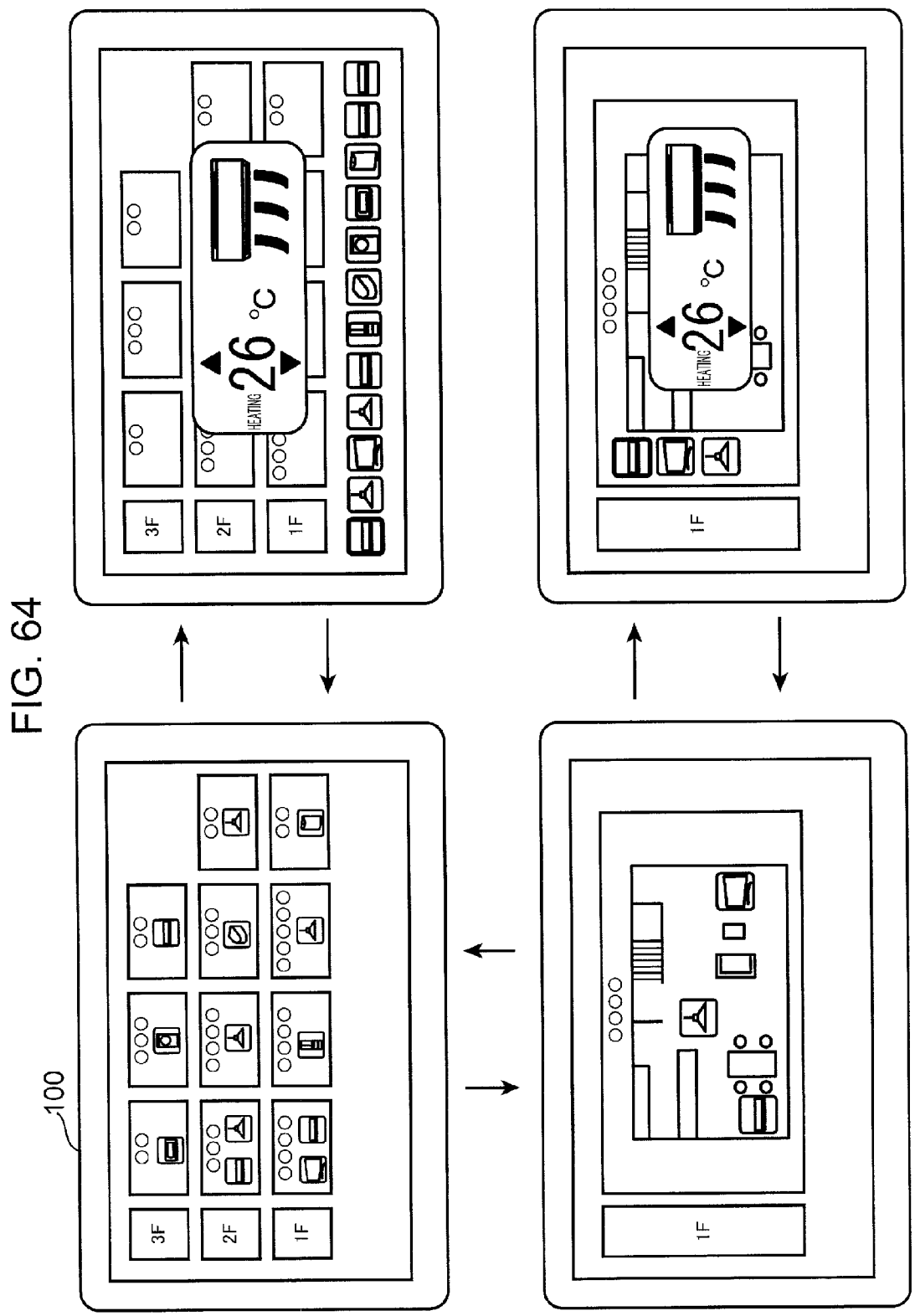
FIG. 64 is a diagram showing screen transition from the display state of the basic screen to the display state of the device control screen.

Thus, in the case where a certain room is displayed as enlarged, the display control section 103 causes only the device icons 501 for the devices 200 disposed in the room to be displayed in one vertical line on the left side of the plan view. In the example of FIG. 64, the device icons 501 are displayed on the left side of the plan view. However, the device icons 501 may be displayed in one vertical line on the right side of the plan view, or may be displayed in one horizontal line on the upper or lower side of the plan view.

FIG. 64 is a diagram showing screen transition from the display state of the basic screen to the display state of the device control screen 502. It is assumed that the user taps on the device icon 501 for the air conditioner, for example, in the basic screen which displays the floor plan 5900 not displayed as enlarged as shown in the upper left diagram of FIG. 64. Then, as shown in the upper right diagram of FIG. 64, the display control section 103 displays the device control screen 502 for the air conditioner as overlapped on the basic screen. In the screen shown in the upper right diagram of FIG. 64, on the other hand, when the user taps on a region on the floor plan 5900 other than the device control screen 502 or taps on the device icon 501 for the air conditioner, the display control section 103 returns the screen display to the basic screen shown in the upper left diagram of FIG. 64.

It is assumed that the user pinches out on the living room in the basic screen shown in the upper left diagram of FIG. 64. Then, as shown in the lower left diagram of FIG. 64, the display control section 103 enlarges the block of the living room, and at the same time displays the plan view of the living room having a size matching the size of the enlarged block as overlapped on the enlarged block. It is assumed that the user pinches in on the living room in the lower left diagram of FIG. 64. Then, the display control section 103 returns the screen display to the basic screen shown in the upper left diagram of FIG. 64.

When the device icon 501 for the air conditioner, for example, is selected in the basic screen shown in the lower left diagram of FIG. 64, the display control section 103 displays the device control screen 502 for the air conditioner as overlapped on the plan view as shown in the lower right diagram of FIG. 64. In the lower right diagram of FIG. 64, when the user taps on a region on the floor plan 5900 other than the device control screen 502 or on the device icon 501 for the air conditioner, the display control section 103 returns the screen display to the screen shown in the lower left diagram of FIG. 64.

Figure 65:
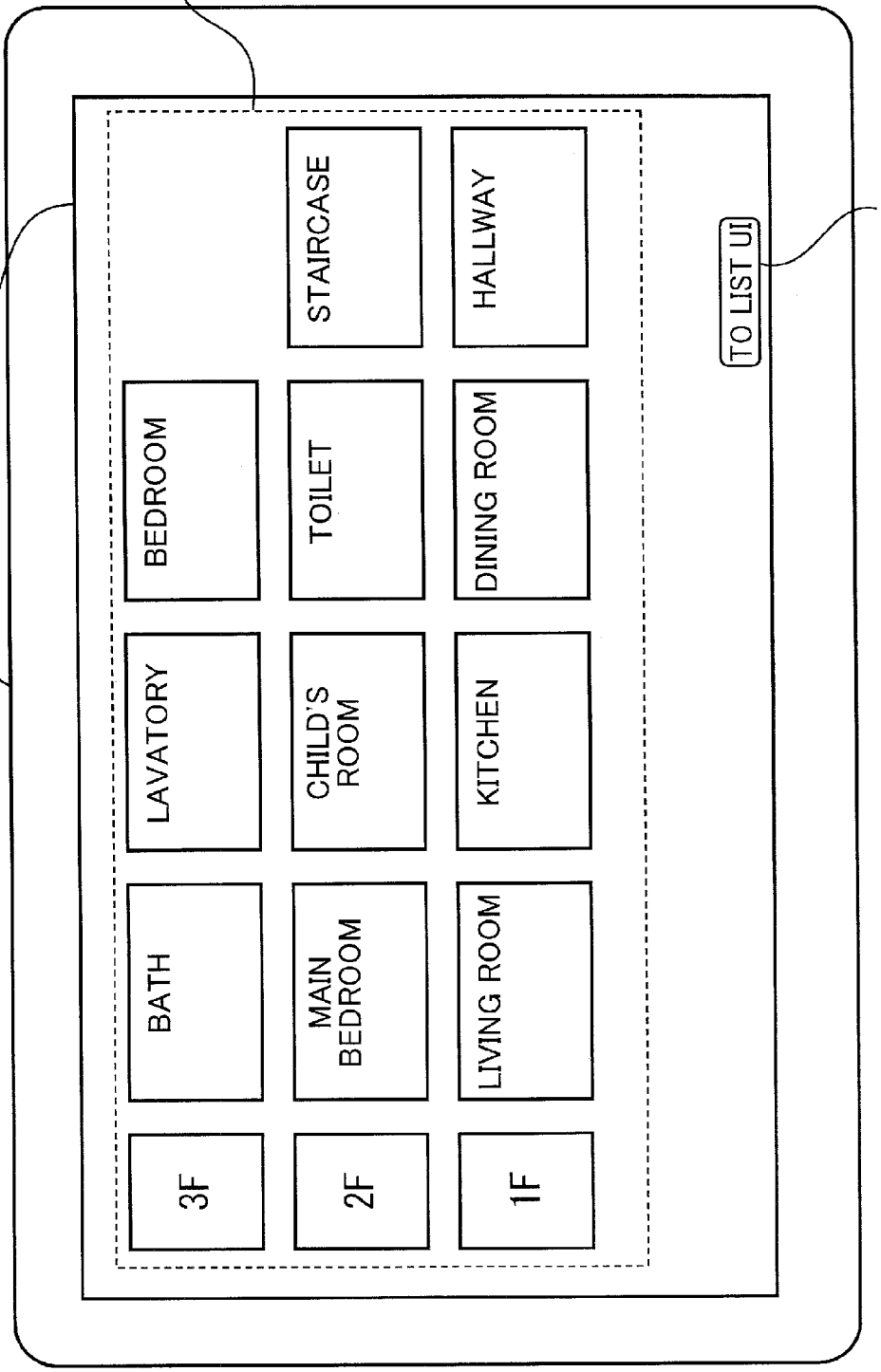
FIG. 65 is a diagram showing the configuration of a basic screen which adopts the floor plan shown in FIG. 59 and in which device icons are not displayed.

FIG. 65 is a diagram showing the configuration of a basic screen 5900 which adopts the floor plan shown in FIG. 59 and in which device icons 501 are not displayed. In the mode shown in FIG. 65, only rooms forming each floor are displayed, and the device icons 501 are not displayed.

Figure 66:
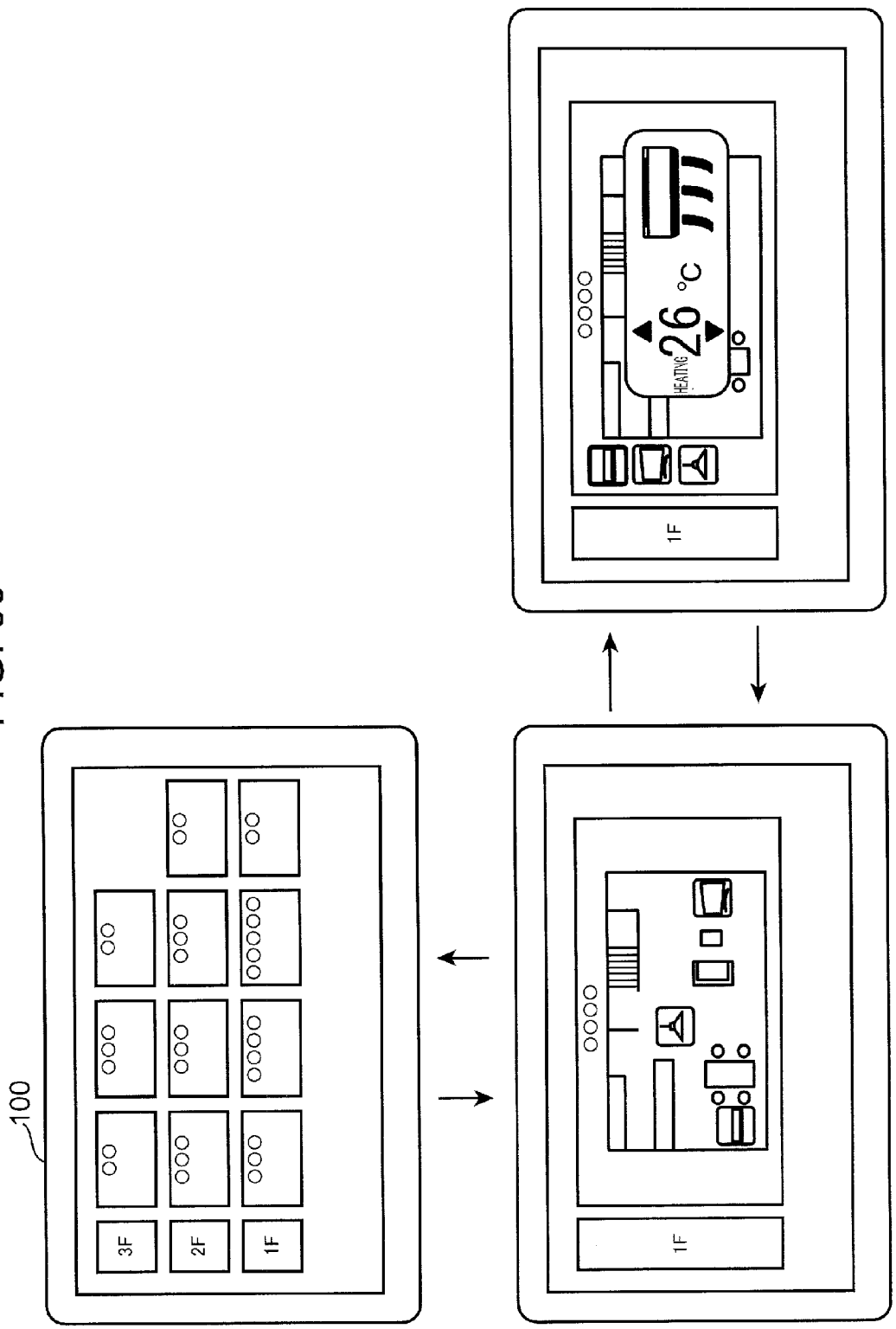
FIG. 66 is a diagram showing screen transition from the display state of the basic screen to the display state of the device control screen for a case where the basic screen in which device icons are not displayed is adopted.

FIG. 66 is a diagram showing screen transition from the display state of the basic screen to the display state of the device control screen 502 for a case where the basic screen in which device icons 501 are not displayed is adopted. It is assumed that the user pinches out on the living room, for example, in the basic screen shown in the upper left diagram of FIG. 66. Then, as shown in the lower left diagram of FIG. 66, the display control section 103 displays the block of the living room as enlarged, and displays the plan view of the living room as overlapped on the block displayed as enlarged. It is assumed that the user taps on the device icon 501 for the air conditioner, for example, in the screen shown in the lower left diagram of FIG. 66. Then, as shown in the lower right diagram of FIG. 66, the display control section 103 displays the device control screen 502 for the air conditioner as overlapped on the plan view of the living room, and disposes the device icons 501 for the living room in one vertical line on the left side of the plan view of the living room. In the lower right diagram of FIG. 66, when the user taps on a region on the floor plan 5900 and outside the display region of the device control screen 502, the display control section 103 returns the display screen to the screen shown in the lower left diagram of FIG. 66.

Figure 67:
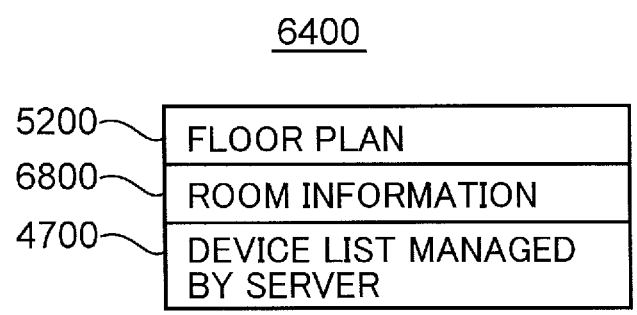
FIG. 67 is a diagram showing the configuration of the home information for a case where the floor plan shown in FIG. 52 is adopted.

FIG. 67 is a diagram showing the configuration of the home information 2700 for a case where the floor plan 5200 shown in FIG. 52 is adopted. As shown in FIG. 67, the home information 6400 includes the floor plan 5200, the room information 6800, and the device list 4700 managed by the server. In the floor plan 5200, the display positions of the rooms are determined in advance. Therefore, the vertex information 2800 included in the home information 2700 is omitted from the home information 6400.

The floor plan 5200 is image data obtained by representing the floor plan 5200 shown in FIG. 52 in a bitmap format, for example. Alternatively, the floor plan 5200 may be information that prescribes the color, the shape, the size, and so forth for displaying the floor plan 5200. The room information 6800 is information for deciding the regions of rooms from the floor plan 5200.

FIG. 68 is a diagram showing the configuration of room information 6800 shown in FIG. 67. As shown in FIG. 68, the room information 6800 includes a room ID 6801, a room type 6802, a floor level 6803, and a display position 6804. The room ID 6801 is an identifier that identifies a room on the floor plan 5200. The room type 6802 indicates the type of the room. The floor level 6803 indicates the floor level (floor) on which the room is disposed. The display position 6804 indicates the arrangement position of the room on the floor plan 5200.

FIG. 69 is a diagram showing an example of the correspondence between the display position 6804 in the room information 6800 and the floor plan 5200. As shown in FIG. 69, the order of the blocks on the floor plan 5200 is prescribed such that the block in the first row and the first column corresponds to the first cell, the block in the first row and the second column corresponds to the second cell, the block in the first row and the third column corresponds to the third cell, the block in the second row and the first column corresponds to the fourth cell, and so forth.

For example, the room with a room ID 6801 of A has a display position 6804 of "FIRST CELL ON FIRST FLOOR". Therefore, as shown in FIG. 69, the display control section 103 interprets the block in the first cell (in the first row and the first column) on the floor plan 5201 for the first floor as the living room.

In the example of FIG. 69, the blocks are disposed in three horizontal lines, and therefore the cell in the second row and the first column corresponds to the fourth cell, and the cell in the third row and the first column corresponds to the seventh cell. It should be noted, however, that this is merely exemplary. For example, in the case where the cells are arranged in four columns in the horizontal direction, the correlation between the order of the cells and the arrangement positions of the blocks is changed as appropriate in accordance with the number of blocks in the horizontal direction, and the cell in the second row and the first column corresponds to the fifth cell, and the cell in the third row and the first column corresponds to the ninth cell.

FIG. 70 is a diagram showing the configuration of a device list 4700 managed by the server 300 for a case where the floor plan 5200 shown in FIG. 52 is adopted. It is not necessary for the floor plan 5200 to indicate the arrangement position of the device 200 in the room. Therefore, in the device list 4700 shown in FIG. 70, unlike FIG. 34, the room type 6802 is registered in the arrangement 4704. The device list 4700 shown in FIG. 70 is otherwise the same as the device list 4700 shown in FIG. 34. For example, the air conditioner with a device ID 4701 of A is disposed in the living room, and therefore "LIVING ROOM" is registered in the arrangement 4704. In the example of FIG. 70, the room type 6802 is adopted as the arrangement 4704. However, any other information that specifies a room may be registered. For example, the room ID 6801 may be adopted as the arrangement 4704.

FIG. 71 is a diagram showing the configuration of a device list 3100 managed by the home controller 100 for a case where the floor plan 5200 shown in FIG. 52 is adopted. Also in the device list 3100 of FIG. 71, for the same reason as that for the device list 4700 of FIG. 70, the room type 6802 is registered in the arrangement 3104. The device list 3100 of FIG. 71 is otherwise the same as the device list 3100 shown in FIG. 35. Also in FIG. 71, the room ID 6801 may be adopted as the arrangement 3104.

Next, the device list 3100 for a case where the plan view of a certain room is displayed in the case where a pinch-out operation is performed on the room on the basic screen of the floor plan 5900 as shown in FIG. 62 will be described. In this case, the room information 6800 shown in FIG. 68 may include an item of the plan view of the room. Then, image data for the plan view of the relevant room may be registered in the item of the plan view of the room. For the plan view of the room, as shown in FIG. 33, the origin may be set at the left end of the room, for example, the X axis and the Y axis may be set in the horizontal direction and the vertical direction, respectively, and the position of the room may be represented by the X and Y coordinates.

Meanwhile, not only the room type 6802 but also the coordinate in the room is registered in the arrangement 3104 of the device list 3100 shown in FIG. 71. This allows the display control section 103 to discriminate from the content of the arrangement 3104 at what position on the plan view representing the room the device icon 501 is to be disposed.

In the present disclosure, the server 300 is not an essential constituent element, and various types of information managed by the server 300 (such as the home information 2700 and the state of the devices 200) may be managed by the home controller 100. This allows the present disclosure described above to be embodied without the server 300. In this case, it is not necessary for the home controller 100 to manage information on the entire house, and it is only necessary to manage information related to the devices 200 controlled by the home controller 100 and the house in which the devices 200 are disposed.

(Control of Humidifier)

An embodiment of an aspect that does not a limit target device type has been described above. Hereinafter, an embodiment of an aspect whose target device is a humidifier will be described in detail.

Figure 73A:
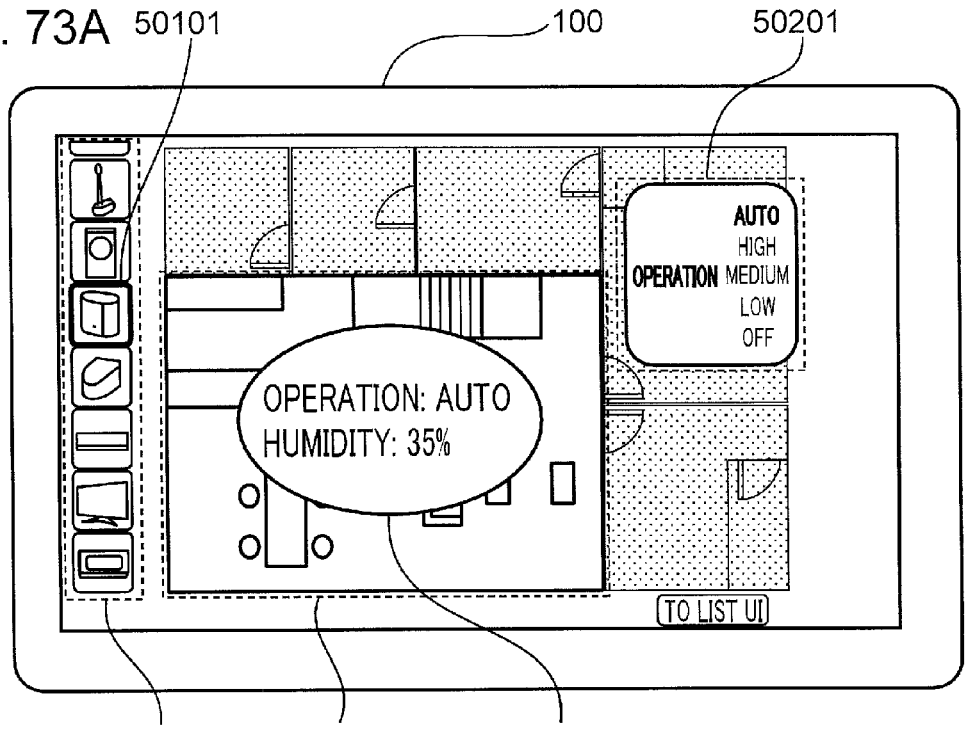
FIG. 73A is a diagram showing a first example of displaying an operation state and a control screen in a case where humidity is 35 percent.
Figure 73B:
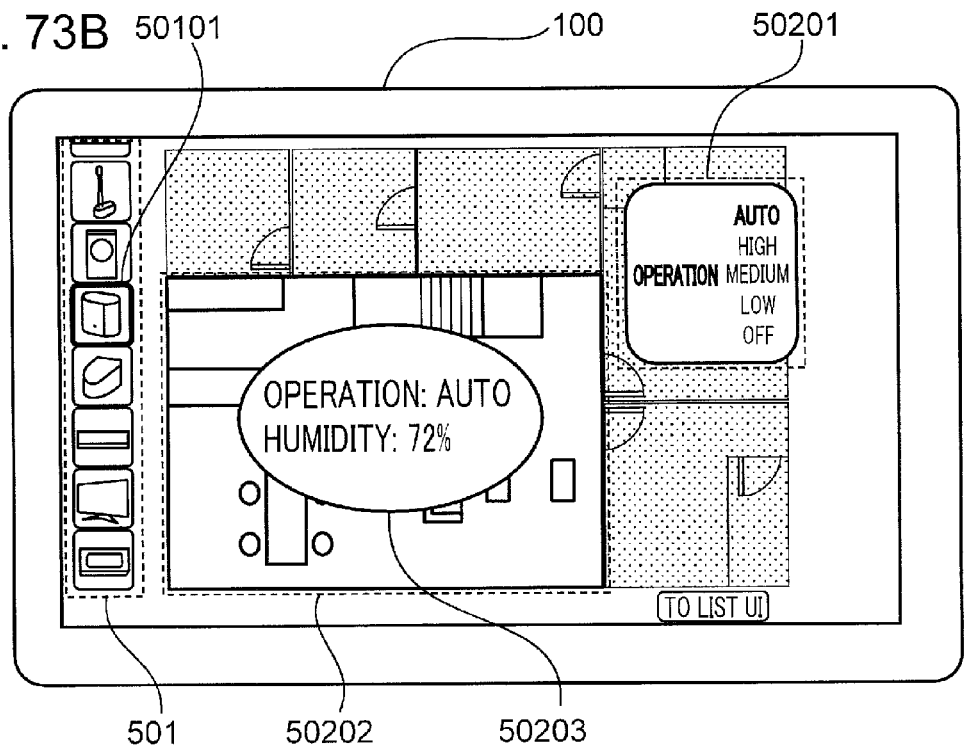
FIG. 73B is a diagram showing a first example of displaying an operation state and a control screen in a case where humidity is 72 percent.

FIG. 72 is a diagram showing an example of a basic screen displayed on the display 101 of the home controller 100, FIG. 73A is a diagram showing a first example of displaying an operation state and a control screen in a case where humidity is 35 percent, and FIG. 73B is a diagram showing a first example of displaying an operation state and a control screen in a case where humidity is 72 percent.

As shown in FIG. 72, a basic screen including the floor plan 500, the device icon 501, and the like is displayed by the display control section 103 on the display 101 of the home controller 100. In this case, the device icons 501 include a humidifier icon 50101 representing a humidifier.

The humidifier icon 50101 is selected when the user taps the humidifier icon 50101 in a display state shown in FIG. 72, and the tap (selection) is sensed by the touch panel control section 102. As a result, as shown in FIG. 73A or 73B, the display control section 103 displays a control screen (an example of an operation screen) 50201 of a humidifier on the display 101. When selection of the humidifier icon 50101 is sensed, the display control section 103 displays the control screen 50201 for operating a humidifier corresponding to the selected humidifier icon 50101 on the display 101 so as to avoid a region corresponding to a room in which the selection of the humidifier icon 50101 had been sensed and to overlap with the display screen.

An image representing an operation mode of the humidifier is selectably displayed on the control screen 50201. For example, operation modes of the humidifier include "auto", "high", "medium", "low", and "off", and a user can select a desired operation mode by, for example, tapping an image representing an operation mode. When an operation mode corresponding to "auto" is selected, the humidifier automatically switches an air flow amount of humidified air that is output in accordance with the humidity in the room to an air flow amount corresponding to any of "high", "medium", and "low". When an operation mode corresponding to "medium" is selected, the humidifier outputs humidified air in a prescribed air flow amount. When an operation mode corresponding to "high" is selected, the humidifier outputs humidified air in an air flow amount that is larger than the prescribed air flow amount. When an operation mode corresponding to "low" is selected, the humidifier outputs humidified air in an air flow amount that is smaller than the prescribed air flow amount. When an operation mode corresponding to "off" is selected, the power of the humidifier is turned off.

Moreover, the configuration of the humidifier is the same as the configuration of the device 200 shown in FIG. 3. Specifically, the humidifier includes a control execution section 211, a state management section 212, a storage section 214, and a communication control section 217. The control execution section 211 receives a control command from the home controller 100 or the server 300 and controls the humidifier in accordance with the received control command.

For example, the control execution section 211 turns on and off the humidifier. In addition, the control execution section 211 changes the air flow amount of humidified air that is output from the humidifier in stages. Moreover, the control execution section 211 may change an output angle (air flow direction) of the humidified air that is output from the humidifier. Furthermore, the control execution section 211 transmits an execution result of the control command or a state of the humidifier to the home controller 100 or the server 300.

The state management section 212 manages a state of the humidifier. The state management section 212 manages whether the humidifier is currently turned on or turned off. In addition, the state management section 212 manages a current operation mode of the humidifier. Furthermore, the state management section 212 manages a current air flow amount of the humidifier. In addition, the state management section 212 manages humidity around the humidifier.

The storage section 214 stores information related to a state of a humidifier that is managed by the state management section 212. The communication control section 217 controls communication between the humidifier and the home controller 100 and communication between the humidifier and the server 300. In addition, the communication control section 217 transmits a variety of data to the home controller 100 or the server 300 upon receiving a request to transmit such data from other blocks, and receives data transmitted from the home controller 100 or the server 300 to deliver the data to the relevant block.

The device control section 106 outputs a control command for operating the humidifier to the network based on an operation performed on the control screen 50201.

In addition, based on an operation performed on the control screen 50201, the display control section 103 identifiably displays an operation state of the humidifier in a region (the control target region 50202) corresponding to a room in which selection of the humidifier icon 50101 has been sensed.

Based on an operation performed on the control screen 50201, the display control section 103 displays an operation state image 50203 representing an operation state of the humidifier in the control target region 50202. For example, in FIG. 73A, the operation state image 50203 displays that the current operation mode of the humidifier is automatic and the humidity of the control target region 50202 as sensed by the humidifier is 35 percent. In addition, in FIG. 73B, the operation state image 50203 displays that the current operation mode of the humidifier is automatic and the humidity of the control target region 50202 as sensed by the humidifier is 72 percent.

Furthermore, as shown in FIGS. 73A and 73B, device icons 501 including the humidifier icon 50101 are disposed in one line outside the display region of the control screen 50201 and the floor plan 500 and inside the display region of the display 101. When the touch panel control section 102 senses that the humidifier icon 50101 has been tapped by the user, the display control section 103 disposes all device icons 501 in one line on a left side of the display region of the floor plan 500. In other words, the display control section 103 moves all device icons 501 out of the display region of the floor plan 500 into a vacant region in the display region of the display 101.

Furthermore, as shown in FIGS. 73A and 73B, the control target region 50202 corresponding to the room in which selection of the humidifier icon 50101 has been sensed and regions other than the control target region 50202 in the floor plan 500 are identifiably displayed in different modes. For example, as shown in FIGS. 73A and 73B, the display control section 103 displays regions other than the control target region 50202 in the floor plan 500 in a state where the regions are covered by a translucent gray layer (the regions indicated by dots in the drawings) and displays the control target region 50202 in a state where the region is not covered by a translucent gray layer. Accordingly, since the user is able to operate the control screen 50201 while being conscious of the control target region 50202, an operation with a realistic feeling can be realized.

Moreover, when a tap (selection) of the humidifier icon 50101 is sensed by the touch panel control section 102 on the basic screen shown in FIG. 72, the display control section 103 may inquire a current operation state (operation mode and humidity) to the humidifier corresponding to the humidifier icon 50101 and acquire the current operation state from the humidifier. In addition, the display control section 103 may display the control screen 50201 and the operation state image 50203 reflecting the current operation state of the humidifier on the display 101.

In addition, the humidifier may transmit an operation state to the home controller 100 and the storage section 104 may store the received operation state periodically or every time the operation state changes. In this case, when a tap (selection) of the humidifier icon 50101 is sensed by the touch panel control section 102, the display control section 103 reads an operation state stored in the storage section 104 without inquiring the current operation state to humidifier and displays the control screen 50201 and the operation state image 50203 reflecting the read operation state of the humidifier on the display 101.

Figure 74A:
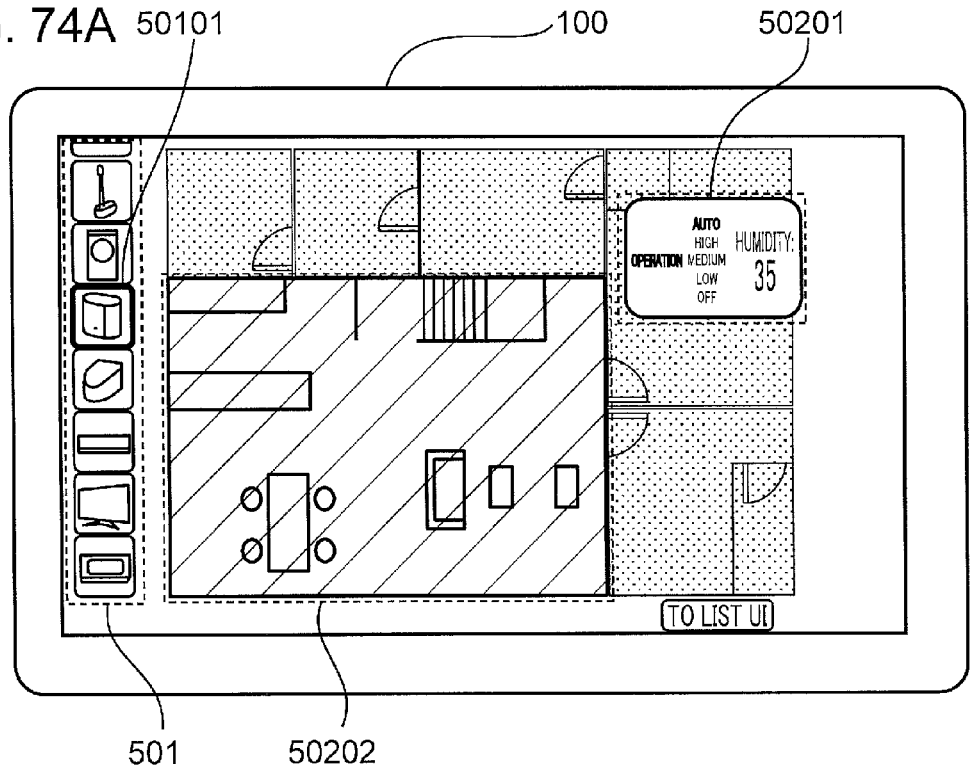
FIG. 74A is a diagram showing a second example of displaying an operation state and a control screen in a case where humidity is 35 percent.
Figure 74B:
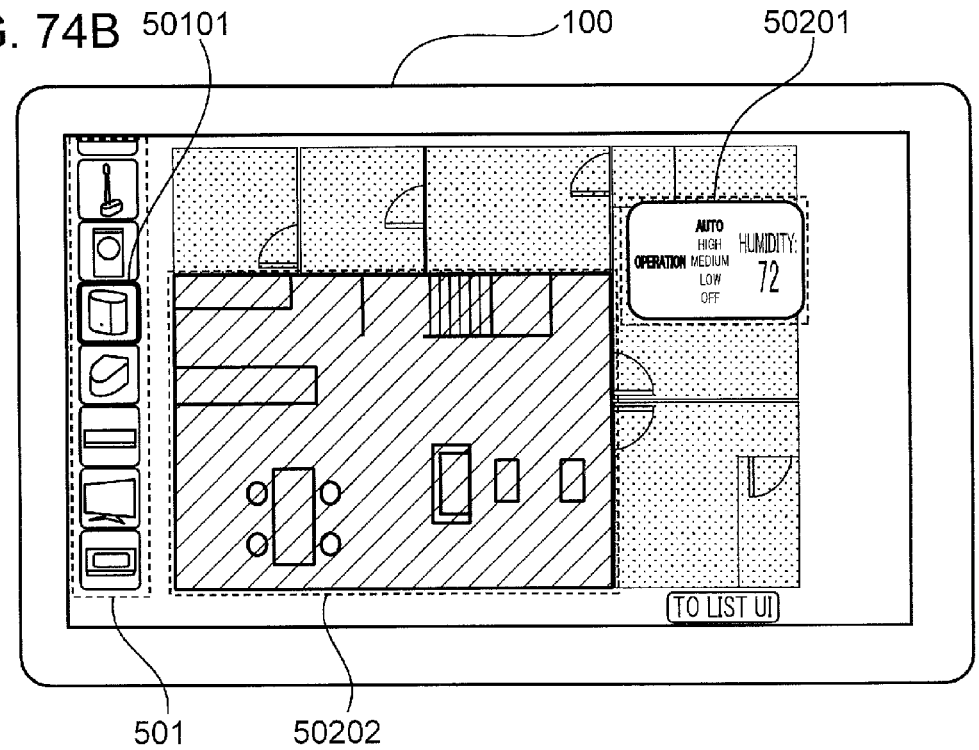
FIG. 74B is a diagram showing a second example of displaying an operation state and a control screen in a case where humidity is 72 percent.

FIG. 74A is a diagram showing a second example of displaying an operation state and a control screen in a case where humidity is 35 percent, and FIG. 74B is a diagram showing a second example of displaying an operation state and a control screen in a case where humidity is 72 percent.

While the operation state image 50203 representing an operation state of the humidifier using text information is displayed in the control target region 50202 in FIGS. 73A and 73B, in FIGS. 74A and 74B, a display mode of the control target region 50202 is changed in accordance with an operation state of the humidifier without displaying the operation state image 50203 in the control target region 50202.

The humidifier icon 50101 is selected when the user taps the humidifier icon 50101 in a display state shown in FIG. 72 and the tap (selection) is sensed by the touch panel control section 102. As a result, as shown in FIG. 74A or 74B, the display control section 103 displays a control screen 50201 of the humidifier on the display 101.

At this point, as shown in FIG. 74A or 74B, the display control section 103 changes a color of the control target region 50202 in accordance with an operation state of the humidifier. For example, when the humidity detected by the humidifier is appropriate, the display control section 103 displays the control target region 50202 in green, and when the humidity detected by the humidifier is high or low, the display control section 103 displays the control target region 50202 in red.

Moreover, in the present embodiment, humidity is assumed to be appropriate when the detected humidity is, for example, higher than 30 percent and lower than 70 percent, humidity is assumed to be low when the detected humidity is, for example, 30 percent or lower, and humidity is assumed to be high when the detected humidity is, for example, 70 percent or higher. These humidity values are simply examples and the determination of appropriate humidity, low humidity, and high humidity are not limited to these humidity values.

In this manner, the communication control section 107 receives humidity around the humidifier as detected by the humidifier. The display control section 103 changes a display mode of a region corresponding to the room in which selection of the humidifier icon 50101 has been sensed in accordance with the received humidity.

An image representing an operation mode of the humidifier is selectably displayed on the control screen 50201. In addition, the humidity detected by the humidifier is displayed on the control screen 50201.

Moreover, while the color of the control target region 50202 is changed in accordance with a humidity value in FIGS. 74A and 74B, the present disclosure is not particularly limited thereto and brightness or density of the control target region 50202 may be changed in accordance with a humidity value.

Figure 75A:
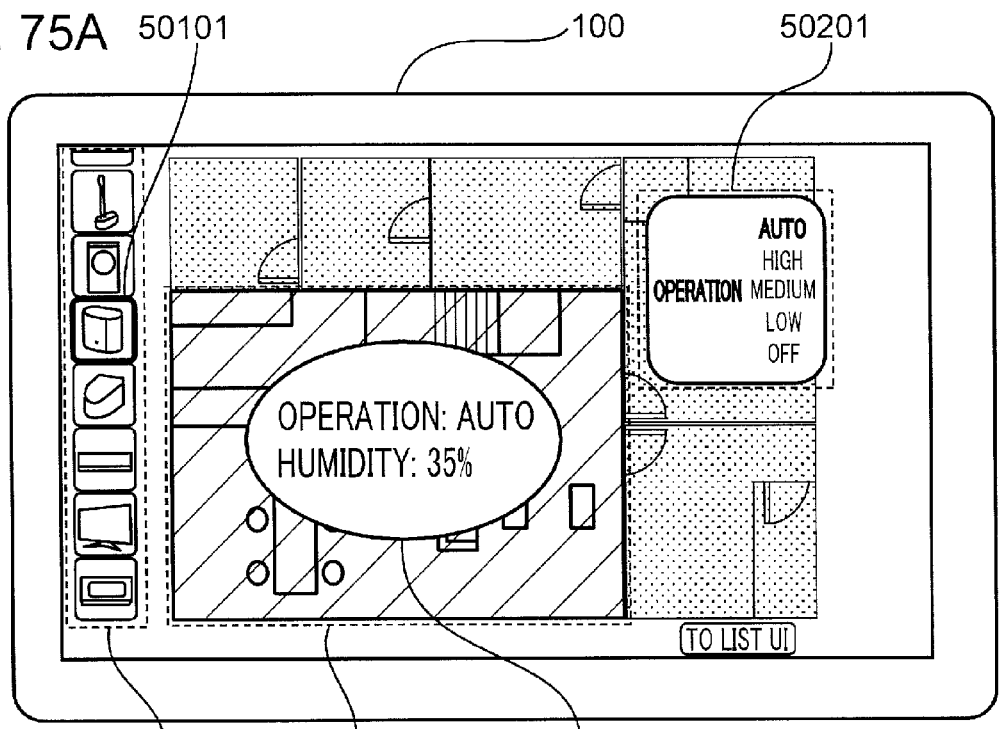
FIG. 75A is a diagram showing a third example of displaying an operation state and a control screen in a case where humidity is 35 percent.
Figure 75B:
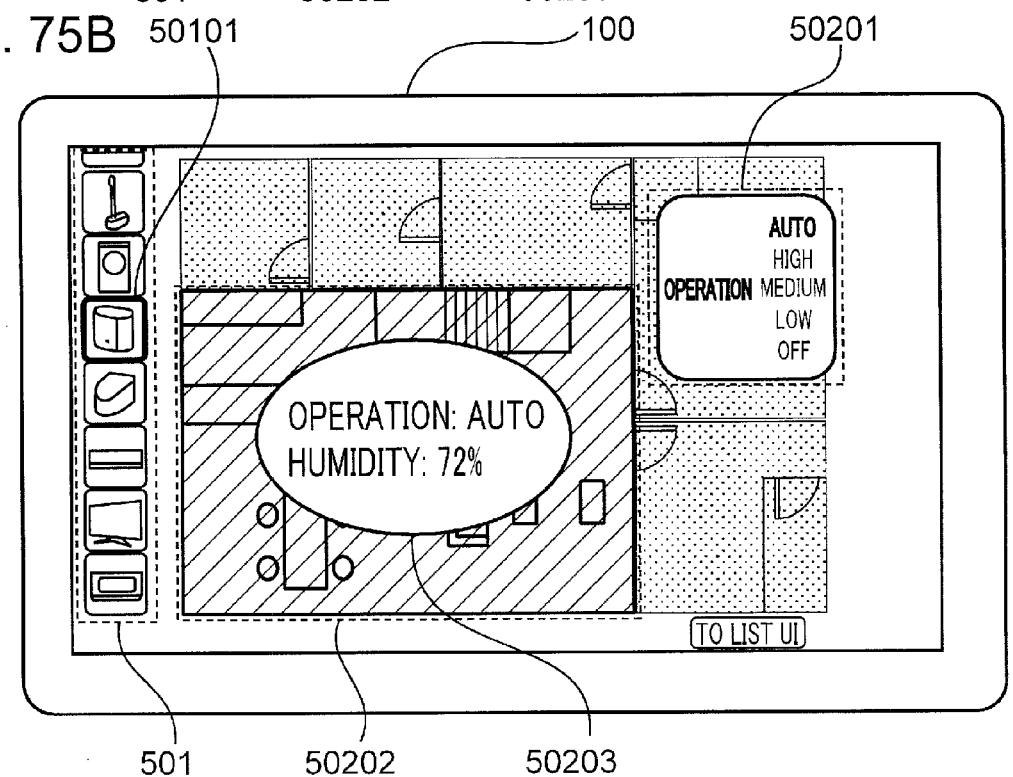
FIG. 75B is a diagram showing a third example of displaying an operation state and a control screen in a case where humidity is 72 percent.

FIG. 75A is a diagram showing a third example of displaying an operation state and a control screen in a case where humidity is 35 percent, and FIG. 75B is a diagram showing a third example of displaying an operation state and a control screen in a case where humidity is 72 percent.

In FIGS. 75A and 75B, the operation state image 50203 is displayed in the control target region 50202 and a display mode of the control target region 50202 is changed in accordance with an operation state of the humidifier.

The humidifier icon 50101 is selected when the user taps the humidifier icon 50101 in a display state shown in FIG. 72 and the tap (selection) is sensed by the touch panel control section 102. As a result, as shown in FIG. 75A or 75B, the display control section 103 displays the control screen 50201 of the humidifier on the display 101.

At this point, as shown in FIG. 75A or 75B, the display control section 103 changes the color of the control target region 50202 in accordance with an operation state of the humidifier and displays the operation state image 50203 representing an operation state of the humidifier so as to overlap with the control target region 50202. For example, when the humidity detected by the humidifier is appropriate, the display control section 103 displays the control target region 50202 in green, and when the humidity detected by the humidifier is low or high, the display control section 103 displays the control target region 50202 in red. In addition, the display control section 103 displays the operation state image 50203 representing the operation mode and the humidity of the humidifier by text information so as to overlap with the control target region 50202.

Figure 76:
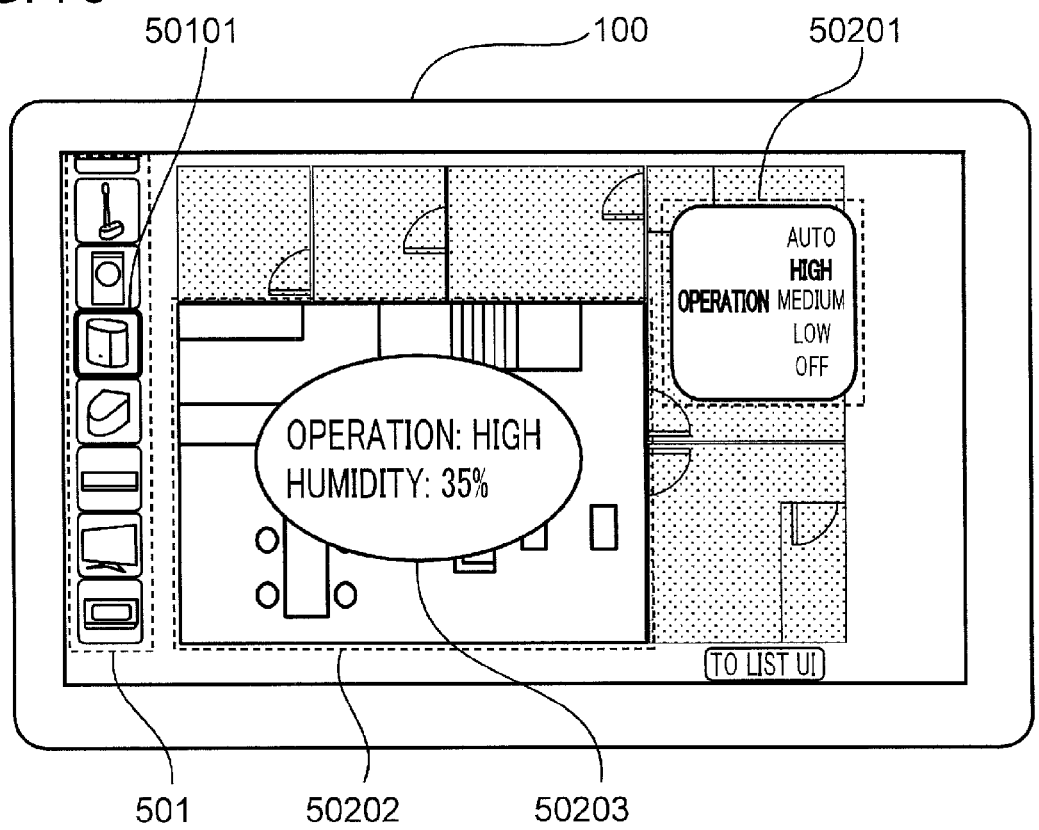
FIG. 76 is a diagram showing an example of displaying an operation state and a control screen in a case where a result of an operation according to a control command is sensed.

FIG. 76 is a diagram showing an example of displaying an operation state and a control screen in a case where a result of an operation according to a control command is sensed.

The display control section 103 senses an operation result according to a control command based on an operation on the control screen 50201 and identifiably displays an operation state of the humidifier reflecting the sensed operation result in a region corresponding to the room in which selection of the humidifier icon 50101 has been sensed.

As shown in FIG. 76, when the operation mode is changed from "auto" to "high" on the control screen 50201, the device control section 106 generates a control command for changing the operation mode from "auto" to "high" and transmits the generated control command to the humidifier. The display control section 103 senses a result of an operation according to the control command based on an operation on the control screen 50201 and displays the operation state image 50203 reflecting the sensed operation result in the control target region 50202. When a control command for changing the operation mode from "auto" to "high" is sensed, the display control section 103 changes the operation mode displayed on the operation state image 50203 from "auto" to "high".

Figure 77:
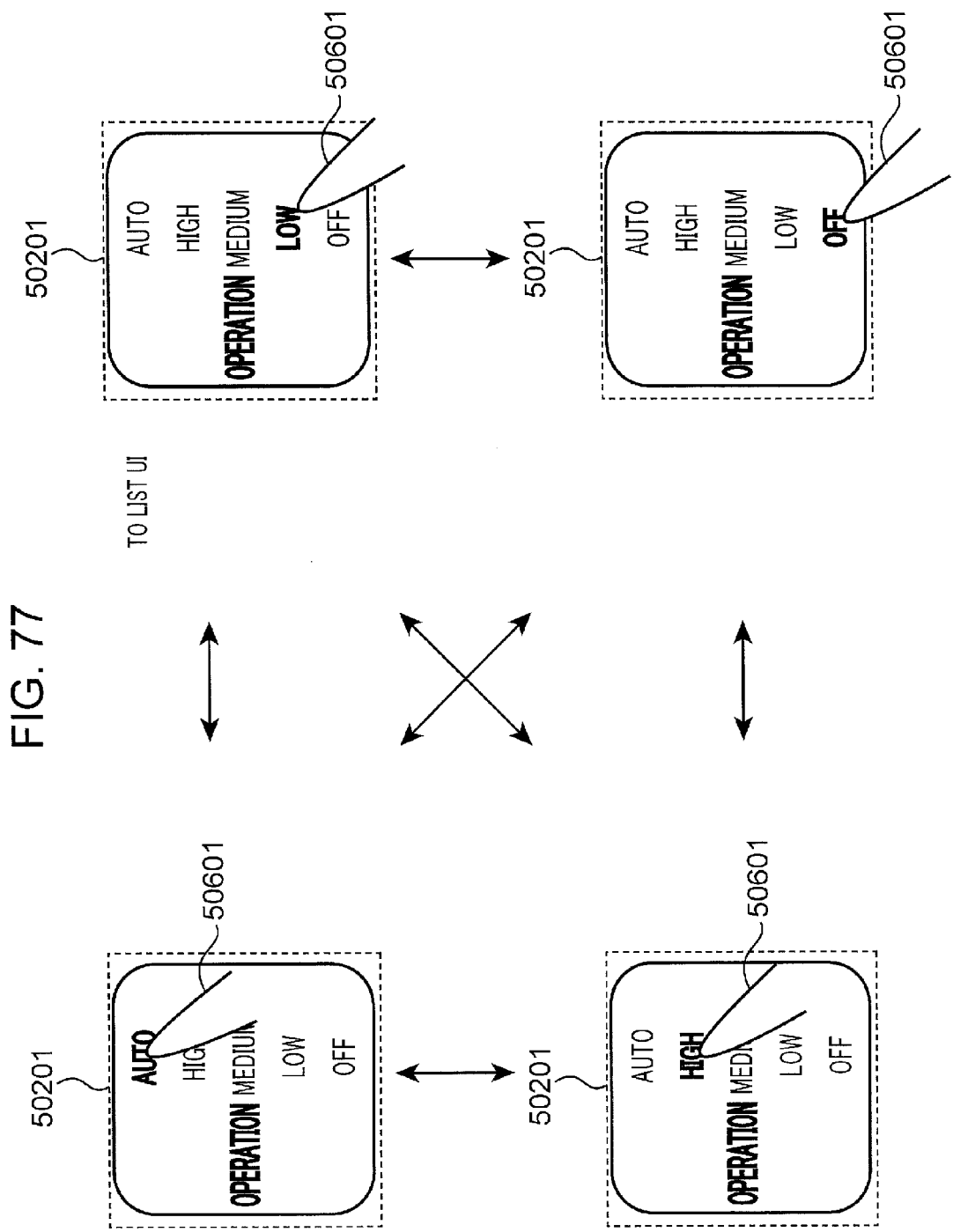
FIG. 77 is a diagram showing an example of an operation by which an operation mode is selected on a control screen.

FIG. 77 is a diagram showing an example of an operation by which an operation mode is selected on a control screen. When an image corresponding to "auto" is tapped by a contacting object 50601 in an upper left diagram in FIG. 77, the display control section 103 displays an image corresponding to "auto" in a mode that differs from a mode in which images corresponding to other operation modes are displayed. For example, the display control section 103 displays the image corresponding to an operation mode selected by the user in red and displays images corresponding to other operation modes in white. Moreover, the contacting object 50601 is, for example, a finger of the user.

Switching between operation modes is performed as the user taps an image corresponding to any of "high", "medium", "low", and "off".

Figure 78:
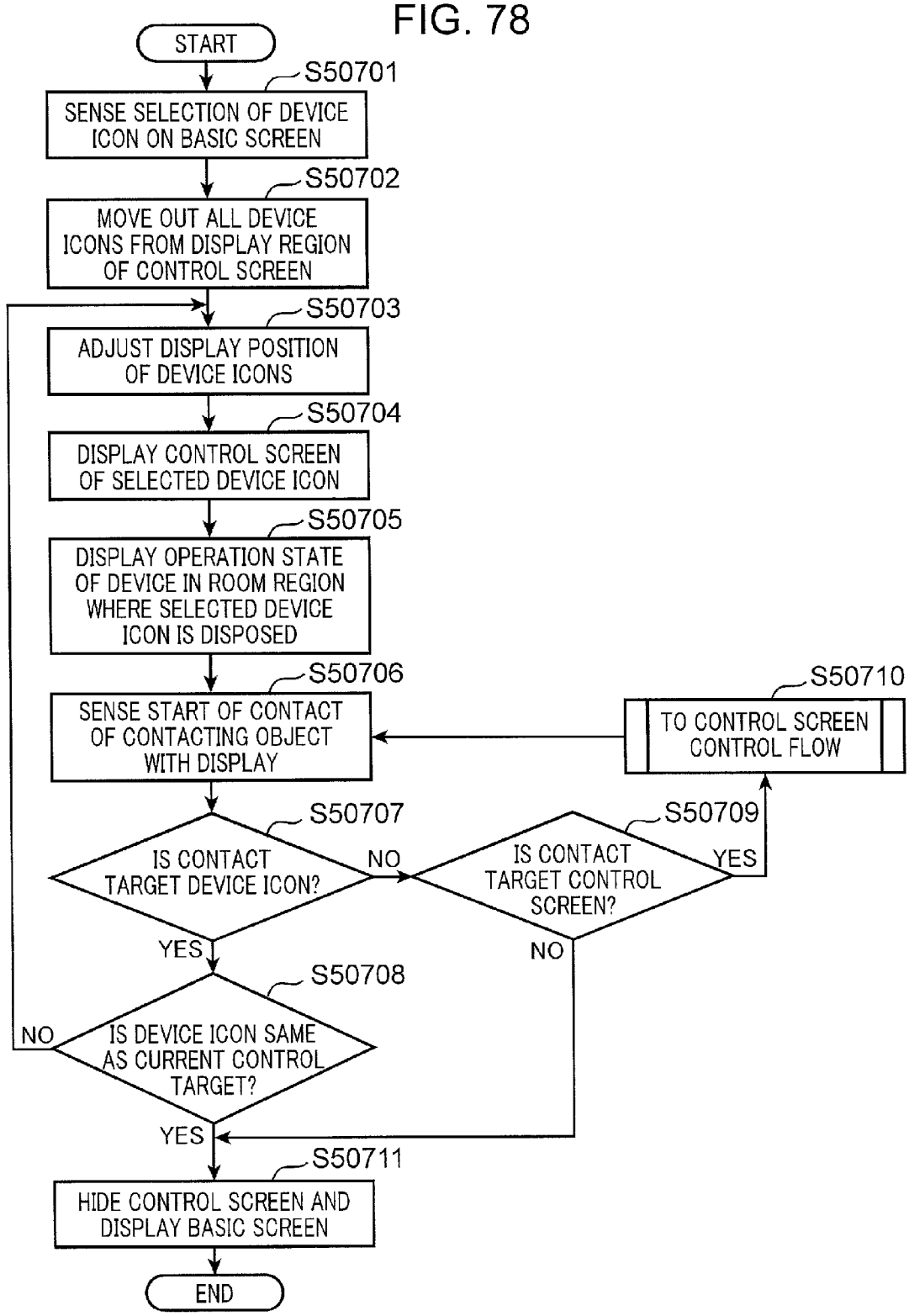
FIG. 78 is a flow chart showing a flow of a process for the home controller to control devices including a humidifier.

FIG. 78 is a flow chart showing a flow of a process for the home controller 100 to control devices 200 including a humidifier. In the process shown in FIG. 78, a control screen and an operation state are displayed on the display 101.

The process performed in S50701 to S50703 is approximately similar to the process performed in S3501 to S3503 in FIG. 39A. Specifically, the touch panel control section 102 senses that a device icon corresponding to a humidifier has been selected by the user on the basic screen (S50701). Next, the display control section 103 moves all device icons 501 out of the display region of the control screen (S50702). The display control section 103 then adjusts display positions of the moved device icons 501 (S50703).

Next, the display control section 103 displays the control screen 50201 of the selected device icon 501 (S50704). For example, when selection of the humidifier icon 50101 is sensed, the display control section 103 displays the control screen 50201 for operating a humidifier corresponding to the selected humidifier icon 50101 on the display 101 so as to avoid a region corresponding to a room in which the selection of the humidifier icon 50101 had been sensed and to overlap with the display screen.

Next, the display control section 103 displays an operation state of the device 200 corresponding to the selected device icon 501 in a room region in which the selected device icon 501 is disposed (S50705). For example, based on an operation performed on the control screen 50201, the display control section 103 identifiably displays an operation state of the humidifier in a region (the control target region 50202) corresponding to a room in which selection of the humidifier icon 50101 has been sensed.

In S50706, when a start of contact made by the contacting object 50601 with the display 101 is sensed by the touch panel control section 102, the touch panel control section 102 determines whether or not a contact target is the device icon 501 (S50707).

When the touch panel control section 102 determines that the contact is with the device icon 501 (YES in S50707), the touch panel control section 102 determines whether or not the contacting object 50601 has made contact with the same device icon as that selected in S50701 (S50708). If not the same device icon (NO in S50708), the process returns to S50703. On the other hand, when it is determined that the contacting object 50601 has made contact with the same device icon as that selected in S50701 (YES in S50708), the display control section 103 hides the currently displayed control screen 50201 and displays the basic screen on the display 101 (S50711) to finish the present flow.

In addition, when the touch panel control section 102 determines in S50707 that the contact is not with the device icon 501 (NO in S50707), the touch panel control section 102 further determines whether or not the contact target is the control screen 50201 (S50709). When it is determined that the contact target is not the control screen 50201 (NO in S50709), the process is advanced to S50711.

On the other hand, when the touch panel control section 102 determines that the contacting object 50601 has made contact with an image representing an operation mode or the like in the control screen 50201 (YES in S50709), the process is advanced to the control flow (FIG. 79) of the control screen (S50710) and the process subsequently returns to S50706.

Figure 79:
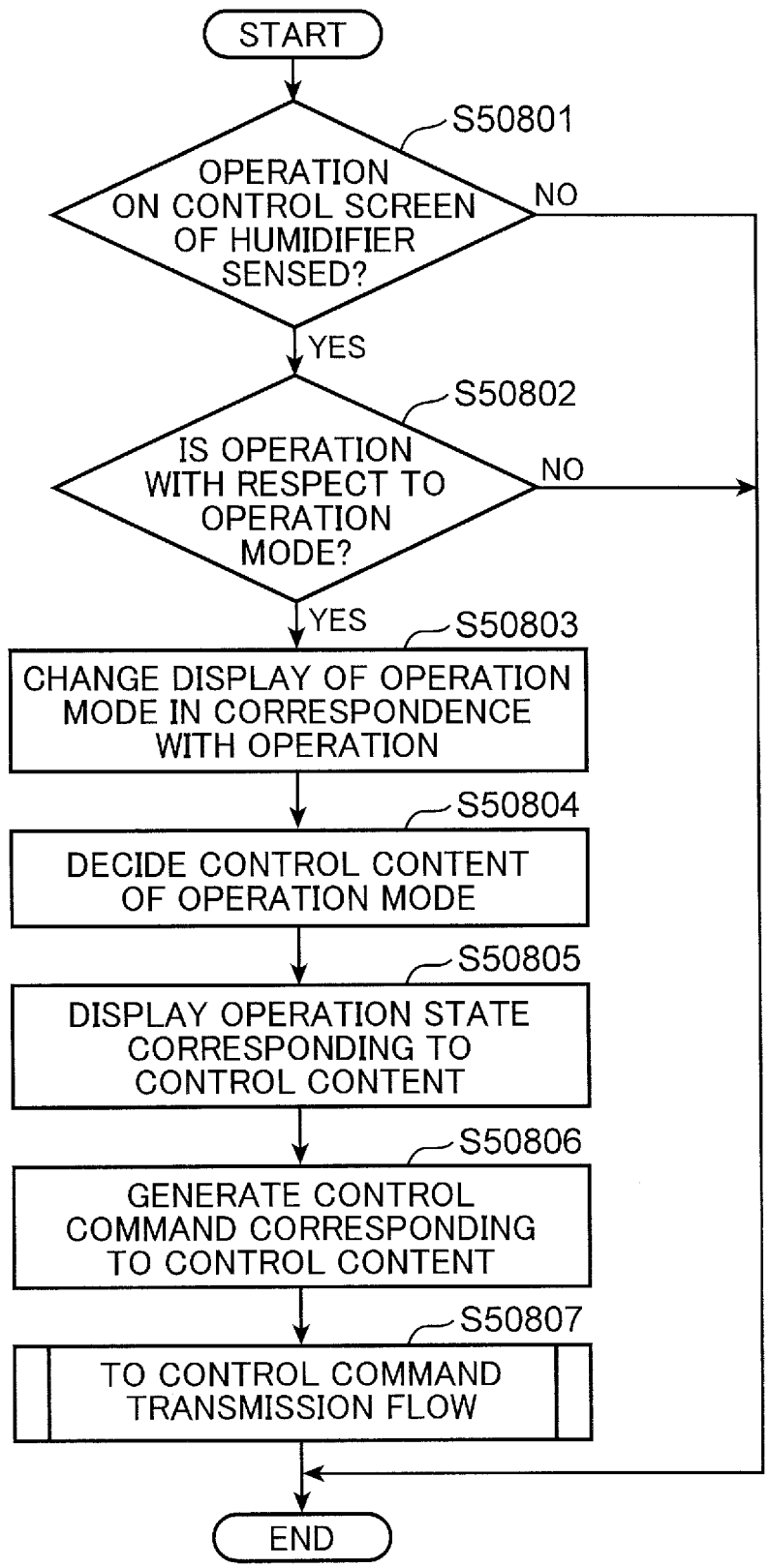
FIG. 79 is a flow chart showing a flow of a process for the home controller to generate a control command of a humidifier in accordance with the content of a contact made by a contacting object.

FIG. 79 is a flow chart showing a flow of a process for the home controller 100 to generate a control command of a humidifier in accordance with the content of a contact made by the contacting object 50601.

First, the touch panel control section 102 determines whether or not an operation on the control screen 50201 of the humidifier has been sensed (S50801). When an operation on the control screen 50201 of the humidifier is not sensed (NO in S50801), the present flow is finished.

On the other hand, when the touch panel control section 102 senses an operation on the control screen 50201 of the humidifier in S50801 (YES in S50801), the touch panel control section 102 determines whether or not the operation on the control screen 50201 of the humidifier is an operation with respect to the operation mode (S50802). When it is determined that the operation is not an operation with respect to the operation mode (NO in S50802), the present flow is finished.

On the other hand, when it is determined that the operation is an operation with respect to the operation mode (YES in S50802), the display control section 103 changes the display of the operation mode of the control screen 50201 in correspondence with the operation on the control screen 50201 (S50803). Next, the device control section 106 decides a content of control for changing the operation mode in correspondence with the operation on the control screen 50201 (S50804) and the process is advanced to S50805.

In S50805, the display control section 103 displays an operation state corresponding to the decided control content in the control target region 50202. For example, when the operation mode has been changed, the display control section 103 changes the display of the current operation mode of the operation state image 50203 in the control target region 50202.

Next, the device control section 106 generates a control command corresponding to the decided control content (S50806). For example, let us assume that the user has tapped a desired operation mode in a state where the control screen 50201 of the humidifier is displayed and that the touch panel control section 102 senses the tap. Accordingly, the device control section 106 generates a control command for changing the operation mode of the humidifier. Next, the device control section 106 advances the process to S50807 and executes a control command transmission flow.

Figure 41:
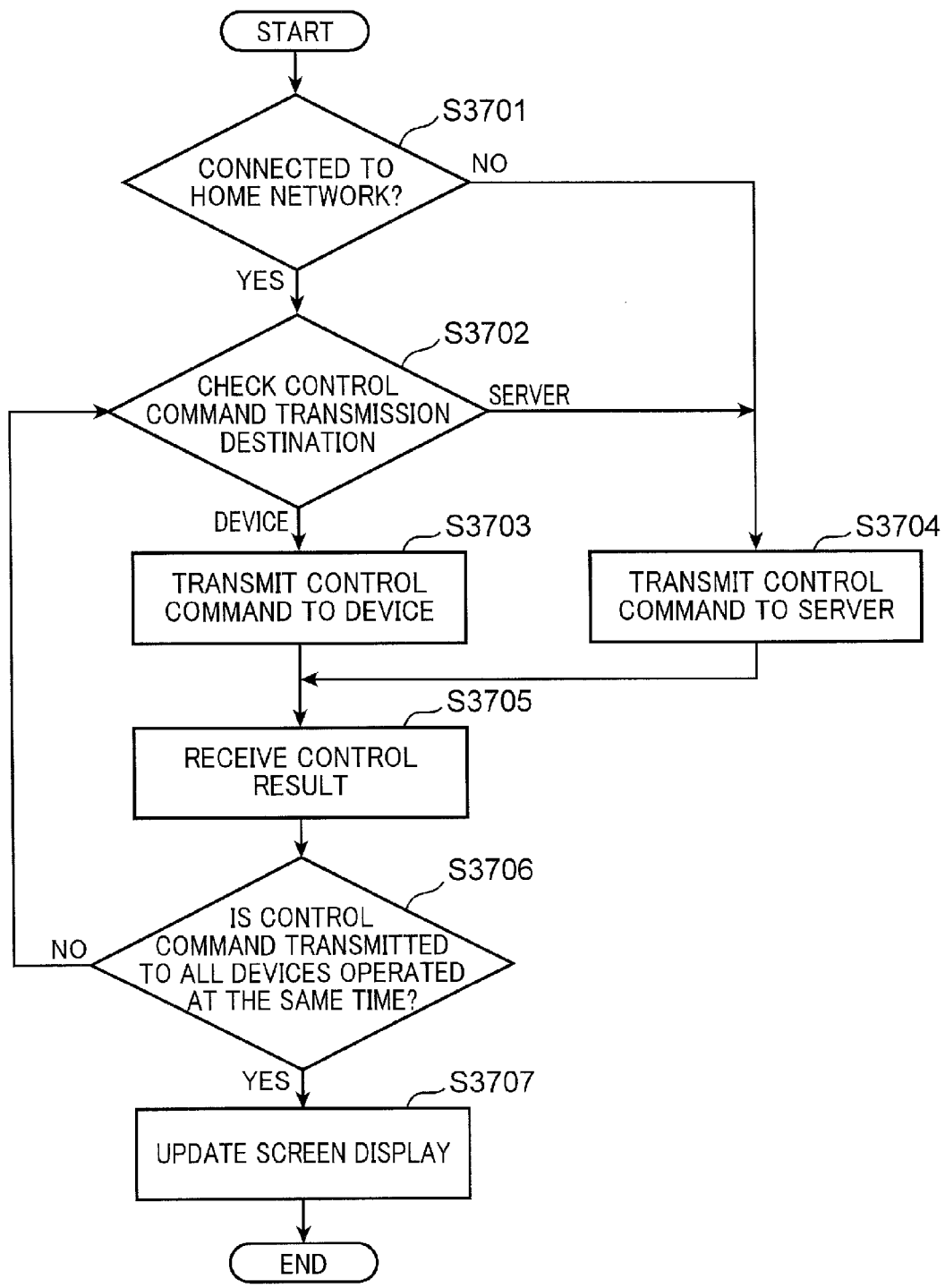
FIG. 41 is a flowchart showing the flow of a process for the home controller to transmit a control command according to the present disclosure.

The control command transmission flow in S50807 is executed in a similar process flow as that shown in the flow chart in FIG. 41. Moreover, in the control of a humidifier, the device that is a control command transmission destination in S3702 and S3703 in FIG. 41 corresponds to the humidifier corresponding to the selected humidifier icon. In addition, in the control of a humidifier, the simultaneously operated devices in S3706 in FIG. 41 correspond to, for example, humidifiers in a plurality of rooms corresponding to humidifier icons that are used in common.

(Display of Effect Range of Humidifier: 1)

FIG. 80A is a diagram showing an example of displaying an effect range and a control screen in a case where an operation mode of a humidifier is set to "auto", FIG. 80B is a diagram showing an example of displaying an effect range and a control screen in a case where the operation mode of the humidifier is set to "low", FIG. 80C is a diagram showing an example of displaying an effect range and a control screen in a case where the operation mode of the humidifier is set to "high", and FIG. 80D is a diagram showing an example of displaying an effect range and a control screen in a case where the operation mode of the humidifier is set to "off".

As shown in FIG. 80A, instead of displaying an operation state in the control target region 50202, the display control section 103 may display an effect range 50901 in which an effect of an operation by the humidifier in accordance with an operation on the control screen 50201 extends in the control target region 50202.

In FIG. 80A, the operation mode of the humidifier is set to "auto" and the effect range 50901 with a size corresponding to a current air flow amount of the humidifier is displayed. Moreover, the effect range 50901 shown in FIG. 80A represents an effect range in a case where the current air flow amount of the humidifier is "medium".

The storage section 104 may store, in advance, images representing a plurality of effect ranges with sizes that differ from one another in accordance with the air flow amount of the humidifier, and the display control section 103 may read an image representing an effect range with a size in accordance with the air flow amount of the humidifier from the storage section 104 and display the read image representing an effect range at a position of the humidifier icon 50101 in the control target region 50202. In addition, the storage section 104 may store sizes of effect ranges in accordance with the air flow amount of the humidifier, and the display control section 103 may read an effect range size in accordance with the air flow amount of the humidifier from the storage section 104 and draw and display an image representing an effect range in correspondence with the read effect range size.

Moreover, the effect range 50901 changes in accordance with set contents that are set based on an operation on the control screen 50201. As shown in FIGS. 80B and 80C, the size of the effect range 50901 in a case where the operation mode of the humidifier is set to "low" is smaller than the size of the effect range 50901 in a case where the operation mode of the humidifier is set to "high". In addition, as shown in FIG. 80D, when the operation mode of the humidifier is set to "off", since the humidifier does not operate, the display control section 103 does not display the effect range 50901.

As described above, the effect range 50901 becomes wider in a case where the humidifier is set to operate in a stronger operation state than a current operation state based on an operation on the control screen 50201 and becomes narrower in a case where the humidifier is set to operate in a weaker operation state than the current operation state based on an operation on the control screen 50201.

In addition, a shape of the effect range 50901 is a circular shape about the position of the humidifier icon 50101. In this case, the display control section 103 may display the humidifier icon 50101 at a position corresponding to the position where the humidifier is disposed in the control target region 50202 or may not display the humidifier icon 50101 at a position corresponding to the position where the humidifier is disposed in the control target region 50202.

Furthermore, the effect range 50901 is displayed in a color that differs from the color of the control target region 50202. In addition, the effect range 50901 may be displayed in a brightness that differs from the brightness of the control target region 50202, and the effect range 50901 may be displayed in a density that differs from the density of the control target region 50202.

Moreover, the effect range 50901 may identifiably display a direction in which the humidifier outputs air. Specifically, the shape of the effect range 50901 may be an elliptical shape and a major axis direction of the ellipse may be consistent with the direction in which the humidifier outputs humidified air. In addition, the effect range 50901 may be displayed so that a position of the humidifier icon 50101 is in a vicinity of an outer periphery of the effect range 50901.

Moreover, an orientation of the effect range 50901 may be changed by changing an orientation of the humidifier icon 50101. When it is sensed that the humidifier icon 50101 has been dragged and an orientation of the front of the humidifier icon 50101 has been changed, the effect range 50901 may be changed. When the touch panel control section 102 senses that the humidifier icon 50101 has been dragged and an orientation of the front of the humidifier icon 50101 has been changed, the display control section 103 may change the effect range 50901 in accordance with the orientation of the front of the humidifier icon 50101.

In this manner, by changing an orientation of the effect range 50901 in accordance with a change in an orientation of the humidifier icon 50101, an effect range when an orientation of the humidifier is actually changed can be confirmed.

Moreover, the humidifier may include a display section that displays humidity in a plurality of stages.

Figure 81:
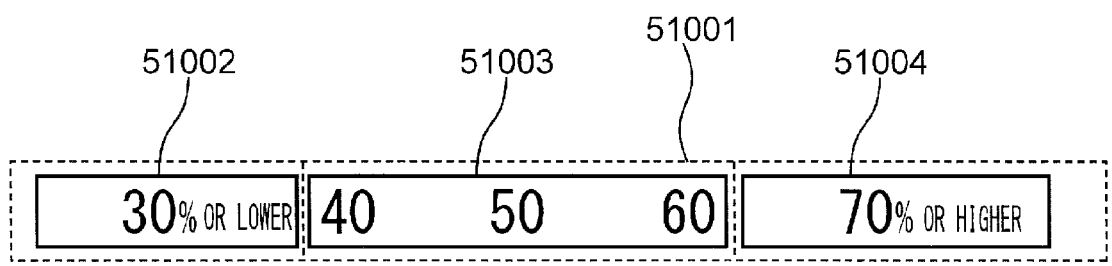
FIG. 81 is a diagram showing a display example of a display section of a humidifier that displays humidity in a plurality of stages.

FIG. 81 is a diagram showing a display example of a display section of a humidifier that displays humidity in a plurality of stages.

As shown in FIG. 81, a display section 51001 of the humidifier displays humidity in stages. Moreover, the humidity is detected by the humidifier. The display section 51001 includes a first display region 51002 representing humidity that is equal to or lower than a first humidity, a second display region 51003 representing humidity that is higher than the first humidity and lower than a second humidity, and a third display region 51004 representing humidity that is equal to or higher than the second humidity. For example, the first humidity is set to 30 percent and the second humidity is set to 70 percent.

When the current humidity is equal to or lower than 30 percent or, in other words, when the current humidity is low, a luminescent color of the first display region 51002 of the display section 51001 is set to red as shown in FIG. 81.

In addition, when the current humidity is higher than 30 percent and lower than 70 percent or, in other words, when the current humidity is appropriate, a luminescent color of the second display region 51003 of the display section 51001 is set to green as shown in FIG. 81.

Furthermore, when the current humidity is equal to or lower than 70 percent or, in other words, when the current humidity is high, a luminescent color of the third display region 51004 of the display section 51001 is set to red as shown in FIG. 81.

Moreover, a display mode of the display section 51001 is not limited to the above. In addition, the humidifier may not include the display section 51001 and may include a detecting section that detects humidity in a plurality of stages. Furthermore, the display section 51001 may display current humidity by a numerical value.

Figure 82B:
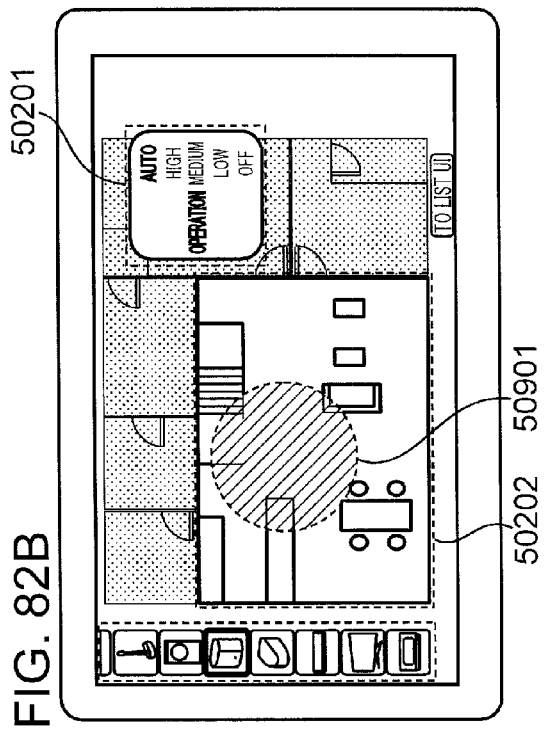
FIG. 82B is a diagram showing a display example of an effect range displayed on a display of a home controller in a case where humidity is higher than the first humidity and lower than a second humidity.
Figure 82A:
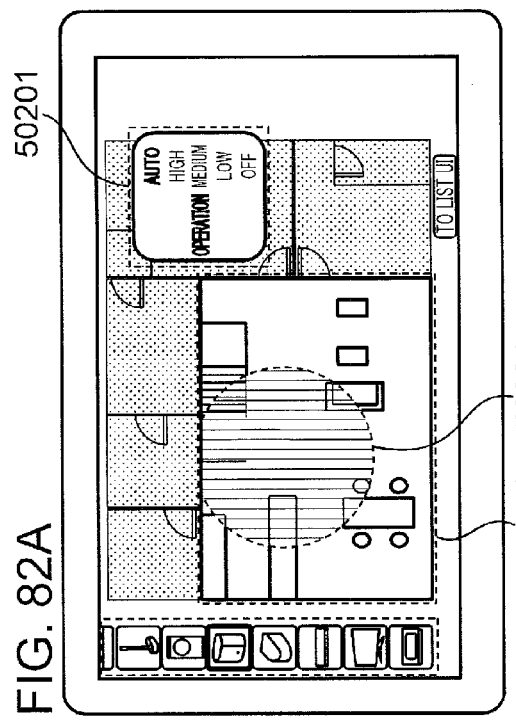
FIG. 82A is a diagram showing a display example of an effect range displayed on a display of a home controller in a case where humidity is equal to or lower than a first humidity.
Figure 82C:
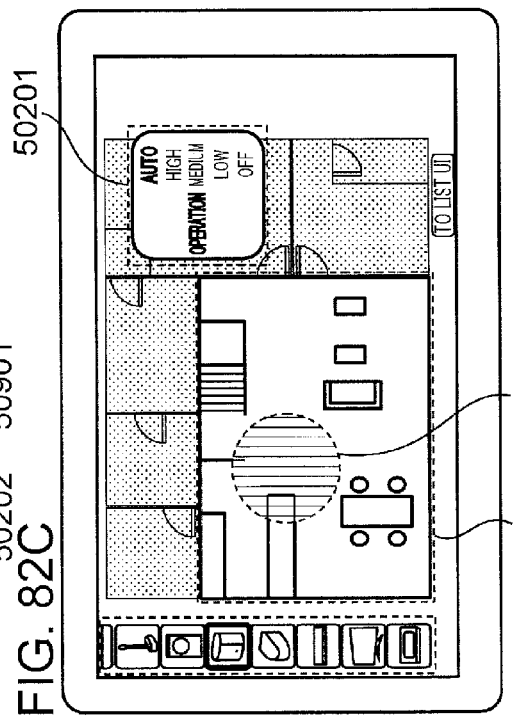
FIG. 82C is a diagram showing a display example of an effect range displayed on a display of a home controller in a case where humidity is higher than the second humidity.

FIG. 82A is a diagram showing a display example of an effect range displayed on a display of a home controller in a case where humidity is equal to or lower than a first humidity, FIG. 82B is a diagram showing a display example of an effect range displayed on a display of a home controller in a case where humidity is higher than the first humidity and lower than a second humidity, and FIG. 82C is a diagram showing a display example of an effect range displayed on a display of a home controller in a case where humidity is higher than the second humidity.

The communication control section 107 receives humidity around the humidifier as detected by the humidifier. The display control section 103 changes the display of the effect range 50901 in correspondence with the received humidity. For example, the display control section 103 changes a color, a pattern, density, or a size of the effect range 50901 in correspondence with the humidity. Moreover, the humidity is detected by the humidifier and a detection result is transmitted to the home controller 100. The home controller 100 receives the humidity detected by the humidifier.

When the humidity is equal to or lower than the first humidity or, in other words, when the humidity is low, as shown in FIG. 82A, the effect range 50901 is displayed in red. In addition, since the operation mode is automatic, the humidified air flow amount is increased and the effect range 50901 is displayed in a first size corresponding to the air flow amount.

In addition, when the humidity is higher than the first humidity and lower than the second humidity or, in other words, when the humidity is appropriate, as shown in FIG. 82B, the effect range 50901 is displayed in green. In addition, since the operation mode is automatic, the humidified air flow amount is set to a moderate level and the effect range 50901 is displayed in a second size that is smaller than the first size in correspondence with the air flow amount.

Furthermore, when the humidity is higher than the second humidity or, in other words, when the humidity is high, as shown in FIG. 82C, the effect range 50901 is displayed in red. In addition, since the operation mode is automatic, the humidified air flow amount is reduced and the effect range 50901 is displayed in a third size that is smaller than the second size in correspondence with the air flow amount.

In this manner, due to the display mode of the effect range being changed in accordance with the humidity around the humidifier, the humidity around the humidifier can be readily confirmed.

Moreover, the user may move the humidifier icon 50101 on the floor plan. The device icon (the humidifier icon 50101) may be moved by being dragged after a contact made by the contacting object 50601 with the display 101 is sensed at a position corresponding to the device icon.

First, the humidifier icon 50101 is displayed by the display control section 103 on the display 101 in the control target region 50202 of the humidifier. In this display state, the touch panel control section 102 senses that the contacting object 50601 makes contact with the humidifier icon 50101 and a contact position between the contacting object 50601 and the display 101 moves in a prescribed direction without separation of the contacting object 50601 from the display 101. In this case, the display control section 103 moves the humidifier icon 50101 to be displayed on the display 101 in accordance with a movement of the contacting object 50601. In addition, the touch panel control section 102 senses that the contacting object 50601 has been separated from the humidifier icon 50101.

When a drag and drop of the humidifier icon 50101 is sensed, the display control section 103 displays the control screen 50201 on the display 101 and displays the effect range 50901 in which an effect of an operation by the humidifier in accordance with an operation on the control screen 50201 extends in the control target region 50202.

As described above, when the humidifier icon 50101 is moved, the display control section 103 may display the effect range 50901 using a position of the humidifier icon 50101 after the movement as a reference point. For example, the display control section 103 may display the effect range 50901 to be centered on the position of the humidifier icon 50101 after the movement.

In this manner, since the humidifier icon 50101 is moved and the effect range 50901 is displayed based on the position of the humidifier icon 50101 after movement, a simulation of the effect range of the humidifier after movement can be performed without actually moving the humidifier.

Moreover, the humidifier icon 50101 prior to movement and the humidifier icon 50101 after the movement may exist in the same room (control target region). Alternatively, the humidifier icon 50101 prior to the movement and the humidifier icon 50101 after the movement may exist in different rooms.

First, the humidifier icon 50101 is displayed by the display control section 103 on the display 101 in a first room. In this display state, the touch panel control section 102 senses that the contacting object 50601 makes contact with the humidifier icon 50101 and a contact position between the contacting object 50601 and the display 101 moves into a second room that differs from the first room without separation of the contacting object 50601 from the display 101. In this case, the display control section 103 moves the humidifier icon 50101 to be displayed on the display 101 in accordance with a movement of the contacting object 50601. In addition, the touch panel control section 102 senses separation of the contacting object 50601 from the humidifier icon 50101 in a region corresponding to the second room.

When a drag and drop of the humidifier icon 50101 is sensed, the display control section 103 displays the control screen 50201 on the display 101 and displays the effect range 50901 in which an effect of an operation by the humidifier in accordance with an operation on the control screen 50201 extends in the control target region corresponding to the second room.

In this manner, the humidifier icon 50101 can be moved not only within a region corresponding to a single room but can also be moved from inside a region corresponding to the first room to inside a region corresponding to the second room. Therefore, a simulation of an effect range of the humidifier when the humidifier is moved from the first room to the second room can be performed without actually moving the humidifier.

Next, an example of displaying a message related to the humidifier in the control target region will be described.

Figure 83:
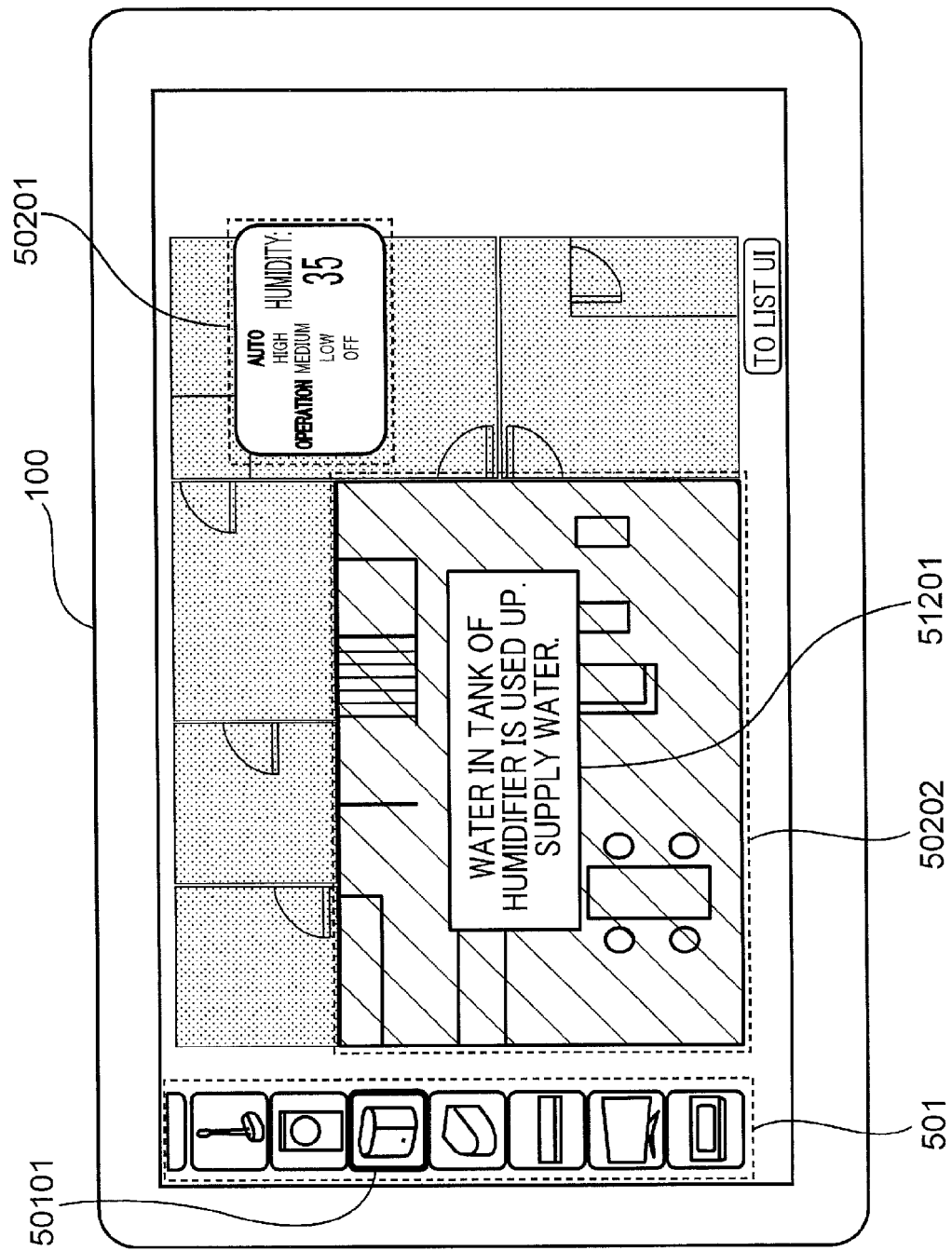
FIG. 83 is a diagram showing an example of a control target region including a message.

FIG. 83 is a diagram showing an example of a control target region including a message. As shown in FIG. 83, a message 51201 related to the humidifier is displayed on the control target region 50202. For example, when water in a tank provided in the humidifier is used up and water must be supplied, a text reading "WATER IN TANK OF HUMIDIFIER IS USED UP. SUPPLY WATER." is displayed as the message 51201.

When it is sensed that the water in the tank included in the humidifier is used up, the communication control section 107 receives a message to the effect that water must be supplied from the network. In addition, the display control section 103 causes a message 51201 to the effect that water must be supplied to the tank included in the humidifier to be displayed in the control target region 50202.

Next, an example of displaying a message related to the humidifier on the control screen will be described.

Figure 84:
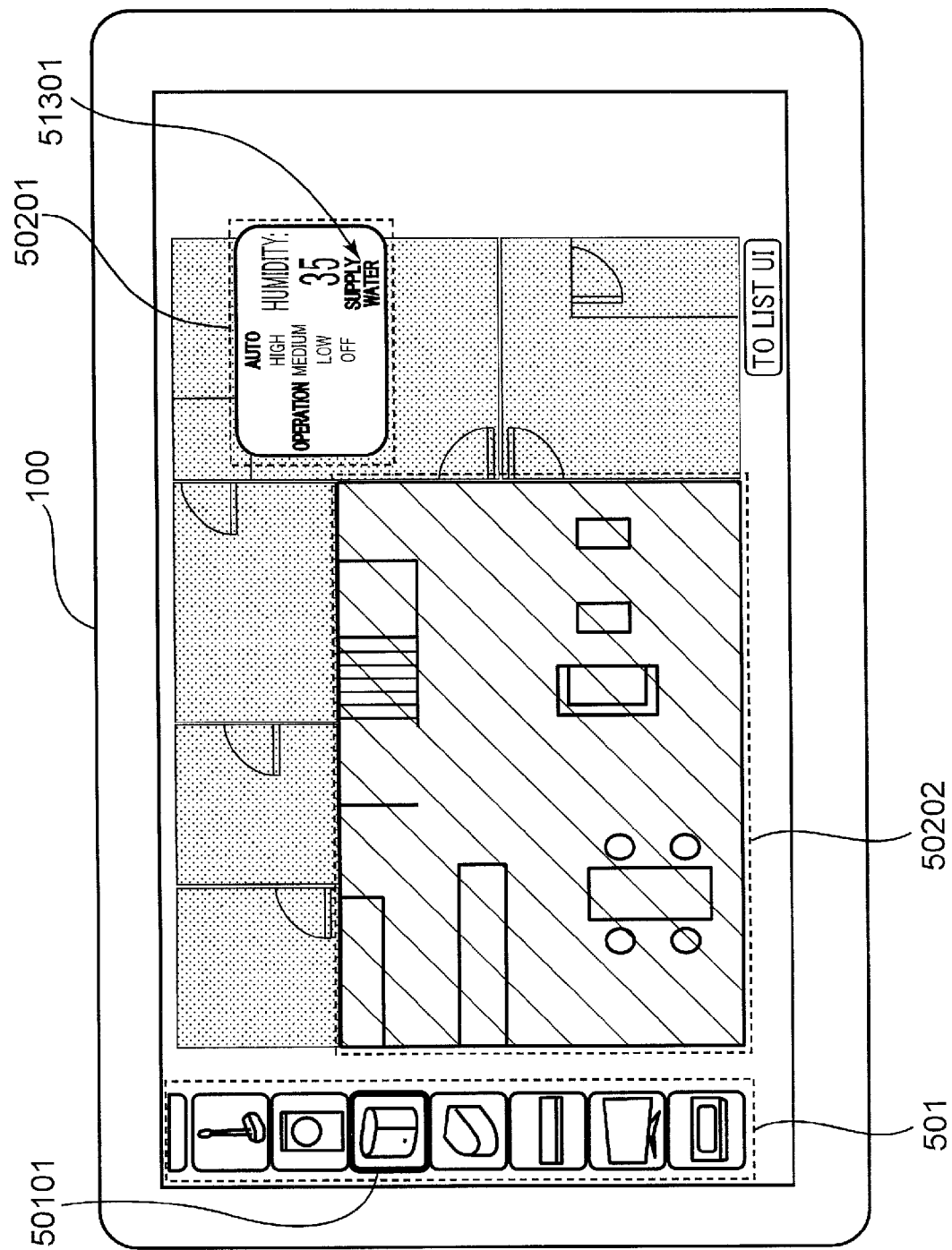
FIG. 84 is a diagram showing an example of a control screen including a message.

FIG. 84 is a diagram showing an example of a control screen including a message. As shown in FIG. 84, the control screen 50201 includes a message 51301 related to the humidifier in addition to an operation mode image for accepting an operation by the user. For example, when water in a tank provided in the humidifier is used up and water must be supplied, "SUPPLY WATER" is displayed as the message 51301.

When it is sensed that the water in the tank included in the humidifier is used up, the communication control section 107 receives a message to the effect that water must be supplied from the network. In addition, the display control section 103 causes a control screen 50201 including a message 51301 to the effect that water must be supplied to the tank included in the humidifier to be displayed.

Moreover, in addition to displaying a text prompting the user to supply water to the tank as a message, the display control section 103 may display other matters to be notified to the user as a message.

An example of displaying another message related to the humidifier in the control target region will now be described.

Figure 85:
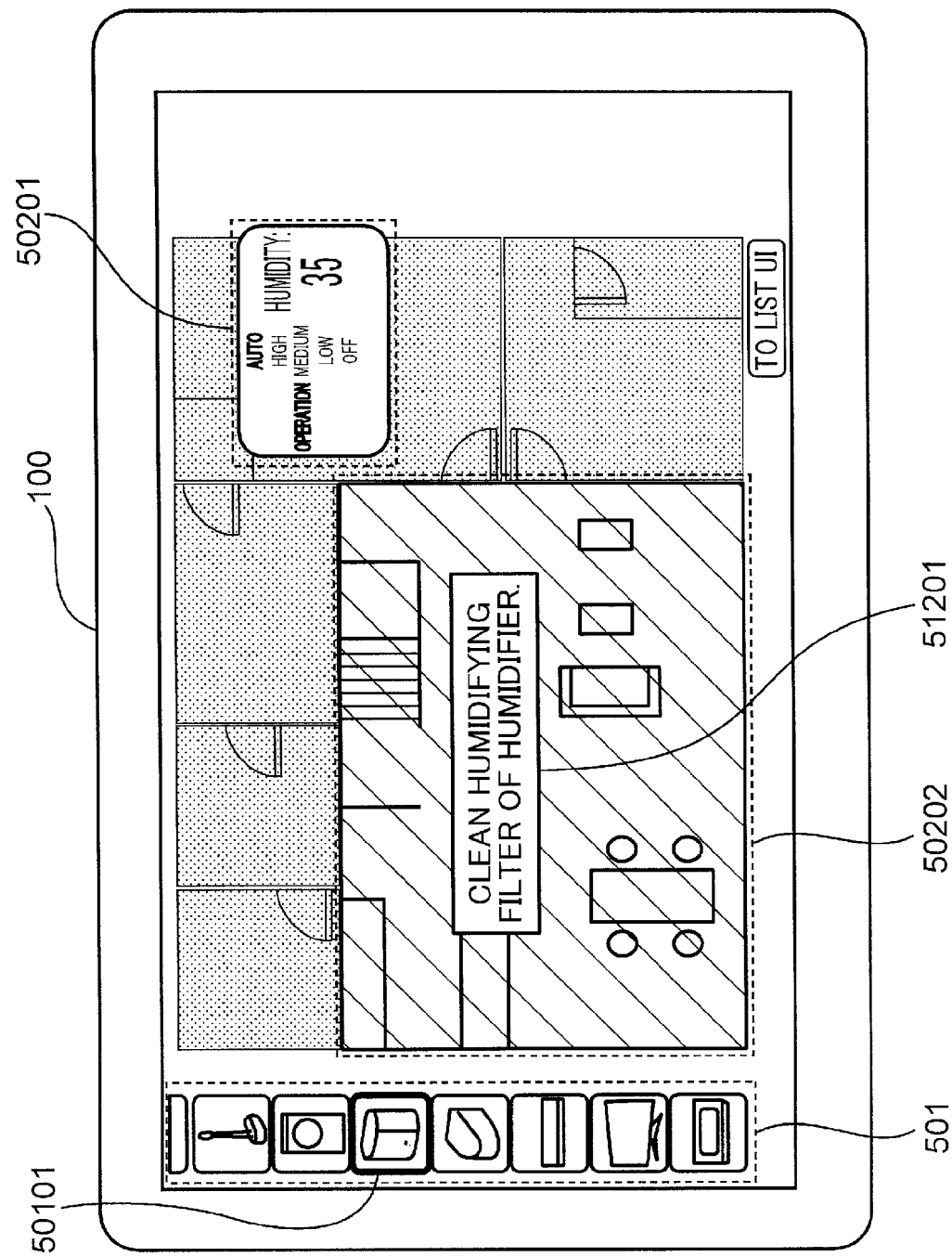
FIG. 85 is a diagram showing an example of a control target region including another message.

FIG. 85 is a diagram showing an example of a control target region including another message. As shown in FIG. 85, a message 51201 related to the humidifier is displayed on the control target region 50202. For example, when a humidifying filter provided in the humidifier must be cleaned, "CLEAN HUMIDIFYING FILTER OF HUMIDIFIER." is displayed as the message 51201.

When it is sensed that the humidifying filter provided in the humidifier must be cleaned, the communication control section 107 receives a notification to the effect that the humidifying filter must be cleaned from the network. In addition, the display control section 103 causes a message 51201 to the effect that the humidifying filter provided in the humidifier must be cleaned to be displayed in the control target region 50202.

Next, an example of displaying another message related to the humidifier on the control screen will be described.

Figure 86:
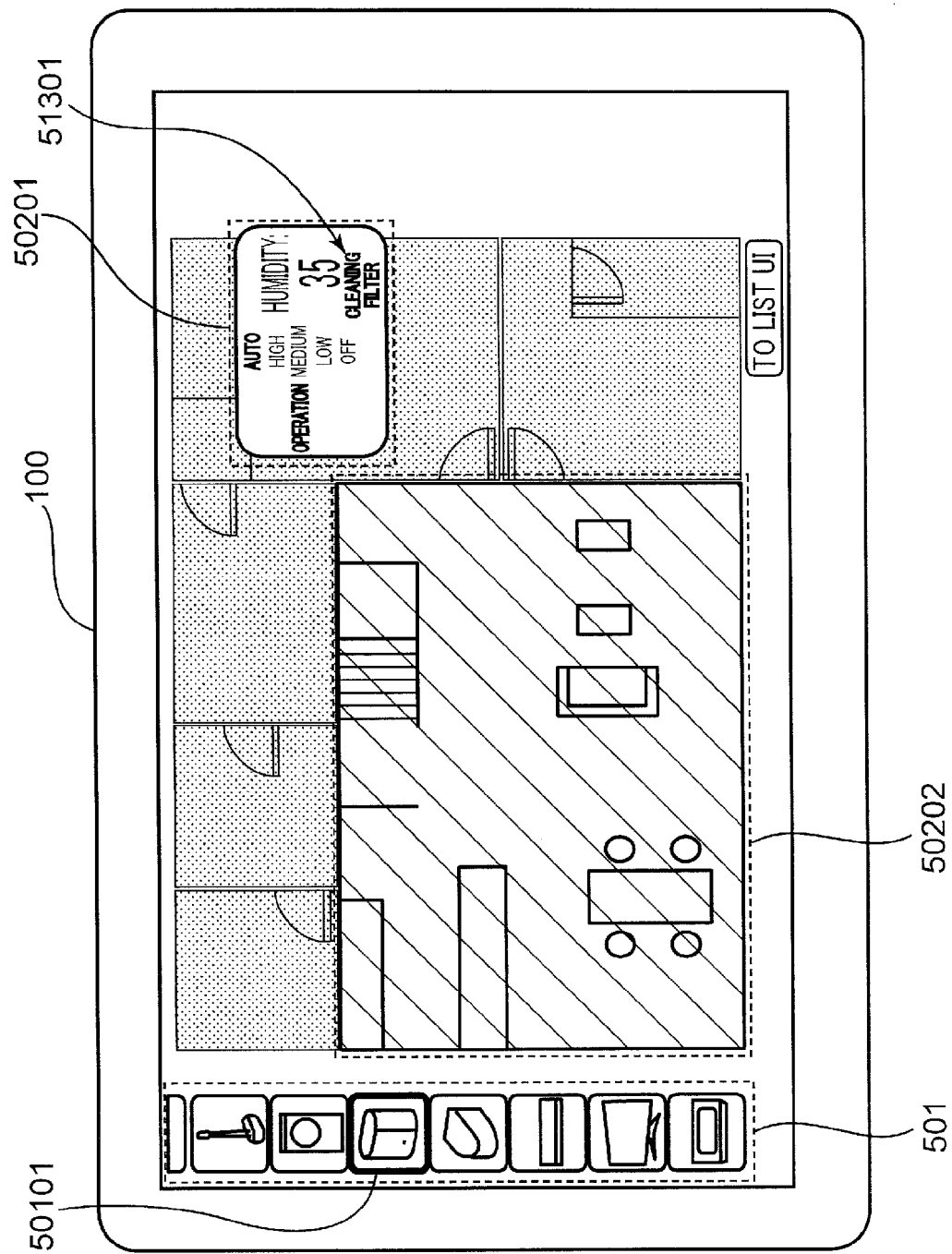
FIG. 86 is a diagram showing an example of a control screen including another message.

FIG. 86 is a diagram showing an example of a control screen including another message. As shown in FIG. 86, the control screen 50201 includes a message 51301 related to the humidifier in addition to an operation mode image for accepting an operation by the user. For example, when a humidifying filter provided in the humidifier must be cleaned, "CLEANING FILTER" is displayed as the message 51301.

When it is sensed that the humidifying filter provided in the humidifier must be cleaned, the communication control section 107 receives a notification to the effect that the humidifying filter must be cleaned from the network. In addition, the display control section 103 causes the control screen 50201 including a message 51301 to the effect that the humidifying filter provided in the humidifier must be cleaned to be displayed.

Moreover, the messages 51201 and 51301 may be displayed by scrolling texts. Alternatively, the messages 51201 and 51301 need not necessarily be texts.

Figure 87:
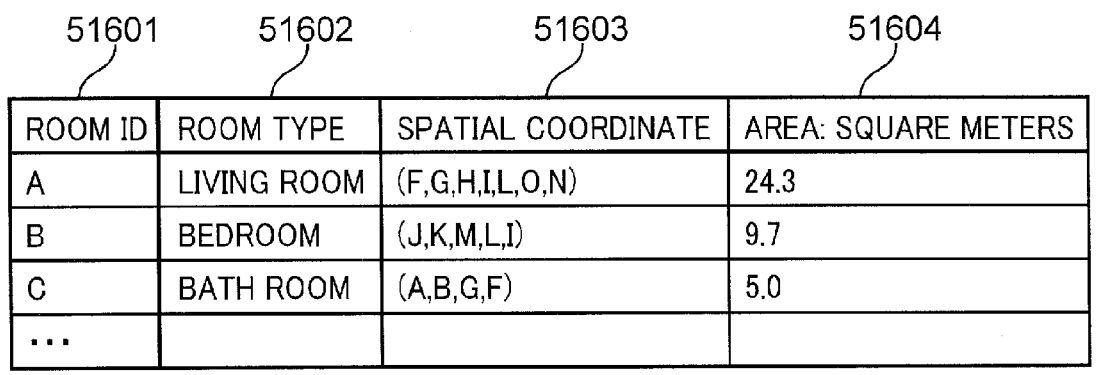
FIG. 87 is a diagram showing another configuration of room information.

Next, room information will be described. FIG. 87 is a diagram showing another configuration of room information. While room information has already been described with reference to FIG. 32, home information 2700 may include room information 51600 shown in FIG. 87.

As shown in FIG. 87, the room information 51600 includes a room ID 51601, a room type 51602, a room coordinate 51603, and an area 51604. The room ID 51601 is an identifier for identifying a room on the floor plan 500. The room type 51602 indicates a type of the room. The room coordinate 51603 is expressed by a set of vertex IDs 2801 (FIG. 31) and decides a region of the room on the floor plan 500. For example, a room whose room ID is A is a living room and represents a region formed by connecting vertex IDs in a sequence of F, G, H, I, L, O, and N on the floor plan 500.

In addition, the area 51604 indicates an area of the room. For example, the area of the living room is 24.3 square meters, the area of the bedroom is 9.7 square meters, and the area of the bath room is 5.0 square meters. As shown, the room information 51600 includes areas 51604 of the respective rooms.

Next, a device list that is managed by a server and/or a home controller will be described. FIG. 88 is a diagram showing a configuration of a device list that is managed by a server and/or a home controller. While a device list managed by a server has already been described with reference to FIG. 34, home information 2700 may include the device list 51700 shown in FIG. 88. In addition, while a device list managed by a home controller has already been described with reference to FIG. 35, the home controller 100 may include the device list 51700 shown in FIG. 88. In this case, the device list 51700 managed by a home controller may further include an IP address.

As shown in FIG. 88, the device list 51700 is constituted by a device ID 51701, a device type 51702, a model number 51703, an arrangement 51704, capability information 51705, a control command transmission destination 51706, and an accommodated area 51707.

The device ID 51701 is an identifier of the device 200. The device type 51702 indicates a device type of the device 200. The model number 51703 indicates a model number of the device 200. The arrangement 51704 is a coordinate that is expressed by an (X coordinate, Y coordinate, floor number) format in a similar manner to the vertex coordinate 2802 and indicates an arrangement on the floor plan 500 of the device icon 501 corresponding to the device 200. The capability information 51705 indicates a content in which the device 200 can be controlled and a state that can be acquired from the device 200. For example, a humidifier whose device ID is D is capable of controlling air flow amount. A control command transmission destination 51706 indicates a transmission destination of a control command for controlling the device 200. For example, since the control command transmission destination 51706 of the humidifier whose device ID is D is a device, a control command is directly transmitted from the home controller 100 to the device 200.

The accommodated area 51707 indicates an area that can be accommodated by the device 200. With air conditioners and humidifiers, an accommodable area (applicable area) is determined for each device. For example, the accommodated area of an air conditioner whose device ID is A is 22.7 square meters and the accommodated area of the humidifier whose device ID is D is 16.2 square meters. Alternatively, the device list 51700 may include output power of the device 200 in place of the accommodated area 51707.

Figure 89:
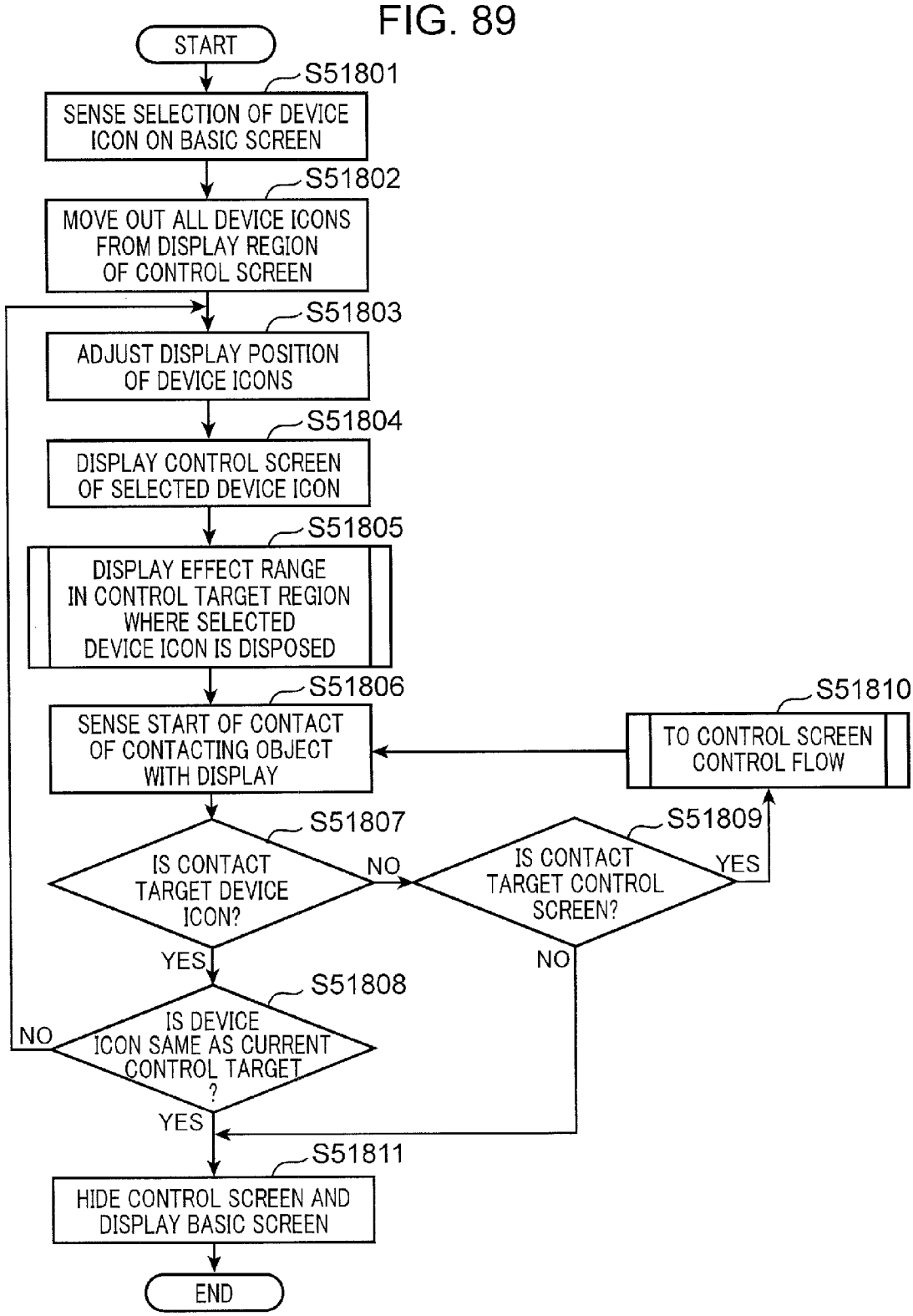
FIG. 89 is a flow chart showing a flow of another process for the home controller to control devices including a humidifier.

FIG. 89 is a flow chart showing a flow of another process for the home controller 100 to control devices 200 including a humidifier. In the process shown in FIG. 89, a control screen and an effect range are displayed on the display 101.

The process performed in S51801 to 551803 is approximately similar to the process performed in S3501 to S3503 in FIG. 39A. Specifically, the touch panel control section 102 senses that a device icon corresponding to a humidifier has been selected by the user on the basic screen (S51801). Next, the display control section 103 moves all device icons 501 out of the display region of the control screen (S51802). The display control section 103 then adjusts display positions of the moved device icons 501 (S51803).

Next, the display control section 103 displays the control screen 50201 of the selected device icon 501 (S51804). For example, when selection of the humidifier icon 50101 is sensed, the display control section 103 displays the control screen 50201 for operating a humidifier corresponding to the selected humidifier icon 50101 on the display 101 so as to avoid a region corresponding to a room in which the selection of the humidifier icon 50101 had been sensed and to overlap with the display screen.

Next, the display control section 103 displays an effect range of the device 200 corresponding to the selected device icon 501 in a room region in which the selected device icon 501 is disposed (S51805). For example, based on an operation performed on the control screen 50201, the display control section 103 displays an effect range in which an effect of an operation by the humidifier in accordance with an operation on the control screen 50201 extends in a region (the control target region 50202) corresponding to a room in which selection of the humidifier icon 50101 has been sensed. Moreover, details of the process of displaying the effect range in S51805 will be described later.

In S51806, when a start of contact made by the contacting object 50601 with the display 101 is sensed by the touch panel control section 102, the touch panel control section 102 determines whether or not a contact target is the device icon 501 (S51807).

When the touch panel control section 102 determines that the contact is with the device icon 501 (YES in S51807), the touch panel control section 102 determines whether or not the contacting object 50601 has made contact with the same device icon as that selected in S51801 (S51808). If not the same device icon (NO in S51808), the process returns to S51803. On the other hand, when it is determined that the contacting object 50601 has made contact with the same device icon as that selected in S51801 (YES in S51808), the display control section 103 hides the currently displayed control screen 50201 and displays the basic screen on the display 101 (S51811) to finish the present flow.

In addition, when the touch panel control section 102 determines in S51807 that the contact is not with the device icon 501 (NO in S51807), the touch panel control section 102 further determines whether or not the contact target is the control screen 50201 (S51809). When it is determined that the contact target is not the control screen 50201 (NO in S51809), the process is advanced to S51811.

On the other hand, when the touch panel control section 102 determines that the contacting object 50601 has made contact with an image representing an operation mode or the like in the control screen 50201 (YES in S51809), the process is advanced to the control flow (FIG. 90) of the control screen (S51810) and the process subsequently returns to S51806.

Figure 90:
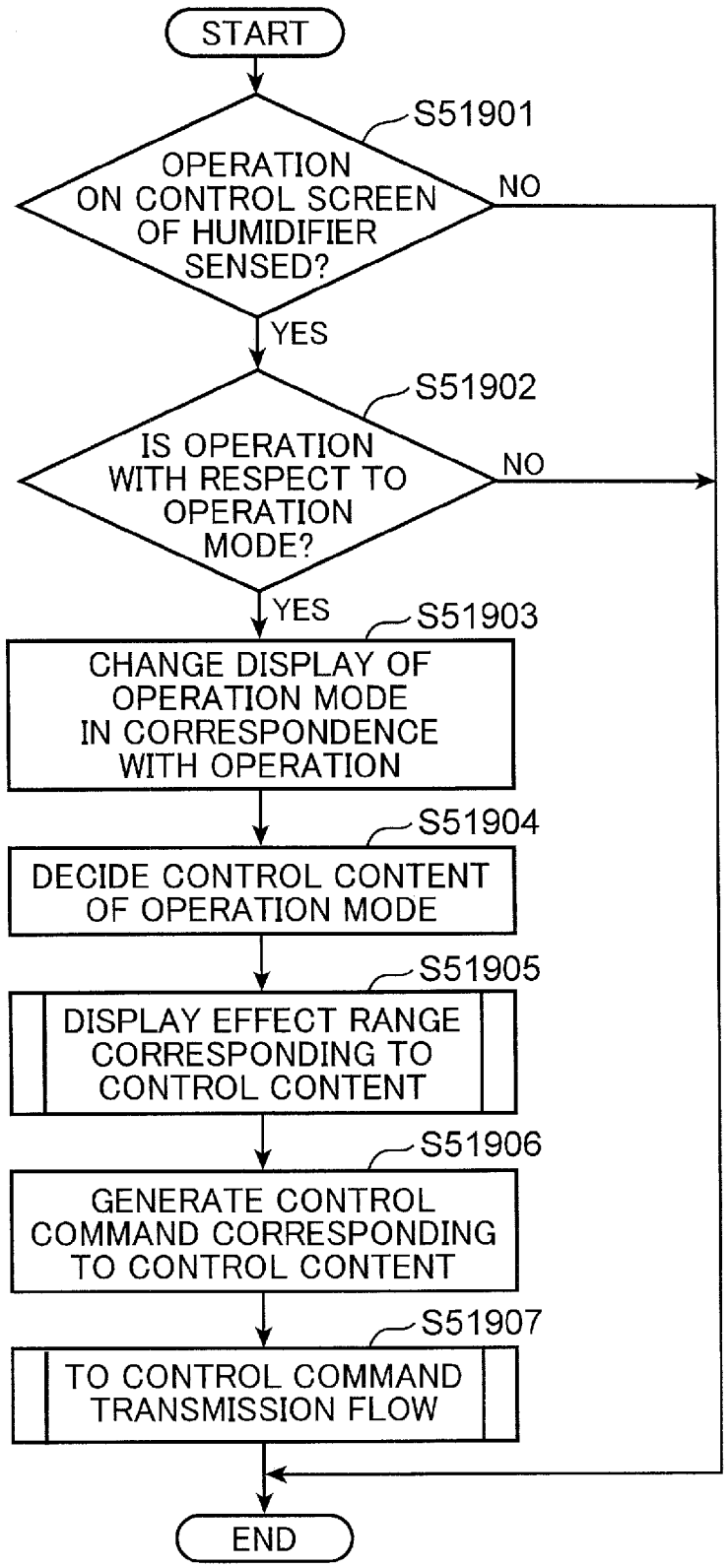
FIG. 90 is a flow chart showing another flow of a process for the home controller to generate a control command of a humidifier in accordance with the content of a contact made by a contacting object.

FIG. 90 is a flow chart showing a flow of another process for the home controller 100 to generate a control command of a humidifier in accordance with the content of a contact made by the contacting object 50601. Since the process performed in S51901 to S51904 in FIG. 90 is the same as the process performed in S50801 to S50804 shown in FIG. 79, a description thereof will be omitted.

In S51905, the display control section 103 displays an effect range corresponding to the decided control content in the control target region 50202. For example, when the operation mode has been changed, the display control section 103 changes a size of the effect range 50901 in the control target region 50202 from a size corresponding to a current operation mode to a size corresponding to an operation mode after the change.

Since the process performed in S51906 and S51907 in FIG. 90 is the same as the process performed in S50806 to S50807 shown in FIG. 79, a description thereof will be omitted.

Figure 91:
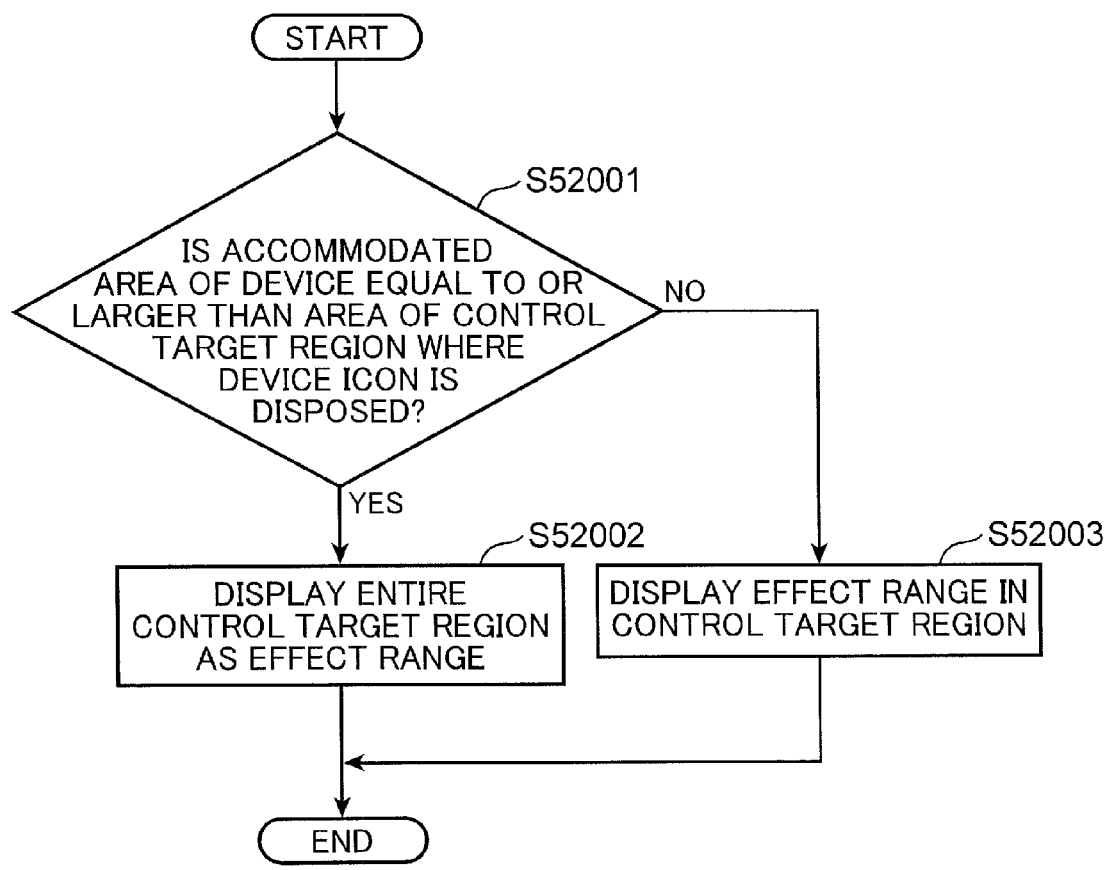
FIG. 91 is a flow chart showing a flow of a process to display an effect range in S51805 and S51905.

FIG. 91 is a flow chart showing a flow of a process to display an effect range in S51805 and S51905.

First, the display control section 103 determines whether or not an accommodated area of a device corresponding to the selected device icon is equal or larger than an area of a control target region in which the selected device icon is disposed (S52001). At this point, the display control section 103 reads the accommodated area 51707 of the device corresponding to the selected device icon from the device list 51700 (FIG. 88) and reads the area 51604 of the room (control target region) in which the selected device icon is disposed from the room information 51600 (FIG. 87). Subsequently, the display control section 103 compares the accommodated area read from the device list 51700 with the area read from the room information 51600.

When it is determined that the accommodated area of the device is equal or larger than the area of the control target region (YES in S52001), the display control section 103 displays the entire control target region as an effect range (S52002). In other words, the display control section 103 displays an effect range of the same size as the control target region. For example, the display control section 103 displays the entire control target region in a prescribed color representing an effect range.

On the other hand, when it is determined that the accommodated area of the device is smaller than the area of the control target region (NO in S52001), the display control section 103 displays an effect range which is smaller than the control target region and which has a prescribed shape in the control target region (S52003). The prescribed shape of the effect range is a circular shape about the device icon.

(Display of Effect Range of Humidifier: 2)

Figure 92:
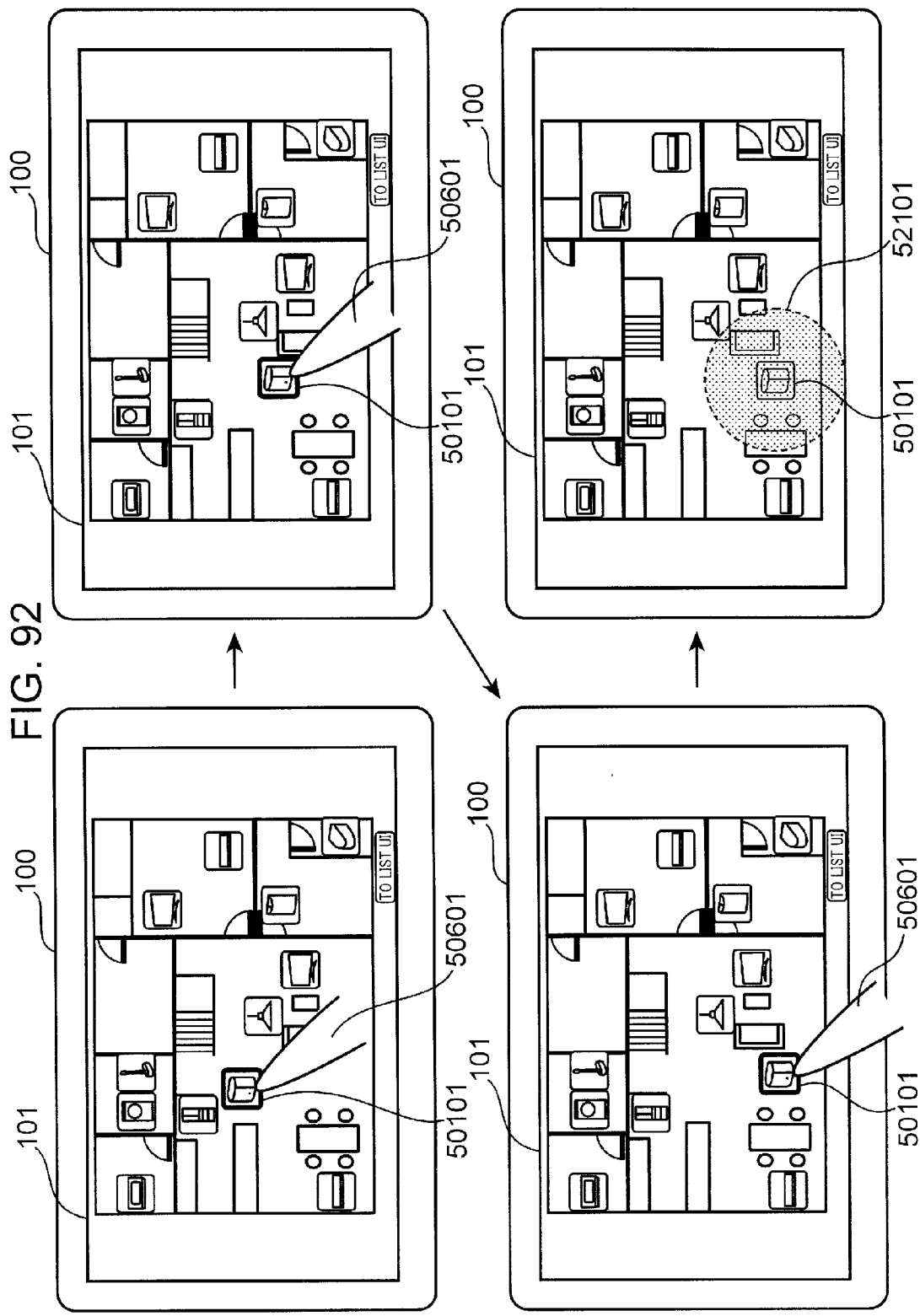
FIG. 92 is a diagram showing a transition of a display screen of a display in a case where it is sensed that a humidifier icon is moved and dropped.

FIG. 92 is a diagram showing a transition of a display screen of the display 101 in a case where it is sensed that the humidifier icon 50101 is moved and dropped.

When the display control section 103 senses that the humidifier icon 50101 is selected, the humidifier icon 50101 is moved on the floor plan, and the humidifier icon 50101 is dropped, the display control section 103 causes the effect range 52101 in which an effect of the humidifier extends to be displayed in a region corresponding to a room in which the drop of the humidifier icon 50101 has been sensed on the floor plan.

First, the humidifier icon 50101 is displayed by the display control section 103 on the display 101 in the floor plan (upper left diagram in FIG. 92). In this display state, the touch panel control section 102 senses that the contacting object 50601 has made contact with the humidifier icon 50101 and that the humidifier icon 50101 has been selected. Next, the touch panel control section 102 senses that a contact position between the contacting object 50601 and the display 101 moves in a prescribed direction (the upper left diagram the upper right diagram in FIG. 92) without the contacting object 50601 separating from the display 101. In this case, the display control section 103 moves the humidifier icon 50101 to be displayed on the display 101 in accordance with a movement of the contacting object 50601. Subsequently, the touch panel control section 102 senses that the contacting object 50601 has been separated from the humidifier icon 50101 (the upper right diagram→the lower left diagram in FIG. 92).

When drop of the humidifier icon 50101 is sensed, the display control section 103 displays the effect range 52101 in which an effect of the humidifier extends in a region corresponding to a room in which the drop of the humidifier icon 50101 has been sensed on the floor plan (the lower left diagram→the lower right diagram in FIG. 92). Moreover, the display control section 103 displays both the humidifier icon 50101 after movement and the effect range 52101. In addition, while the humidifier icon 50101 is moved by the contacting object 50601, the present disclosure is not particularly limited thereto and the humidifier icon 50101 may be moved by a pointing device such as a mouse.

As described above, when the humidifier icon 50101 is moved, the display control section 103 displays the effect range 52101 using a position of the humidifier icon 50101 after the movement as a reference point. For example, the display control section 103 displays the effect range 52101 to be centered on the position of the humidifier icon 50101 after the movement. Moreover, the display control section 103 displays both the humidifier icon 50101 after movement and the effect range 52101.

In this manner, since the humidifier icon 50101 is moved and the effect range 52101 is displayed based on the position of the humidifier icon 50101 after movement, a simulation of the effect range of the humidifier after movement can be performed without actually moving the humidifier.

Moreover, while the room that includes the humidifier icon 50101 prior to movement and the room that includes the humidifier icon 50101 after the movement are the same in FIG. 92 described above, the room that includes the humidifier icon 50101 prior to movement and the room that includes the humidifier icon 50101 after the movement may differ from each other.

Figure 93:
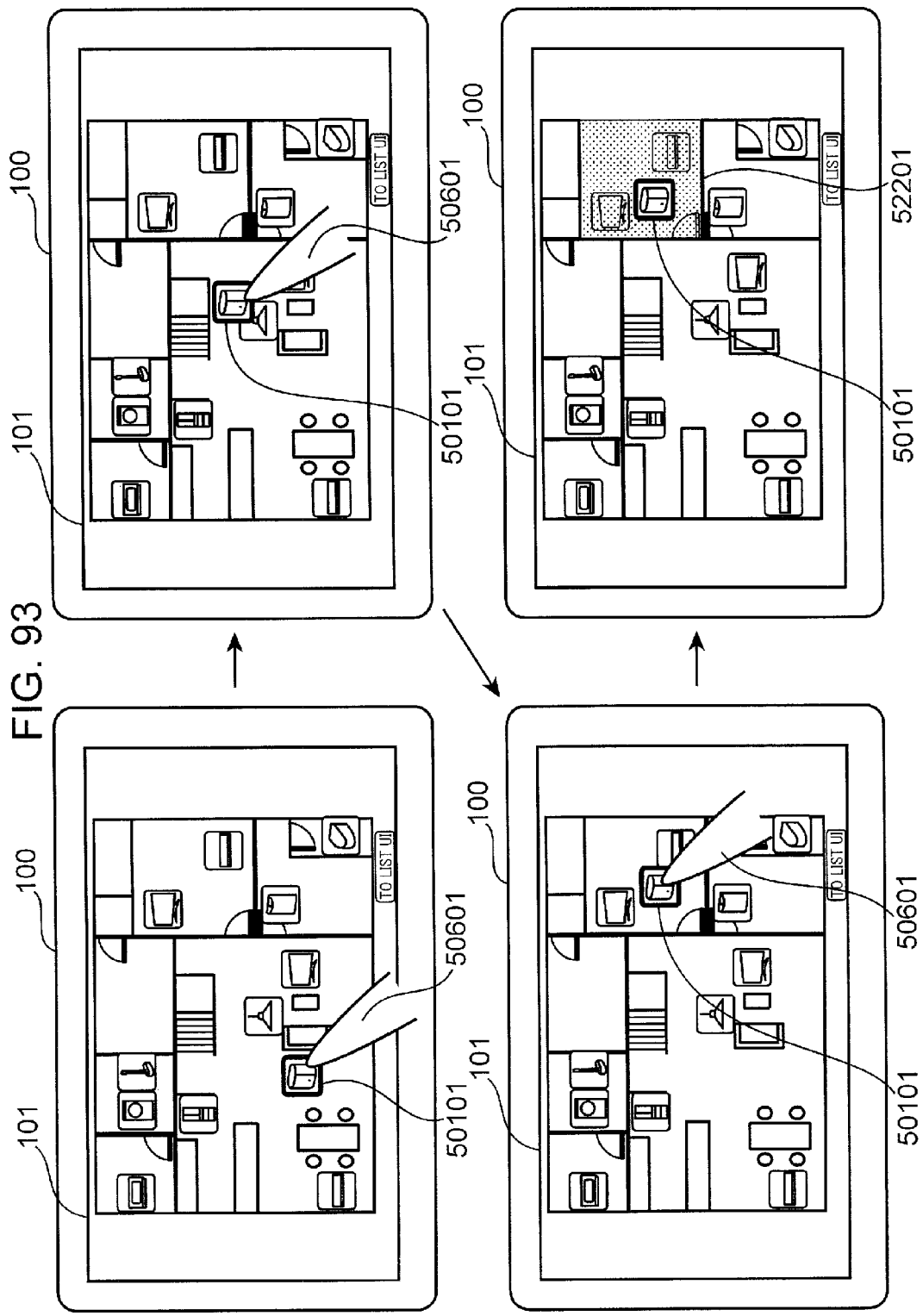
FIG. 93 is a diagram showing a transition of a display screen of a display in a case where a room in which a humidifier icon prior to movement is present and a room in which the humidifier icon after the movement is present differ from each other.

FIG. 93 is a diagram showing a transition of a display screen of the display 101 in a case where a room that includes the humidifier icon 50101 prior to movement and the room that includes the humidifier icon 50101 after the movement differs from each other.

Furthermore, when the display control section 103 senses that the humidifier icon 50101 is dragged and dropped in a region corresponding to a second room that differs from a first room in which the humidifier icon 50101 prior to movement had been present in the floor plan, the display control section 103 causes an effect range 52201 in which an effect of the humidifier extends in the region corresponding to the second room to be displayed.

First, the humidifier icon 50101 is displayed by the display control section 103 on the display 101 in a first room on the floor plan (upper left diagram in FIG. 93). In this display state, the touch panel control section 102 senses that the contacting object 50601 has made contact with the humidifier icon 50101 and that the humidifier icon 50101 has been selected. Next, the touch panel control section 102 senses that a contact position between the contacting object 50601 and the display 101 moves into a second room that differs from the first room (the upper left diagram→the upper right diagram in FIG. 93) without the contacting object 50601 separating from the display 101. In this case, the display control section 103 moves the humidifier icon 50101 to be displayed on the display 101 in accordance with a movement of the contacting object 50601. Subsequently, the touch panel control section 102 senses separation of the contacting object 50601 from the humidifier icon 50101 (the upper right diagram→the lower left diagram in FIG. 93) in a region corresponding to the second room.

When drop of the humidifier icon 50101 is sensed, the display control section 103 displays the effect range 52201 in which an effect of the humidifier extends in a region corresponding to the second room in which the drop of the humidifier icon 50101 has been sensed on the floor plan (the lower left diagram→the lower right diagram in FIG. 93). Moreover, the display control section 103 displays both the humidifier icon 50101 after movement and the effect range 52201.

At this point, the display control section 103 determines whether or not an accommodated area of the humidifier corresponding to the selected humidifier icon 50101 is equal to or larger than an area of the second room in which drop of the humidifier icon 50101 has been sensed.

When it is determined that the accommodated area of the humidifier is equal to or larger than the area of the second room, the display control section 103 displays the entire second room after movement as the effect range 52201. In other words, the display control section 103 displays the effect range 52201 of the same size as the second room after movement. On the other hand, when it is determined that the accommodated area of the humidifier is smaller than the area of the second room after movement, the display control section 103 displays an effect range 52201 which is smaller than the second room and which has a prescribed shape in the second room after the movement.

For example, in the lower right diagram in FIG. 93, since the accommodated area of the humidifier is equal to or larger than the area of the second room after movement, the entire second room after movement is displayed as the effect range 52201. In this manner, when the size of the first room and the size of the second room differ from each other, the effect range in a region corresponding to the first room differs from the effect range in the region corresponding to the second room.

As described above, the humidifier icon 50101 can be moved not only within a region corresponding to a single room but can also be moved from inside a region corresponding to the first room to inside a region corresponding to the second room. Therefore, a simulation of an effect range of the humidifier when the humidifier is moved from the first room to the second room can be performed without actually moving the humidifier.

Furthermore, while an effect range is not displayed during a movement of the humidifier icon 50101 in FIGS. 92 and 93 described above, an effect range may be displayed during a movement of the humidifier icon 50101.

Figure 94:
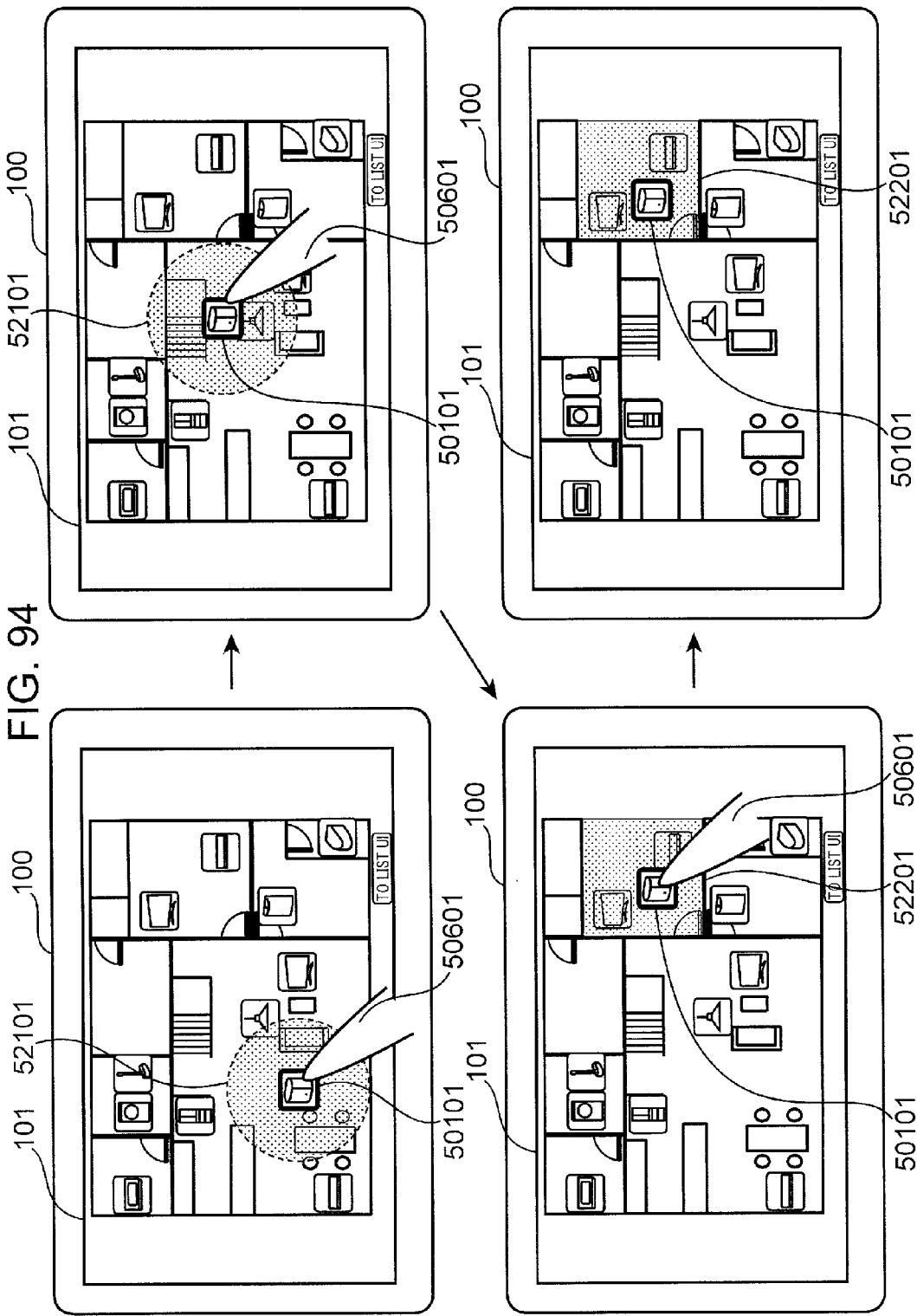
FIG. 94 is a diagram showing a transition of a display screen of a display in a case where an effect range is displayed during a movement of a humidifier icon.

FIG. 94 is a diagram showing a transition of a display screen of the display 101 in a case where an effect range is displayed during a movement of the humidifier icon 50101.

First, the humidifier icon 50101 is displayed by the display control section 103 on the display 101 in a first room on the floor plan (upper left diagram in FIG. 94). In this display state, the touch panel control section 102 senses that the contacting object 50601 has made contact with the humidifier icon 50101 and that the humidifier icon 50101 has been selected. At this point, when the touch panel control section 102 senses that the contacting object 50601 has made contact with the humidifier icon 50101, the display control section 103 displays an effect range 52101 in which an effect of the humidifier corresponding to the humidifier icon 50101 extends in the first room. Moreover, the display control section 103 determines whether or not an accommodated area of the humidifier corresponding to the humidifier icon 50101 disposed in the first room is equal to or larger than an area of the first room in which selection of the humidifier icon 50101 has been sensed.

When it is determined that the accommodated area of the humidifier is equal to or larger than the area of the first room, the display control section 103 displays the entire first room as the effect range 52101. In other words, the display control section 103 displays the effect range 52101 of the same size as the first room. On the other hand, when it is determined that the accommodated area of the humidifier is smaller than the area of the first room, the display control section 103 displays an effect range 52101 which is smaller than the first room and which has a prescribed shape in the first room after the movement. In the upper left diagram in FIG. 94, since the accommodated area of the humidifier is smaller than the area of the first room, the effect range 52101 which is smaller than the first room and which has a circular shape is displayed.

Next, the touch panel control section 102 senses that a contact position between the contacting object 50601 and the display 101 moves into a second room that differs from the first room (the upper left diagram→the upper right diagram in FIG. 94) without the contacting object 50601 separating from the display 101. In this case, the display control section 103 moves the humidifier icon 50101 to be displayed on the display 101 in accordance with a movement of the contacting object 50601. While the humidifier icon 50101 is being moved, the display control section 103 continues displaying the effect range 52101 of the humidifier corresponding to the humidifier icon 50101. Subsequently, the touch panel control section 102 senses separation of the contacting object 50601 from the humidifier icon 50101 (the upper right diagram→the lower left diagram in FIG. 94) in a region corresponding to the second room.

When drop of the humidifier icon 50101 is sensed, the display control section 103 displays the effect range 52201 in which an effect of the humidifier extends in a region corresponding to the second room in which the drop of the humidifier icon 50101 has been sensed on the floor plan (the lower left diagram→the lower right diagram in FIG. 94). Moreover, the display control section 103 displays both the humidifier icon 50101 after movement and the effect range 52201.

At this point, the display control section 103 determines whether or not an accommodated area of the humidifier corresponding to the selected humidifier icon 50101 is equal to or larger than an area of the second room in which drop of the humidifier icon 50101 has been sensed.

When it is determined that the accommodated area of the humidifier is equal to or larger than the area of the second room, the display control section 103 displays the entire second room after movement as the effect range 52201. In other words, the display control section 103 displays the effect range 52201 of the same size as the second room after movement. On the other hand, when it is determined that the accommodated area of the humidifier is smaller than the area of the second room, the display control section 103 displays an effect range 52101 which is smaller than the second room and which has a prescribed shape in the second room after the movement.

For example, in the lower right diagram in FIG. 94, since the accommodated area of the humidifier is equal to or larger than the area of the second room after movement, the entire second room after movement is displayed as the effect range 52201.

As described above, since an effect range is also displayed while the humidifier icon 50101 is moving, the user can confirm an effect range of a humidifier corresponding to the humidifier icon 50101 while moving the humidifier icon 50101.

In addition, while all device icons are displayed on the floor plan together with an effect range when the humidifier icon 50101 is dropped in FIGS. 92 and 93 described above, only the effect range may be displayed without displaying the device icons on the floor plan when the humidifier icon 50101 is dropped.

Figure 95:
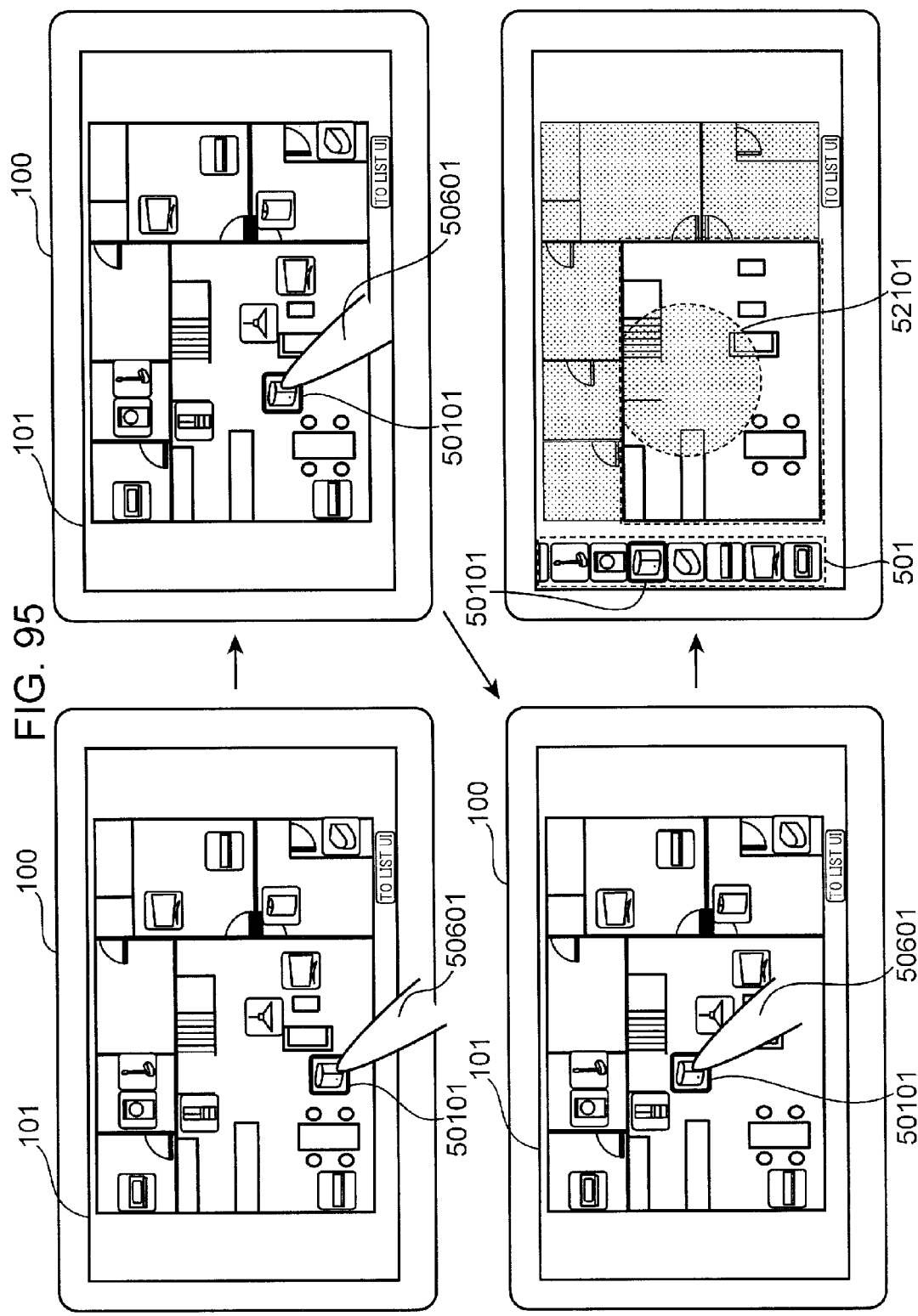
FIG. 95 is a diagram showing a transition of a display screen of a display in a case where only an effect range is displayed on a floor plan after a movement of a humidifier icon.

FIG. 95 is a diagram showing a transition of a display screen of the display 101 in a case where only an effect range is displayed on a floor plan after a movement of the humidifier icon 50101.

First, the humidifier icon 50101 is displayed by the display control section 103 on the display 101 in the floor plan (upper left diagram in FIG. 95). In this display state, the touch panel control section 102 senses that the contacting object 50601 has made contact with the humidifier icon

50101 and that the humidifier icon 50101 has been selected. Next, the touch panel control section 102 senses that a contact position between the contacting object 50601 and the display 101 moves in a prescribed direction (the upper left diagram→the upper right diagram in FIG. 95) without the contacting object 50601 separating from the display 101. In this case, the display control section 103 moves the humidifier icon 50101 to be displayed on the display 101 in accordance with a movement of the contacting object 50601. Subsequently, the touch panel control section 102 senses that the contacting object 50601 has been separated from the humidifier icon 50101 (the upper right diagram→the lower left diagram in FIG. 95).

When drop of the humidifier icon 50101 is sensed, the display control section 103 displays the effect range 52101 in which an effect of the humidifier extends in a region corresponding to a room in which the drop of the humidifier icon 50101 has been sensed on the floor plan (the lower left diagram→the lower right diagram in FIG. 95). At this point, the display control section 103 only displays the effect range 52101 instead of displaying all device icons 501 including the humidifier icon 50101 after movement on the floor plan. In addition, the device icons 501 including the humidifier icon 50101 are displayed in one line outside of the display region of the floor plan 500 and inside the display region of the display 101.

As described above, since only the effect range 52101 is displayed without displaying the device icons on the floor plan when the humidifier icon 50101 is dropped, visibility of the effect range 52101 can be improved.

Moreover, while the room that includes the humidifier icon 50101 prior to movement and the room that includes the humidifier icon 50101 after the movement are the same in FIG. 95 described above, the room that includes the humidifier icon 50101 prior to movement and the room that includes the humidifier icon 50101 after the movement may differ from each other.

Figure 96:
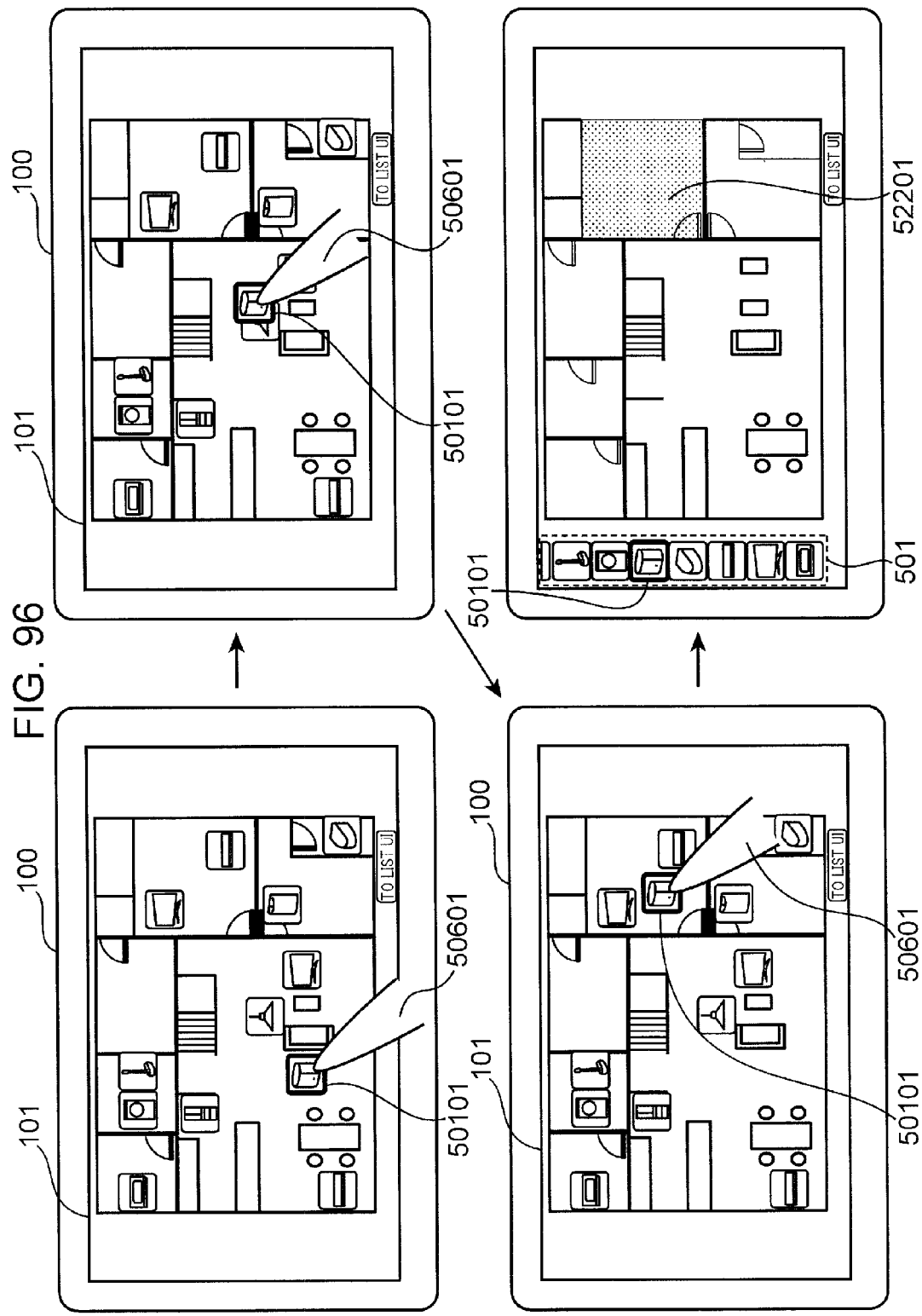
FIG. 96 is a diagram showing a transition of a display screen of a display in a case where a room in which a humidifier icon prior to movement is present and a room in which the humidifier icon after the movement is present differ from each other and, at the same time, only an effect range is displayed on a floor plan after the movement of the humidifier icon.

FIG. 96 is a diagram showing a transition of a display screen of the display 101 in a case where a room in which the humidifier icon 50101 prior to movement is present and a room in which the humidifier icon 50101 after the movement is present differ from each other and, at the same time, only an effect range is displayed on the floor plan after the movement of the humidifier icon 50101.

First, the humidifier icon 50101 is displayed by the display control section 103 on the display 101 in a first room on the floor plan (upper left diagram in FIG. 96). In this display state, the touch panel control section 102 senses that the contacting object 50601 has made contact with the humidifier icon 50101 and that the humidifier icon 50101 has been selected. Next, the touch panel control section 102 senses that a contact position between the contacting object 50601 and the display 101 moves into a second room that differs from the first room (the upper left diagram→the upper right diagram in FIG. 96) without the contacting object 50601 separating from the display 101. In this case, the display control section 103 moves the humidifier icon 50101 to be displayed on the display 101 in accordance with the movement of the contacting object 50601. Subsequently, the touch panel control section 102 senses separation of the contacting object 50601 from the humidifier icon 50101 (the upper right diagram→the lower left diagram in FIG. 96) in a region corresponding to the second room.

When drop of the humidifier icon 50101 is sensed, the display control section 103 displays the effect range 52201 in which an effect of the humidifier extends in a region corresponding to the second room in which the drop of the humidifier icon 50101 has been sensed on the floor plan (the lower left diagram the lower right diagram in FIG. 96). At this point, the display control section 103 only displays the effect range 52201 instead of displaying all device icons 501 including the humidifier icon 50101 after movement on the floor plan. In addition, the device icons 501 including the humidifier icon 50101 are displayed in one line outside of the display region of the floor plan 500 and inside the display region of the display 101.

Furthermore, at this point, the display control section 103 determines whether or not an accommodated area of the humidifier corresponding to the selected humidifier icon 50101 is equal to or larger than an area of the second room in which drop of the humidifier icon 50101 has been sensed.

When it is determined that the accommodated area of the humidifier is equal to or larger than the area of the second room, the display control section 103 displays the entire second room after movement as the effect range 52201. In other words, the display control section 103 displays the effect range 52201 of the same size as the second room after movement. On the other hand, when it is determined that the accommodated area of the humidifier is smaller than the area of the second room, the display control section 103 displays an effect range 52201 which is smaller than the second room and which has a prescribed shape in the second room after the movement.

For example, in the lower right diagram in FIG. 96, since the accommodated area of the humidifier is equal to or larger than the area of the second room after movement, the entire second room after movement is displayed as the effect range 52201.

As described above, since only the effect range 52201 is displayed without displaying the device icons on the floor plan when the humidifier icon 50101 is dropped, visibility of the effect range 52201 can be improved.

Furthermore, while an effect range is not displayed during a movement of the humidifier icon 50101 in FIGS. 95 and 96 described above, an effect range may be displayed during a movement of the humidifier icon 50101.

Figure 97:
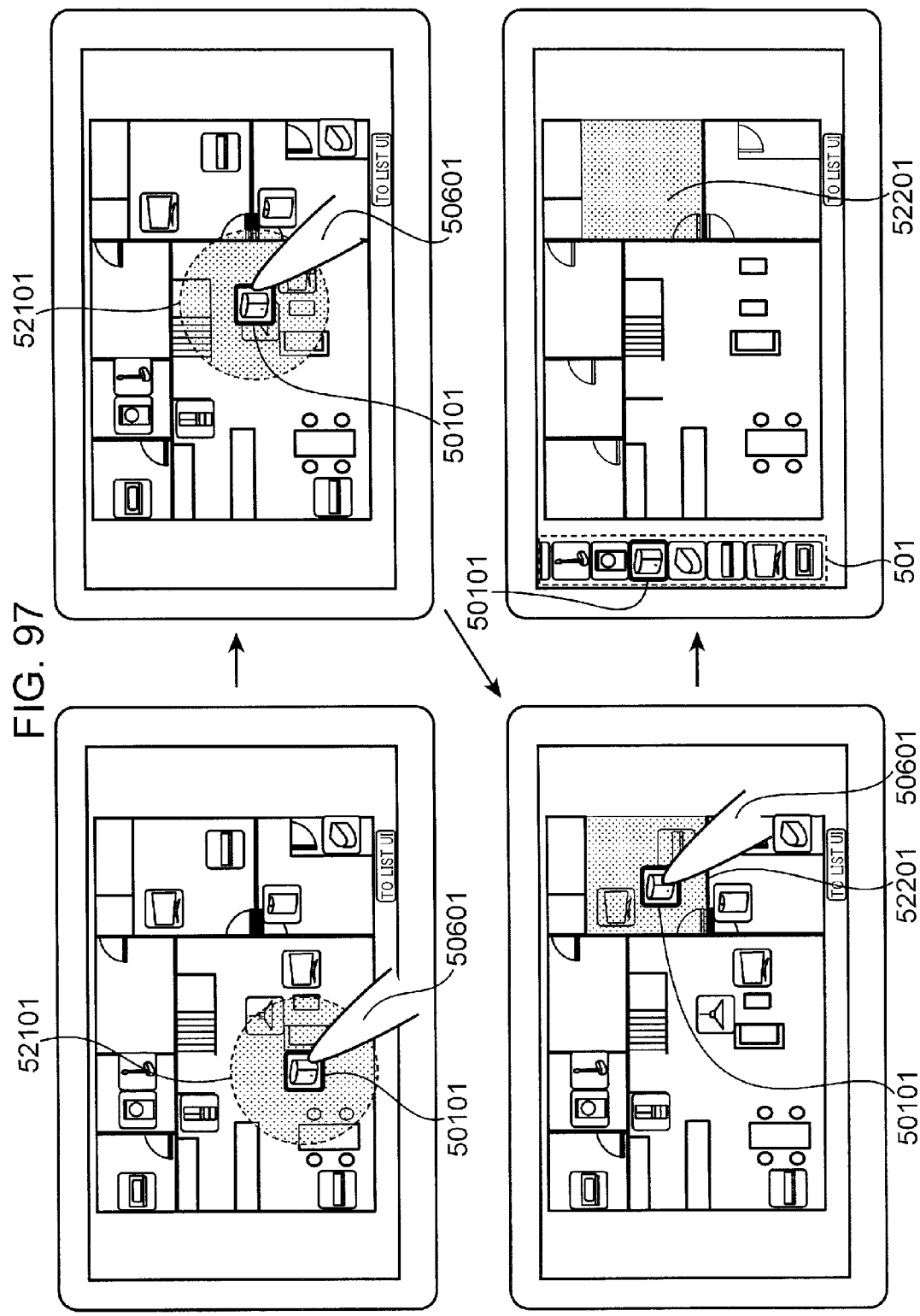
FIG. 97 is a diagram showing a transition of a display screen of a display in a case where a room in which a humidifier icon prior to movement is present and a room in which the humidifier icon after the movement is present differ from each other, an effect range is displayed during the movement of the humidifier icon, and only an effect range is displayed on a floor plan after the movement of the humidifier icon.

FIG. 97 is a diagram showing a transition of a display screen of the display 101 in a case where a room in which the humidifier icon 50101 prior to movement is present and a room in which the humidifier icon 50101 after the movement is present differ from each other, an effect range is displayed during the movement of the humidifier icon 50101, and only an effect range is displayed on a floor plan after the movement of the humidifier icon 50101.

First, the humidifier icon 50101 is displayed by the display control section 103 on the display 101 in a first room on the floor plan (upper left diagram in FIG. 97). In this display state, the touch panel control section 102 senses that the contacting object 50601 has made contact with the humidifier icon 50101 and that the humidifier icon 50101 has been selected. At this point, when the touch panel control section 102 senses that the contacting object 50601 has made contact with the humidifier icon 50101, the display control section 103 displays an effect range 52101 in which an effect of the humidifier corresponding to the humidifier icon 50101 extends in the first room. Moreover, the display control section 103 determines whether or not an accommodated area of the humidifier corresponding to the humidifier icon 50101 disposed in the first room is equal to or larger than an area of the first room in which selection of the humidifier icon 50101 has been sensed.

When it is determined that the accommodated area of the humidifier is equal to or larger than the area of the first room, the display control section 103 displays the entire first room as the effect range 52201. In other words, the display control section 103 displays the effect range 52201 of the same size as the first room. On the other hand, when it is determined that the accommodated area of the humidifier is smaller than the area of the first room, the display control section 103 displays an effect range 52101 which is smaller than the first room and which has a prescribed shape in the first room after the movement. In the upper left diagram in FIG. 97, since the accommodated area of the humidifier is smaller than the area of the first room, the effect range 52101 which is smaller than the first room and which has a prescribed shape is displayed.

Next, the touch panel control section 102 senses that a contact position between the contacting object 50601 and the display 101 moves into a second room that differs from the first room (the upper left diagram→the upper right diagram in FIG. 97) without the contacting object 50601 separating from the display 101. In this case, the display control section 103 moves the humidifier icon 50101 to be displayed on the display 101 in accordance with the movement of the contacting object 50601. While the humidifier icon 50101 is being moved, the display control section 103 continues displaying the effect range 52101 of the humidifier corresponding to the humidifier icon 50101. Subsequently, the touch panel control section 102 senses separation of the contacting object 50601 from the humidifier icon 50101 (the upper right diagram the lower left diagram in FIG. 97) in a region corresponding to the second room.

When drop of the humidifier icon 50101 is sensed, the display control section 103 displays the effect range 52201 in which an effect of the humidifier extends in a region corresponding to the second room in which the drop of the humidifier icon 50101 has been sensed on the floor plan (the lower left diagram→the lower right diagram in FIG. 97). At this point, the display control section 103 only displays the effect range 52201 instead of displaying all device icons 501 including the humidifier icon 50101 after movement on the floor plan. In addition, the device icons 501 including the humidifier icon 50101 are disposed in one line outside of the display region of the floor plan 500 and inside the display region of the display 101.

Furthermore, at this point, the display control section 103 determines whether or not an accommodated area of the humidifier corresponding to the selected humidifier icon 50101 is equal to or larger than an area of the second room in which drop of the humidifier icon 50101 has been sensed.

When it is determined that the accommodated area of the humidifier is equal to or larger than the area of the second room, the display control section 103 displays the entire second room after movement as the effect range 52201. In other words, the display control section 103 displays the effect range 52201 of the same size as the second room after movement. On the other hand, when it is determined that the accommodated area of the humidifier is smaller than the area of the second room after movement, the display control section 103 displays an effect range 52101 which is smaller than the second room and which has a prescribed shape in the second room after the movement.

For example, in the lower right diagram in FIG. 97, since the accommodated area of the humidifier is equal to or larger than the area of the second room after movement, the entire second room after movement is displayed as the effect range 52201.

As described above, since only the effect range 52201 is displayed without displaying the device icons on the floor plan when the humidifier icon 50101 is dropped, visibility of the effect range 52201 can be improved.

In addition, since an effect range is also displayed while the humidifier icon 50101 is moving, the user can confirm an effect range of a humidifier corresponding to the humidifier icon 50101 while moving the humidifier icon 50101.

Moreover, when selection of the humidifier icon 50101 is sensed in a region corresponding to a room in which drop of the humidifier icon 50101 is sensed in the floor plan, the display control section 103 may display a control screen for at least operation or state confirmation of a humidifier corresponding to the selected humidifier icon 50101.

Figure 98:
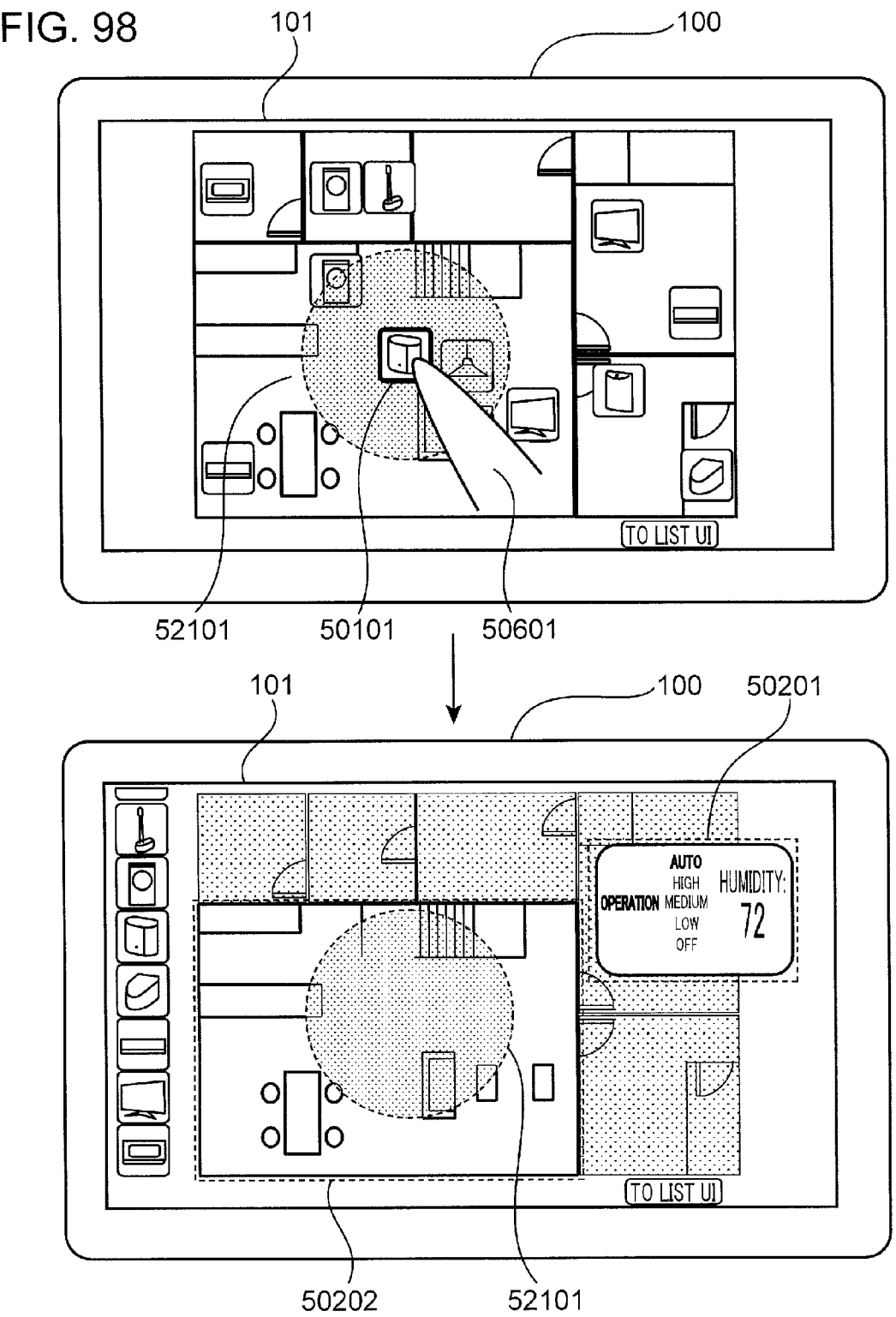
FIG. 98 is a diagram showing a transition of a display screen of a display in a case where a control screen is displayed.

FIG. 98 is a diagram showing a transition of a display screen of the display 101 in a case where a control screen is displayed.

As shown in an upper diagram in FIG. 98, when drop of the humidifier icon 50101 is sensed, the display control section 103 displays the effect range 52101 in which an effect of the humidifier extends in a region corresponding to a room in which the drop of the humidifier icon 50101 has been sensed on the floor plan. In this display state, the touch panel control section 102 senses that the contacting object 50601 has made contact with the humidifier icon 50101 and that the humidifier icon 50101 has been selected. As a result, as shown in a lower diagram in FIG. 98, the display control section 103 displays the control screen 50201 of the humidifier on the display 101. When selection of the humidifier icon 50101 is sensed, the display control section 103 displays the control screen 50201 for operating a humidifier corresponding to the selected humidifier icon 50101 on the display 101 so as to avoid a region corresponding to a room in which the selection of the humidifier icon 50101 had been sensed and to overlap with the display screen.

The control screen 50201 accepts an operation of a humidifier corresponding to the selected humidifier icon 50101. The control screen 50201 may display a state of the humidifier corresponding to the humidifier icon 50101. For example, the control screen 50201 may display humidity around the humidifier. The device control section 106 outputs a control command for operating the humidifier to the network based on an operation performed on the control screen 50201.

In addition, the control screen 50201 may include an output angle image representing an angle at which the humidifier outputs air. Furthermore, the control screen 50201 may include an intake direction image for operating an intake direction of air that is sucked into the humidifier. In this case, when the display control section 103 senses that contact is made by a prescribed object with the display 101 and senses that the contact moves in a region corresponding to the output angle image, the display control section 103 changes a display of the angle in which air is output in the output angle image. In addition, the effect range 52101 may change in accordance with a change in the output angle of air.

Furthermore, as shown in the lower diagram in FIG. 98, the device icons 501 including the humidifier icon 50101 are disposed in one line outside the display region of the control screen 50201 and the floor plan 500 and inside the display region of the display 101.

In addition, the effect range 52101 is displayed in a region (the control target region 50202) corresponding to a room in which selection of the humidifier icon 50101 has been sensed. The effect range 52101 changes in accordance with set contents that are set based on an operation on the control screen 50201.

While the control screen 50201 is displayed when selection of the humidifier icon 50101 is sensed in the example shown in FIG. 98, the present disclosure is not particularly limited thereto and the control screen 50201 may be displayed when drop of the humidifier icon 50101 is sensed.

A process of displaying an effect range in a case where an operation of a device icon is sensed will now be described.

Figure 99:
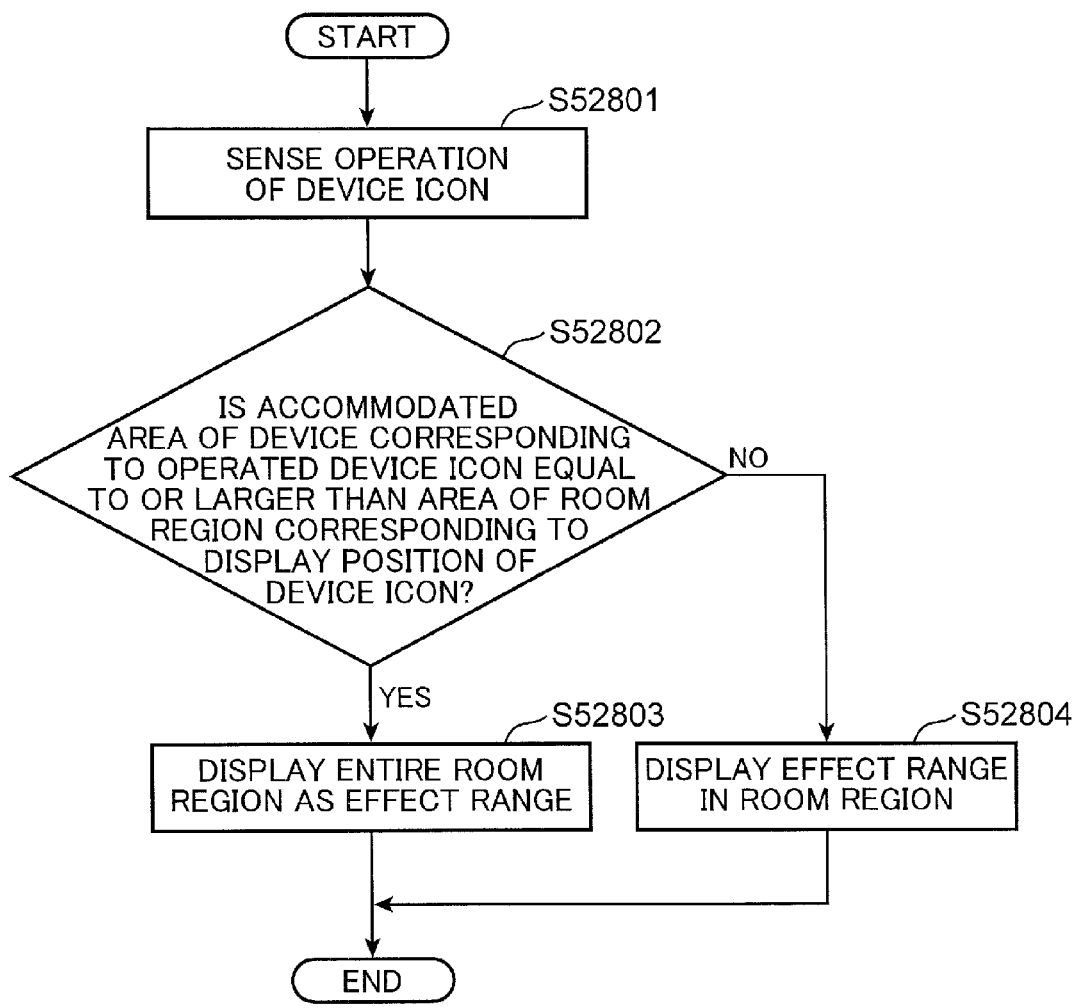
FIG. 99 is a flow chart showing a flow to display an effect range in a case where an operation of a device icon is sensed.

FIG. 99 is a flow chart showing a flow to display an effect range in a case where an operation of a device icon is sensed.

First, the touch panel control section 102 senses that a device icon has been operated by the user on the basic screen (S52801). The operation at this point includes all operations performed on a device icon including tapping, dragging, and dropping.

Next, the display control section 103 determines whether or not an accommodated area of a device corresponding to the selected device icon is equal or larger than an area of a room region corresponding to a display position of the operated device icon (S52802). At this point, the display control section 103 reads the accommodated area 51707 of the device corresponding to the selected device icon from the device list 51700 (FIG. 88) and reads the area 51604 of the room corresponding to the display position of the selected device icon from the room information 51600 (FIG. 87). Subsequently, the display control section 103 compares the accommodated area 51707 read from the device list 51700 with the area 51604 read from the room information 51600.

When it is determined that the accommodated area of the device is equal or larger than the area of the room region (YES in S52802), the display control section 103 displays the entire room region in which the device icon exists as an effect range (S52803). In other words, the display control section 103 displays an effect range of the same size as the room region in which the device icon exists. For example, the display control section 103 displays the entire control target region in a prescribed color representing an effect range.

On the other hand, when it is determined that the accommodated area of the device is smaller than the area of the room region (NO in S52802), the display control section 103 displays an effect range which is smaller than the room region and which has a prescribed shape in the room region in which the device icon exists (S52804). The prescribed shape of the effect range is a circular shape about the device icon.

Moreover, an operation of the humidifier may be controlled by operating an effect range displayed in a control target region.

Figure 100:
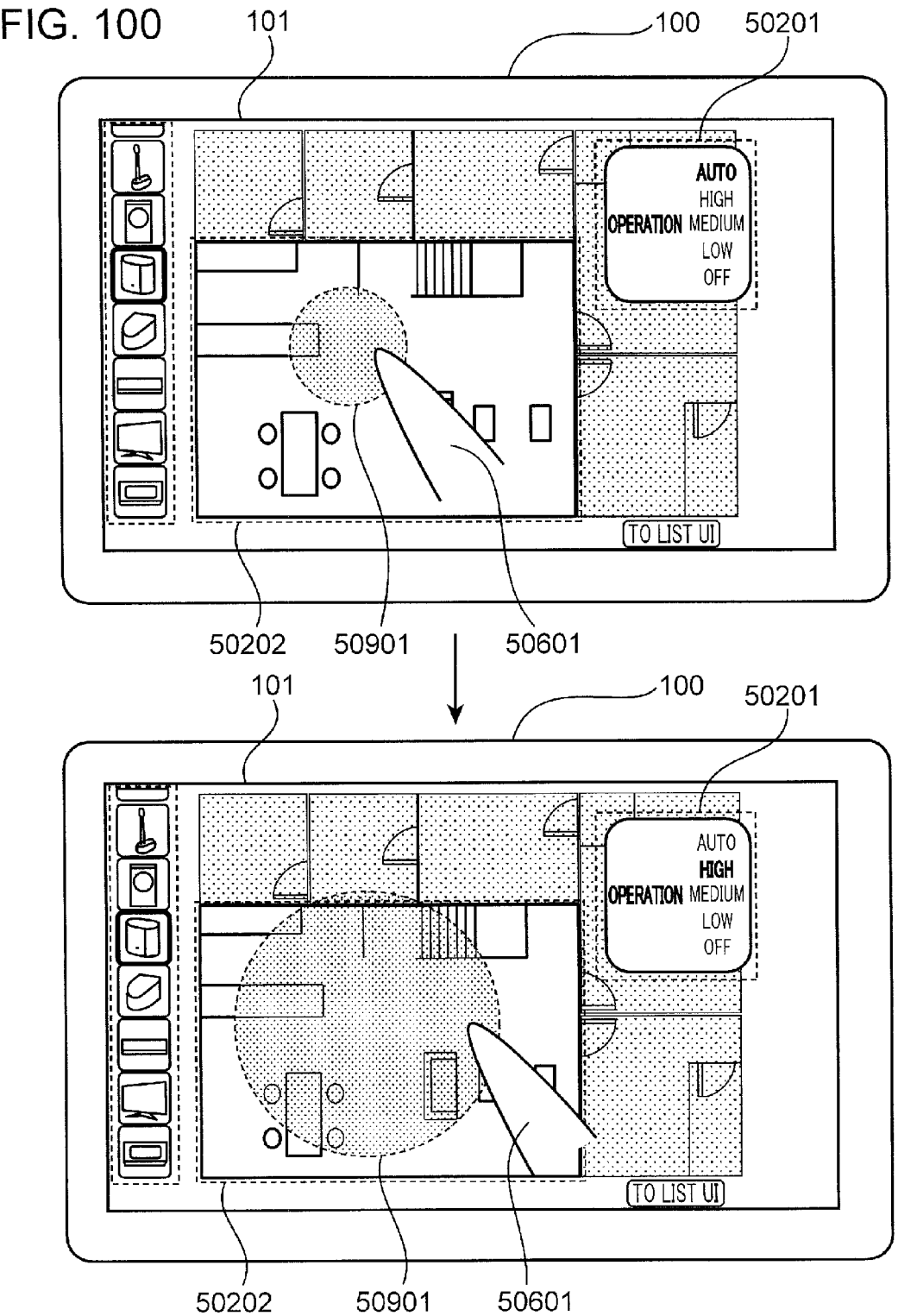
FIG. 100 is a diagram showing a transition of a display screen of a display in a case where a swipe operation is performed with respect to an effect range displayed in a control target region.

FIG. 100 is a diagram showing a transition of a display screen of the display 101 in a case where a swipe operation is performed with respect to an effect range displayed in a control target region.

As shown in an upper diagram in FIG. 100, an effect range 50901 of a humidifier is displayed in the control target region 50202 and the control screen 50201 of the humidifier is displayed outside the control target region 50202. In addition, an operation mode at which the humidifier is to be operated is displayed on the control screen 50201.

Furthermore, the effect range 50901 is displayed in a shape (size) in accordance with a current air flow amount of air that is output from the humidifier. In the example shown in the upper diagram of FIG. 100, the shape of the effect range 50901 is a circular shape about a position of a humidifier icon. The effect range 50901 shown in the upper diagram of FIG. 100 corresponds to an air flow amount in a case where the operation mode is "low".

In the display state shown in the upper diagram in FIG. 100, the touch panel control section 102 senses that the contacting object 50601 has made contact with the effect range 50901 of the humidifier and the contact position between the contacting object 50601 and the display 101 moves in a rightward direction (a direction toward an outer edge portion of the effect range 50901) (the upper diagram→the lower diagram in FIG. 100) without the contacting object 50601 separating from the display 101. In this case, as an amount of movement increases, the display control section 103 deforms a shape (a size) of the effect range 50901 of the humidifier to be displayed on the display 101. In other words, the display control section 103 changes the effect range 50901 of the humidifier to be displayed on the display 101 so as to increase. In addition, the display control section 103 changes a display content of the control screen 50201 in accordance with the change in the effect range 50901. The operation mode of the control screen 50201 and the effect range 50901 shown in the lower diagram of FIG. 100 correspond to an air flow amount in a case where the operation mode is "high".

As described above, by performing a swiping operation on the effect range 50901 in the control target region 50202, a shape (size) of the effect range 50901 can be changed and a display content of the control screen 50201 can be changed in accordance with the shape (size) of the effect range 50901.

Furthermore, when a contact with the display 101 is sensed and a continuous movement of the contact with the display 101 on the display screen is sensed in a region corresponding to the displayed effect range 50901, the device control section 106 causes a control command for changing the air flow amount of the humidifier so as to follow the movement to be output to the network. The control execution section 211 of the humidifier sets an air flow amount of air to be output in accordance with a received control command.

In addition, by performing a pinch-in operation or a pinch-out operation on the effect range 50901 in the control target region 50202, a shape of the effect range 50901 may be changed and a display content of the control screen 50201 may be changed in accordance with the shape of the effect range 50901.

Figure 101:
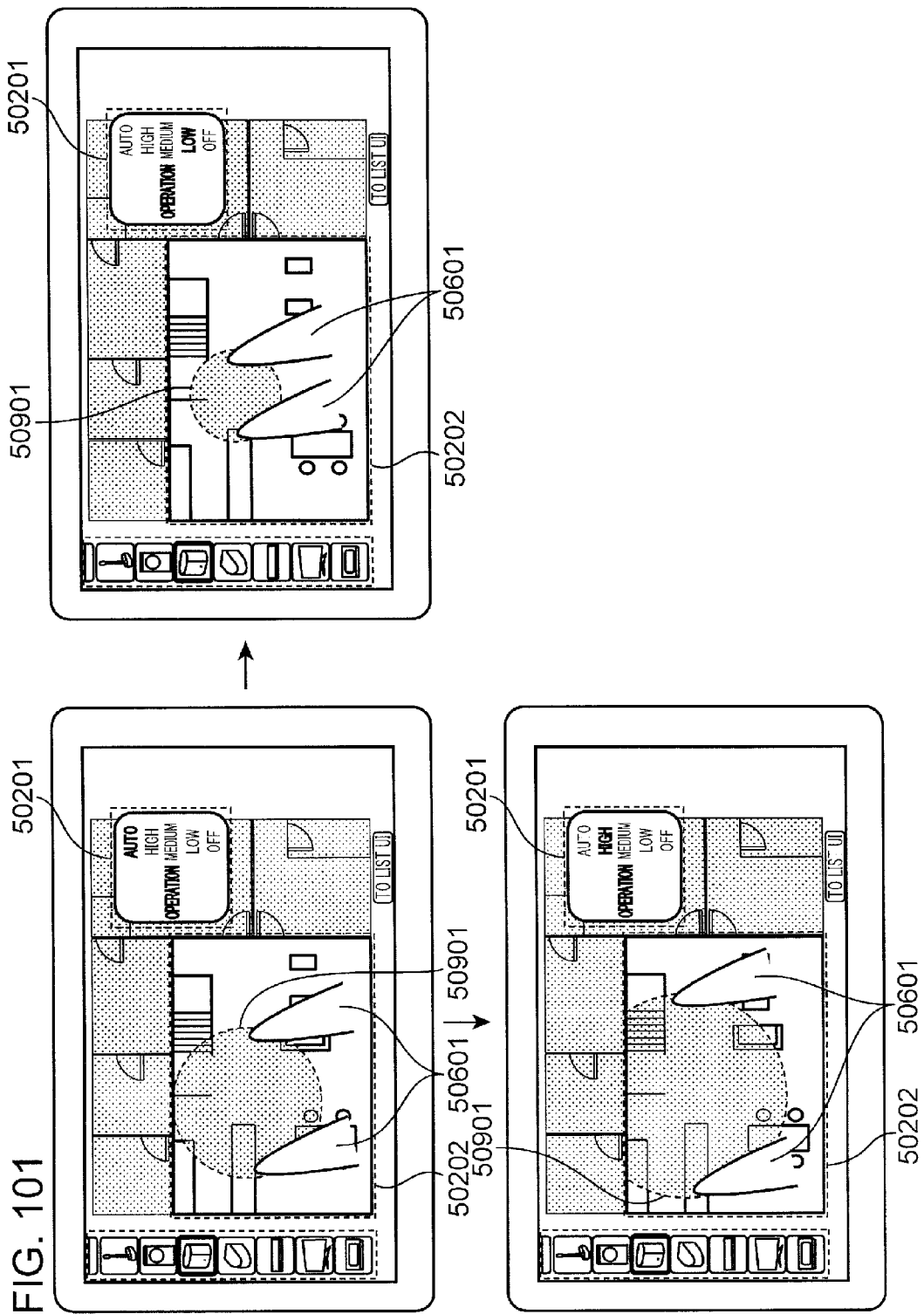
FIG. 101 is a diagram showing a transition of a display screen of a display in a case where a pinch-in operation or a pinch-out operation is performed with respect to an effect range displayed in a control target region.

FIG. 101 is a diagram showing a transition of a display screen of the display 101 in a case where a pinch-in operation or a pinch-out operation is performed with respect to an effect range displayed in a control target region.

As shown in an upper left diagram in FIG. 101, the effect range 50901 of a humidifier is displayed in the control target region 50202 and the control screen 50201 of the humidifier is displayed outside the control target region 50202. In addition, an operation mode at which the humidifier is to be operated is displayed on the control screen 50201.

Furthermore, the effect range 50901 is presented in a size in accordance with a current air flow amount of air output from the humidifier. In the example shown in the upper left diagram in FIG. 101, the size of the effect range 50901 is a size corresponding to "medium" (a second air flow amount) among air flow amounts expressed in three stages including "high" (a first air flow amount), "medium" (the second air flow amount), and "low" (a third air flow amount).

In the display state shown in the upper left diagram in FIG. 101, the touch panel control section 102 senses that two contacting objects 50601 have made contact with the effect range 50901 of the humidifier and contact positions between the two contacting objects 50601 and the display 101 move so as to approach one another (the upper left diagram→the upper right diagram in FIG. 101) without the two contacting objects 50601 separating from the display 101. In this case, as an amount of movement increases, the display control section 103 changes a size of the effect range 50901 of the humidifier to be displayed on the display 101. In other words, the display control section 103 reduces the size of the effect range 50901 of the humidifier to be displayed on the display 101 (the upper right diagram in FIG. 101). Subsequently, the display control section 103 changes the display of the control screen 50201 from "auto" to "low".

Furthermore, in the display state shown in the upper left diagram in FIG. 101, the touch panel control section 102 senses that two contacting objects 50601 have made contact with the effect range 50901 of the humidifier and contact positions between the two contacting objects 50601 and the display 101 move so as to separate from one another (the upper left diagram→the lower left diagram in FIG. 101) without the two contacting objects 50601 separating from the display 101. In this case, as an amount of movement increases, the display control section 103 changes a size of the effect range 50901 of the humidifier to be displayed on the display 101. In other words, the display control section 103 increases the size of the effect range 50901 of the humidifier to be displayed on the display 101 (the lower left diagram in FIG. 101). Subsequently, the display control section 103 changes the display of the control screen 50201 from "auto" to "high".

In addition, when a contact with the display 101 is sensed and a continuous movement of the contact with the display 101 on the display screen is sensed in a region corresponding to the displayed effect range 50901, the device control section 106 causes a control command for changing an output amount of air that is output from the humidifier so as to follow the movement to be output to the network. The control execution section 211 of the humidifier sets an output amount of air in accordance with a received control command.

Accordingly, an operation of the humidifier can be controlled in accordance with an operation performed with respect to the effect range 50901 displayed on the display 101.

A process of generating a control command of the humidifier in accordance with a content of an operation with respect to an effect range will now be described.

Figure 102:
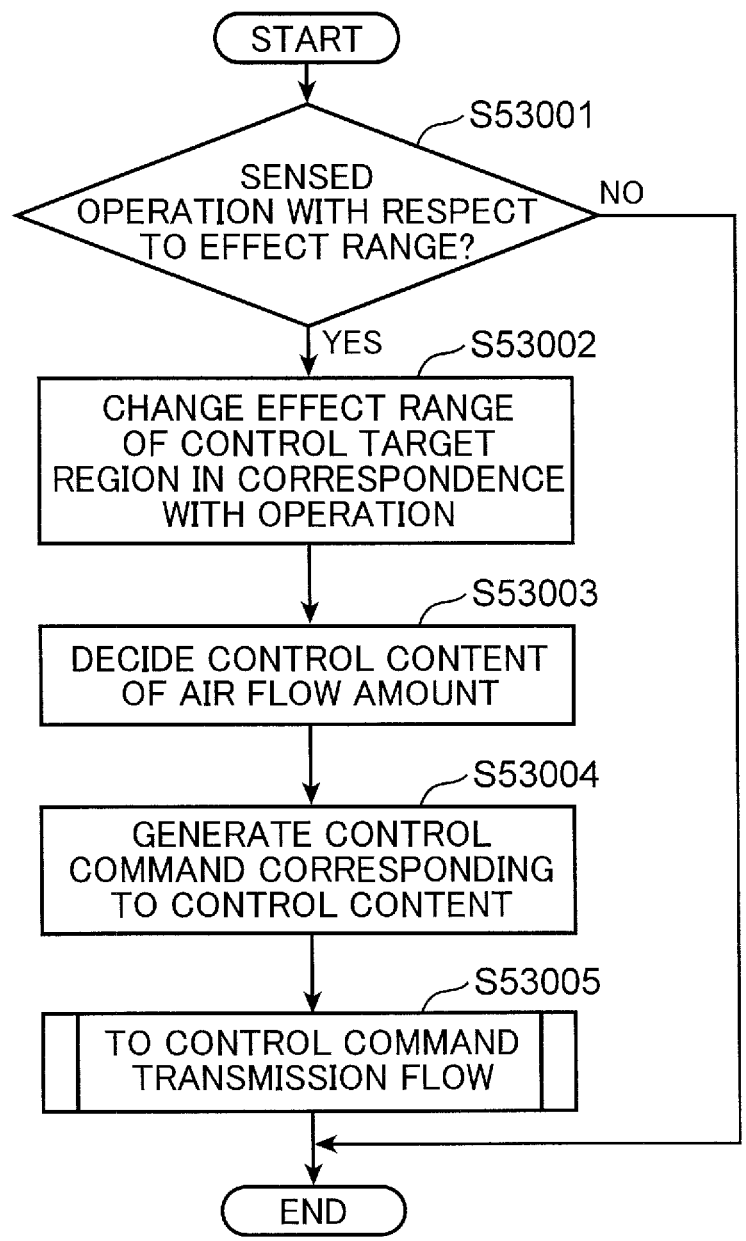
FIG. 102 is a flow chart showing a flow of a process to generate a control command of a humidifier in accordance with the content of an operation with respect to an effect range.

FIG. 102 is a flow chart showing a flow of a process to generate a control command of a humidifier in accordance with the content of an operation with respect to an effect range.

First, the touch panel control section 102 determines whether or not an operation with respect to the effect range 50901 of the humidifier has been sensed (S53001). When an operation with respect to the effect range 50901 of the humidifier is not sensed (NO in S53001), the present flow is finished.

On the other hand, when the touch panel control section 102 senses an operation with respect to the effect range 50901 of the humidifier in S53001 (YES in S53001), the touch panel control section 102 changes display of the effect range 50901 in the control target region 50202 in correspondence with the operation with respect to the effect range 50901 of the humidifier (S53002). Next, the device control section 106 decides a content of control for changing the air flow amount of air in correspondence with the operation with respect to the effect range 50901 (S53003) and the process is advanced to S53004.

Next, the device control section 106 generates a control command corresponding to the decided control content (S53004). For example, let us assume that a pinch-in operation or a pinch-out operation has been performed with respect to the effect range 50901 of the humidifier in a state where the effect range 50901 is displayed and the operation is sensed by the touch panel control section 102. Accordingly, the device control section 106 generates a control command for changing the operation mode of the humidifier. Next, the device control section 106 advances the process to S53005 and executes a control command transmission flow.

The control command transmission flow in S53005 is executed in a similar process flow as, for example, the process flow shown in the flow chart in FIG. 41. Moreover, in the control of a humidifier, the device that is a control command transmission destination in S3702 and S3703 in FIG. 41 corresponds to the humidifier corresponding to the selected humidifier icon. In addition, in the control of a humidifier, the simultaneously operated devices in S3706 in FIG. 41 correspond to, for example, humidifiers in a plurality of rooms corresponding to humidifier icons that are used in common.

INDUSTRIAL APPLICABILITY

The control method according to the present disclosure is useful as a control method for preferably controlling one or more humidifiers connected to a network.

The invention claimed is:

1. A method for controlling an information apparatus having a touch panel display and being connected to a network, and at least one target device being controlled over the network,
the method causing a computer of the information apparatus to:
display, on the touch panel display, a display screen representing a floor plan of a building, the floor plan including at least one room;
display, on the touch panel display screen, at least one movable device icon representing the at least one target device, the at least one device icon including a humidifier icon that represents a humidifier;
sense that the humidifier icon is selected and is dropped within a room of the at least one room on the floor plan by a user; and
in response to the humidifier icon being selected and dropped within the room on the floor plan:
display the humidifier icon and an effective range, in which an effect of the humidifier extends, within the room where the drop of the humidifier icon is sensed, wherein the effective range is not displayed within the room until it is sensed that the humidifier icon is dropped within the room, and the effective range is displayed as a defined area having a predetermined shape encompassing the humidifier icon within the room on the floor plan; and
in response to sensing, on the touch panel display, a contact of a prescribed object in the defined area and a movement of the contact in a direction towards an outer edge of the defined area, adjust the size of the defined area, and output a control command for increasing an amount of the humidified air output from the humidifier, to the network based on the sensed movement of the contact.

2. The method according to claim 1, wherein
when it is sensed that the humidifier icon is dragged from a first room, in which the humidifier icon was placed in the floor plan, and is dropped in a second room that differs from the first room, the defined area of an effective range, in which the effect of the humidifier extends, is displayed within the second room.

3. The method according to claim 2, wherein
when a first size of the first room differs from a second size of the second room, the defined area of the effective range within the first room differs from the defined area of the effective range within the second room.

4. The method according to claim 1, wherein
after the drop of the humidifier icon is sensed within the room, when it is sensed that the humidifier icon is selected within the room, in which the drop of the humidifier icon is sensed, a control screen for operation or state confirmation of a humidifier corresponding to the selected humidifier icon is displayed.

5. The method according to claim 4, wherein
a control command is output to the network based on an operation on the control screen, the control command being used for at least the operation or the state confirmation of the humidifier.

6. The method according to claim 1, wherein
the effective range comprises a range that is humidified by the humidifier.

7. The method according to claim 4, wherein
the effective range changes in accordance with the operation on the control screen.

8. The method according to claim 7, wherein
the effective range is expanded when the humidifier is set to operate in a stronger operation state than a current operation state based on the operation on the control screen and is narrowed when the humidifier is set to operate in a weaker operation state than the current operation state based on the operation on the control screen.

9. The method according to claim 1, wherein
the defined area of the effective range has a circular shape that is centered on the humidifier icon.

10. The method according to claim 1, wherein
the device icon is moved when a contact of a prescribed object with the touch panel display is sensed at a position corresponding to the device icon and the device icon is dragged.

11. A non-transitory computer-readable recording medium which stores a program to be executed by an information apparatus having a touch panel display and being connected to a network, and at least one target device being controlled over the network,
the program causing a computer of the information apparatus to:
display, on the touch panel display, a display screen representing a floor plan of a building, the floor plan including at least one room;
display, on the touch panel display screen, at least one movable device icon representing the at least one target device, the at least one device icon including a humidifier icon that represents a humidifier;
sense that the humidifier icon is selected and is dropped within a room of the at least one room on the floor plan by a user; and
in response to the humidifier icon being selected and dropped within the room on the floor plan:
display the humidifier icon and an effective range, in which an effect of the humidifier extends, within the room where the drop of the humidifier icon is sensed, wherein the effective range is not displayed within the room until it is sensed that the humidifier icon is dropped within the room, and the effective range is displayed as a defined area having a predetermined shape encompassing the humidifier icon within the room on the floor plan; and
in response to sensing, on the touch panel display, a contact of a prescribed object in the defined area and a movement of the contact in a direction towards an outer edge of the defined area, adjust the size of the defined area, and output a control command for increasing an amount of the humidified air output from the humidifier, to the network based on the sensed movement of the contact.

12. The method according to claim 1, wherein
when an area of the effective range is smaller than an area of the room where the drop of the humidifier icon is sensed, the defined area of the effective range is displayed with a smaller size than the size of the room, and
when an area of the effective range is larger than the area of the room where the drop of the humidifier icon is sensed, the defined area of the effective range is displayed with the same size as the size of the room.

* * * * *